US012437447B2

(12) United States Patent
Iguchi et al.

(10) Patent No.: US 12,437,447 B2
(45) Date of Patent: Oct. 7, 2025

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Noritaka Iguchi, Osaka (JP); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 409 days.

(21) Appl. No.: 17/846,628

(22) Filed: Jun. 22, 2022

(65) Prior Publication Data
US 2022/0327745 A1    Oct. 13, 2022

Related U.S. Application Data

(63) Continuation of application No. PCT/JP2020/048819, filed on Dec. 25, 2020.
(Continued)

(51) Int. Cl.
*G06T 9/00* (2006.01)
*G06T 9/40* (2006.01)

(52) U.S. Cl.
CPC ............... *G06T 9/001* (2013.01); *G06T 9/40* (2013.01)

(58) Field of Classification Search
CPC .. G06T 9/00; G06T 9/001; G06T 9/40; G06T 2219/00; G06T 2215/00; G06T 1/00;
(Continued)

(56) References Cited

U.S. PATENT DOCUMENTS 5,861,921 A * 1/1999 Shimizu ............... H04N 19/60
375/E7.157
7,620,240 B2 * 11/2009 Chi ..................... H04N 19/126
382/233
(Continued)

FOREIGN PATENT DOCUMENTS

EP       3944195 B1 * 12/2024 ............... G06T 9/00
JP    2005354307 A  * 12/2005
(Continued)

OTHER PUBLICATIONS

Compression of 3D point clouds using a region-adaptive hierarchical transform. IEEE Transactions on Image Processing 25.8 (2016): 3947-3956. (Year: 2016).*
(Continued)

*Primary Examiner* — Stephen R Koziol
*Assistant Examiner* — Benedict E Lee
(74) *Attorney, Agent, or Firm* — Wenderoth, Lind & Ponack, L.L.P.

(57) ABSTRACT

A three-dimensional data encoding method includes: generating quantized values by quantizing, using one or more first parameters for one or more groups to which one or more attribute information belong, a coefficient value calculated for each node included in a layered structure of three-dimensional points. At least one attribute information belongs to any of the one or more groups. The calculating includes calculating, using two first coefficient values of two first nodes of a first layer, a second coefficient value of a second node of a second layer which is one layer higher. The quantizing includes: shifting-up the one or more first parameters by N bits (N is a natural number); shifting-down, by one bit, a sum of two second parameters of the two first nodes; shifting-down the result by N bits; and quantizing the second coefficient value using the obtained parameter.

10 Claims, 116 Drawing Sheets

Related U.S. Application Data

(60) Provisional application No. 62/953,777, filed on Dec. 26, 2019.

(58) Field of Classification Search
CPC .... G06T 3/00; G06T 5/00; G06T 7/00; G06T 11/00; G06T 15/00; G06T 17/00; G06T 13/00; G06T 19/00; G06T 2200/00; G06T 2201/00; G06T 2207/00; G06T 2210/00; G06T 2211/00; G06T 2213/00
See application file for complete search history.

(56) References Cited

U.S. PATENT DOCUMENTS

| | | | | |
|---|---|---|---|---|
| 7,894,440 | B2 * | 2/2011 | Xu | H04L 45/745 370/392 |
| 8,280,939 | B2 * | 10/2012 | Reyzin | G06F 7/483 708/498 |
| 8,463,835 | B1 * | 6/2013 | Walke | G06F 7/485 708/505 |
| 8,588,297 | B2 * | 11/2013 | Kishore | H04N 19/172 375/240.03 |
| 8,638,800 | B2 * | 1/2014 | Kramer | H04L 69/22 710/316 |
| 10,200,688 | B2 * | 2/2019 | Ikai | H04N 19/176 |
| 10,277,910 | B2 * | 4/2019 | Xiu | H04N 19/96 |
| 10,368,104 | B1 * | 7/2019 | Mitchell | H04N 19/124 |
| 10,853,447 | B2 * | 12/2020 | Chou | G06F 17/175 |
| 11,113,786 | B2 * | 9/2021 | Rovers | H04N 19/42 |
| 11,146,828 | B2 * | 10/2021 | Lasang | H04N 19/46 |
| 11,954,112 | B2 * | 4/2024 | Siebel | G06F 8/35 |
| 2011/0186359 | A1 * | 8/2011 | Chen | G06F 3/04182 178/18.06 |
| 2014/0375638 | A1 | 12/2014 | Tomaru et al. | |
| 2018/0302641 | A1 * | 10/2018 | Ikai | H04N 19/196 |

FOREIGN PATENT DOCUMENTS

| | | | | |
|---|---|---|---|---|
| JP | 2011166795 A | * | 8/2011 | ........... H04N 19/115 |
| WO | 2014/020663 | | 2/2014 | |
| WO | WO-2017061189 A1 | * | 4/2017 | ........... H04N 19/105 |

OTHER PUBLICATIONS

De Queiroz et al. "Compression of 3D point clouds using a region-adaptive hierarchical transform." IEEE Transactions on Image Processing 25.8 (2016): 3947-3956. (Year: 2016).*

Salmela et al. "Low-Complexity Inverse Square Root Approximation for Baseband Matrix Operations." International Scholarly Research Notices 2011.1 (2011): 615934. (Year: 2011).*

H. Hou, K. W. Shum, M. Chen and H. Li, "BASIC regenerating code: Binary addition and shift for exact repair," 2013 IEEE International Symposium on Information Theory, Istanbul, Turkey, 2013, pp. 1621-1625, doi: 10.1109/ISIT.2013.6620501. (Year: 2013).*

M. Burtscher and P. Ratanaworabhan, "FPC: A High-Speed Compressor for Double-Precision Floating-Point Data," in IEEE Transactions on Computers, vol. 58, No. 1, pp. 18-31, Jan. 2009, doi: 10.1109/TC.2008.131 (Year: 2008).*

Voronenko, Yevgen, and Markus Püschel. "Multiplierless multiple constant multiplication." ACM Transactions on Algorithms (TALG) 3.2 (2007): 11-es. (Year: 2007).*

Cai, Hongyun, Vincent W. Zheng, and Kevin Chen-Chuan Chang. "A comprehensive survey of graph embedding: Problems, techniques, and applications." IEEE transactions on knowledge and data engineering 30.9 (2018): 1616-1637. (Year: 2018).*

International Search Report (ISR) issued on Mar. 2, 2021 in International (PCT) Application No. PCT/JP2020/048819.

* cited by examiner

| | GEOMETRY INFORMATION | ATTRIBUTE INFORMATION |
| --- | --- | --- |
| n = 1 | $G(1) = (x_1, y_1, z_1)$ | $A(1) = (R_1, G_1, B_1)$ |
| n = 2 | $G(2) = (x_2, y_2, z_2)$ | $A(2) = (R_2, G_2, B_2)$ |
| ⋮ | ⋮ | ⋮ |
| n = N | $G(N) = (x_N, y_N, z_N)$ | $A(N) = (R_N, G_N, B_N)$ |

FIG. 27

```
EXAMPLES OF SEMANTICS OF pcc_nal_unit_type
(1) if pcc_codec_type == Codec 1
      0:Codec1 Goemetry
      1:Codec1 AttributeX
      2:Codec1 AttributeY
      3:Codec1 Geom. PS
      4:Codec1 AttrX. PS
      5:Codec1 AttrX. PS
      6:Codec1 Geometry Sequence PS
      7:Codec1 AttributeX Sequence PS
      8:Codec1 AttributeY Sequence PS
      9:Codec1 AU Header
     10:Codec1 GOF Header
   11 ~:Codec1 reserved for future use (2) if pcc_codec_type == Codec 2
      0:Codec2 DataA
      1:Codec2 MetaDataA
      2:Codec2 MetaDataB
    3 ~:Codec2 reserved for future use
```

| ZeroCnt | BINARIZED DATA |
|---|---|
| 0 | 0 |
| 1 | 10 |
| 2 | 110 |
| ... | ... |
| T-1 | 11111...10 |
| T | 11111...11 |

FIG. 38

```
attribute_data {
  ...
  ZeroCnt
  for (i=0; i<NumOfPoint; i++) {
    if (layerL >= TH_layer) {
      if (ZeroCnt > 0 ) {
        for (j=0; j<attribute_dimension; j++)
          value[j][i] = 0
        --ZeroCnt
      }
      else {
        for (j=0; j<attribute_dimension; j++)
          value[j][i]
        for(d=1, j=1; j<attribute_dimension; j++)
          if (value[j][i] != value[j-1][i])
            d = 0
        for(j=0; j< attribute_dimension; j++ )
          value[j][i] += d
        ZeroCnt
      }
    }
    else {
      if (ZeroCnt > 0 ) {
        value[0][i] = 0
        --ZeroCnt
      }
      else {
        value[0][i]
        value[0][i] += 1
        ZeroCnt
      }
    }
  }
  ...
}
```

FIG. 39

| FIRST DIMENSIONAL COMPONENT (R COMPONENT, v0) | : 73 50 32 15 0 12 0 0 0 ... 0 |
| SECOND DIMENSIONAL COMPONENT (G COMPONENT, v1) | : 60 20 0 0 0 10 0 0 0 ... 0 |
| THIRD DIMENSIONAL COMPONENT (B COMPONENT, v2) | : 58 10 12 0 0 12 0 0 0 ... 0 |

↓

| 0 | 73 | 60 | 58 | 0 | 50 | 20 | 10 | 0 | 32 | 0 | 12 | ... |
|---|----|----|----|---|----|----|----|---|----|----|----|-----|
|   | v0 | v1 | v2 |   | v0 | v1 | v2 |   | v0 | v1 | v2 |     |

| ... | 0 | 15 | 0 | 0 | 1 | 12 | 10 | 12 | N |
|-----|---|----|---|---|---|----|----|----|---|
| ZeroCnt | v0 | v1 | v2 | ZeroCnt | v0 | v1 | v2 | ZeroCnt |

FIG. 49

```
attribute_data {
...
TotalZeroCnt
ZeroCnt
for (i=0; i<NumOfPoint; i++) {
 if (layerL >= TH_layer) {
  if (ZeroCnt > 0 ) {
    for (j=0; j<attribute_dimension; j++)
        value[j][i] = 0
    --ZeroCnt
  }
  else {
    for (j=0; j<attribute_dimension; j++)
      value[j][i]
    for(d=1, j=1; j<attribute_dimension; j++)
      if (value[j][i] != value[j-1][i])
        d = 0
    for(j=0; j< attribute_dimension; j++ )
      value[j][i] += d
    if (TotalZeroCnt > 0) {
        ZeroCnt
      TotalZeroCnt = TotalZeroCnt - ZeroCnt
    }
  }
 }
 else {
  if (ZeroCnt > 0 ) {
    value[0][i] = 0
    --ZeroCnt
  }
  else {
    value[0][i]
    value[j][i] += 1
    if (TotalZeroCnt > 0) {
        ZeroCnt
      TotalZeroCnt = TotalZeroCnt - ZeroCnt
    }
   }
  }
 }
}
...
}
```

FIG. 53

```
attribute_data {
...
ZeroCnt
for (i=0; i<NumOfPoint; i++) {
  if (ZeroCnt > 0 ) {
    for (j=0; j<attribute_dimension; j++)
        value[j][i] = 0
    --ZeroCnt
  }
  else {
    for (j=0; j<attribute_dimension; j++)
      value[j][i]_greater_zero_flag
      if (value[j][i]_greater_zero_flag == 1) {
          value[j][i]_greater_one_flag
          if (value[j][i]_greater_one_flag == 1) {
              value[j][i]
              value[j][i] = value[j][i] + 2
          }
          else
              value[j][i] = 1
      }
      else
          value[j][i] = 0
    for(d=1, j=1; j<attribute_dimension; j++)
      if (value[j][i] != value[j-1][i])
        d = 0
    for(j=0; j< attribute_dimension; j++ )
      value[j][i] += d
    ZeroCnt
  }
}
...
}
```

FIG. 66

```
Attribute header information(){
 QPbase
 NumLayer
 for (i=0; i<NumLayer; i++) {
  Delta_Layer[i]
 }
}
```

FIG. 67

```
Attribute header information(){
 QPbase
 delta_Layer_present_flag
 if (delta_Layer_present_flag) {
  NumLayer
   for (i=0; i<NumLayer; i++) {
   Delta_Layer[i]
  }
 }
}
```

FIG. 69

```
Attribute header information(){
 QPbase
 NumLayer
 for (i=0; i<NumLayer; i++) {
  Delta_Layer[i]
 }
 NumADelta
 for (i=0; i<NumADelta; i++) {
  NumPointADelta[i]
  ADelta_QP[i]
 }
}
```

FIG. 70

```
Attribute header information(){
 QPbase
 delta_Layer_present_flag
 if (delta_Layer_present_flag) {
  NumLayer
  for (i=0; i<NumLayer; i++) {
   Delta_Layer[i]
  }
 }
 additional_delta_QP_present_flag
 if (additional_delta_QP_present_flag) {
  NumADelta_minus1
  for (i=0; i<NumADelta; i++) {
   NumPointADelta[i]
   ADelta_QP[i]
  }
 }
}
```

FIG. 71

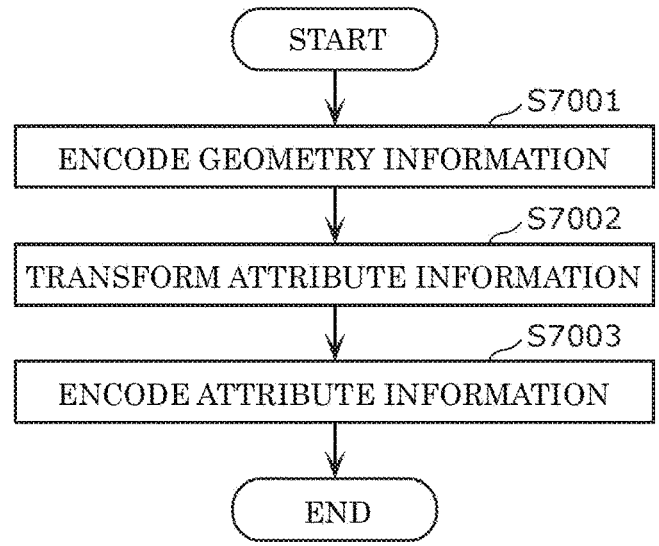

FIG. 79

```
Attribute header information(){
 QPbase
 NumLayer
 for (i=0; i<NumLayer; i++) {
  Delta_Layer[i]
 }
 NumADelta
 for (i=0; i<NumADelta; i++) {
  NumPointADelta[i]
  ADelta_QP[i]
 }
}
```

FIG. 80

```
Attribute header information(){
 QPbase
 delta_Layer_present_flag
 if (delta_Layer_present_flag) {
  NumLayer
  for (i=0; i<NumLayer; i++) {
   Delta_Layer[i]
  }
 }
 additional_delta_QP_present_flag
 if (additional_delta_QP_present_flag) {
  NumADelta_minus1
  for (i=0; i<NumADelta; i++) {
   NumPointADelta[i]
   ADelta_QP[i]
  }
 }
}
```

FIG. 81

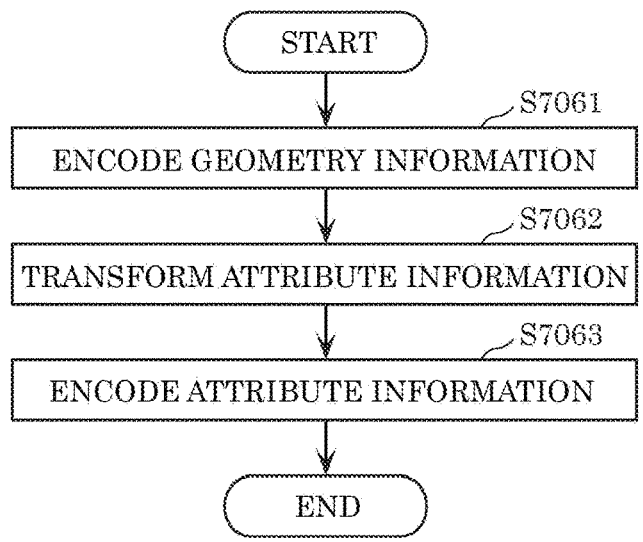

FIG. 86

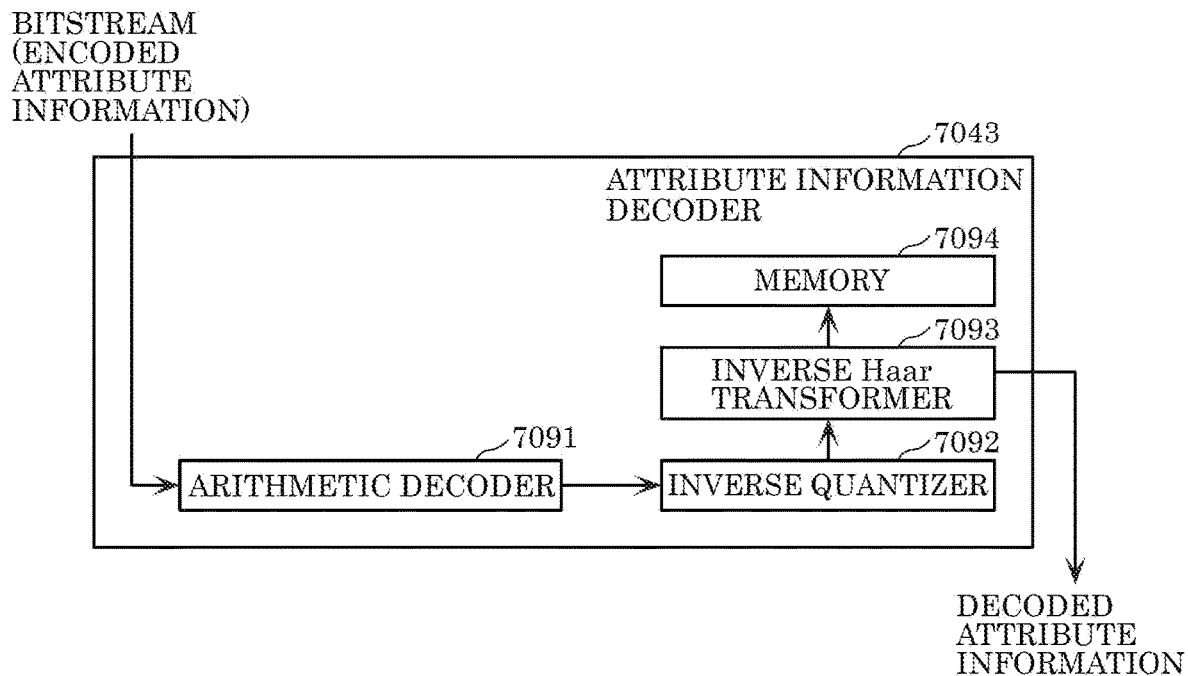

FIG. 87

```
Attribute header information(){
 QPbase
 delta_Layer_present_flag
 if (delta_Layer_present_flag) {
  NumLayer
  for (i=0; i<NumLayer; i++) {
   Delta_Layer[i]
  }
 }
 else {
  default_delta_Layer_present_flag
  if (default_delta_Layer_present_flag) {
   default_delta_Layer_index
  }
 }
 additional_delta_QP_present_flag
 if (additional_delta_QP_present_flag) {
  NumADelta_minus1
  for (i=0; i<NumADelta; i++) {
   NumPointADelta[i]
   ADelta_QP[i]
  }
 }
 else {
  default_additional_delta_QP_present_flag
  if (default_additional_delta_QP_present_flag) {
   default_additional_delta_QP_index
  }
 }
}
```

FIG. 92

```
Attribute header information(){
 QPbase
 delta_Layer_present_flag
 if (delta_Layer_present_flag) {
  NumLayer
  for (i=0; i<NumLayer; i++) {
   Delta_Layer[i]
   TotalPoints[i]
  }
 }
 additional_delta_QP_present_flag
 if (additional_delta_QP_present_flag) {
  const_NumPoint
  for (i=0; i<NumLayer; i++) {
   num_sublayer = (TotalPoints[i] / const_NumPoint) + 1
   for (j=0; j< num_sublayer; j++) {
     ADelta_QP[j]
   }
  }
 }
}
```

FIG. 93

```
Attribute header information(){
 QPbase
 delta_Layer_present_flag
 if (delta_Layer_present_flag) {
  NumLayer
  for (i=0; i<NumLayer; i++) {
   Delta_Layer[i]
   TotalPoints[i]
  }
 }
 additional_delta_QP_present_flag
 if (additional_delta_QP_present_flag) {
 for (i=0; i<NumLayer; i++) {
   const_NumPoint[i]
   num_sublayer = (TotalPoints[i] / const_NumPoint[i]) + 1
   for (j=0; j< num_sublayer; j++) {
     ADelta_QP[j]
   }
  }
 }
}
```

```
Attribute header information(){
 QPbase
 delta_Layer_present_flag
 if (delta_Layer_present_flag) {
  NumLayer
  for (i=0; i<NumLayer; i++) {
   Delta_Layer[i]
   TotalPoints[i]
  }
 }
 additional_delta_QP_present_flag
 if (additional_delta_QP_present_flag) {
  const_NumPoint
  for (i=0; i<NumLayer; i++) {
   j = 0
   While (!stop_code) {
    ADelta_QP[j]
    j++
   }
  }
 }
}
```

FIG. 96

```
Attribute header information(){
QPbase
delta_Layer_present_flag
if (delta_Layer_present_flag) {
  NumLayer
  for (i=0; i<NumLayer; i++) {
    Delta_Layer[i]
    TotalPoints[i]
  }
}
additional_delta_QP_present_flag
if (additional_delta_QP_present_flag) {
  const_NumPoint
  for (i=0; i<NumLayer; i++) {
    num_sublayer[i]
    for (j=0; j< num_sublayer[j]; j++) {
      ADelta_QP[j]
    }
  }
}
```

```
Attribute header information(){
QPbase
delta_Layer_present_flag
if (delta_Layer_present_flag) {
  NumLayer
  for (i=0; i<NumLayer; i++) {
     Delta_Layer[i]
  }
}
additional_delta_QP_present_flag  if
(additional_delta_QP_present_flag) {
  for (i=0; i<NumLayer; i++) {
    num_sublayer[i]
    for (j=0; j<num_sublayer[i]; j++) {
      if (j != (num_sublayer[i] – 1)) {
        percentile[j]
      }
      ADelta_QP[j]
    }
  }
}
}
```

```
Attribute header information(){
QPbase
delta_Layer_present_flag
if (delta_Layer_present_flag) {
  NumLayer
  for (i=0; i<NumLayer; i++) {
   Delta_Layer[i]
  }
}
additional_delta_QP_present_flag
if (additional_delta_QP_present_flag) {
 num_morton_sublayer
 for (i=0; i<num_morton_sublayer; i++) {
  Index[i]
  ADelta_QP[i]
 }
}
}
```

```
Attribute header information(){
 QPbase
 delta_Layer_present_flag
 if (delta_Layer_present_flag) {
  NumLayer
  for (i=0; i<NumLayer; i++) {
   Delta_Layer[i]
  }
 }
 additional_delta_QP_present_flag
 if (additional_delta_QP_present_flag) {
  num_Group
  for (i=0; i<num_Group; i++) {
   ADelta_QP[i]
  }
 }
}
```

FIG. 106

```
Residual ( dimension, i ) {
  for ( k = 0; k < dimension; k++ ) {
    isZero
    if ( isZero == 1 )
      values[ k ][ i ] = 0
    else{
      index [ k ][ i ]
      values[ k ][ i ]
    }
  }
}
```

FIG. 107

For example:
 Encoding cost = (original - prediction) + lambda * encoding_bit herein,
  lambda: adaptive parameter based on QP or Qstep
  encoding_bit: bits to encode target attribute value
*(original – reconstructed value) might be used instead of (original – prediction) to get much accurate value

FIG. 108

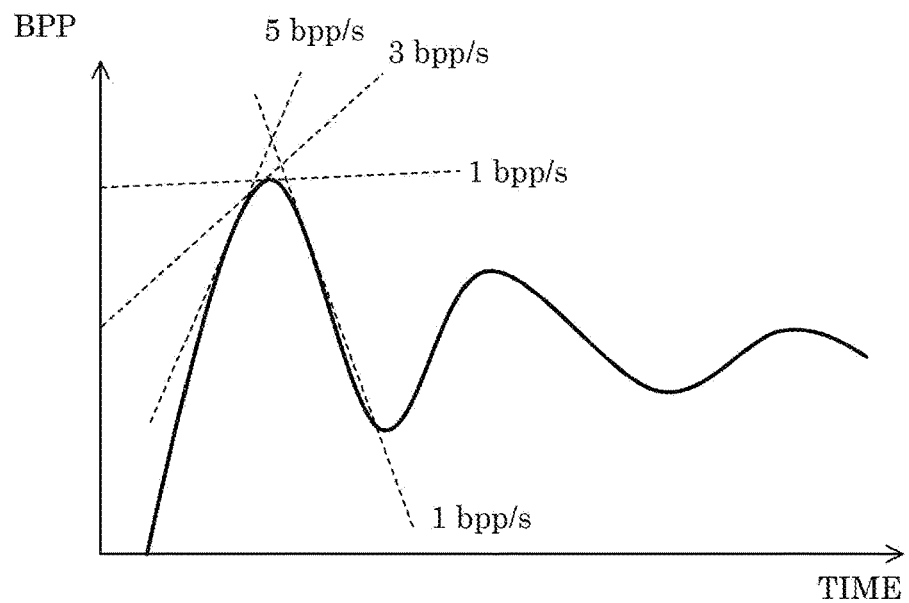

```
Attribute header information(){
QPbase
delta_Layer_present_flag
if (delta_Layer_present_flag) {
 NumLayer
  for (i=0; i<NumLayer; i++) {
   Delta_Layer[i]
  }
 }
additional_delta_QP_present_flag
if (additional_delta_QP_present_flag) {
 num_group
  for (i=0; i<num_group; i++) {
   center_x[i]
   center_y[i]
   center_z[i]
   radius[i]
   ADelta_QP[i]
  }
 }
}
```

FIG. 115

```
Attribute header information(){
 QPbase
 delta_Layer_present_flag
 if (delta_Layer_present_flag) {
  NumLayer
  for (i=0; i<NumLayer; i++) {
   Delta_Layer[i]
  }
 }
 additional_delta_QP_present_flag
 if (additional_delta_QP_present_flag) {
  num_group
  for (i=0; i<num_group; i++) {
   origin_x[i]
   origin_y[i]
   origin_z[i]
   length[i]
   width[i]
   depth[i]
   ADelta_QP[i]
  }
 }
}
```

(origin_x, origin_y, origin_z) = (x', y', z')
shape = cylinder
parameter1 = radius = R
parameter2 = height = H
ADelta_QP = -2

FIG. 118

```
Attribute header information(){
 QPbase
 delta_Layer_present_flag
 if (delta_Layer_present_flag) {
  NumLayer
  for (i=0; i<NumLayer; i++) {
    Delta_Layer[i]
  }
 }
 additional_delta_QP_present_flag
 if (additional_delta_QP_present_flag) {
  num_group
  for (i=0; i<num_group; i++) {
   origin_x[i]
   origin_y[i]
   origin_z[i]
   shape[i]
   parameter1[i]
   parameter2[i]
   ADelta_QP[i]
  }
 }
```

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2020/048819 filed on Dec. 25, 2020, claiming the benefit of priority of U.S. Provisional Patent Application No. 62/953,777 filed on Dec. 26, 2019, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (for example, see International Publication WO 2014/020663).

SUMMARY

There has been a demand for performing encoding efficiently in encoding three-dimensional data.

The present disclosure has an object to provide a three-dimensional data encoding method, a three-dimensional data decoding method, a three-dimensional data encoding device, or a three-dimensional data decoding device that is capable of performing encoding efficiently.

A three-dimensional data encoding method according to an aspect of the present disclosure includes: calculating a coefficient value of each of nodes included in a layered structure by generating the layered structure in which each of items of attribute information of three-dimensional points included in point cloud data is hierarchically divided into a first component and a second component; and quantizing, for each of the nodes, the coefficient value of the node using one or more first parameters for one or more groups to which one or more items of attribute information used in the calculating of the coefficient value belong, to generate quantized values, wherein at least one item of attribute information among the items of attribute belongs to any one of the one or more groups, in the calculating, a second coefficient value of a second node of a second layer which is one layer higher than a first layer of the layered structure is calculated using two first coefficient values of two first nodes belonging to the first layer, and the quantizing includes: (i) generating one or more second parameters by shifting-up the one or more first parameters by N bits, N being a natural number; (ii) generating a third parameter by shifting-down, by one bit, a sum obtained by adding up two second parameters of the two first nodes; (iii) generating a fourth parameter by shifting-down the third parameter by N bits; and (iv) quantizing the second coefficient value using the fourth parameter.

A three-dimensional data decoding method according to an aspect of the present disclosure includes: calculating, using quantized values and one or more first parameters, coefficient values by inverse-quantizing each of the quantized values; and calculating, from the coefficient values, items of attribute information of three-dimensional points included in point cloud data, wherein the one or more first parameters are one or more parameters for one or more groups to which one or more items of attribute information belong, the one or more items of attribute information being used in the calculating of a coefficient value to which a corresponding one of the quantized values corresponds, at least one item of attribute information among the items of attribute information belongs to any one of the one or more groups, the coefficient values are calculated corresponding to nodes included to a layered structure, the layered structure is a structure in which each of the items of attribute information is hierarchically divided into a first component and a second component, two first coefficient values of two first nodes belonging to a first layer of the layered structure are used in calculating a second coefficient value of a second node of a second layer which is one layer higher than the first layer, and the inverse-quantizing includes: (i) generating one or more second parameters by shifting-up the one or more first parameters by N bits, N being a natural number; (ii) generating a third parameter by shifting-down, by one bit, a sum obtained by adding up two second parameters of the two first nodes; (iii) generating a fourth parameter by shifting-down the third parameter by N bits; and (iv) inverse-quantizing a quantized value of the second node using the fourth parameter.

Note that these general and specific aspects may be implemented as a system, an integrated circuit, a computer program, or a computer-readable recording medium such as a CD-ROM, or as any combination of a system, an integrated circuit, a computer program, and a computer-readable recording medium.

The present disclosure provides a three-dimensional data encoding method, a three-dimensional data decoding method, a three-dimensional data encoding device, or a three-dimensional data decoding device that is capable of performing encoding efficiently.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 27 is a diagram illustrating a semantics example of pcc_nal_unit_type according to Embodiment 2;

FIG. 38 is a diagram showing a syntax example of the attribute information according to Embodiment 3;

FIG. 39 is a diagram showing an example of a coding coefficient and ZeroCnt according to Embodiment 3;

FIG. 49 is a diagram showing a syntax example of the attribute information according to the modification of Embodiment 3;

FIG. 53 is a diagram showing a syntax example of the attribute information according to the modification of Embodiment 3;

FIG. 66 is a diagram showing a syntax example of an attribute information header according to Embodiment 4;

FIG. 67 is a diagram showing a syntax example of an attribute information header according to Embodiment 4;

FIG. 69 is a diagram showing a syntax example of an attribute information header according to Embodiment 4;

FIG. 70 is a diagram showing a syntax example of an attribute information header according to Embodiment 4;

FIG. 71 is a flowchart of a three-dimensional data encoding process according to Embodiment 4;

FIG. 79 is a diagram showing a syntax example of an attribute information header according to Embodiment 4;

FIG. 80 is a diagram showing a syntax example of an attribute information header according to Embodiment 4;

FIG. 81 is a flowchart of a three-dimensional data encoding process according to Embodiment 4;

FIG. 86 is a block diagram of an attribute information decoder according to Embodiment 4;

FIG. 87 is a diagram showing a syntax example of an attribute information header according to Embodiment 4;

FIG. 92 shows a syntax example of a header of attribute information in the second example according to Embodiment 5;

FIG. 93 shows another syntax example of attribute information in the second example according to Embodiment 5;

FIG. 96 shows another syntax example of a header of attribute information in the third example according to Embodiment 5;

FIG. 106 shows a syntax example of a bitstream of a residual according to Embodiment 5;

FIG. 107 shows an equation for calculating an encoding cost (Encoding cost) according to Embodiment 5;

FIG. 108 is a graph showing a relationship between bits per point (BPP) and time according to Embodiment 5;

FIG. 115 shows an example of a syntax of a header of attribute information according to Embodiment 6;

FIG. 118 shows an example of a syntax of a header of attribute information in a case where a three-dimensional space having a cylindrical shape is set according to Embodiment 6;

FIG. 119 is a flowchart showing an example of a process of applying a different quantization parameter for each three-dimensional space according to Embodiment 6;

FIG. 120 is a flowchart showing another example of the process of applying a different quantization parameter for each three-dimensional space according to Embodiment 6;

FIG. 121 is a diagram for illustrating a first example of an encoding of attribute information using RAHT according to Embodiment 6;

FIG. 122 is a diagram for illustrating a second example of the encoding of attribute information using RAHT according to Embodiment 6;

FIG. 123 is a diagram for illustrating a third example of the encoding of attribute information using RAHT according to Embodiment 6;

FIG. 124 is a diagram for illustrating a fourth example of the encoding of attribute information using RAHT according to Embodiment 6;

FIG. 125 is a diagram showing an example of a RAHT hierarchical structure (tree structure) according to Embodiment 6;

FIG. 126 is a diagram for illustrating a fifth example of the encoding of attribute information using RAHT according to Embodiment 6;

FIG. 127 is a diagram for illustrating a sixth example of the encoding of attribute information using RAHT according to Embodiment 6;

FIG. 128 is a block diagram showing an example of a processor that performs an attribute information encoding process according to Embodiment 6;

FIG. 129 is a diagram showing a relationship between items of attribute information and a relationship between QP values in a LoD hierarchical structure according to Embodiment 6;

FIG. 130 is a block diagram showing an example of a processor that performs an attribute information decoding process according to Embodiment 6;

Figure 131:
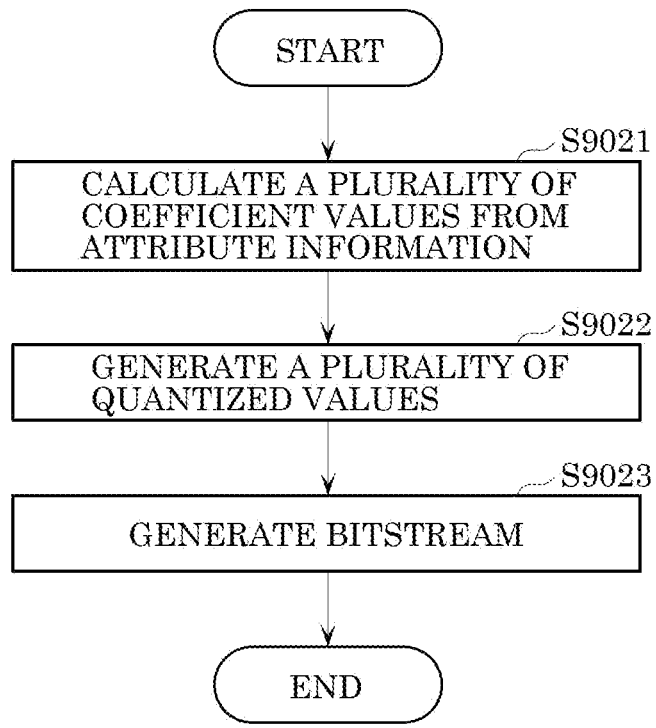
Figure 132:
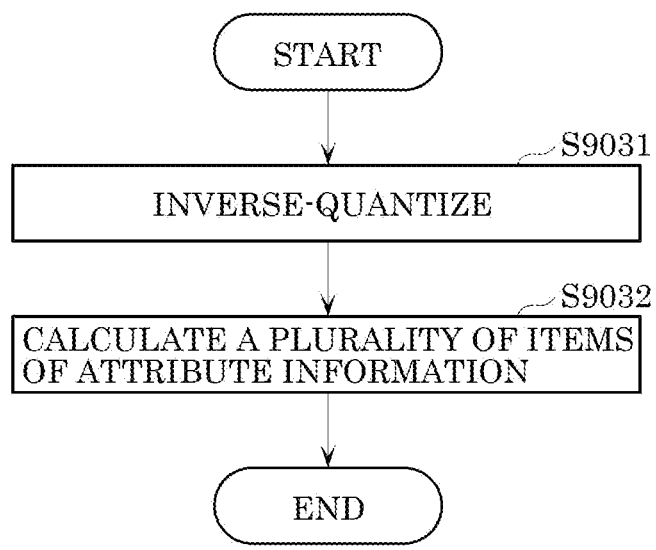
Figure 133:
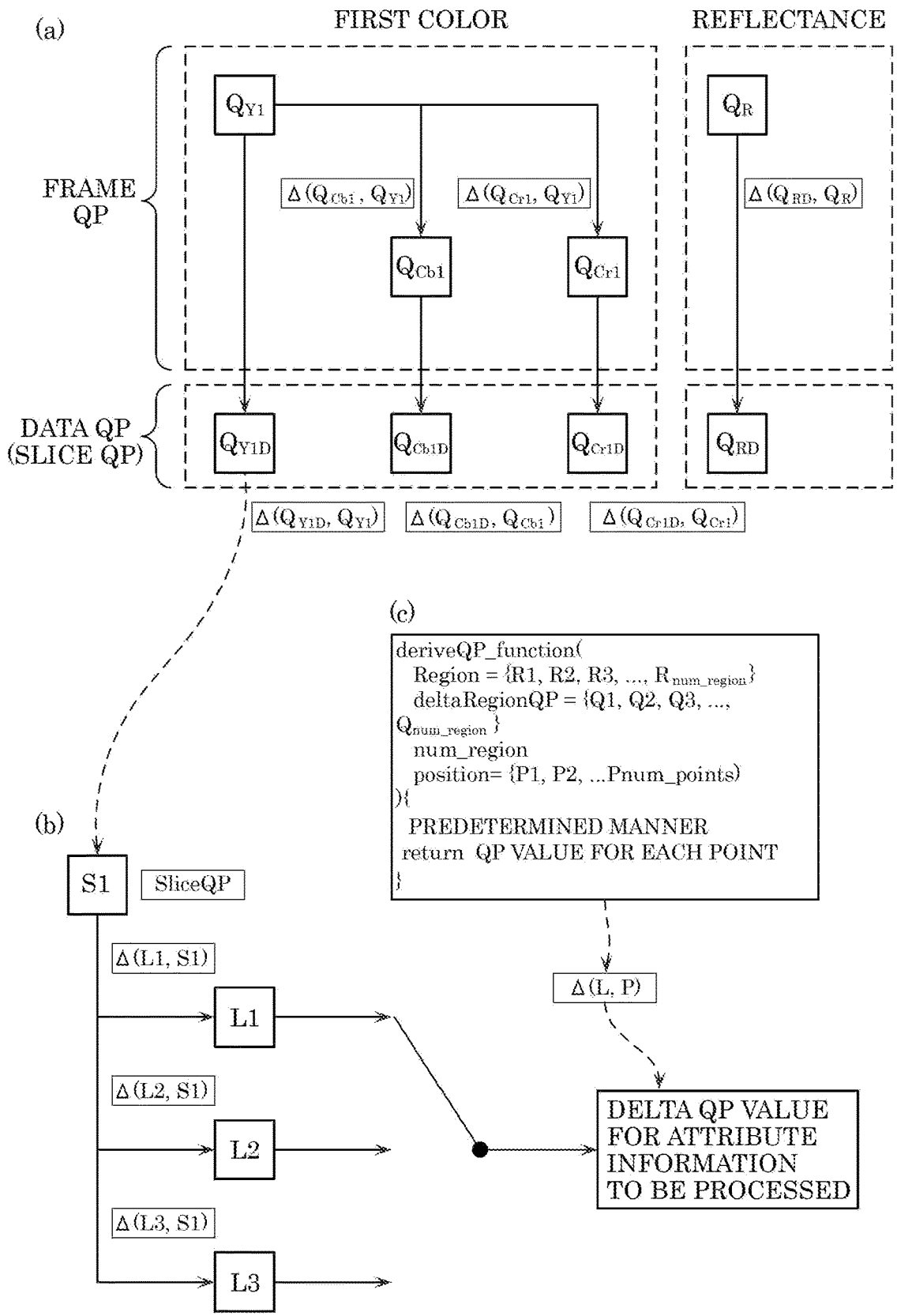
Figure 134:
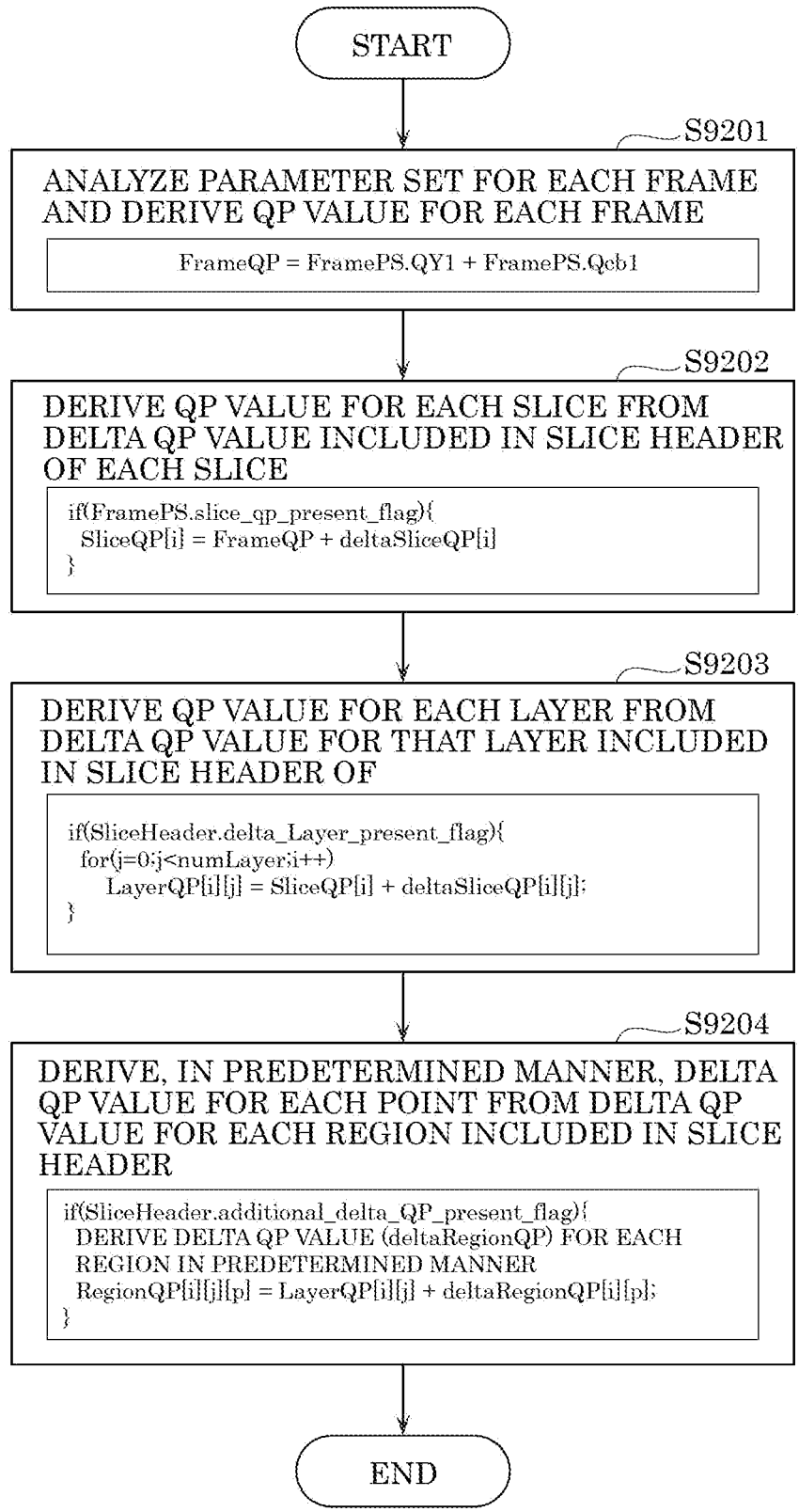
Figure 135:
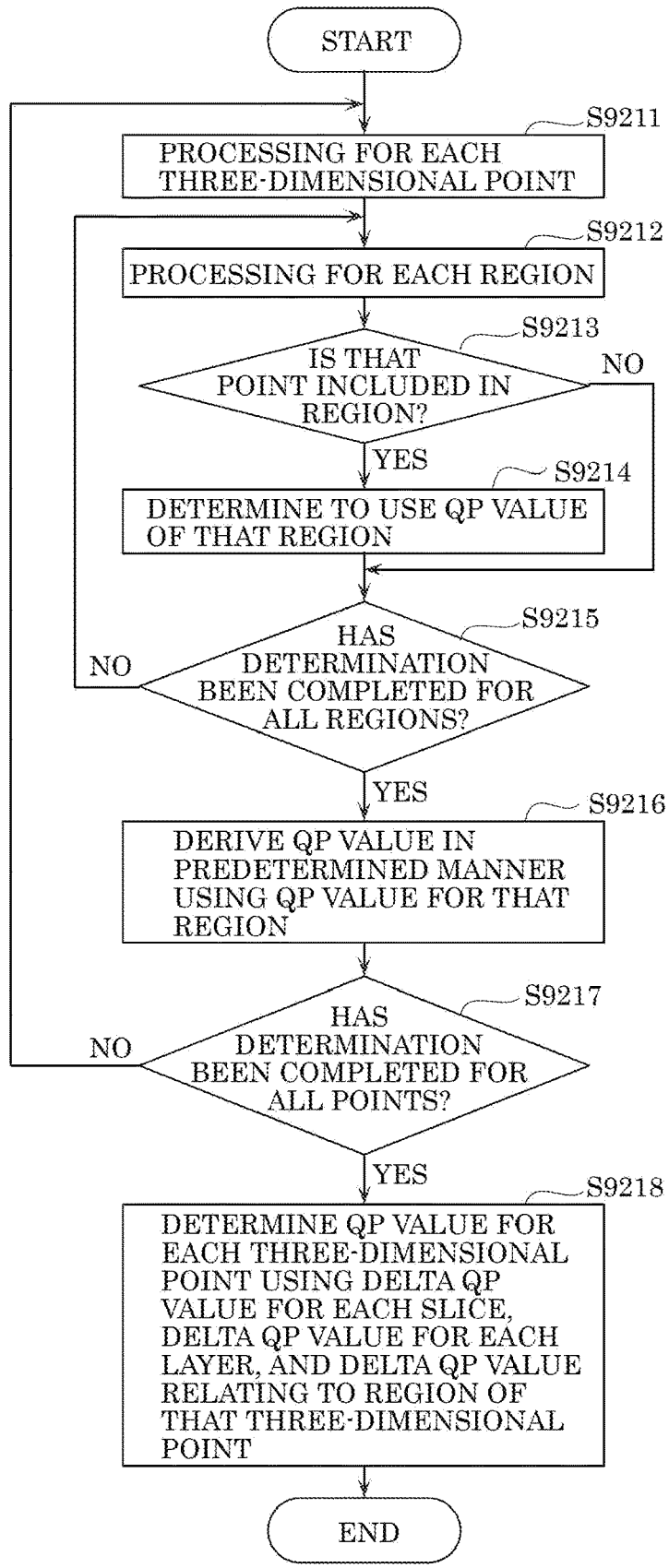
Figure 136:
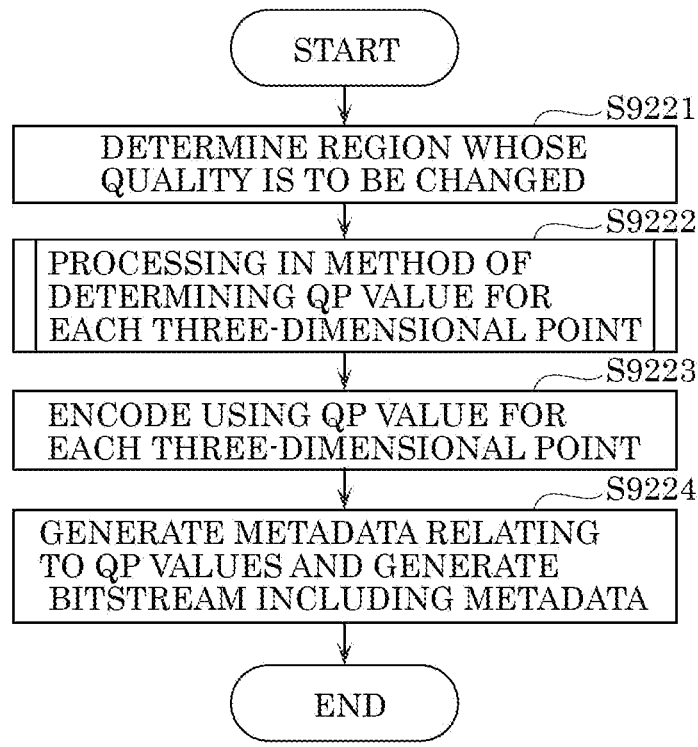
Figure 137:
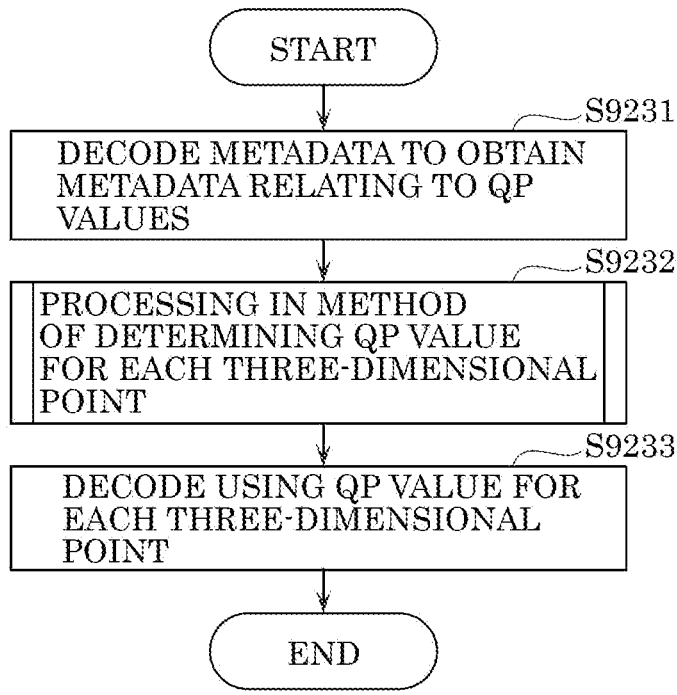
Figure 138:
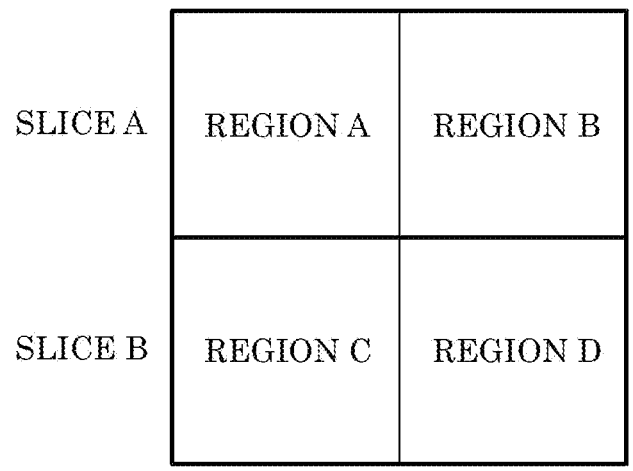
Figure 139:
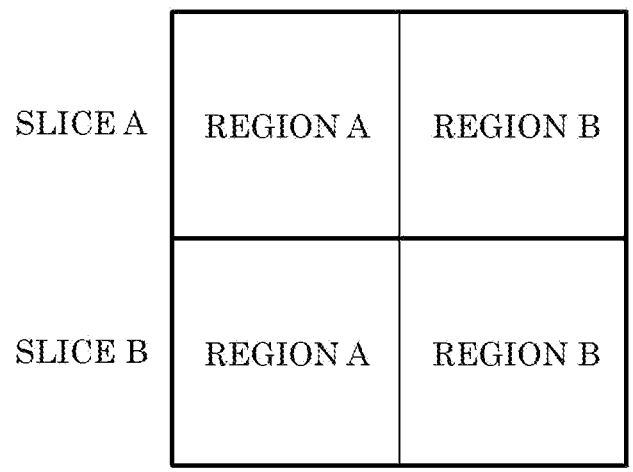
Figure 140:
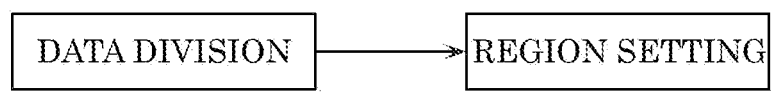
Figure 141:
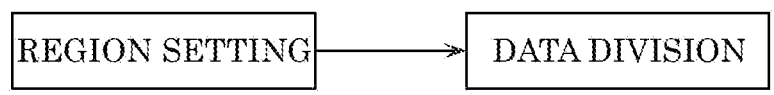
Figure 142:
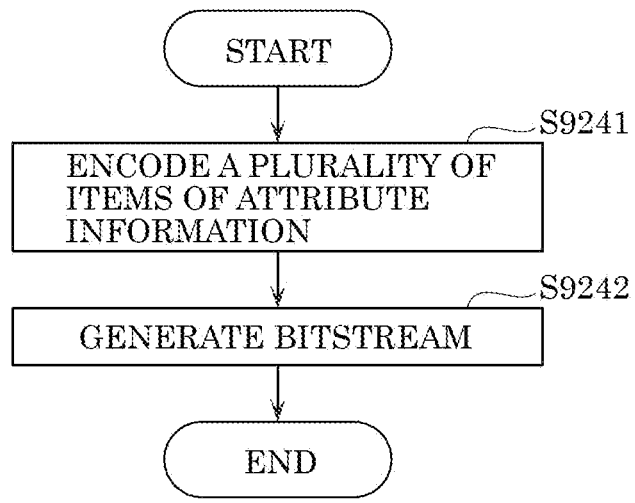
Figure 143:
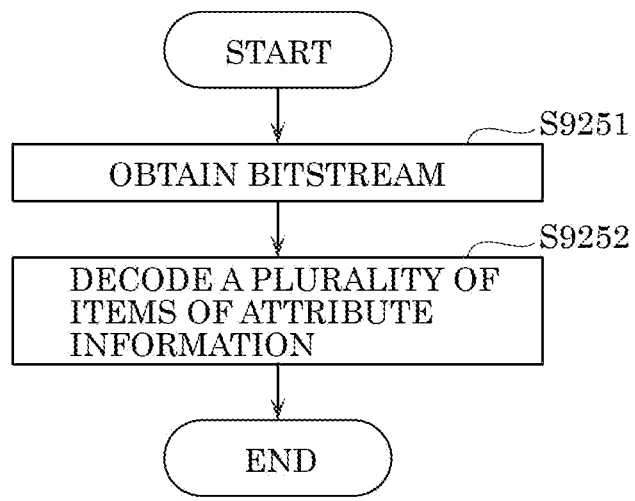
Figure 144:
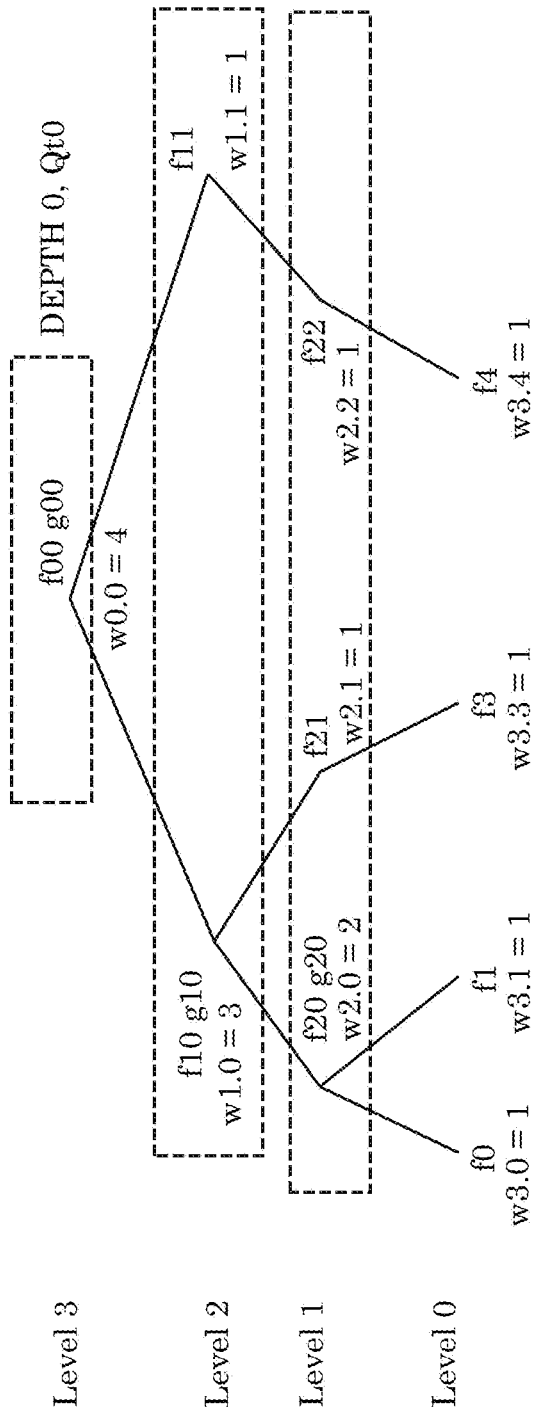
Figure 145:
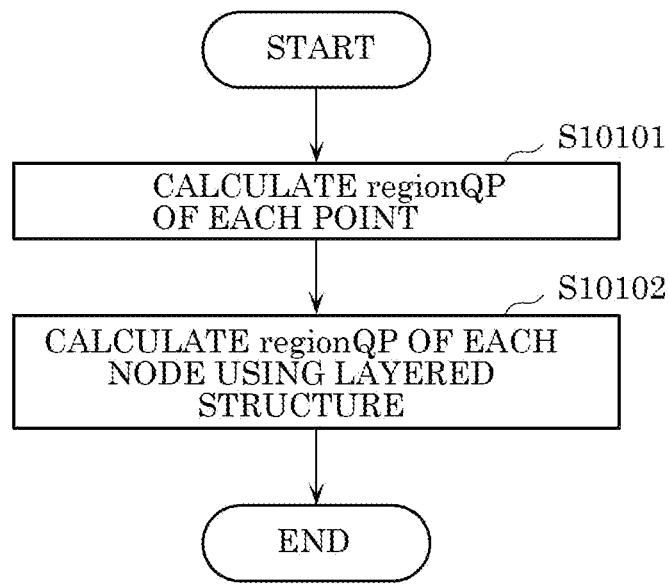
Figure 146:
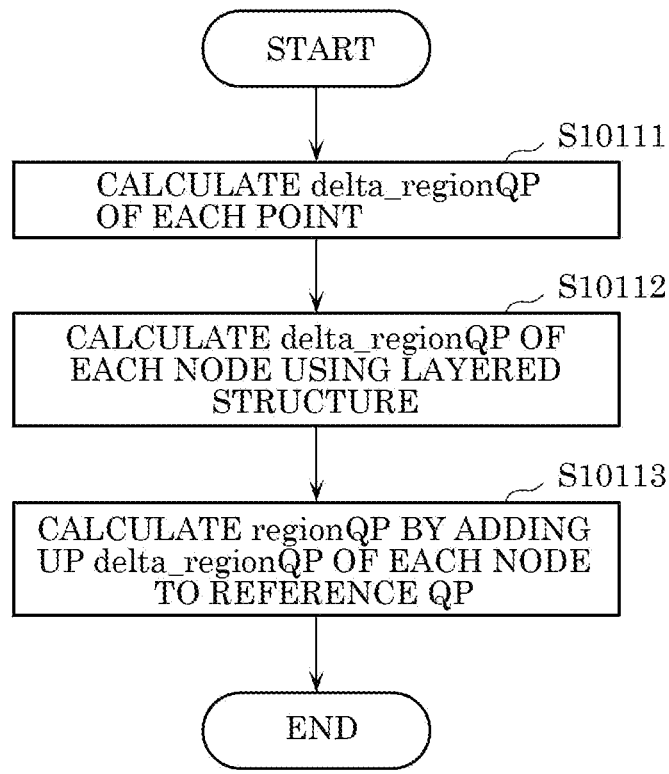
Figure 147:
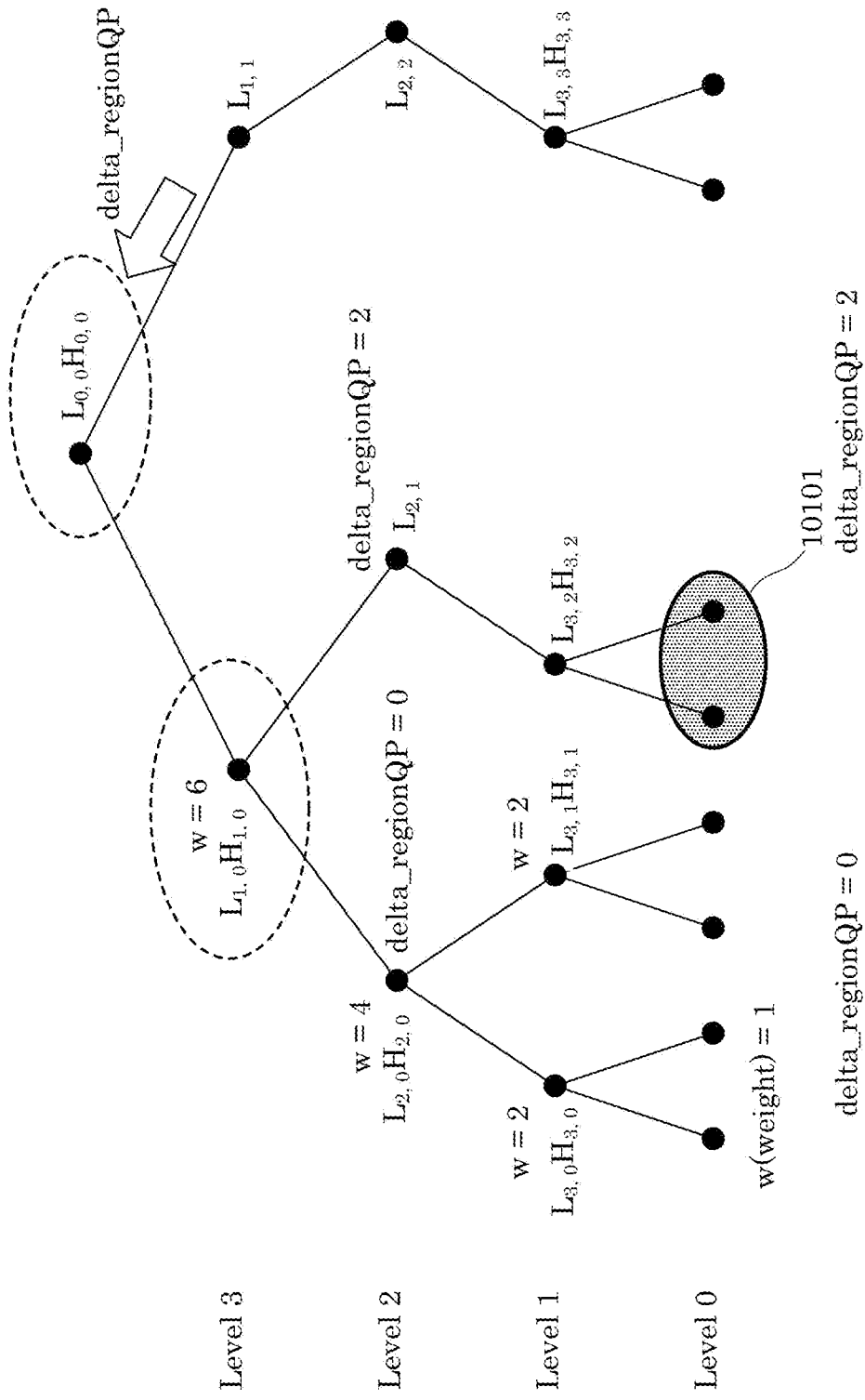
Figure 148:
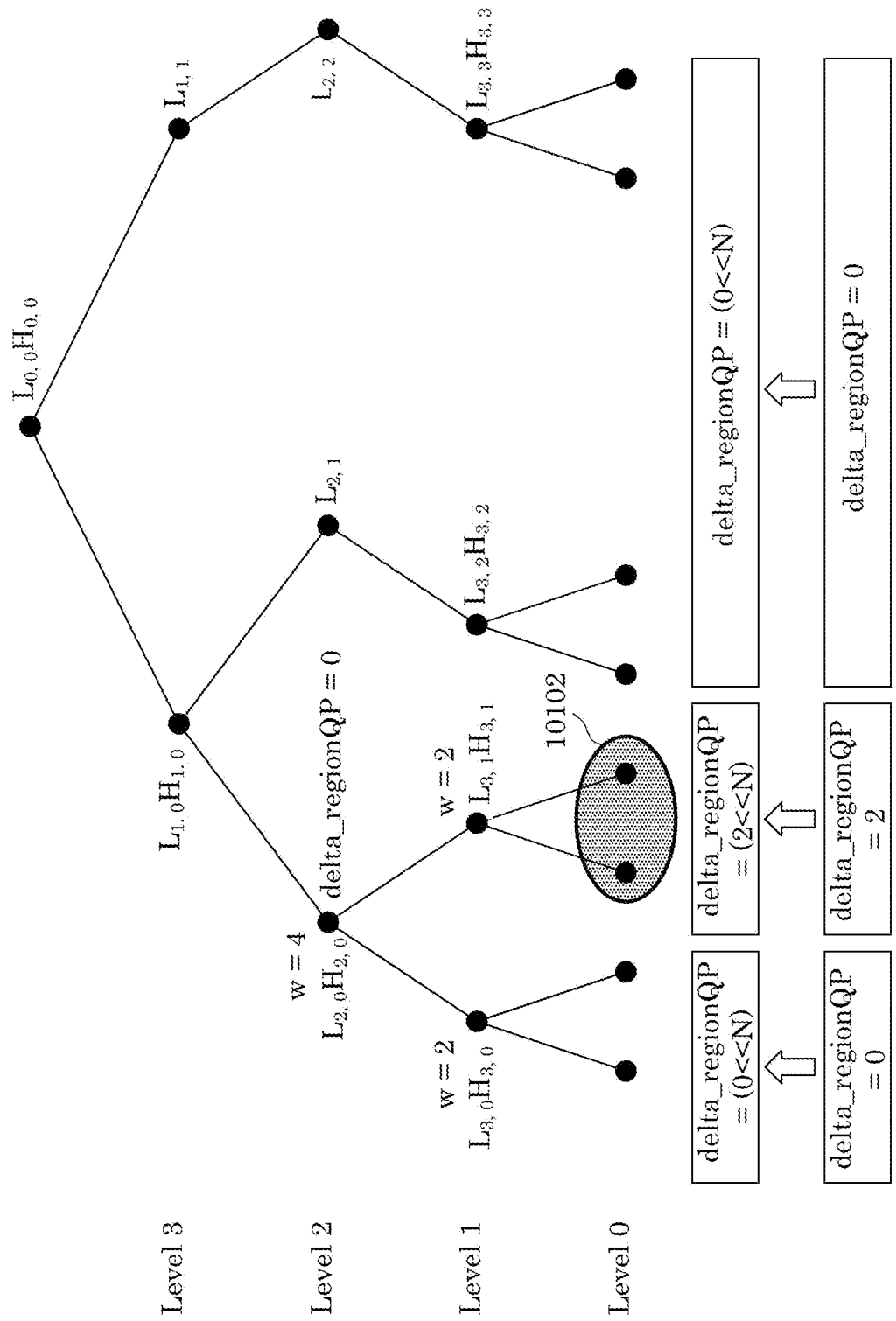
Figure 149:
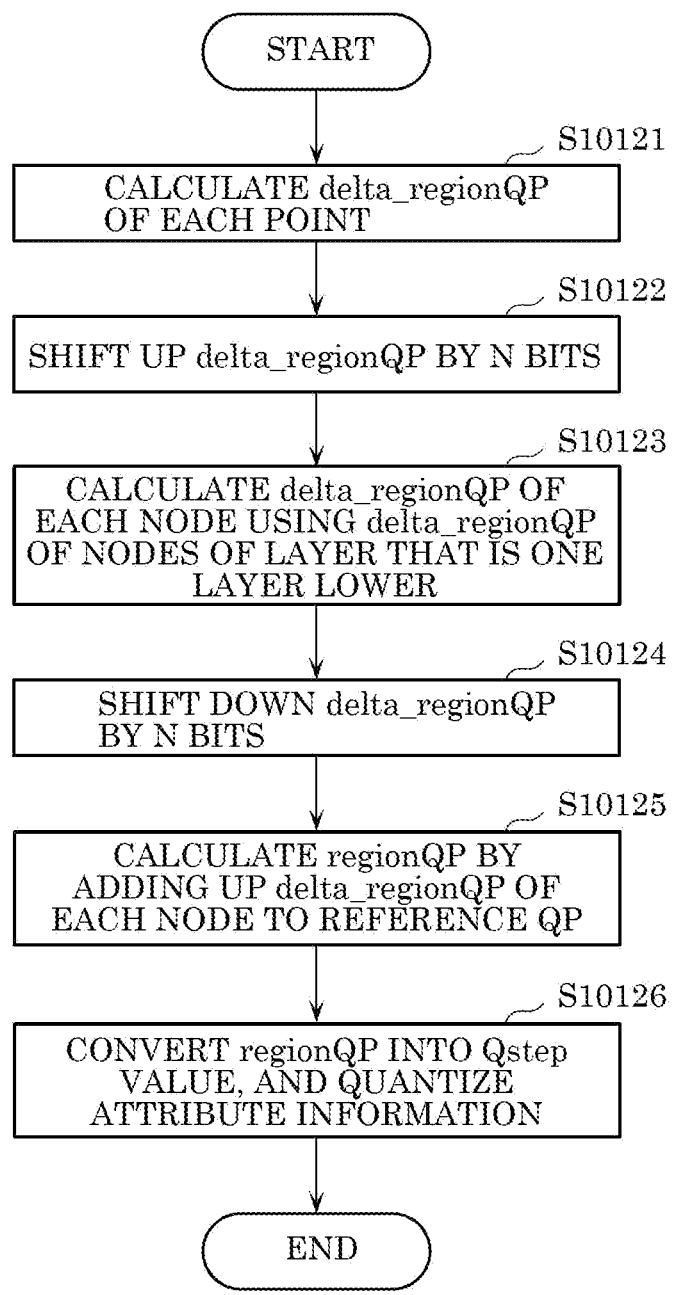
Figure 150:
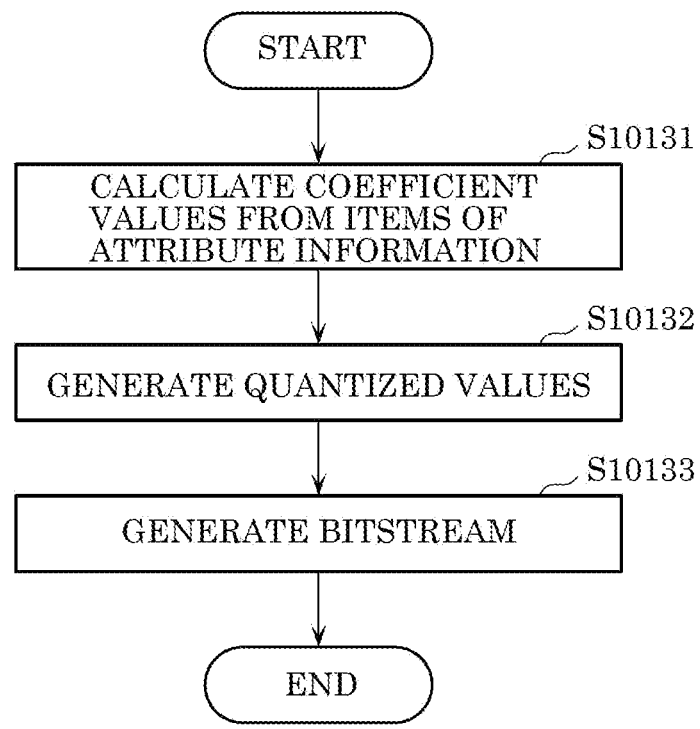
Figure 151:
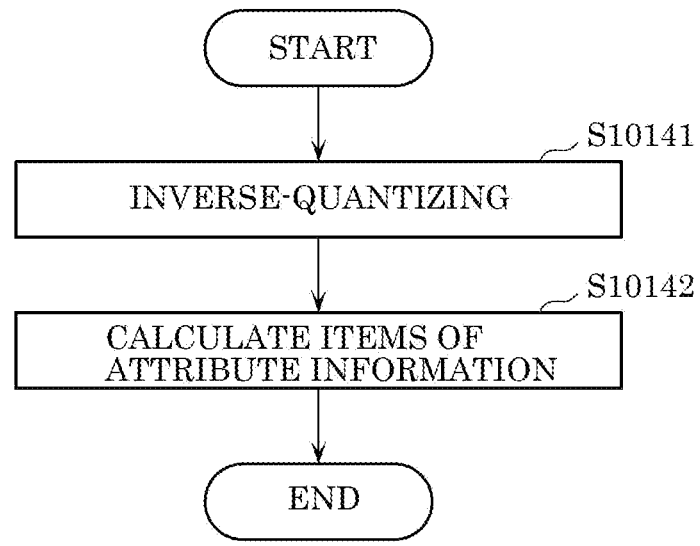

FIG. 131 is a flowchart of a three-dimensional data encoding process according to Embodiment 6;

FIG. 132 is a flowchart of a three-dimensional data decoding process according to Embodiment 6;

FIG. 133 is a diagram for describing a method of transmitting a quantization parameter used for encoding of attribute information according to Embodiment 7;

FIG. 134 is an example of a flowchart for deriving a QP value to be applied to attribute information to be processed according to Embodiment 7;

FIG. 135 is a flowchart of a method of determining a QP value for each three-dimensional point according to Embodiment 7;

FIG. 136 is an example of a flowchart of an encoding method by a three-dimensional data encoding device according to Embodiment 7;

FIG. 137 is an example of a flowchart of a decoding method by a three-dimensional data decoding device according to Embodiment 7;

FIG. 138 is a diagram for describing an example of a relationship between slices and regions according to Embodiment 7;

FIG. 139 is a diagram for describing another example of the relationship between slices and regions according to Embodiment 7;

FIG. 140 is a diagram for describing an example in which regions are set after data is divided according to Embodiment 7;

FIG. 141 is a diagram for describing an example in which data is divided after regions are set according to Embodiment 7;

FIG. 142 is a flow chart illustrating another example of the three-dimensional data encoding process according to Embodiment 7;

FIG. 143 is a flow chart illustrating another example of the three-dimensional data decoding process according to Embodiment 7;

FIG. 144 is a diagram illustrating a method for calculating a weight according to Embodiment 8;

FIG. 145 is a flowchart illustrating an example of a method for calculating regionQP according to Embodiment 8;

FIG. 146 is a flowchart illustrating another example of a method for calculating regionQP according to Embodiment 8;

FIG. 147 is a diagram for describing another example of a three-dimensional space to which a three-dimensional point cloud belongs, according to Embodiment 8;

FIG. 148 is a diagram for describing another example of the method for calculating QP of each node of RAHT according to Embodiment 8;

FIG. 149 is a flowchart of the other example of the method for calculating QP of each node of RAHT according to Embodiment 8;

FIG. 150 is a flowchart of a three-dimensional data encoding process according to Embodiment 8; and FIG. 151 is a flowchart of a three-dimensional data decoding process according to Embodiment 8.

DETAILED DESCRIPTION OF THE EMBODIMENTS

A three-dimensional data encoding method according to an aspect of the present disclosure includes: calculating a coefficient value of each of nodes included in a layered structure by generating the layered structure in which each of items of attribute information of three-dimensional points included in point cloud data is hierarchically divided into a first component and a second component; and quantizing, for each of the nodes, the coefficient value of the node using one or more first parameters for one or more groups to which one or more items of attribute information used in the calculating of the coefficient value belong, to generate quantized values. At least one item of attribute information among the items of attribute belongs to any one of the one or more groups. In the calculating, a second coefficient value of a second node of a second layer which is one layer higher than a first layer of the layered structure is calculated using two first coefficient values of two first nodes belonging to the first layer. The quantizing includes: (i) generating one or more second parameters by shifting-up the one or more first parameters by N bits, N being a natural number; (ii) generating a third parameter by shifting-down, by one bit, a sum obtained by adding up two second parameters of the two first nodes; (iii) generating a fourth parameter by shifting-down the third parameter by N bits; and (iv) quantizing the second coefficient value using the fourth parameter.

Accordingly, the three-dimensional data encoding method includes encoding capable of switching the parameters used for the quantization for each of the groups. In the encoding, a sum of the parameters of the two child nodes is calculated as a parameter of each of the nodes in the layered structure by shifting-down the sum by one bit, before the calculation, each of the parameters is shifted up by N bits, and after the calculation, each of the parameters is shifted down by N bits. This enables reduction of a rounding error, and the fourth parameter can be calculated with high accuracy. Further, an average of the parameters of the two child nodes is calculated by shifting-down the sum of the parameters of the two child nodes by one bit, and therefore, an amount of calculation for the parameters of the two child nodes can be reduced.

For example, the first parameter and the fourth parameter may each be differences from a reference parameter, and, in the quantizing of the second coefficient value, a fifth parameter obtained by adding the reference parameter to the fourth parameter may be used.

For this reason, the information amount of the first parameter and the fourth parameter can be reduced.

For example, N may be 4.

For example, each of the items of attribute information may be classified into any one of the one or more groups, according to a three-dimensional space to which the three-dimensional point having the item of attribute information belongs.

For this reason, the appropriate parameter can be set for each three-dimensional space.

A three-dimensional data decoding method according to an aspect of the present disclosure includes: calculating, using quantized values and one or more first parameters, coefficient values by inverse-quantizing each of the quantized values; and calculating, from the coefficient values, items of attribute information of three-dimensional points included in point cloud data. The one or more first parameters are one or more parameters for one or more groups to which one or more items of attribute information used in the calculating of a coefficient value to which a corresponding one of the quantized values corresponds belong. At least one item of attribute information among the items of attribute information belongs to any one of the one or more groups. The coefficient values are calculated corresponding to nodes included to a layered structure. The layered structure is a structure in which each of the items of attribute information is hierarchically divided into a first component and a second component. Two first coefficient values of two first nodes belonging to a first layer of the layered structure are used in calculating a second coefficient value of a second node of a second layer which is one layer higher than the first layer. The inverse-quantizing includes: (i) generating one or more second parameters by shifting-up the one or more first parameters by N bits, N being a natural number; (ii) generating a third parameter by shifting-down, by one bit, a sum obtained by adding up two second parameters of the two first nodes; (iii) generating a fourth parameter by shifting-down the third parameter by N bits; and (iv) inverse-quantizing a quantized value of the second node using the fourth parameter.

Accordingly, the three-dimensional data decoding method includes decoding a bitstream generated by switching the parameters used for the quantization for each of the groups. In the decoding, a sum of the parameters of the two child nodes is calculated as a parameter of each of the nodes in the layered structure by shifting-down the sum by one bit, before the calculation, each of the parameters is shifted up by N bits, and after the calculation, each of the parameters is shifted down by N bits. This enables reduction of a rounding error, and the fourth parameter can be calculated with high accuracy. Further, an average of the parameters of the two child nodes is calculated by shifting-down the sum of the parameters of the two child nodes by one bit, and therefore, an amount of calculation for the parameters of the two child nodes can be reduced.

For example, the first parameter and the fourth parameter may each be differences from a reference parameter, and in the inverse-quantizing of the quantized value of the second node, a fifth parameter obtained by adding the reference parameter to the fourth parameter may be used.

For this reason, the information amount of the first parameter and the fourth parameter can be reduced.

For example, N may be 4.

For example, each of the items of attribute information may be classified into any one of the one or more groups, according to a three-dimensional space to which the three-dimensional point having the item of attribute information belongs.

For this reason, the appropriate parameter can be set for each three-dimensional space.

It is to be noted that these general or specific aspects may be implemented as a system, a method, an integrated circuit, a computer program, or a computer-readable non-transitory recording medium such as a CD-ROM, or may be implemented as any combination of a system, a method, an integrated circuit, a computer program, and a non-transitory recording medium.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, structural components, the arrangement and connection of the structural components, steps, the processing order of the steps, etc., indicated in the following embodiments are mere examples, and thus are not intended to limit the present disclosure. Among the structural components described in the following embodiments, structural components not recited in any one of the independent claims will be described as optional structural components.

Embodiment 1

When using encoded data of a point cloud in a device or for a service in practice, required information for the application is desirably transmitted and received in order to reduce the network bandwidth. However, conventional encoding structures for three-dimensional data have no such a function, and there is also no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as point cloud compression (PCC).

With regard to this embodiment, a configuration of PCC-encoded data that involves two codecs, a first encoding method and a second encoding method, and a method of storing the encoded data in a system format will be described.

Figure 1:
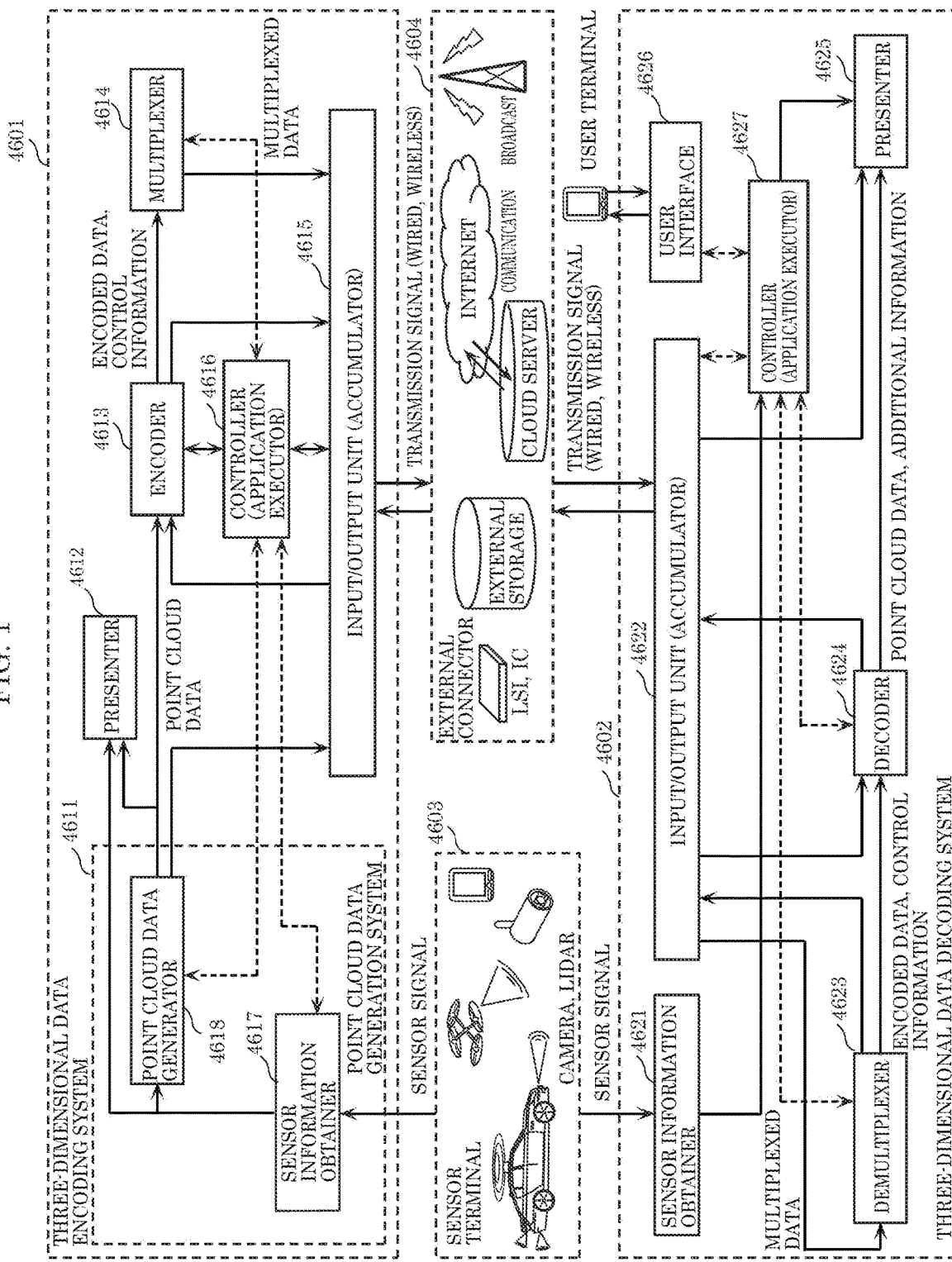
FIG. 1 is a diagram illustrating a configuration of a three-dimensional data encoding and decoding system according to Embodiment 1.

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614. Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor.

That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LiDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
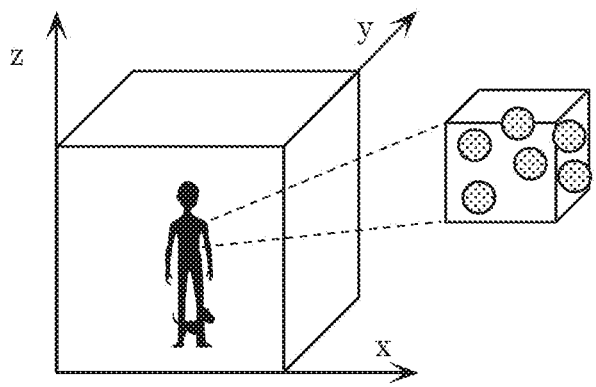
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One item of attribute information (in other words, a piece of attribute information or an attribute information item) may be associated with one item of geometry information (in other words, a piece of geometry information or a geometry information item), or attribute information on a plurality of different types of attributes may be associated with one item of geometry information. Alternatively, items of attribute information on the same type of attribute may be associated with one item of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example. A representative data file is ply file, for example.

Figure 4:
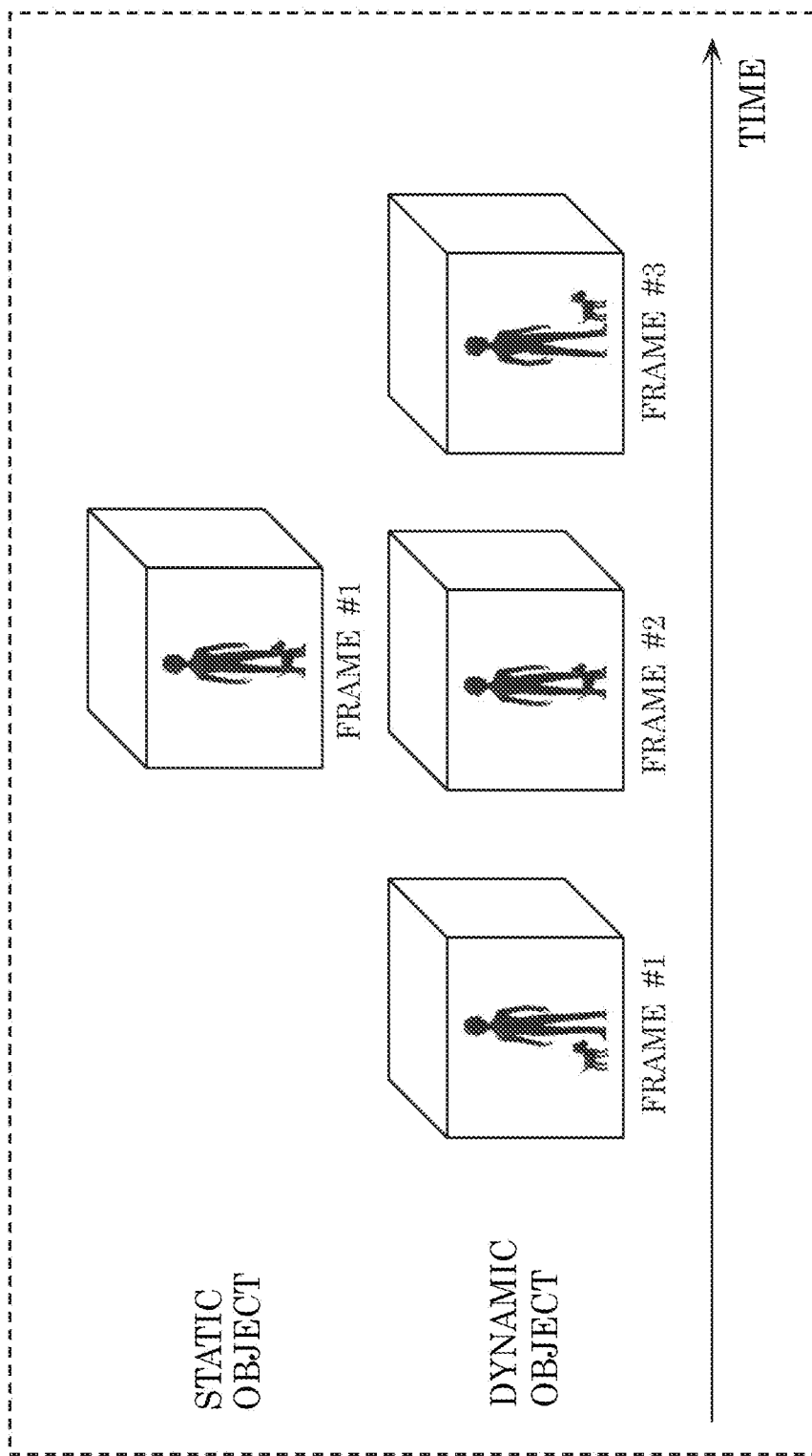
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LiDAR or a range finder, a stereo camera, or a combination of a plurality of monocular cameras. Point cloud data generator 4618 generates point cloud data based on the sensor information obtained by sensor information obtainer 4617. Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

As a broadcasting scheme, DVB-T2, DVB-S2, DVB-C2, ATSC3.0, or ISDB-S3 is used, for example.

Figure 5:
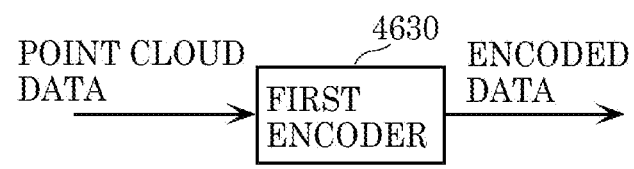
FIG. 5 is a diagram illustrating a structure of a first encoder according to Embodiment 1.
Figure 6:
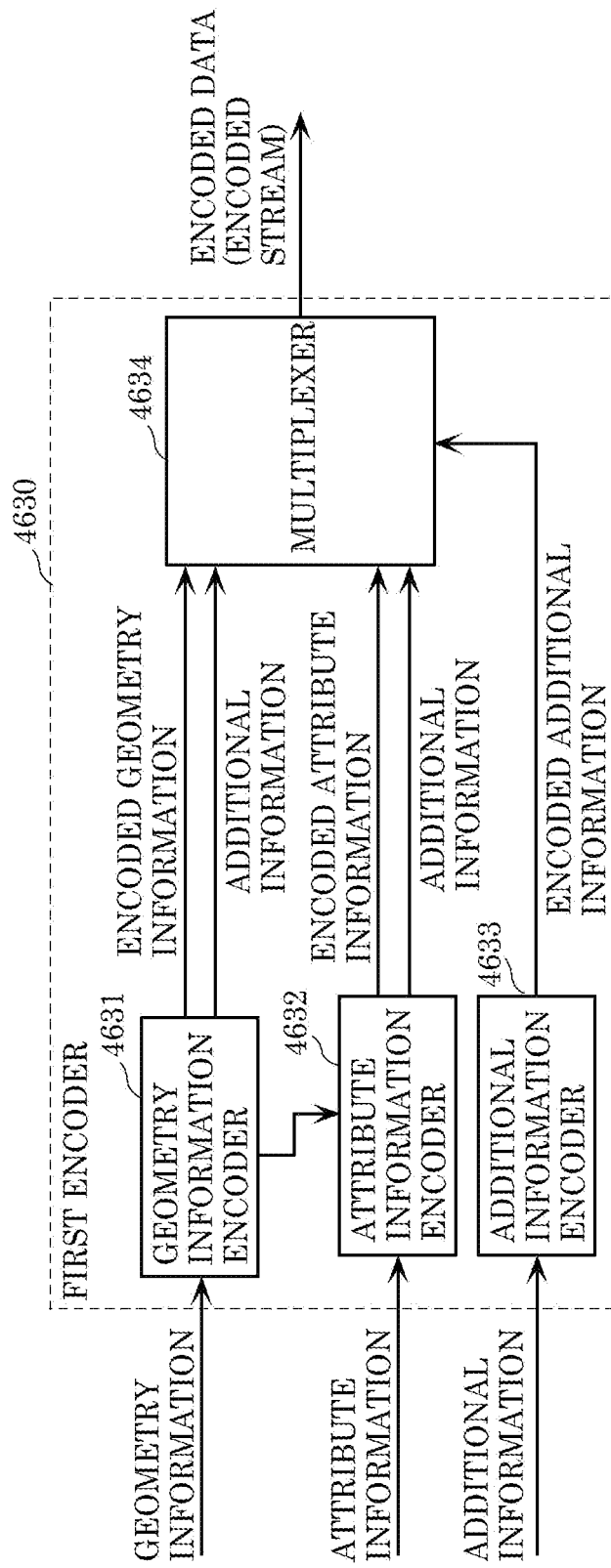
FIG. 6 is a block diagram illustrating the first encoder according to Embodiment 1.

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space (target space) is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (in other words, a current node or a target node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
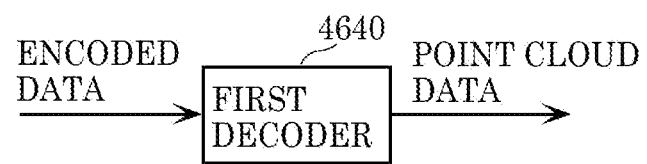
FIG. 7 is a diagram illustrating a structure of a first decoder according to Embodiment 1.
Figure 8:
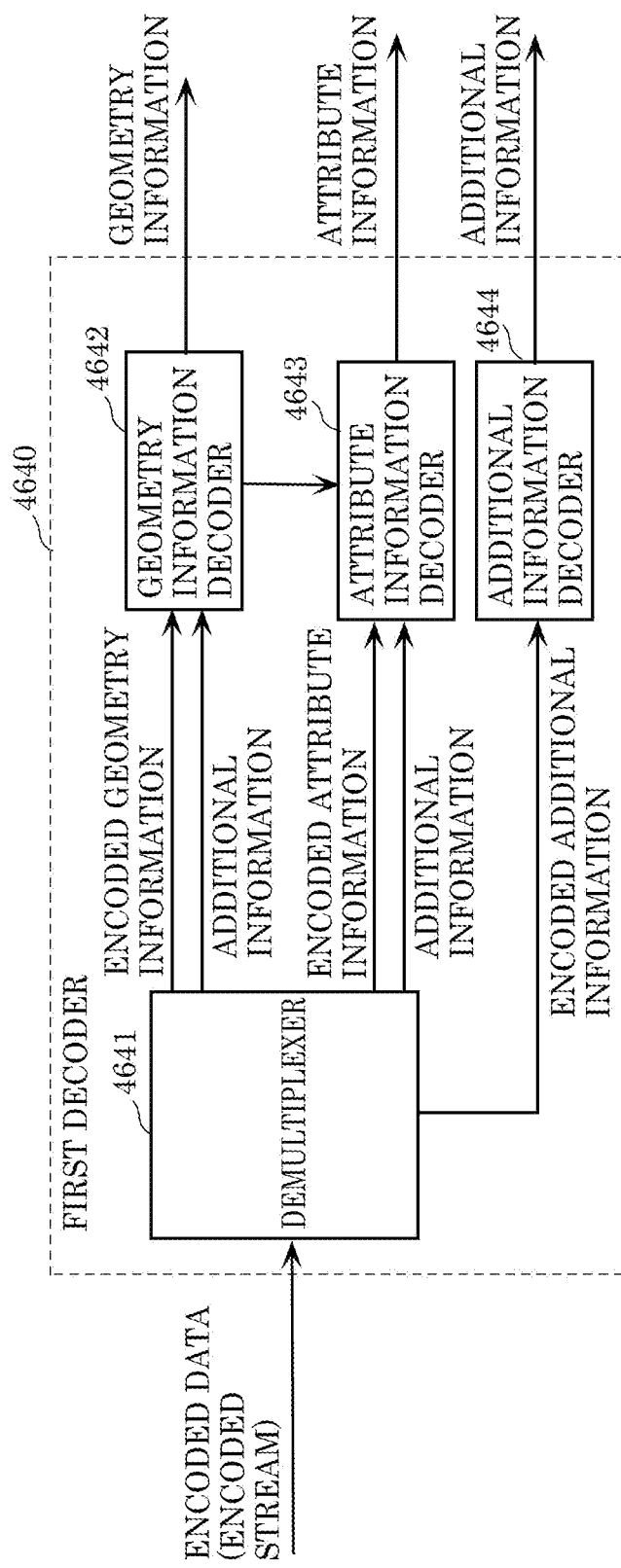
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream) encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
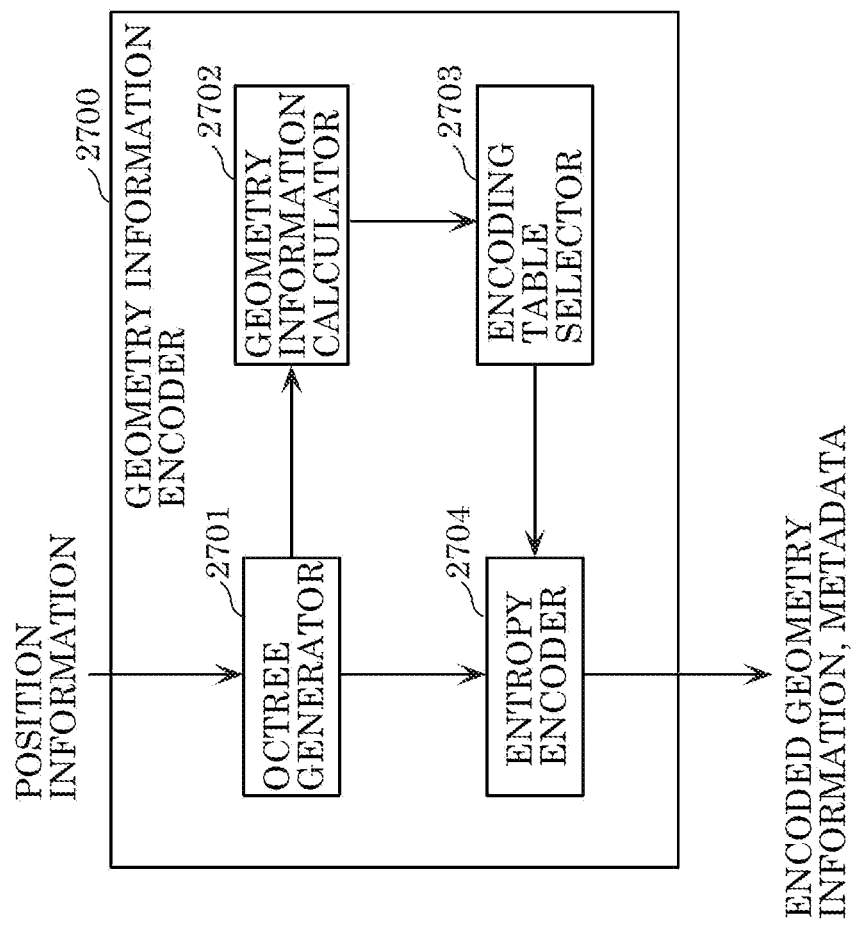
FIG. 9 is a block diagram of a three-dimensional data encoding device according to Embodiment 1.

Next, an example configuration of a geometry information encoder will be described. FIG. 9 is a block diagram of geometry information encoder 2700 according to this embodiment. Geometry information encoder 2700 includes octree generator 2701, geometry information calculator 2702, encoding table selector 2703, and entropy encoder 2704.

Octree generator 2701 generates an octree, for example, from input position information, and generates an occupancy code of each node of the octree. Geometry information calculator 2702 obtains information that indicates whether a neighboring node of a current node (target node) is an occupied node or not. For example, geometry information calculator 2702 calculates occupancy information on a neighboring node from an occupancy code of a parent node to which a current node belongs (information that indicates whether a neighboring node is an occupied node or not). Geometry information calculator 2702 may save an encoded node in a list and search the list for a neighboring node. Note that geometry information calculator 2702 may change neighboring nodes in accordance with the position of the current node in the parent node.

Encoding table selector 2703 selects an encoding table used for entropy encoding of the current node based on the occupancy information on the neighboring node calculated by geometry information calculator 2702. For example, encoding table selector 2703 may generate a bit sequence based on the occupancy information on the neighboring node and select an encoding table of an index number generated from the bit sequence.

Entropy encoder 2704 generates encoded geometry information and metadata by entropy-encoding the occupancy code of the current node using the encoding table of the selected index number. Entropy encoder may add, to the encoded geometry information, information that indicates the selected encoding table.

Figure 10:
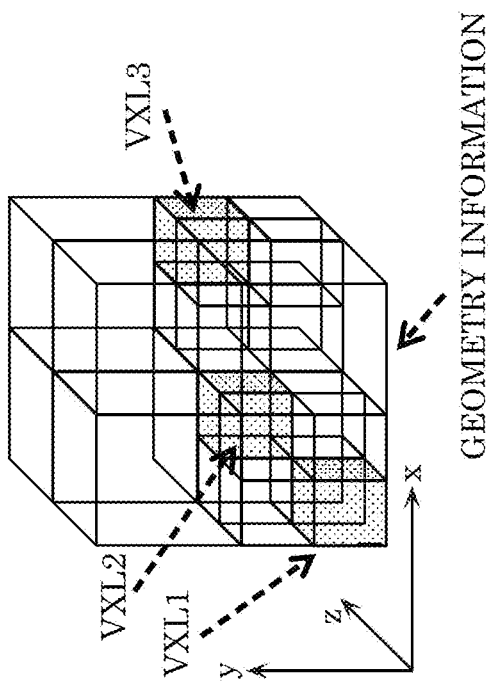
FIG. 10 is a diagram showing an example of geometry information according to Embodiment 1.
Figure 11:
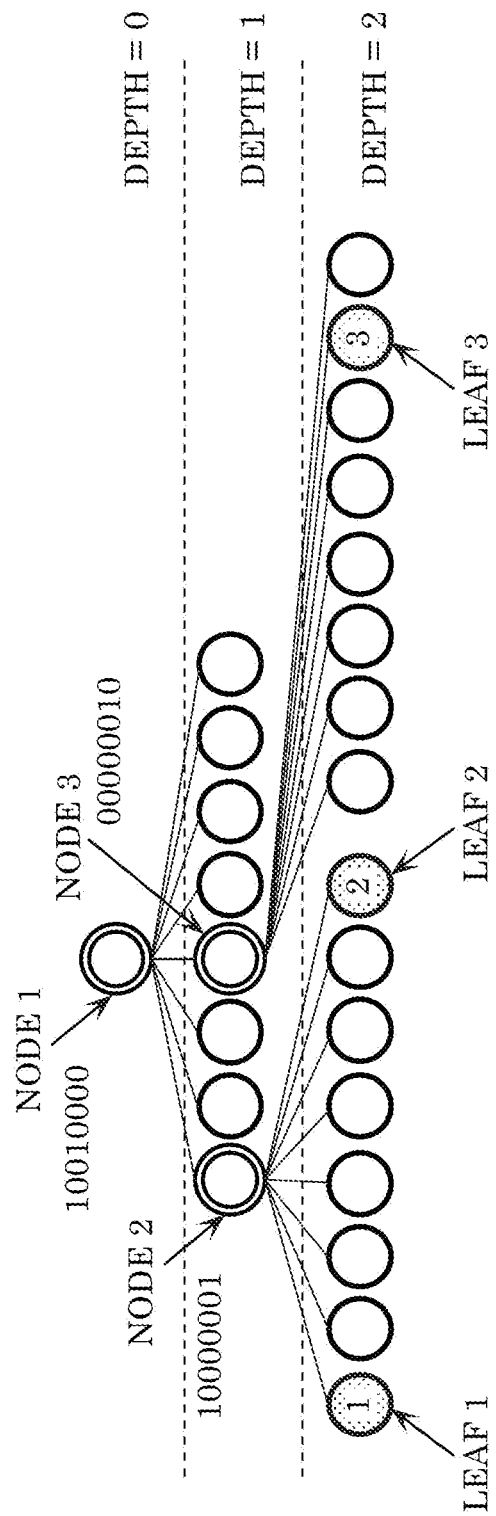
FIG. 11 is a diagram showing an example of an octree representation of geometry information according to Embodiment 1.

In the following, an octree representation and a scan order for geometry information will be described. Geometry information (geometry data) is transformed into an octree structure (octree transform) and then encoded. The octree structure includes nodes and leaves. Each node has eight nodes or leaves, and each leaf has voxel (VXL) information. FIG. 10 is a diagram showing an example structure of geometry information including a plurality of voxels. FIG. 11 is a diagram showing an example in which the geometry information shown in FIG. 10 is transformed into an octree structure. Here, of leaves shown in FIG. 11, leaves 1, 2, and 3 represent voxels VXL1, VXL2, and VXL3 shown in FIG. 10, respectively, and each represent VXL containing a point cloud (referred to as a valid VXL, hereinafter).

Specifically, node 1 corresponds to the entire space comprising the geometry information in FIG. 10. The entire space corresponding to node 1 is divided into eight nodes, and among the eight nodes, a node containing valid VXL is further divided into eight nodes or leaves. This process is repeated for every layer of the tree structure. Here, each node corresponds to a subspace, and has information (occupancy code) that indicates where the next node or leaf is located after division as node information. A block in the bottom layer is designated as a leaf and retains the number of the points contained in the leaf as leaf information.

Figure 12:
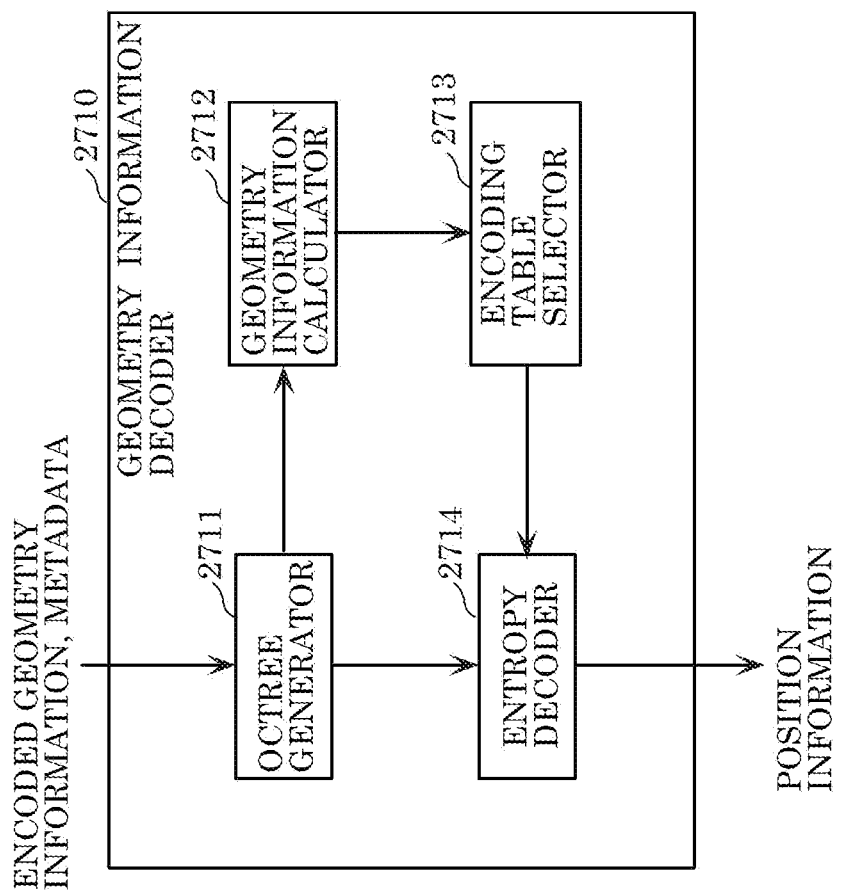
FIG. 12 is a block diagram of a three-dimensional data decoding device according to Embodiment 1.

Next, an example configuration of a geometry information decoder will be described. FIG. 12 is a block diagram of geometry information decoder 2710 according to this embodiment. Geometry information decoder 2710 includes octree generator 2711, geometry information calculator 2712, encoding table selector 2713, and entropy decoder 2714.

Octree generator 2711 generates an octree of a space (node) based on header information, metadata or the like of a bitstream. For example, octree generator 2711 generates an octree by generating a large space (root node) based on the sizes of a space in an x-axis direction, a y-axis direction, and a z-axis direction added to the header information and dividing the space into two parts in the x-axis direction, the y-axis direction, and the z-axis direction to generate eight small spaces A (nodes A0 to A7). Nodes A0 to A7 are sequentially designated as a current node.

Geometry information calculator 2712 obtains occupancy information that indicates whether a neighboring node of a current node is an occupied node or not. For example, geometry information calculator 2712 calculates occupancy information on a neighboring node from an occupancy code of a parent node to which a current node belongs. Geometry information calculator 2712 may save a decoded node in a list and search the list for a neighboring node. Note that geometry information calculator 2712 may change neighboring nodes in accordance with the position of the current node in the parent node.

Encoding table selector 2713 selects an encoding table (decoding table) used for entropy decoding of the current node based on the occupancy information on the neighboring node calculated by geometry information calculator 2712. For example, encoding table selector 2713 may generate a bit sequence based on the occupancy information on the neighboring node and select an encoding table of an index number generated from the bit sequence.

Entropy decoder 2714 generates position information by entropy-decoding the occupancy code of the current node using the selected encoding table. Note that entropy decoder 2714 may obtain information on the selected encoding table by decoding the bitstream, and entropy-decode the occupancy code of the current node using the encoding table indicated by the information.

Figure 13:
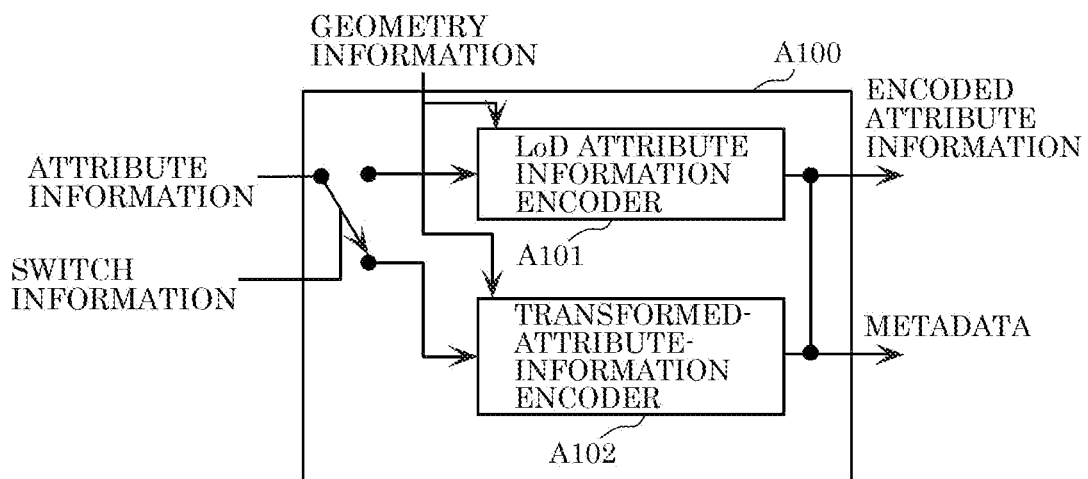
FIG. 13 is a block diagram of an attribute information encoder according to Embodiment 1.

In the following, configurations of an attribute information encoder and an attribute information decoder will be described. FIG. 13 is a block diagram showing an example configuration of attribute information encoder A100. The attribute information encoder may include a plurality of encoders that perform different encoding methods. For example, the attribute information encoder may selectively use any of the two methods described below in accordance with the use case.

Attribute information encoder A100 includes LoD attribute information encoder A101 and transformed-attribute-information encoder A102. LoD attribute information encoder A101 classifies three-dimensional points into a plurality of layers based on geometry information on the three-dimensional points, predicts attribute information on three-dimensional points belonging to each layer, and encodes a prediction residual therefor. Here, each layer into which a three-dimensional point is classified is referred to as a level of detail (LoD).

Transformed-attribute-information encoder A102 encodes attribute information using region adaptive hierarchical transform (RAHT). Specifically, transformed-attribute-information encoder A102 generates a high frequency component and a low frequency component for each layer by applying RAHT or Haar transform to each item of attribute information based on the geometry information on three-dimensional points, and encodes the values by quantization, entropy encoding or the like.

Figure 14:
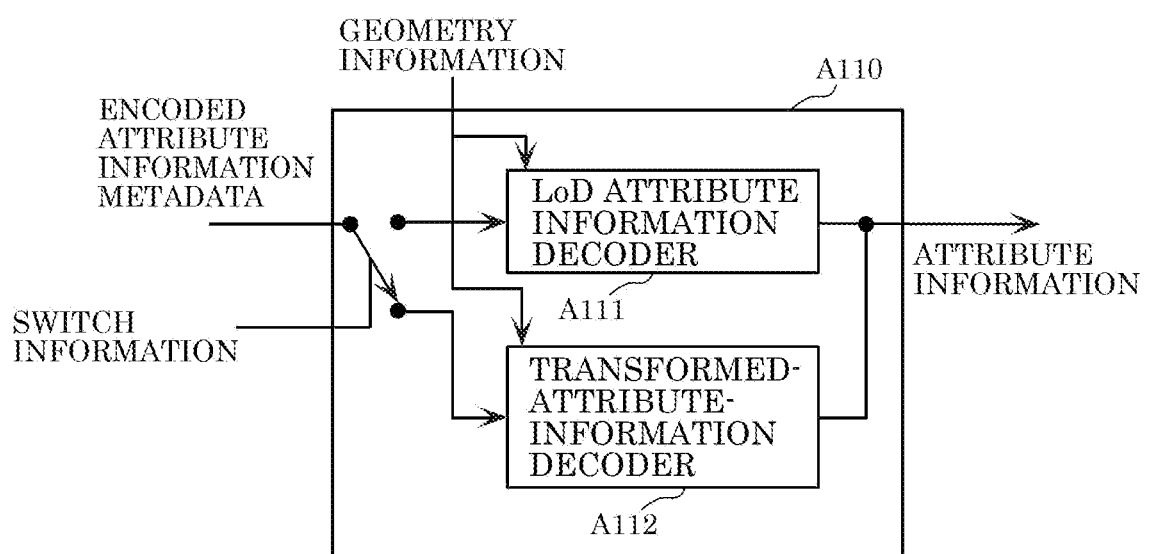
FIG. 14 is a block diagram of an attribute information decoder according to Embodiment 1.

FIG. 14 is a block diagram showing an example configuration of attribute information decoder A110. The attribute information decoder may include a plurality of decoders that perform different decoding methods. For example, the attribute information decoder may selectively use any of the two methods described below for decoding based on the information included in the header or metadata.

Attribute information decoder A110 includes LoD attribute information decoder A111 and transformed-attribute-information decoder A112. LoD attribute information decoder A111 classifies three-dimensional points into a plurality of layers based on the geometry information on the three-dimensional points, predicts attribute information on three-dimensional points belonging to each layer, and decodes attribute values thereof.

Transformed-attribute-information decoder A112 decodes attribute information using region adaptive hierarchical transform (RAHT). Specifically, transformed-attribute-information decoder A112 decodes each attribute value by applying inverse RAHT or inverse Haar transform to the high frequency component and the low frequency component of the attribute value based on the geometry information on the three-dimensional point.

Figure 15:
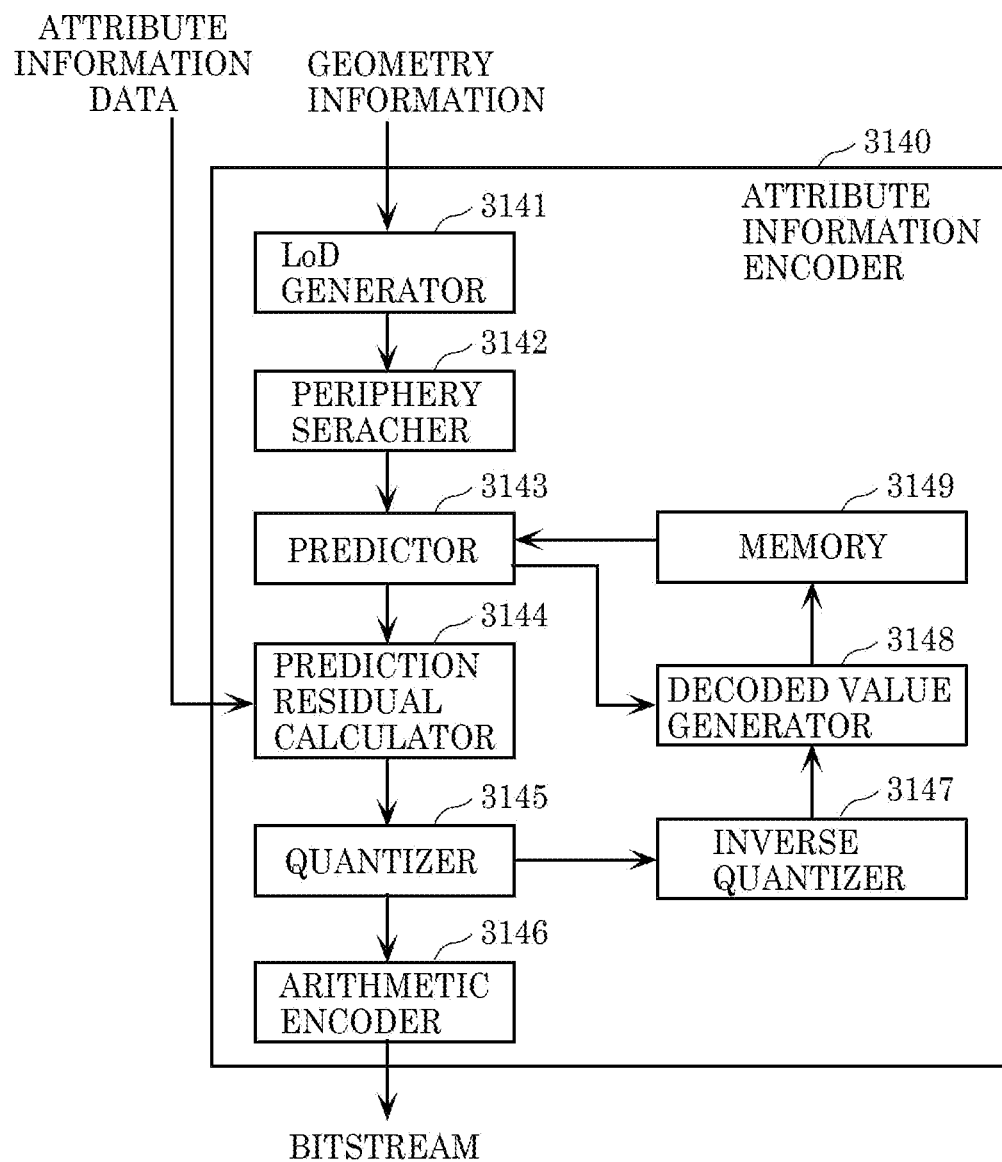
FIG. 15 is a block diagram showing a configuration of the attribute information encoder according to the variation of Embodiment 1.

FIG. 15 is a block diagram showing a configuration of attribute information encoder 3140 that is an example of LoD attribute information encoder A101.

Attribute information encoder 3140 includes LoD generator 3141, periphery searcher 3142, predictor 3143, prediction residual calculator 3144, quantizer 3145, arithmetic encoder 3146, inverse quantizer 3147, decoded value generator 3148, and memory 3149.

LoD generator 3141 generates an LoD using geometry information on a three-dimensional point.

Periphery searcher 3142 searches for a neighboring three-dimensional point neighboring each three-dimensional point using a result of LoD generation by LoD generator 3141 and distance information indicating distances between three-dimensional points.

Predictor 3143 generates a predicted value of an item of attribute information on a current (target) three-dimensional point to be encoded.

Prediction residual calculator 3144 calculates (generates) a prediction residual of the predicted value of the item of the attribute information generated by predictor 3143.

Quantizer 3145 quantizes the prediction residual of the item of attribute information calculated by prediction residual calculator 3144.

Arithmetic encoder 3146 arithmetically encodes the prediction residual quantized by quantizer 3145. Arithmetic encoder 3146 outputs a bitstream including the arithmetically encoded prediction residual to the three-dimensional data decoding device, for example.

The prediction residual may be binarized by quantizer 3145 before being arithmetically encoded by arithmetic encoder 3146.

Arithmetic encoder 3146 may initialize the encoding table used for the arithmetic encoding before performing the arithmetic encoding. Arithmetic encoder 3146 may initialize the encoding table used for the arithmetic encoding for each layer. Arithmetic encoder 3146 may output a bitstream including information that indicates the position of the layer at which the encoding table is initialized.

Inverse quantizer 3147 inverse-quantizes the prediction residual quantized by quantizer 3145.

Decoded value generator 3148 generates a decoded value by adding the predicted value of the item of attribute information generated by predictor 3143 and the prediction residual inverse-quantized by inverse quantizer 3147 together.

Memory 3149 is a memory that stores a decoded value of an item of attribute information on each three-dimensional point decoded by decoded value generator 3148. For example, when generating a predicted value of a three-dimensional point yet to be encoded, predictor 3143 may generate the predicted value using a decoded value of an item of attribute information on each three-dimensional point stored in memory 3149.

Figure 16:
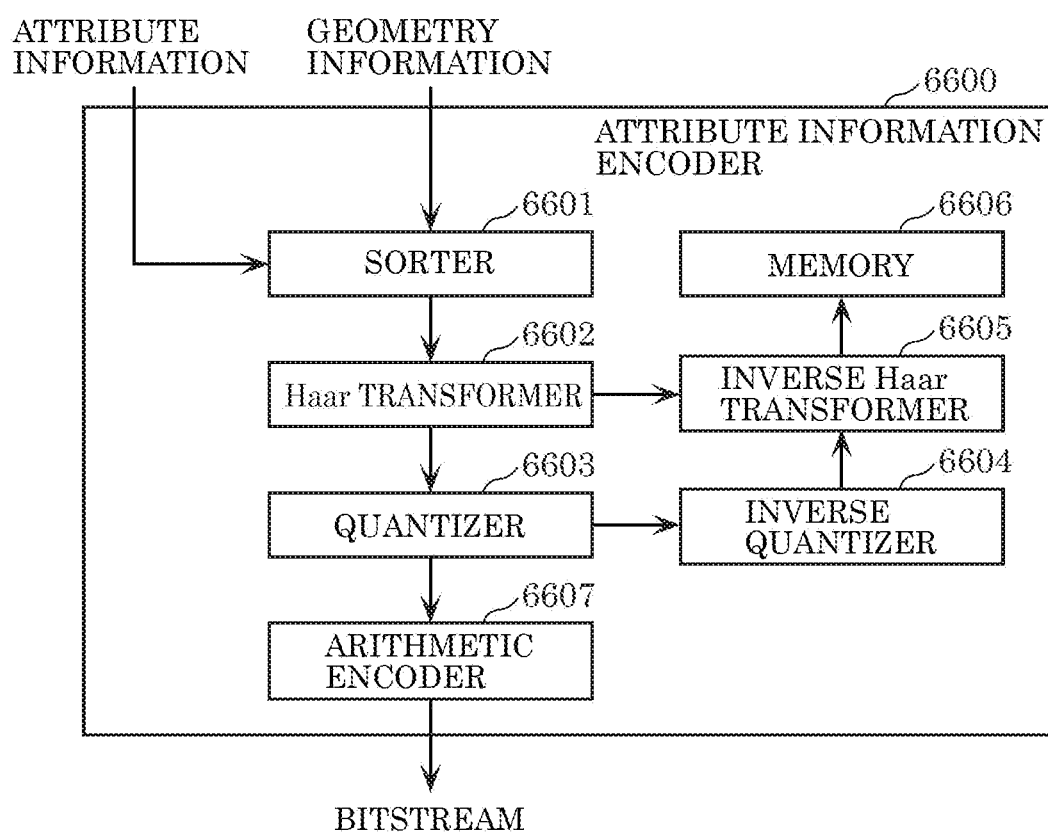
FIG. 16 is a block diagram of the attribute information encoder according to Embodiment 1.

FIG. 16 is a block diagram of attribute information encoder 6600 that is an example of transformation attribute information encoder A102. Attribute information encoder 6600 includes sorter 6601, Haar transformer 6602, quantizer 6603, inverse quantizer 6604, inverse Haar transformer 6605, memory 6606, and arithmetic encoder 6607.

Sorter 6601 generates the Morton codes by using the geometry information of three-dimensional points, and sorts the plurality of three-dimensional points in the order of the Morton codes. Haar transformer 6602 generates the coding coefficient by applying the Haar transform to the attribute information. Quantizer 6603 quantizes the coding coefficient of the attribute information.

Inverse quantizer 6604 inverse quantizes the coding coefficient after the quantization. Inverse Haar transformer 6605 applies the inverse Haar transform to the coding coefficient. Memory 6606 stores the values of items of attribute information of a plurality of decoded three-dimensional points. For example, the attribute information of the decoded three-dimensional points stored in memory 6606 may be utilized for prediction and the like of an unencoded three-dimensional point.

Arithmetic encoder 6607 calculates ZeroCnt from the coding coefficient after the quantization, and arithmetically encodes ZeroCnt. Additionally, arithmetic encoder 6607 arithmetically encodes the non-zero coding coefficient after the quantization. Arithmetic encoder 6607 may binarize the coding coefficient before the arithmetic encoding. In addition, arithmetic encoder 6607 may generate and encode various kinds of header information.

Figure 17:
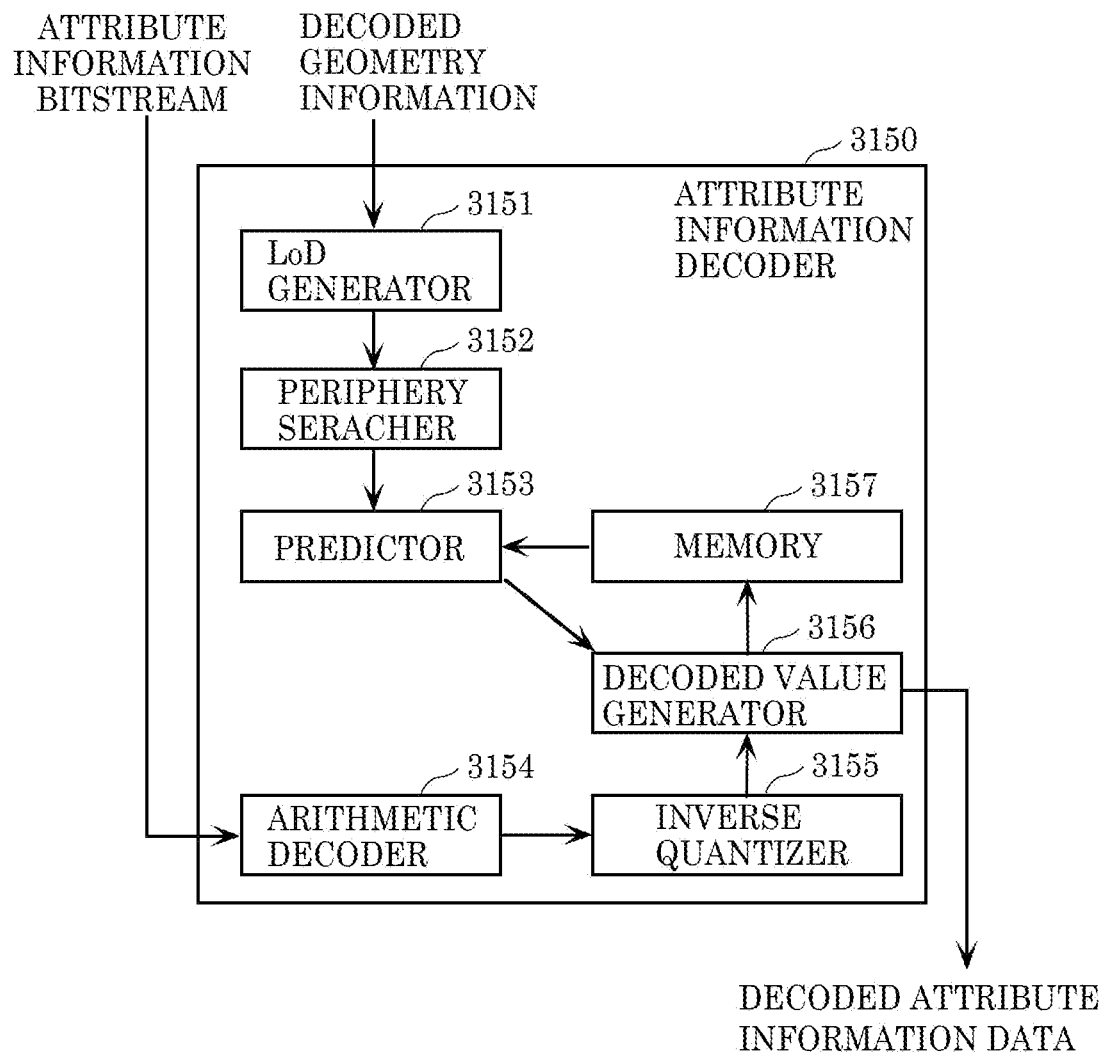
FIG. 17 is a block diagram showing a configuration of the attribute information decoder according to the variation of Embodiment 1.

FIG. 17 is a block diagram showing a configuration of attribute information decoder 3150 that is an example of LoD attribute information decoder A111.

Attribute information decoder 3150 includes LoD generator 3151, periphery searcher 3152, predictor 3153, arithmetic decoder 3154, inverse quantizer 3155, decoded value generator 3156, and memory 3157.

LoD generator 3151 generates an LoD using geometry information on a three-dimensional point decoded by the geometry information decoder (not shown in FIG. 17).

Periphery searcher 3152 searches for a neighboring three-dimensional point neighboring each three-dimensional point using a result of LoD generation by LoD generator 3151 and distance information indicating distances between three-dimensional points.

Predictor 3153 generates a predicted value of attribute information item on a current three-dimensional point to be decoded.

Arithmetic decoder 3154 arithmetically decodes the prediction residual in the bitstream obtained from attribute information encoder 3140 shown in FIG. 15. Note that arithmetic decoder 3154 may initialize the decoding table used for the arithmetic decoding. Arithmetic decoder 3154 initializes the decoding table used for the arithmetic decoding for the layer for which the encoding process has been performed by arithmetic encoder 3146 shown in FIG. 15. Arithmetic decoder 3154 may initialize the decoding table used for the arithmetic decoding for each layer. Arithmetic decoder 3154 may initialize the decoding table based on the information included in the bitstream that indicates the position of the layer for which the encoding table has been initialized.

Inverse quantizer 3155 inverse-quantizes the prediction residual arithmetically decoded by arithmetic decoder 3154.

Decoded value generator 3156 generates a decoded value by adding the predicted value generated by predictor 3153 and the prediction residual inverse-quantized by inverse quantizer 3155 together. Decoded value generator 3156 outputs the decoded attribute information data to another device.

Memory 3157 is a memory that stores a decoded value of an item of attribute information on each three-dimensional point decoded by decoded value generator 3156. For example, when generating a predicted value of a three-dimensional point yet to be decoded, predictor 3153 generates the predicted value using a decoded value of an item of attribute information on each three-dimensional point stored in memory 3157.

Figure 18:
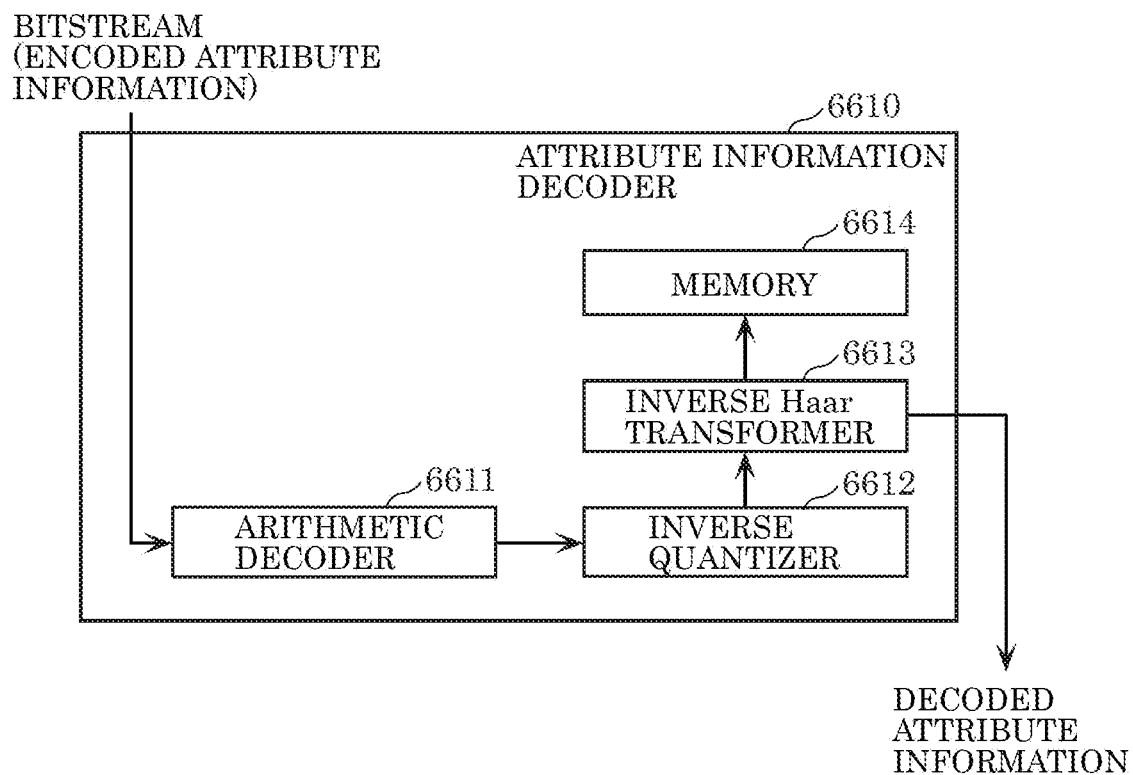
FIG. 18 is a block diagram of the attribute information decoder according to Embodiment 1.

FIG. 18 is a block diagram of attribute information decoder 6610 that is an example of transformation attribute information decoder A112. Attribute information decoder 6610 includes arithmetic decoder 6611, inverse quantizer 6612, inverse Haar transformer 6613, and memory 6614.

Arithmetic decoder 6611 arithmetically decodes ZeroCnt and the coding coefficient included in a bitstream. Note that arithmetic decoder 6611 may decode various kinds of header information.

Inverse quantizer 6612 inverse quantizes the arithmetically decoded coding coefficient. Inverse Haar transformer 6613 applies the inverse Haar transform to the coding coefficient after the inverse quantization. Memory 6614 stores the values of items of attribute information of a plurality of decoded three-dimensional points. For example, the attribute information of the decoded three-dimensional points stored in memory 6614 may be utilized for prediction of an undecoded three-dimensional point.

Figure 19:
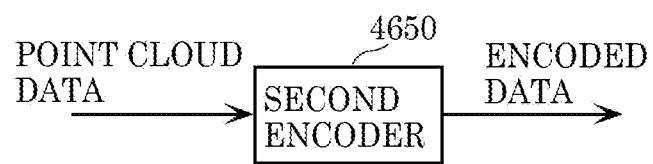
FIG. 19 is a diagram illustrating a structure of a second encoder according to Embodiment 1.
Figure 20:
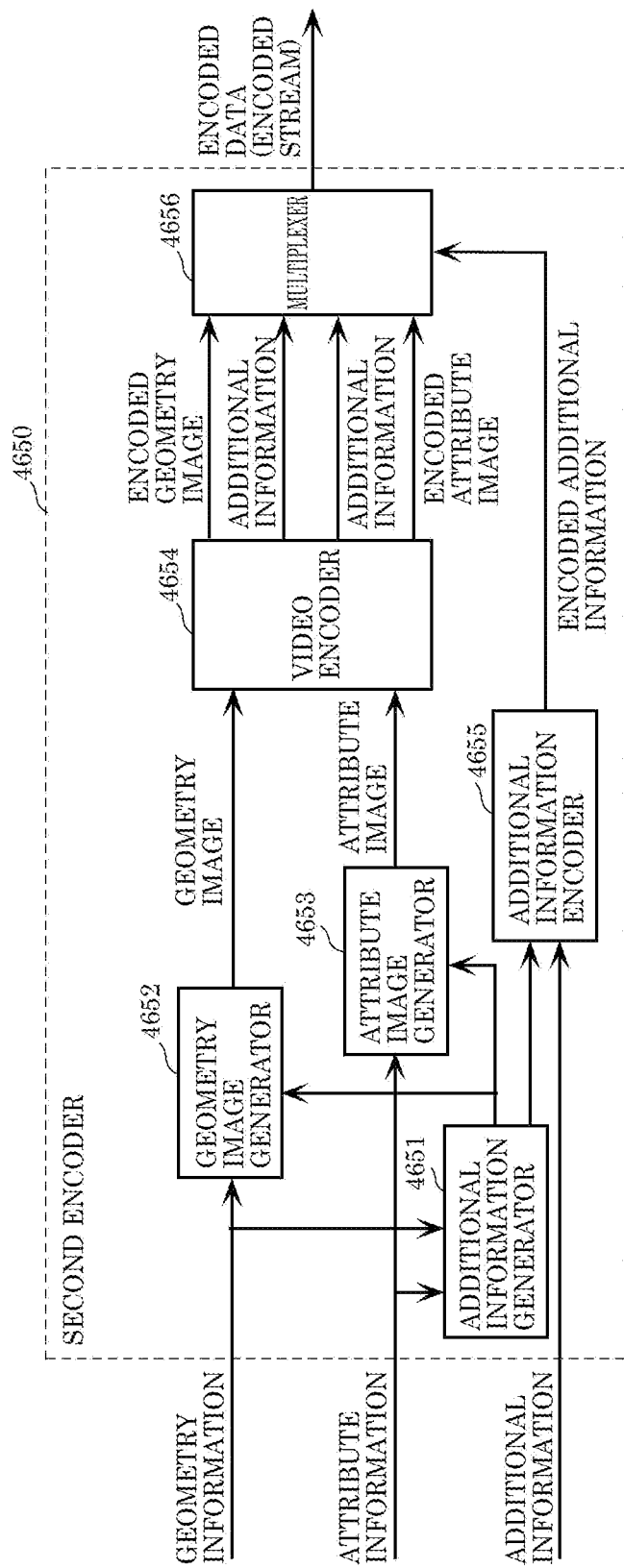
FIG. 20 is a block diagram illustrating the second encoder according to Embodiment 1.

Next, second encoder 4650, which is an example of encoder 4613 that performs encoding in the second encoding method, will be described. FIG. 19 is a diagram showing a configuration of second encoder 4650. FIG. 20 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 21:
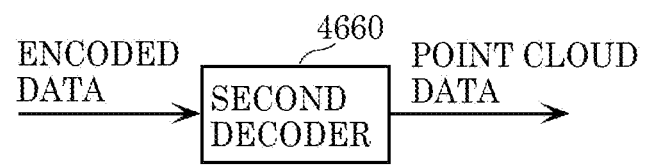
FIG. 21 is a diagram illustrating a structure of a second decoder according to Embodiment 1.
Figure 22:
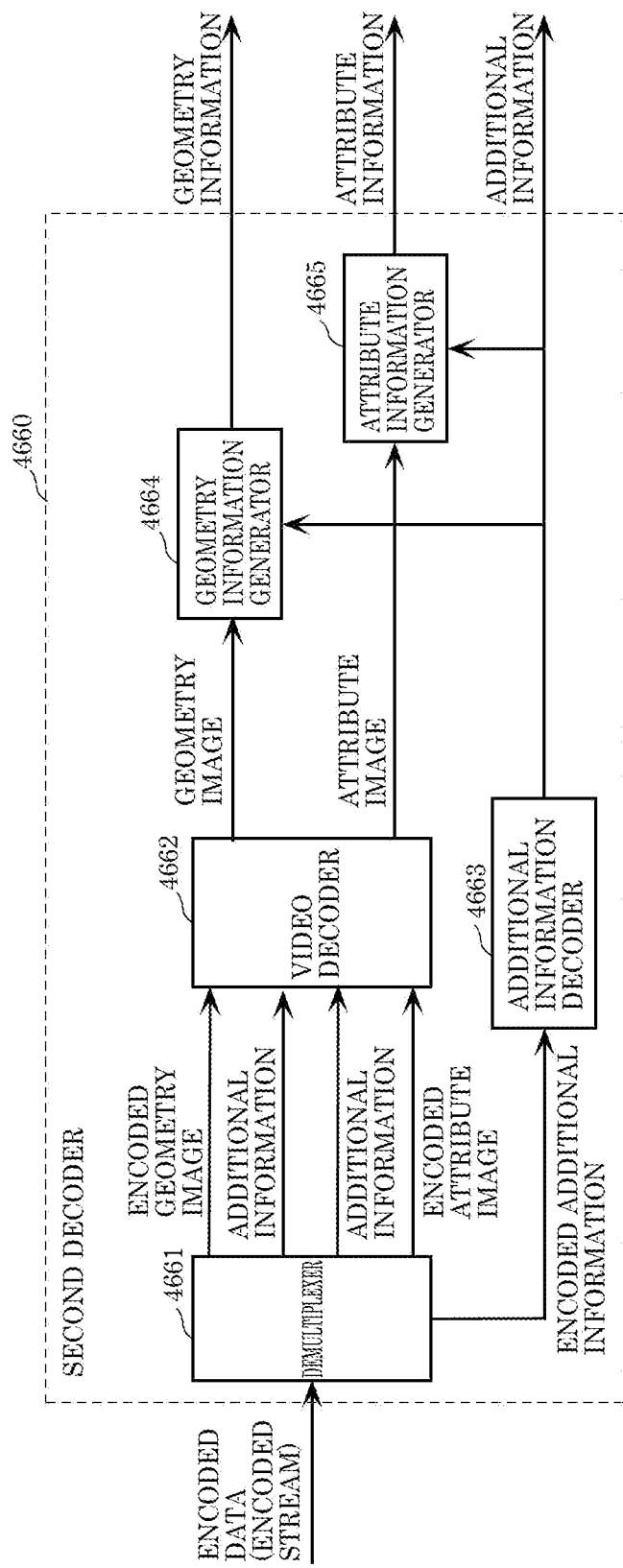
FIG. 22 is a block diagram illustrating the second decoder according to Embodiment 1.

Next, second decoder 4660, which is an example of decoder 4624 that performs decoding in the second encoding method, will be described. FIG. 21 is a diagram showing a configuration of second decoder 4660. FIG. 22 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 23:
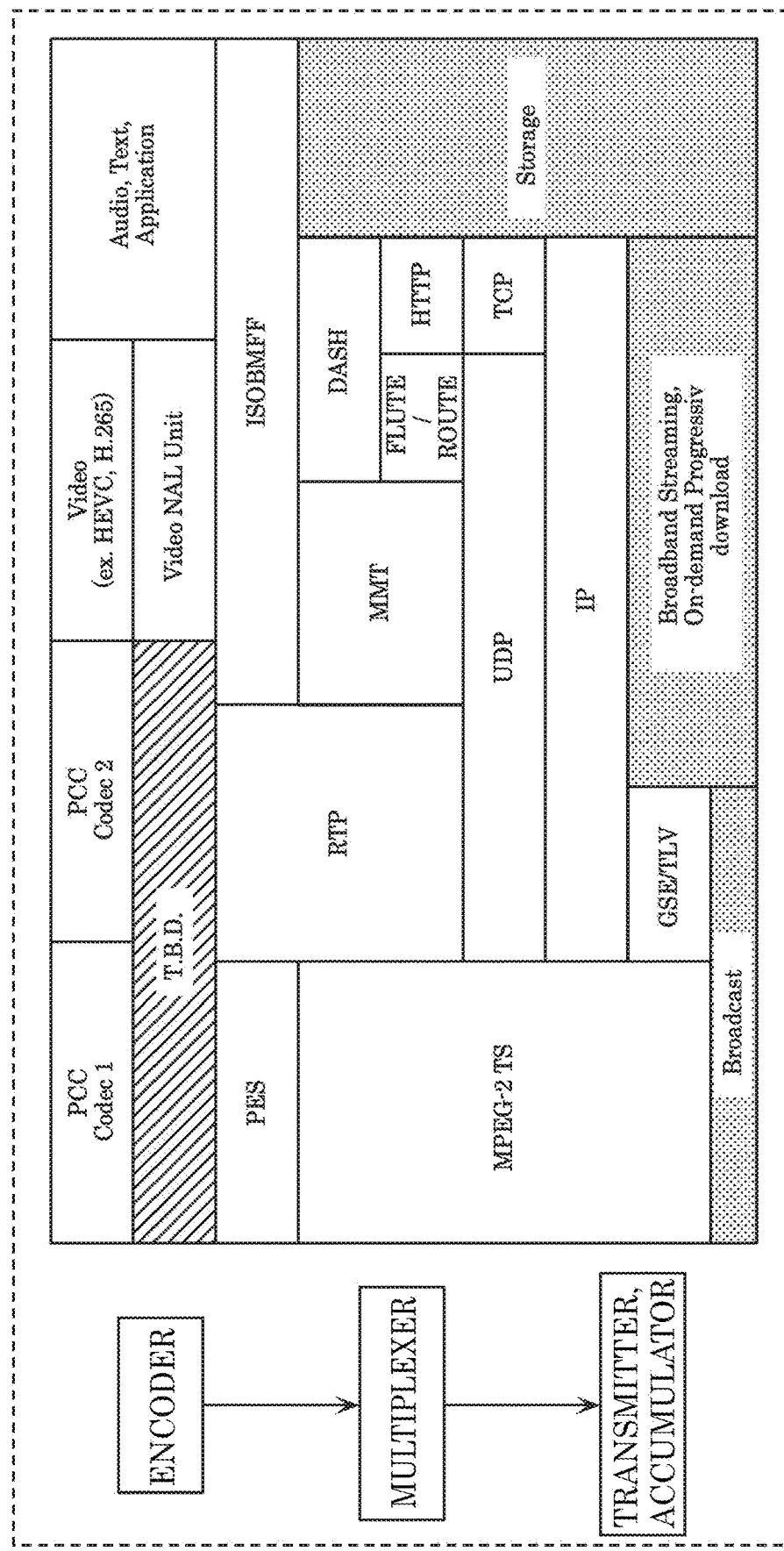
FIG. 23 is a diagram illustrating a protocol stack related to PCC encoded data according to Embodiment 1.

In the following, a problem with the PCC encoding scheme will be described. FIG. 23 is a diagram showing a protocol stack relating to PCC-encoded data. FIG. 23 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Codec1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

Embodiment 2

In this embodiment, types of the encoded data (geometry information (geometry), attribute information (attribute), and additional information (metadata)) generated by first encoder 4630 or second encoder 4650 described above, a method of generating additional information (metadata), and a multiplexing process in the multiplexer will be described. The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 24:
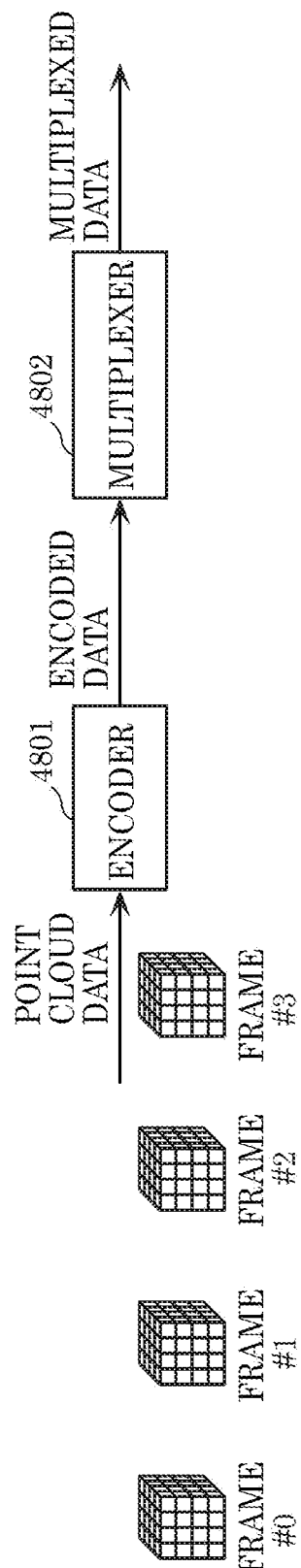
FIG. 24 is a diagram illustrating structures of an encoder and a multiplexer according to Embodiment 2.

FIG. 24 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 25:
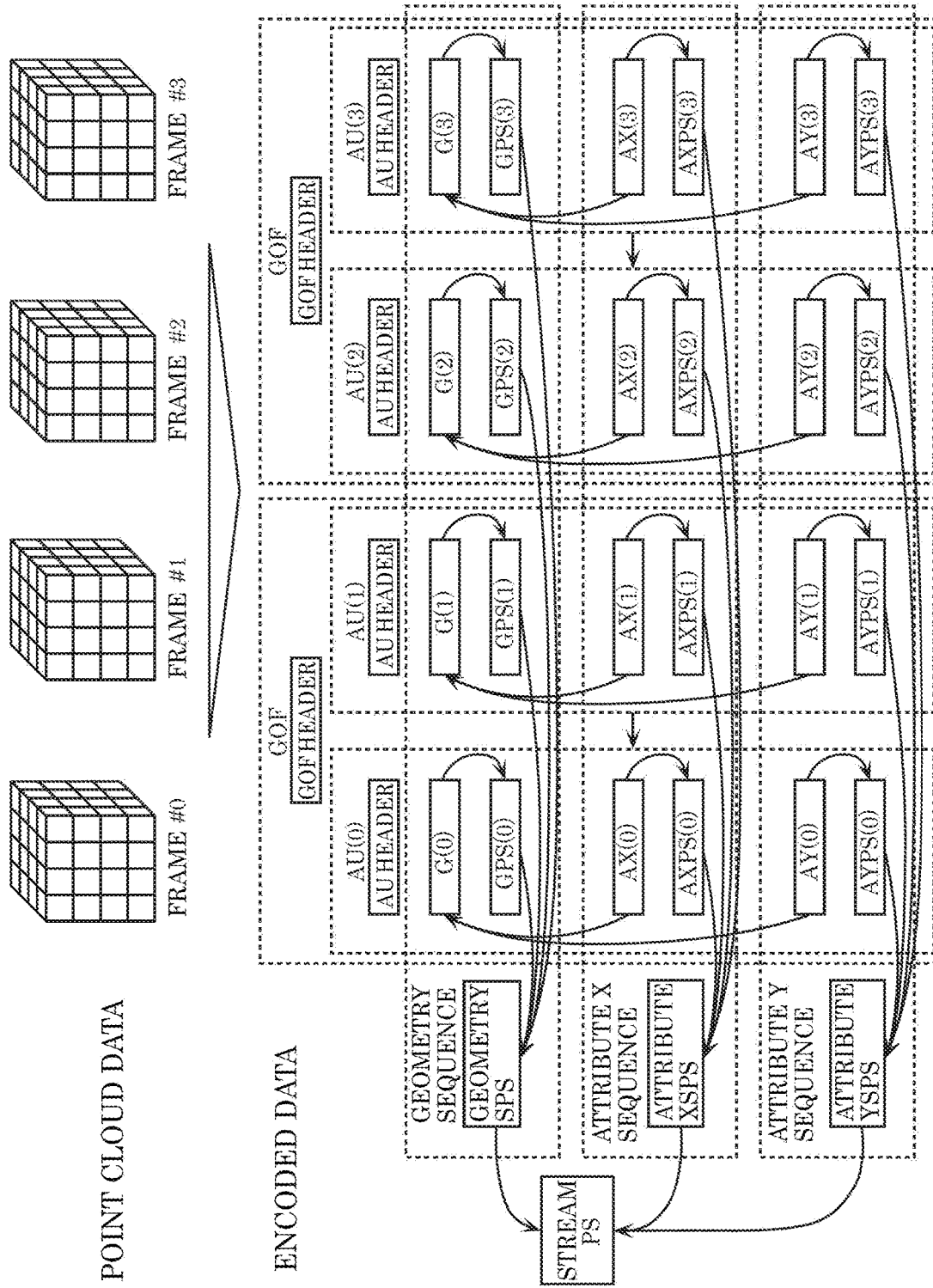
FIG. 25 is a diagram illustrating a structure example of encoded data according to Embodiment 2.

FIG. 25 is a diagram showing a configuration example of the encoded data generated by encoder 4801. Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described. Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described. Encoder 4801 encodes attribute information of each frame to generate encoded attribute data (compressed attribute data) for each frame. The encoded attribute data is denoted by A(i). FIG. 25 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i). The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 25 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 25 shows an example in which there is one type of geometry information, and there are two types of attribute information, the present disclosure is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (metadata) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header. Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF. The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF. For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 26:
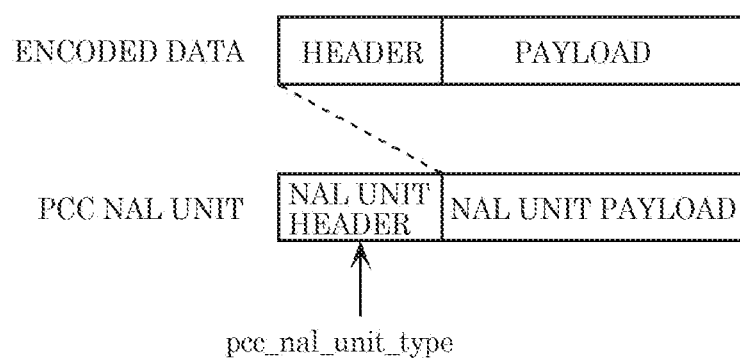
FIG. 26 is a diagram illustrating a structure example of encoded data and a NAL unit according to Embodiment 2.

For example, a data format is defined for each type of encoded data. FIG. 26 is a diagram showing an example of encoded data and a NAL unit.

For example, as shown in FIG. 26, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pec_nal_unit_type, which is identification information for the encoded data. FIG. 27 is a diagram showing a semantics example of pcc_nal_unit_type.

As shown in FIG. 27, when pcc_codec_type is codec 1 (Codec1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX. S), attribute YPS (AttrY. PS), geometry SPS (Geometry Sequence PS), attribute X SPS (AttributeX Sequence PS), attribute Y SPS (AttributeY Sequence PS), AU header (AU Header), and GOF header (GOF Header) in codec 1. Values of 11 and greater are reserved in codec 1.

When pec_codec_type is codec 2 (Codec2: second encoding method), values of 0 to 2 of pec_nal_unit_type are assigned to data A (DataA), metadata A (MetaDataA), and metadata B (MetaDataB) in the codec. Values of 3 and greater are reserved in codec 2.

Next, an order of transmission of data will be described. In the following, restrictions on the order of transmission of NAL units will be described.

Multiplexer 4802 transmits NAL units on a GOF basis or on an AU basis. Multiplexer 4802 arranges the GOF header at the top of a GOF, and arranges the AU header at the top of an AU.

In order to allow the decoding device to decode the next AU and the following AUs even when data is lost because of a packet loss or the like, multiplexer 4802 may arrange a sequence parameter set (SPS) in each AU.

When there is a dependence relationship for decoding between encoded data, the decoding device decodes the data of the entity to be referred to and then decodes the data of the referring entity. In order to allow the decoding device to perform decoding in the order of reception without rearranging the data, multiplexer 4802 first transmits the data of the entity to be referred to.

Figure 28:
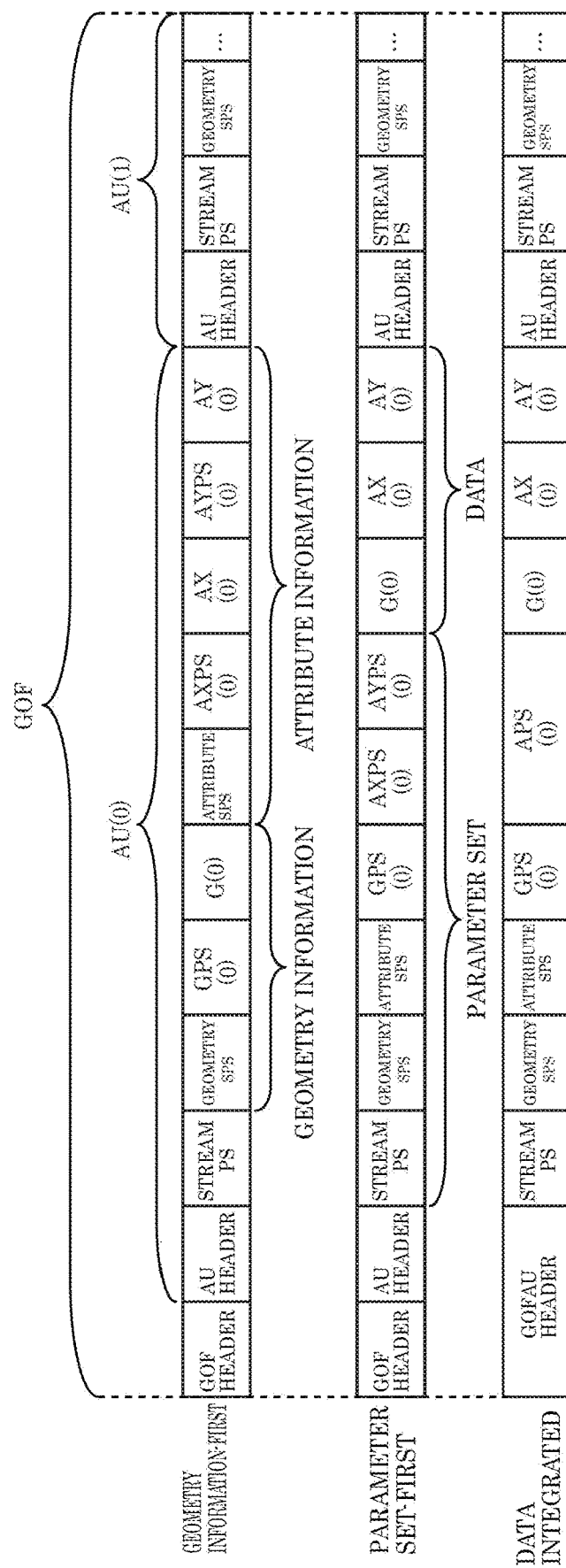
FIG. 28 is a diagram illustrating an example of a transmitting order of NAL units according to Embodiment 2.

FIG. 28 is a diagram showing examples of the order of transmission of NAL units. FIG. 28 shows three examples, that is, geometry information-first order, parameter-first order, and data-integrated order.

The geometry information-first order of transmission is an example in which information relating to geometry information is transmitted together, and information relating to attribute information is transmitted together. In the case of this order of transmission, the transmission of the information relating to the geometry information ends earlier than the transmission of the information relating to the attribute information.

For example, according to this order of transmission is used, when the decoding device does not decode attribute information, the decoding device may be able to have an idle time since the decoding device can omit decoding of attribute information. When the decoding device is required to decode geometry information early, the decoding device may be able to decode geometry information earlier since the decoding device obtains encoded data of the geometry information earlier.

Note that, although in FIG. 28 the attribute X SPS and the attribute Y SPS are integrated and shown as the attribute SPS, the attribute X SPS and the attribute Y SPS may be separately arranged.

In the parameter set-first order of transmission, a parameter set is first transmitted, and data is then transmitted.

As described above, as far as the restrictions on the order of transmission of NAL units are met, multiplexer 4802 can transmit NAL units in any order. For example, order identification information may be defined, and multiplexer 4802 may have a function of transmitting NAL units in a plurality of orders. For example, the order identification information for NAL units is stored in the stream PS.

The three-dimensional data decoding device may perform decoding based on the order identification information. The three-dimensional data decoding device may indicate a desired order of transmission to the three-dimensional data encoding device, and the three-dimensional data encoding device (multiplexer 4802) may control the order of transmission according to the indicated order of transmission.

Note that multiplexer 4802 can generate encoded data having a plurality of functions merged to each other as in the case of the data-integrated order of transmission, as far as the restrictions on the order of transmission are met. For example, as shown in FIG. 28, the GOF header and the AU header may be integrated, or AXPS and AYPS may be integrated. In such a case, an identifier that indicates data having a plurality of functions is defined in pec_nal_unit_type.

In the following, variations of this embodiment will be described. There are levels of PSs, such as a frame-level PS, a sequence-level PS, and a PCC sequence-level PS. Provided that the PCC sequence level is a higher level, and the frame level is a lower level, parameters can be stored in the manner described below.

The value of a default PS is indicated in a PS at a higher level. If the value of a PS at a lower level differs from the value of the PS at a higher level, the value of the PS is indicated in the PS at the lower level. Alternatively, the value of the PS is not described in the PS at the higher level but is described in the PS at the lower level. Alternatively, information indicating whether the value of the PS is indicated in the PS at the lower level, at the higher level, or at both the levels is indicated in both or one of the PS at the lower level and the PS at the higher level. Alternatively, the PS at the lower level may be merged with the PS at the higher level. If the PS at the lower level and the PS at the higher level overlap with each other, multiplexer 4802 may omit transmission of one of the PSs.

Note that encoder 4801 or multiplexer 4802 may divide data into slices or tiles and transmit each of the divided slices or tiles as divided data. The divided data includes information for identifying the divided data, and a parameter used for decoding of the divided data is included in the parameter set. In this case, an identifier that indicates that the data is data relating to a tile or slice or data storing a parameter is defined in pcc_nal_unit_type.

Figure 29:
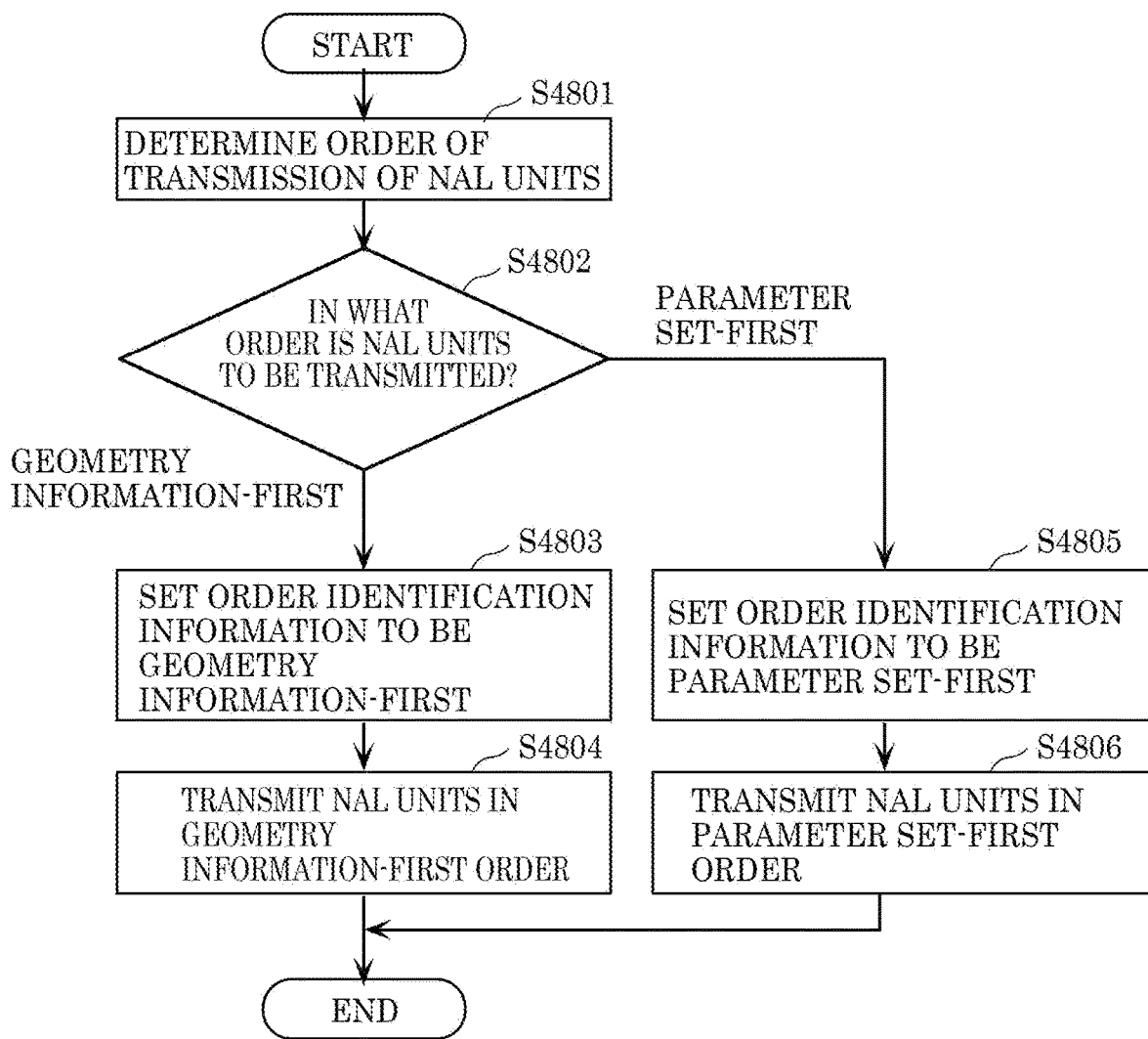
FIG. 29 is a flowchart of processing performed by a three-dimensional data encoding device according to Embodiment 2.

In the following, a process relating to order identification information will be described. FIG. 29 is a flowchart showing a process performed by the three-dimensional data encoding device (encoder 4801 and multiplexer 4802) that involves the order of transmission of NAL units.

First, the three-dimensional data encoding device determines the order of transmission of NAL units (geometry information-first or parameter set-first) (S4801). For example, the three-dimensional data encoding device determines the order of transmission based on a specification from a user or an external device (the three-dimensional data decoding device, for example).

If the determined order of transmission is geometry information-first (if "geometry information-first" in S4802), the three-dimensional data encoding device sets the order identification information included in the stream PS to geometry information-first (S4803). That is, in this case, the order identification information indicates that the NAL units are transmitted in the geometry information-first order. The three-dimensional data encoding device then transmits the NAL units in the geometry information-first order (S4804).

On the other hand, if the determined order of transmission is parameter set-first (if "parameter set-first" in S4802), the three-dimensional data encoding device sets the order identification information included in the stream PS to parameter set-first (S4805). That is, in this case, the order identification information indicates that the NAL units are transmitted in the parameter set-first order. The three-dimensional data encoding device then transmits the NAL units in the parameter set-first order (S4806).

Figure 30:
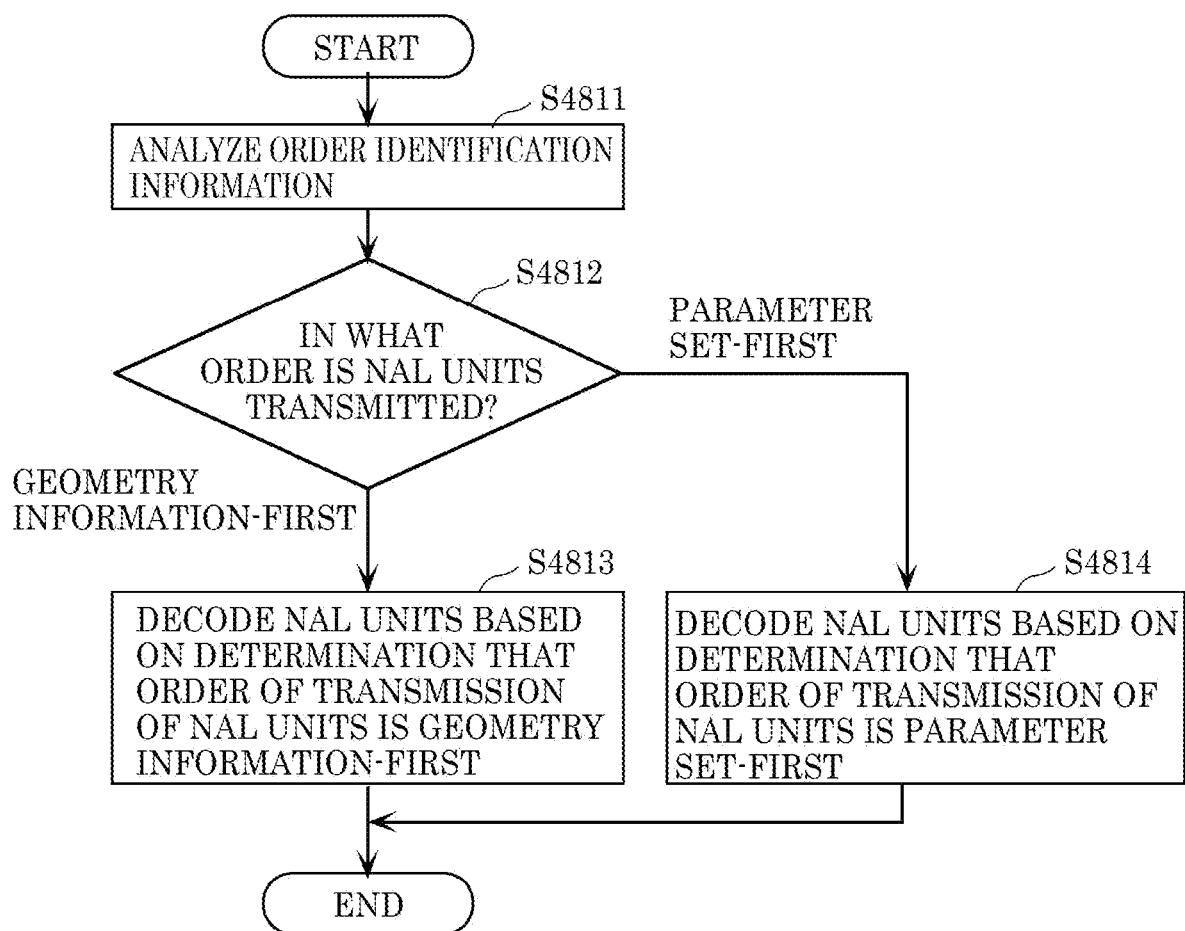
FIG. 30 is a flowchart of processing performed by a three-dimensional data decoding device according to Embodiment 2.

FIG. 30 is a flowchart showing a process performed by the three-dimensional data decoding device that involves the order of transmission of NAL units. First, the three-dimensional data decoding device analyzes the order identification information included in the stream PS (S4811).

If the order of transmission indicated by the order identification information is geometry information-first (if "geometry information-first" in S4812), the three-dimensional data decoding device decodes the NAL units based on the determination that the order of transmission of the NAL units is geometry information-first (S4813).

On the other hand, if the order of transmission indicated by the order identification information is parameter set-first (if "parameter set-first" in S4812), the three-dimensional data decoding device decodes the NAL units based on the determination that the order of transmission of the NAL units is parameter set-first (S4814).

For example, if the three-dimensional data decoding device does not decode attribute information, in step S4813, the three-dimensional data decoding device does not obtain the entire NAL units but can obtain a part of a NAL unit relating to the geometry information and decode the obtained NAL unit to obtain the geometry information.

Figure 31:
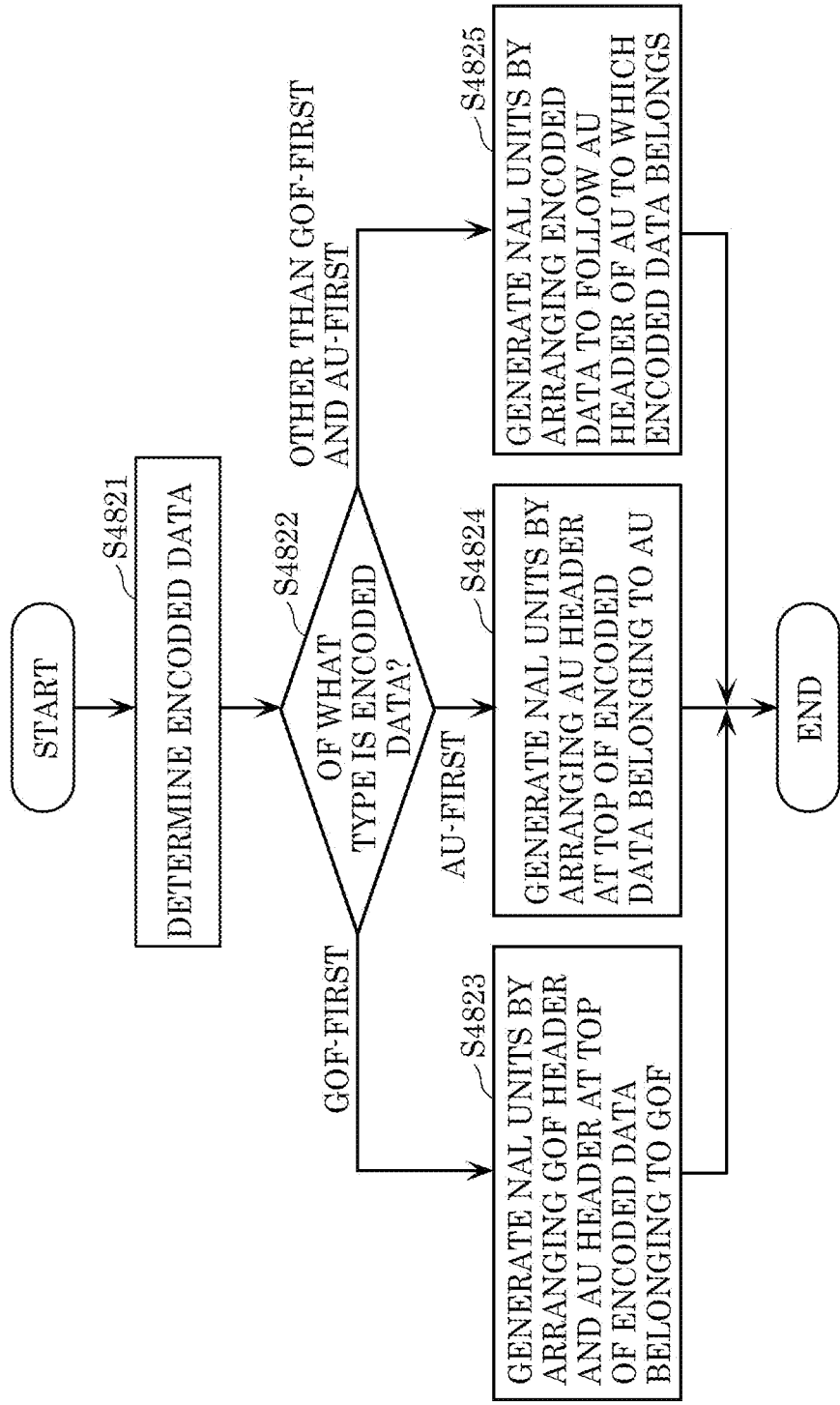
FIG. 31 is a flowchart of multiplexing processing according to Embodiment 2.

Next, a process relating to generation of an AU and a GOF will be described. FIG. 31 is a flowchart showing a process performed by the three-dimensional data encoding device (multiplexer 4802) that relates to generation of an AU and a GOF in multiplexing of NAL units.

First, the three-dimensional data encoding device determines the type of the encoded data (S4821). Specifically, the three-dimensional data encoding device determines whether the encoded data to be processed is AU-first data, GOF-first data, or other data.

If the encoded data is GOF-first data (if "GOF-first" in S4822), the three-dimensional data encoding device generates NAL units by arranging a GOF header and an AU header at the top of the encoded data belonging to the GOF (S4823).

If the encoded data is AU-first data (if "AU-first" in S4822), the three-dimensional data encoding device generates NAL units by arranging an AU header at the top of the encoded data belonging to the AU (S4824).

If the encoded data is neither GOF-first data nor AU-first data (if "other than GOF-first and AU-first" in S4822), the three-dimensional data encoding device generates NAL units by arranging the encoded data to follow the AU header of the AU to which the encoded data belongs (S4825).

Figure 32:
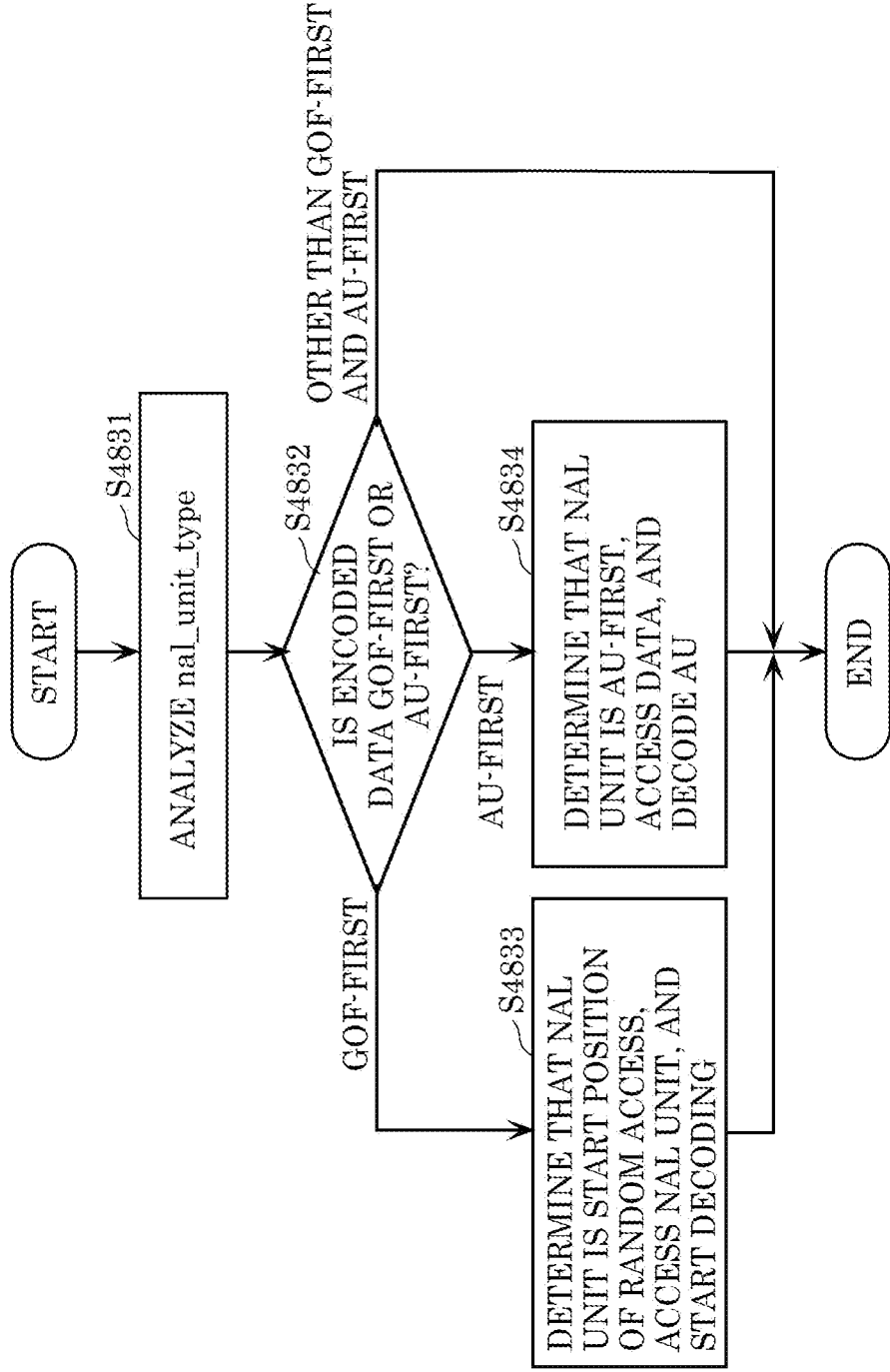
FIG. 32 is a flowchart of demultiplexing processing according to Embodiment 2.

Next, a process relating to access to an AU and a GOF will be described. FIG. 32 is a flowchart showing a process performed by the three-dimensional data decoding device that involves accessing to an AU and a GOF in demultiplexing of a NAL unit.

First, the three-dimensional data decoding device determines the type of the encoded data included in the NAL unit by analyzing nal_unit_type in the NAL unit (S4831). Specifically, the three-dimensional data decoding device determines whether the encoded data included in the NAL unit is AU-first data, GOF-first data, or other data.

If the encoded data included in the NAL unit is GOF-first data (if "GOF-first" in S4832), the three-dimensional data decoding device determines that the NAL unit is a start position of random access, accesses the NAL unit, and starts the decoding process (S4833).

If the encoded data included in the NAL unit is AU-first data (if "AU-first" in S4832), the three-dimensional data decoding device determines that the NAL unit is AU-first, accesses the data included in the NAL unit, and decodes the AU (S4834).

If the encoded data included in the NAL unit is neither GOF-first data nor AU-first data (if "other than GOF-first and AU-first" in S4832), the three-dimensional data decoding device does not process the NAL unit.

Embodiment 3

Figure 33:
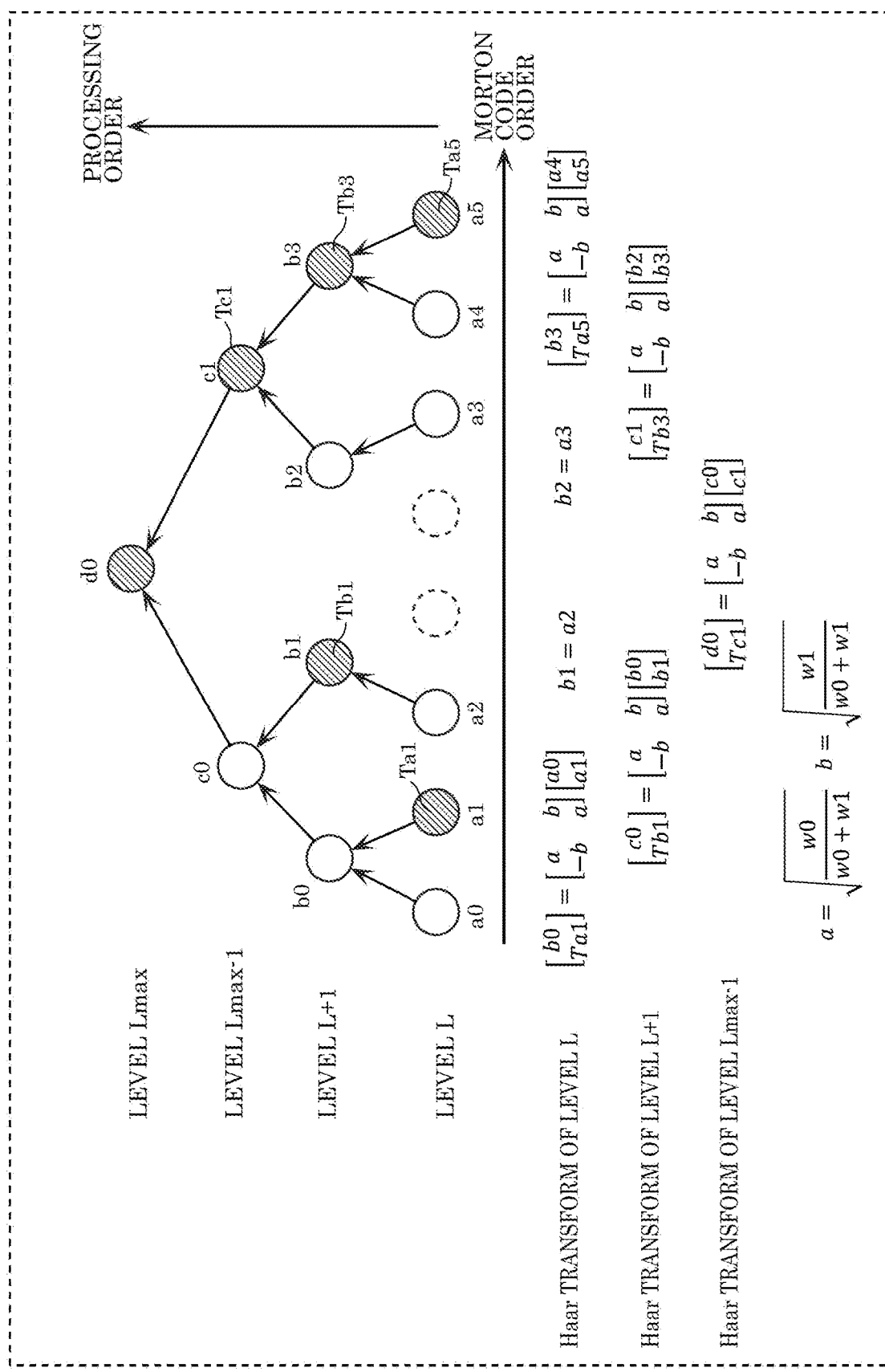
FIG. 33 is a diagram for describing the encoding of the attribute information by using a RAHT according to Embodiment 3.

Hereinafter, a method using a RAHT (Region Adaptive Hierarchical Transform) will be described as another method of encoding the attribute information of a three-dimensional point. FIG. 33 is a diagram for describing the encoding of the attribute information by using a RAHT.

First, the three-dimensional data encoding device generates Morton codes based on the geometry information of three-dimensional points, and sorts the attribute information of the three-dimensional points in the order of the Morton codes. For example, the three-dimensional data encoding device may perform sorting in the ascending order of the Morton codes. Note that the sorting order is not limited to the order of the Morton codes, and other orders may be used.

Next, the three-dimensional data encoding device generates a high-frequency component and a low-frequency component of the layer L by applying the Haar conversion to the attribute information of two adjacent three-dimensional points in the order of the Morton codes. For example, the three-dimensional data encoding device may use the Haar conversion of 2×2 matrices. The generated high-frequency component is included in a coding coefficient as the high-frequency component of the layer L, and the generated low-frequency component is used as the input value for the higher layer L+1 of the layer L.

After generating the high-frequency component of the layer L by using the attribute information of the layer L, the three-dimensional data encoding device subsequently performs processing of the layer L+1. In the processing of the layer L+1, the three-dimensional data encoding device generates a high-frequency component and a low-frequency component of the layer L+1 by applying the Haar conversion to two low-frequency components obtained by the Haar conversion of the attribute information of the layer L. The generated high-frequency component is included in a coding coefficient as the high-frequency component of the layer L+1, and the generated low-frequency component is used as the input value for the higher layer L+2 of the layer L+1.

The three-dimensional data encoding device repeats such layer processing, and determines that the highest layer Lmax has been reached at the time when a low-frequency component that is input to a layer becomes one. The three-dimensional data encoding device includes the low-frequency component of the layer Lmax−1 that is input to the Layer Lmax in a coding coefficient. Then, the value of the low-frequency component or high-frequency component included in the coding coefficient is quantized, and is encoded by using entropy encoding or the like.

Note that, when only one three-dimensional point exists as two adjacent three-dimensional points at the time of application of the Haar conversion, the three-dimensional data encoding device may use the value of the attribute information of the existing one three-dimensional point as the input value for a higher layer.

In this manner, the three-dimensional data encoding device hierarchically applies the Haar conversion to the input attribute information, generates a high-frequency component and a low-frequency component of the attribute information, and performs encoding by applying quantization described later or the like. Accordingly, the coding efficiency can be improved.

When the attribute information is N dimensional, the three-dimensional data encoding device may independently apply the Haar conversion for each dimension, and may calculate each coding coefficient. For example, when the attribute information is color information (RGB, YUV, or the like), the three-dimensional data encoding device applies the Haar conversion for each component, and calculates each coding coefficient.

The three-dimensional data encoding device may apply the Haar conversion in the order of the layers L, L+1, ..., Lmax. The closer to the layer Lmax, a coding coefficient including the more low-frequency components of the input attribute information is generated.

w0 and w1 shown in FIG. 33 are the weights assigned to each three-dimensional point. For example, the three-dimensional data encoding device may calculate the weight based on the distance information between two adjacent three-dimensional points to which the Haar conversion is applied, or the like. For example, the three-dimensional data encoding device may improve the coding efficiency such that the closer the distance, the greater the weight. Note that the three-dimensional data encoding device may calculate this weight with another technique, or need not use the weight.

In the example shown in FIG. 33, the pieces of the input attribute information are a0, a1, a2, a3, a4, and a5. Additionally, Ta1, Ta5, Tb1, Tb3, Tc1, and d0 are encoded among the coding coefficients after the Haar conversion. The other coding coefficients (b0, b2, c0 and the like) are medians, and are not encoded.

Specifically, in the example shown in FIG. 33, the high-frequency component Ta1 and the low-frequency component b0 are generated by performing the Haar conversion on a0 and a1. Here, when the weights w0 and w1 are equal, the low-frequency component b0 is the average value of a0 and a1, and the high-frequency component Ta1 is the difference between a0 and a1.

Since there is no attribute information to be paired with a2, a2 is used as b1 as is. Similarly, since there is no attribute information to be paired with a3, a3 is used as b2 as is. Additionally, the high-frequency component Ta5 and the low-frequency component b3 are generated by performing the Haar conversion on a4 and a5.

In the layer L+1, the high-frequency component Tb1 and the low-frequency component c0 are generated by performing the Haar conversion on b0 and b1. Similarly, the high-frequency component Tb3 and the low-frequency component c1 are generated by performing the Haar conversion on b2 and b3.

In the layer Lmax−1, the High-frequency component Tc1 and the low-frequency component d0 are generated by performing the Haar conversion on c0 and c1.

The three-dimensional data encoding device may encode the coding coefficients to which the Haar conversion has been applied, after quantizing the coding coefficients. For example, the three-dimensional data encoding device performs quantization by dividing the coding coefficient by the quantization scale (also called the quantization step (QS)). In this case, the smaller the quantization scale, the smaller the error (quantization error) that may occur due to quantization. Conversely, the larger the quantization scale, the larger the quantization error.

Figure 34:
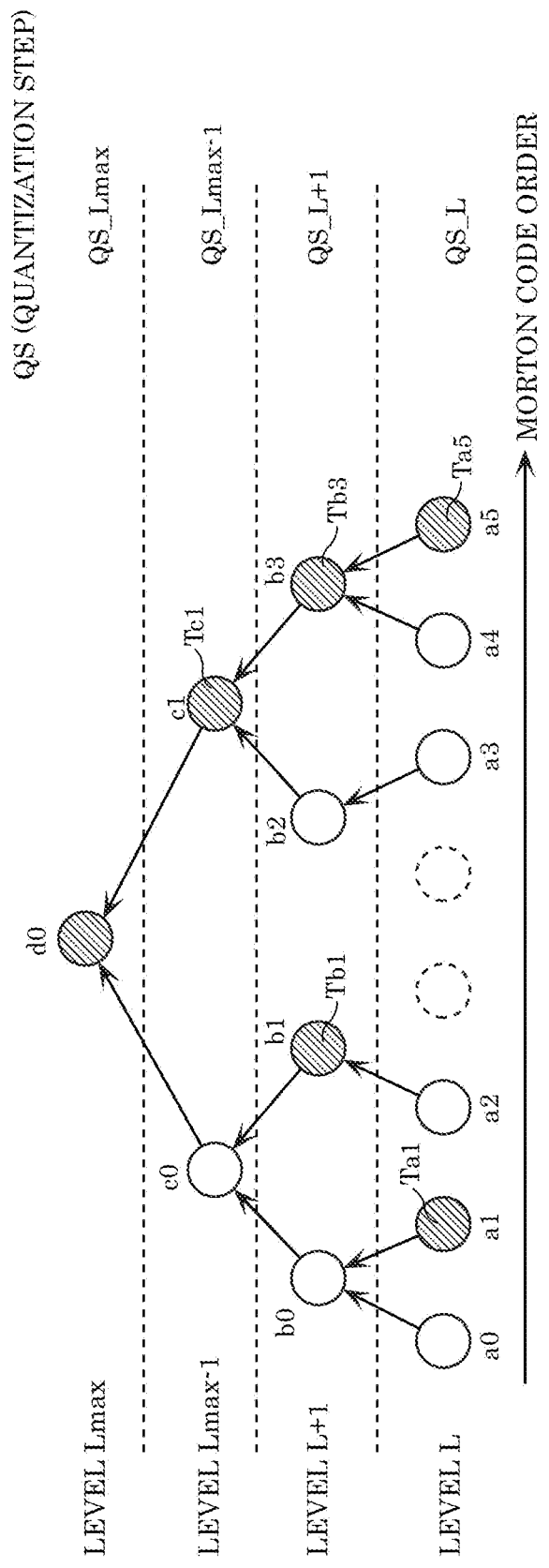
FIG. 34 is a diagram showing an example of setting a quantization scale for each hierarchy according to Embodiment 3.

Note that the three-dimensional data encoding device may change the value of the quantization scale for each layer. FIG. 34 is a diagram showing an example of setting the quantization scale for each layer. For example, the three-dimensional data encoding device sets smaller quantization scales to the higher layers, and larger quantization scales to the lower layers. Since the coding coefficients of the three-dimensional points belonging to the higher layers include more low-frequency components than the lower layers, there is a high possibility that the coding coefficients are important components in human visual characteristics and the like. Therefore, by suppressing the quantization error that may occur in the higher layers by making the quantization scales for the higher layers small, visual deterioration can be suppressed, and the coding efficiency can be improved.

Note that the three-dimensional data encoding device may add the quantization scale for each layer to a header or the like. Accordingly, the three-dimensional decoding device can correctly decode the quantization scale, and can appropriately decode a bitstream.

Additionally, the three-dimensional data encoding device may adaptively switch the value of the quantization scale according to the importance of a current three-dimensional point to be encoded. For example, the three-dimensional data encoding device uses a small quantization scale for a three-dimensional point with high importance, and uses a large quantization scale for a three-dimensional point with low importance. For example, the three-dimensional data encoding device may calculate the importance from the weight at the time of the Haar conversion, or the like. For example, the three-dimensional data encoding device may calculate the quantization scale by using the sum of w0 and w1. In this manner, by making the quantization scale of a three-dimensional point with high importance small, the quantization error becomes small, and the coding efficiency can be improved.

Additionally, the value of the QS may be made smaller for the higher layers. Accordingly, the higher the layer, the larger the value of the QW, and the prediction efficiency can be improved by suppressing the quantization error of the three-dimensional point.

Here, a coding coefficient Ta1q after quantization of the coding coefficient Ta1 of the attribute information a1 is represented by Ta1/QS_L. Note that QS may be the same value in all the layers or a part of the layers.

The QW (Quantization Weight) is the value that represents the importance of a current three-dimensional point to be encoded. For example, the above-described sum of w0 and w1 may be used as the QW. Accordingly, the higher the layer, the larger the value of the QW, and the prediction efficiency can be improved by suppressing the quantization error of the three-dimensional point.

For example, the three-dimensional data encoding device may first initialize the values of the QWs of all the three-dimensional points with 1, and may update the QW of each three-dimensional point by using the values of w0 and w1 at the time of the Haar conversion. Alternatively, the three-dimensional data encoding device may change the initial value according to the layers, without initializing the values of the QWs of all the three-dimensional points with a value of 1. For example, the quantization scales for the higher layers becomes small by setting larger QW initial values for the higher layers. Accordingly, since the prediction error in the higher layers can be suppressed, the prediction accuracy of the lower layers can be increased, and the coding efficiency can be improved. Note that the three-dimensional data encoding device need not necessarily use the QW.

When using the QW, the quantized value Ta1q of Ta1 is calculated by (Equation K1) and (Equation K2).

[Math. 1]

$$Ta1q = \frac{Ta1 + \frac{QS\_L}{2}}{QS\_LoD1} \times QWTa1 \quad \text{(Equation K1)}$$

$$QWTa1 = 1 + \sum_{i=0}^{1} w_i \quad \text{(Equation K2)}$$

Additionally, the three-dimensional data encoding device scans and encodes the coding coefficients (unsigned integer values) after quantization in a certain order. For example, the three-dimensional data encoding device encodes a plurality of three-dimensional points from the three-dimensional points included in the higher layers toward the lower layers in order.

For example, in the example shown in FIG. 33, the three-dimensional data encoding device encodes a plurality of three-dimensional points in the order of Tc1q Tb1q, Tb3q, Ta1q, and Ta5q from d0q included in the higher layer Lmax. Here, there is a tendency that the lower the layer L, the more likely it is that the coding coefficient after quantization becomes 0. This can be due to the following and the like.

Since the coding coefficient of the lower layer L shows a higher frequency component than the higher layers, there is a tendency that the coding coefficient becomes 0 depending on a current three-dimensional point.

Additionally, by switching the quantization scale according to the above-described importance or the like, the lower the layer, the larger the quantization scales, and the more likely it is that the coding coefficient after quantization becomes 0.

Figures 35, 36:
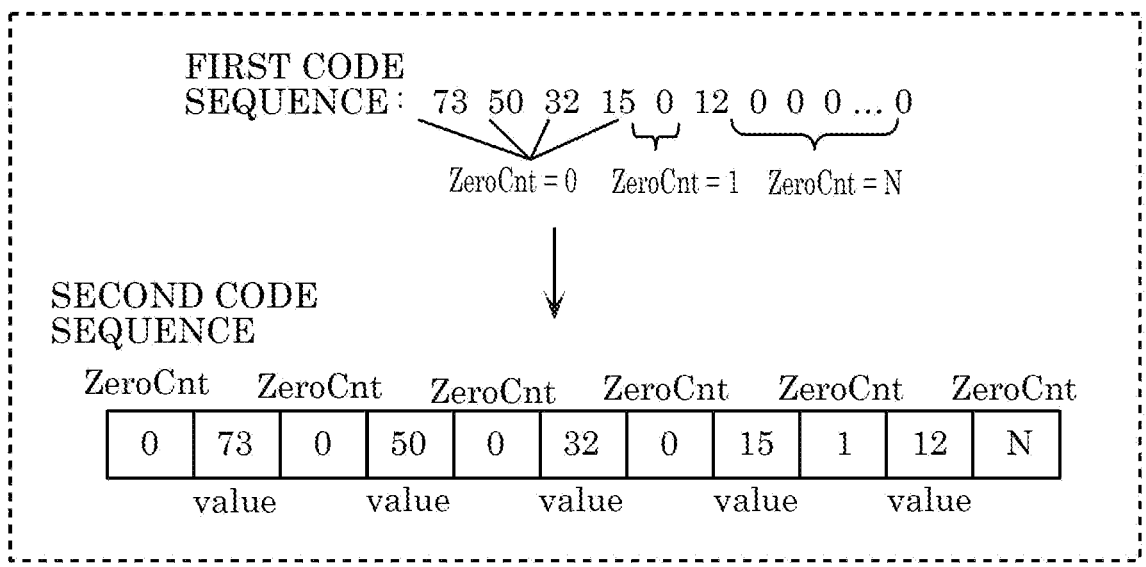
FIG. 35 is a diagram showing an example of a first code sequence and a second code sequence according to Embodiment 3.
FIG. 36 is a diagram showing an example of a truncated unary code according to Embodiment 3.

In this manner, the lower the layer, the more likely it is that the coding coefficient after quantization becomes 0, and the value 0 consecutively occurs in the first code sequence. FIG. 35 is a diagram showing an example of the first code sequence and the second code sequence.

The three-dimensional data encoding device counts the number of times that the value 0 occurs in the first code sequence, and encodes the number of times that the value 0 consecutively occurs, instead of the consecutive values 0. That is, the three-dimensional data encoding device generates a second code sequence by replacing the coding coefficient of the consecutive values 0 in the first code sequence with the number of consecutive times (ZeroCnt) of 0. Accordingly, when there are consecutive values 0 of the coding coefficients after quantization, the coding efficiency can be improved by encoding the number of consecutive times of 0, rather than encoding a lot of 0s.

Additionally, the three-dimensional data encoding device may entropy encode the value of ZeroCnt. For example, the three-dimensional data encoding device binarizes the value of ZeroCnt with the truncated unary code of the total number T of the encoded three-dimensional points, and arithmetically encodes each bit after the binarization. FIG. 36 is a diagram showing an example of the truncated unary code in the case where the total number of encoded three-dimensional points is T. At this time, the three-dimensional data encoding device may improve the coding efficiency by using a different coding table for each bit. For example, the three-dimensional data encoding device uses coding table 1 for the first bit, uses coding table 2 for the second bit, and coding table 3 for the subsequent bits. In this manner, the three-dimensional data encoding device can improve the coding efficiency by switching the coding table for each bit.

Additionally, the three-dimensional data encoding device may arithmetically encode ZeroCnt after binarizing ZeroCnt with an Exponential-Golomb. Accordingly, when the value of ZeroCnt easily becomes large, the efficiency can be more improved than the binarized arithmetic encoding with the truncated unary code. Note that the three-dimensional data encoding device may add a flag for switching between using the truncated unary code and using the Exponential-Golomb to a header. Accordingly, the three-dimensional data encoding device can improve the coding efficiency by selecting the optimum binarization method. Additionally, the three-dimensional data decoding device can correctly decode a bitstream by referring to the flag included in the header to switch the binarization method.

The three-dimensional decoding device may convert the decoded coding coefficient after the quantization from an unsigned integer value to a signed integer value with a method contrary to the method performed by the three-dimensional data encoding device. Accordingly, when the coding coefficient is entropy encoded, the three-dimensional decoding device can appropriately decode a bitstream generated without considering the occurrence of a negative integer. Note that the three-dimensional decoding device does not necessarily need to convert the coding coefficient from an unsigned integer value to a signed integer value. For example, when decoding a bitstream including an encoded bit that has been separately entropy encoded, the three-dimensional decoding device may decode the sign bit.

The three-dimensional decoding device decodes the coding coefficient after the quantization converted to the signed integer value, by the inverse quantization and the inverse Haar conversion. Additionally, the three-dimensional decoding device utilizes the coding coefficient after the decoding for the prediction after the current three-dimensional point to be decoded. Specifically, the three-dimensional decoding device calculates the inverse quantized value by multiplying the coding coefficient after the quantization by the decoded quantization scale. Next, the three-dimensional decoding device obtains the decoded value by applying the inverse Haar conversion described later to the inverse quantized value.

For example, the three-dimensional decoding device converts the decoded unsigned integer value to a signed integer value with the following method. When the LSB (least significant bit) of the decoded unsigned integer value a2u is 1, the signed integer value Ta1q is set to −((a2u+1)>>1). When the LSB of the decoded unsigned integer value a2u is not 1 (when it is 0), the signed integer value Ta1q is set to (a2u>>1).

Additionally, the inverse quantized value of Ta1 is represented by Ta1q×QS_L. Here, Ta1q is the quantized value of Ta1. In addition, QS_L is the quantization step for the layer L.

Additionally, the QS may be the same value for all the layers or a part of the layers. In addition, the three-dimensional data encoding device may add the information indicating the QS to a header or the like. Accordingly, the three-dimensional decoding device can correctly perform inverse quantization by using the same QS as the QS used by the three-dimensional data encoding device.

Figure 37:
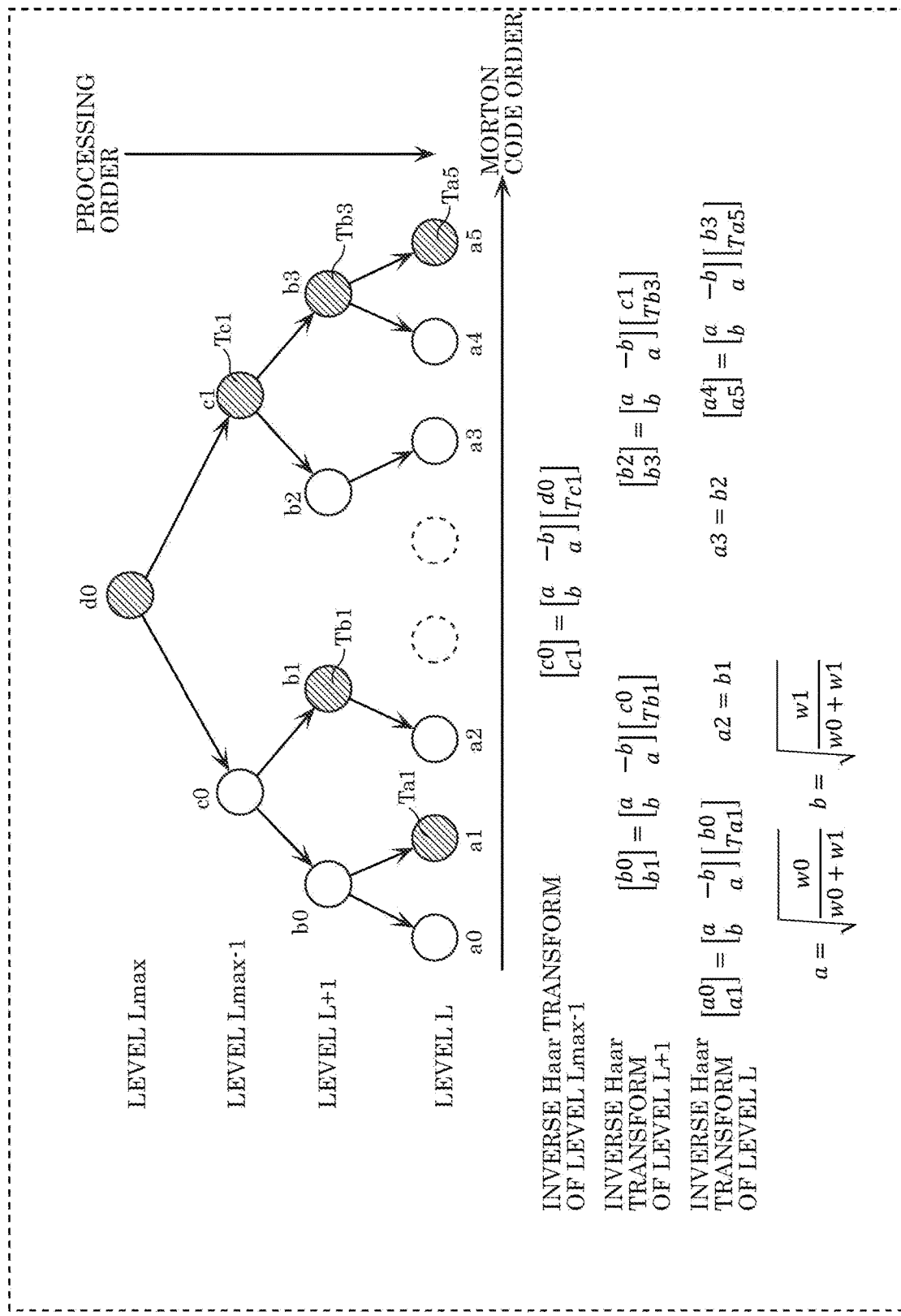
FIG. 37 is a diagram for describing the inverse Haar conversion according to Embodiment 3.

Next, the inverse Haar conversion will be described. FIG. 37 is a diagram for describing the inverse Haar conversion. The three-dimensional decoding device decodes the attribute value of a three-dimensional point by applying the inverse Haar conversion to the coding coefficient after the inverse quantization.

First, the three-dimensional decoding device generates the Morton codes based on the geometry information of three-dimensional points, and sorts the three-dimensional points in the order of the Morton codes. For example, the three-dimensional decoding device may perform the sorting in ascending order of the Morton codes. Note that the sorting order is not limited to the order of the Morton codes, and the other order may be used.

Next, the three-dimensional decoding device restores the attribute information of three-dimensional points that are adjacent to each other in the order of the Morton codes in the layer L, by applying the inverse Haar conversion to the coding coefficient including the low-frequency component of the layer L+1, and the coding coefficient including the high-frequency component of the layer L. For example, the three-dimensional decoding device may use the inverse Haar conversion of a 2×2 matrix. The attribute information of the restored layer L is used as the input value for the lower layer L−1.

The three-dimensional decoding device repeats such layer processing, and ends the processing when all the attribute information of the bottom layer is decoded. Note that, when only one three-dimensional point exists as two three-dimensional points that are adjacent to each other in the layer L−1 at the time of application of the inverse Haar conversion, the three-dimensional decoding device may assign the value of the encoding component of the layer L to the attribute value of the one existing three-dimensional point. Accordingly, the three-dimensional decoding device can correctly decode a bitstream with improved coding efficiency by applying the Haar conversion to all the values of the input attribute information.

When the attribute information is N dimensional, the three-dimensional decoding device may independently apply the inverse Haar conversion for each dimension, and may decode each coding coefficient. For example, when the attribute information is color information (RGB, YUV, or the like), the three-dimensional data decoding device applies the inverse Haar conversion to the coding coefficient for each component, and decodes each attribute value.

The three-dimensional decoding device may apply the inverse Haar conversion in the order of Layers Lmax, L+1, . . . , L. Additionally, w0 and w1 shown in FIG. 37 are the weights assigned to each three-dimensional point. For example, the three-dimensional data decoding device may calculate the weight based on the distance information between two adjacent three-dimensional points to which the inverse Haar conversion is applied, or the like. For example, the three-dimensional data encoding device may decode a bitstream with improved coding efficiency such that the closer the distance, the greater the weight.

In the example shown in FIG. 37, the coding coefficients after the inverse quantization are Ta1, Ta5, Tb1, Tb3, Tc1, and d0, and a0, a1, a2, a3, a4, and a5 are obtained as the decoded values.

FIG. 38 is a diagram showing a syntax example of the attribute information (attribute_data). The attribute information (attribute_data) includes the number of consecutive zeros (ZeroCnt), the number of attribute dimensions (attribute_dimension), and the coding coefficient (value [j] [i]).

The number of consecutive zeros (ZeroCnt) indicates the number of times that the value 0 continues in the coding coefficient after quantization. Note that the three-dimensional data encoding device may arithmetically encode ZeroCnt after binarizing ZeroCnt.

Additionally, as shown in FIG. 38, the three-dimensional data encoding device may determine whether or not the layer L (layerL) to which the coding coefficient belongs is equal to or more than a predefined threshold value TH_layer, and may switch the information added to a bitstream according to the determination result. For example, when the determination result is true, the three-dimensional data encoding device adds all the coding coefficients of the attribute information to a bitstream. In addition, when the determination result is false, the three-dimensional data encoding device may add a part of the coding coefficients to a bitstream.

Specifically, when the determination result is true, the three-dimensional data encoding device adds the encoded result of the three-dimensional information of the color information RGB or YUV to a bitstream. When the determination result is false, the three-dimensional data encoding device may add a part of information such as G or Y of the color information to a bitstream, and need not to add the other components to the bitstream. In this manner, the three-dimensional data encoding device can improve the coding efficiency by not adding a part of the coding coefficients of the layer (the layer smaller than TH_layer) including the coding coefficients indicating the high-frequency component with less visually noticeable degradation to a bitstream.

The number of attribute dimensions (attribute_dimension) indicates the number of dimensions of the attribute information. For example, when the attribute information is the color information (RGB, YUV, or the like) of a three-dimensional point, since the color information is three-dimensional, the number of attribute dimensions is set to a value 3. When the attribute information is the reflectance, since the reflectance is one-dimensional, the number of attribute dimensions is set to a value 1. Note that the number of attribute dimensions may be added to the header of the attribute information of a bit stream or the like.

The coding coefficient (value [j] [i]) indicates the coding coefficient after quantization of the attribute information of the j-th dimension of the i-th three-dimensional point. For example, when the attribute information is color information, value [99] [1] indicates the coding coefficient of the second dimension (for example, the G value) of the 100th three-dimensional point. Additionally, when the attribute information is reflectance information, value [119] [0] indicates the coding coefficient of the first dimension (for example, the reflectance) of the 120th three-dimensional point.

Note that, when the following conditions are satisfied, the three-dimensional data encoding device may subtract the value 1 from value [j] [i], and may entropy encode the obtained value. In this case, the three-dimensional data decoding device restores the coding coefficient by adding the value 1 to value [j] [i] after entropy decoding.

The above-described conditions are (1) when attribute_dimension=1, or (2) when attribute_dimension is 1 or more, and when the values of all the dimensions are equal. For example, when the attribute information is the reflectance, since attribute_dimension=1, the three-dimensional data encoding device subtracts the value 1 from the coding coefficient to calculate value, and encodes the calculated value. The three-dimensional decoding device calculates the coding coefficient by adding the value 1 to the value after decoding.

More specifically, for example, when the coding coefficient of the reflectance is 10, the three-dimensional data encoding device encodes the value 9 obtained by subtracting the value 1 from the value 10 of the coding coefficient. The three-dimensional data decoding device adds the value 1 to the decoded value 9 to calculate the value 10 of the coding coefficient.

Additionally, since attribute_dimension=3 when the attribute information is the color, for example, when the coding coefficient after quantization of each of the components R, G, and B is the same, the three-dimensional data encoding device subtracts the value 1 from each coding coefficient, and encodes the obtained value. The three-dimensional data decoding device adds the value 1 to the value after decoding. More specifically, for example, when the coding coefficient of R, G, and B=(1, 1, 1), the three-dimensional data encoding device encodes (0, 0, 0). The three-dimensional data decoding device adds 1 to each component of (0, 0, 0) to calculate (1, 1, 1). Additionally, when the coding coefficients of R, G, and B=(2, 1, 2), the three-dimensional data encoding device encodes (2, 1, 2) as is. The three-dimensional data decoding device uses the decoded (2, 1, 2) as is as the coding coefficients.

In this manner, by providing ZeroCnt, since the pattern in which all the dimensions are 0 as value is not generated, the value obtained by subtracting 1 from the value indicated by value can be encoded. Therefore, the coding efficiency can be improved.

Additionally, value [0] [i] shown in FIG. 38 indicates the coding coefficient after quantization of the attribute information of the first dimension of the i-th three-dimensional point. As shown in FIG. 38, when the layer L (layerL) to which the coding coefficient belongs is smaller than the threshold value TH_layer, the code amount may be reduced by adding the attribute information of the first dimension to a bitstream (not adding the attribute information of the second and following dimensions to the bitstream).

The three-dimensional data encoding device may switch the calculation method of the value of ZeroCnt depending on the value of attribute_dimension. For example, when attribute_dimension=3, the three-dimensional data encoding device may count the number of times that the values of the coding coefficients of all the components (dimensions) become 0. FIG. 39 is a diagram showing an example of the coding coefficient and ZeroCnt in this case. For example, in the case of the color information shown in FIG. 39, the three-dimensional data encoding device counts the number of the consecutive coding coefficients having 0 for all of the R, G, and B components, and adds the counted number to a bitstream as ZeroCnt. Accordingly, it becomes unnecessary to encode ZeroCnt for each component, and the overhead can be reduced. Therefore, the coding efficiency can be improved. Note that the three-dimensional data encoding device may calculate ZeroCnt for each dimension even when attribute_dimension is two or more, and may add the calculated ZeroCnt to a bitstream.

Figure 40:
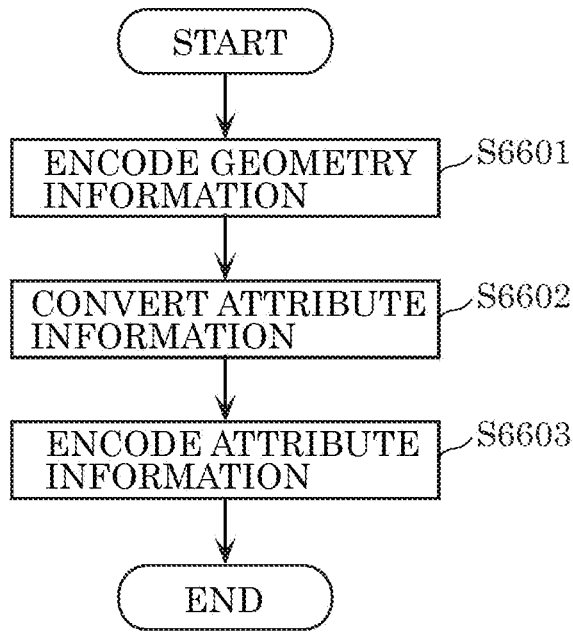
FIG. 40 is a flowchart of the three-dimensional data encoding processing according to Embodiment 3.

FIG. 40 is a flowchart of the three-dimensional data encoding processing according to the present embodiment. First, the three-dimensional data encoding device encodes geometry information (geometry) (S6601). For example, the three-dimensional data encoding device performs encoding by using an octree representation.

Next, the three-dimensional data encoding device converts the attribute information (S6602). For example, after the encoding of the geometry information, when the position of a three-dimensional point is changed due to quantization or the like, the three-dimensional data encoding device reassigns the attribute information of the original three-dimensional point to the three-dimensional point after the change. Note that the three-dimensional data encoding device may interpolate the value of the attribute information according to the amount of change of the position to perform the reassignment. For example, the three-dimensional data encoding device detects N three-dimensional points before the change near the three dimensional position after the change, performs the weighted averaging of the value of the attribute information of the N three-dimensional points based on the distance from the three-dimensional position after the change to each of the N three-dimensional points, and sets the obtained value as the value of the attribute information of the three-dimensional point after the change. Additionally, when two or more three-dimensional points are changed to the same three-dimensional position due to quantization or the like, the three-dimensional data encoding device may assign the average value of the attribute information in the two or more three-dimensional points before the change as the value of the attribute information after the change.

Next, the three-dimensional data encoding device encodes the attribute information (S6603). For example, when encoding a plurality of pieces of attribute information, the three-dimensional data encoding device may encode the plurality of pieces of attribute information in order. For example, when encoding the color and the reflectance as the attribute information, the three-dimensional data encoding device generates a bitstream to which the encoding result of the reflectance is added after the encoding result of the color. Note that a plurality of encoding results of the attribute information added to a bitstream may be in any order.

Additionally, the three-dimensional data encoding device may add the information indicating the start location of the encoded data of each attribute information in a bitstream to a header or the like. Accordingly, since the three-dimensional data decoding device can selectively decode the attribute information that needs to be decoded, the decoding processing of the attribute information that does not need to be decoded can be omitted. Therefore, the processing amount for the three-dimensional data decoding device can be reduced. Additionally, the three-dimensional data encoding device may encode a plurality of pieces of attribute information in parallel, and may integrate the encoding results into one bitstream. Accordingly, the three-dimensional data encoding device can encode a plurality of pieces of attribute information at high speed.

Figure 41:
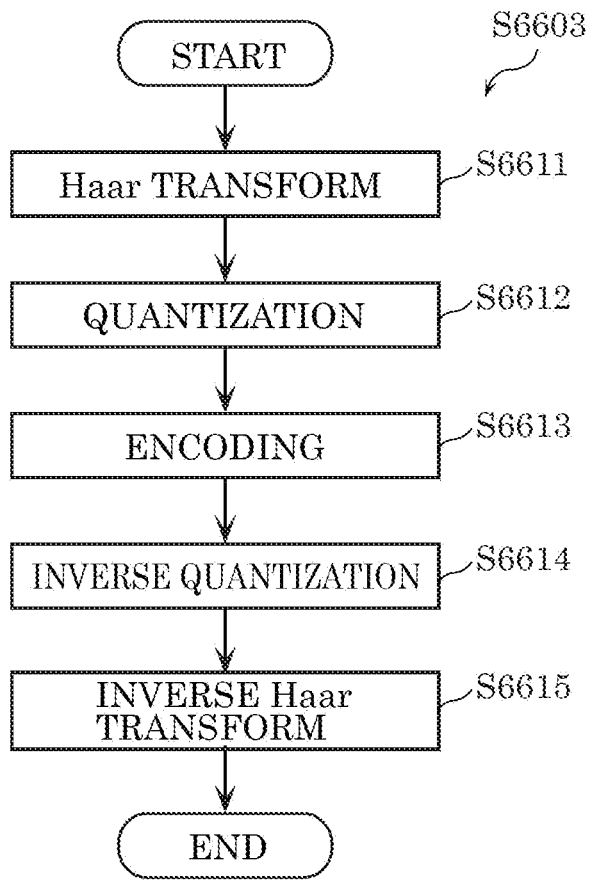
FIG. 41 is a flowchart of the attribute information encoding processing according to Embodiment 3.

FIG. 41 is a flowchart of the attribute information encoding processing (S6603). First, the three-dimensional data encoding device generates a coding coefficient from attribute information by the Haar conversion (S6611). Next, the three-dimensional data encoding device applies quantization to the coding coefficient (S6612). Next, the three-dimensional data encoding device generates encoded attribute information (bitstream) by encoding the coding coefficient after the quantization (S6613).

Additionally, the three-dimensional data encoding device applies inverse quantization to the coding coefficient after the quantization (S6614). Next, the three-dimensional decoding device decodes the attribute information by applying the inverse Haar conversion to the coding coefficient after the inverse quantization (S6615). For example, the decoded attribute information is referred to in the following encoding.

Figure 42:
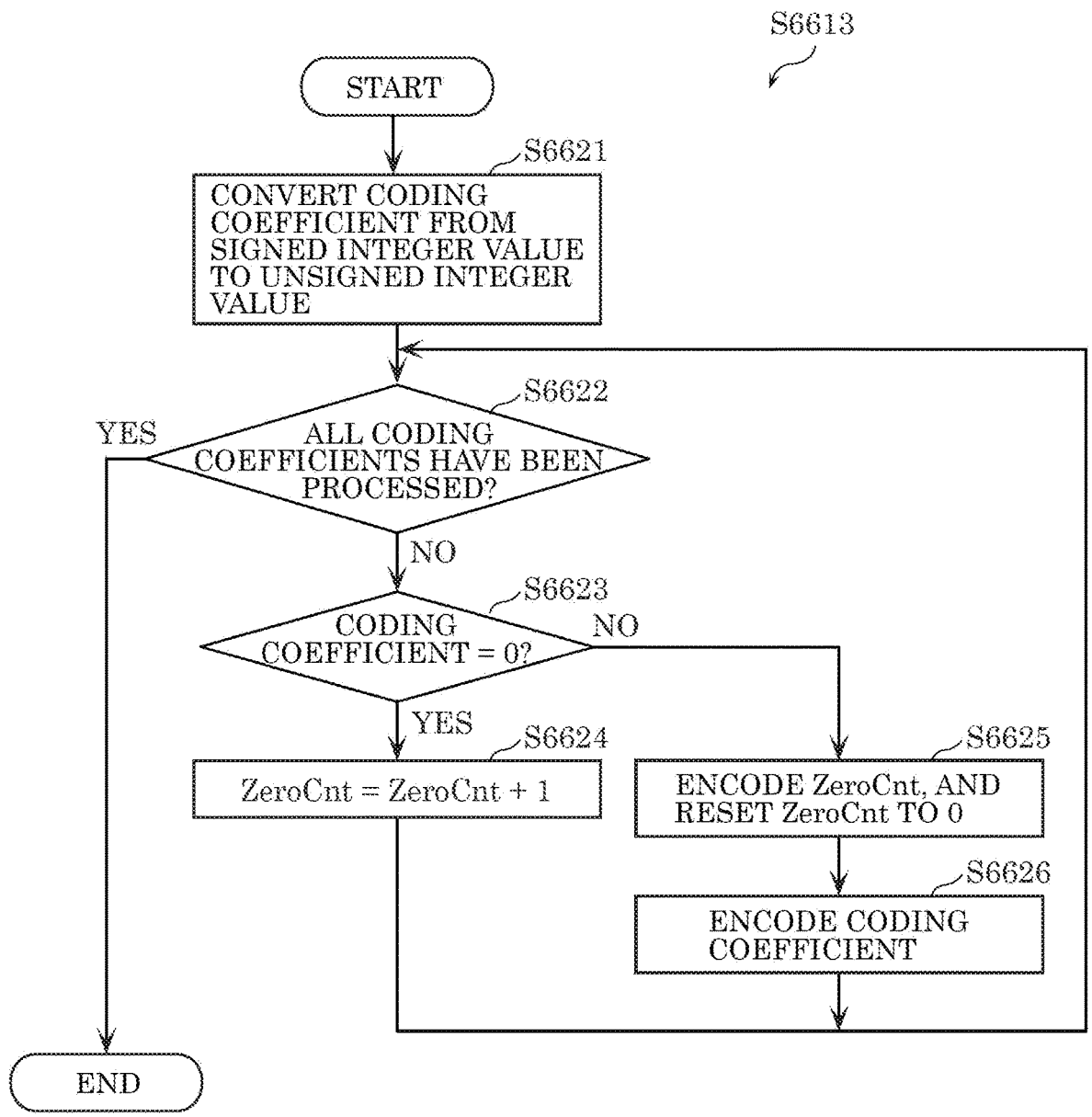
FIG. 42 is a flowchart of the coding coefficient encoding processing according to Embodiment 3.

FIG. 42 is a flowchart of the coding coefficient encoding processing (S6613). First, the three-dimensional data encoding device converts a coding coefficient from a signed integer value to an unsigned integer value (S6621). For example, the three-dimensional data encoding device converts a signed integer value to an unsigned integer value as follows. When signed integer value Ta1q is smaller than 0, the unsigned integer value is set to −1−(2×Ta1q). When the signed integer value Ta1q is equal to or more than 0, the unsigned integer value is set to 2×Ta1q. Note that, when the coding coefficient does not become a negative value, the three-dimensional data encoding device may encode the coding coefficient as the unsigned integer value as is.

When not all coding coefficients have been processed (No in S6622), the three-dimensional data encoding device determines whether the value of the coding coefficient to be processed is zero (S6623). When the value of the coding coefficient to be processed is zero (Yes in S6623), the three-dimensional data encoding device increments ZeroCnt by 1 (S6624), and returns to step S6622.

When the value of the coding coefficient to be processed is not zero (No in S6623), the three-dimensional data encoding device encodes ZeroCnt, and resets ZeroCnt to zero (S6625). Additionally, the three-dimensional data encoding device arithmetically encodes the coding coefficient to be processed (S6626), and returns to step S6622. For example, the three-dimensional data encoding device performs binary arithmetic encoding. In addition, the three-dimensional data encoding device may subtract the value 1 from the coding coefficient, and may encode the obtained value.

Additionally, the processing of steps S6623 to S6626 is repeatedly performed for each coding coefficient. In addition, when all the coding coefficients have been processed (Yes in S6622), the three-dimensional data encoding device ends the processing.

Figure 43:
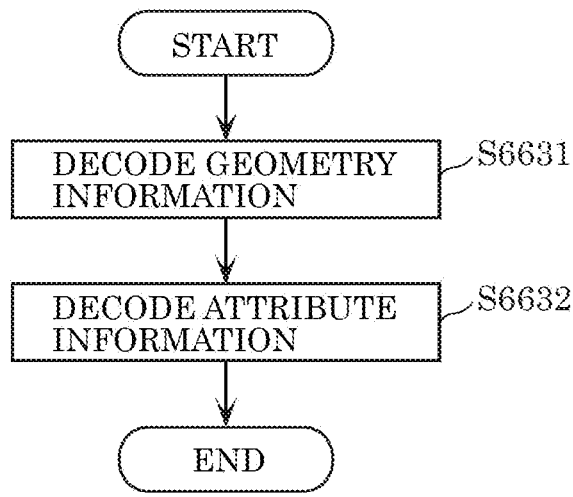
FIG. 43 is a flowchart of the three-dimensional data decoding processing according to Embodiment 3.

FIG. 43 is a flowchart of the three-dimensional data decoding processing according to the present embodiment. First, the three-dimensional decoding device decodes geometry information (geometry) from a bitstream (S6631). For example, the three-dimensional data decoding device performs decoding by using an octree representation.

Next, the three-dimensional decoding device decodes the attribute information from the bitstream (S6632). For example, when decoding a plurality of pieces of attribute information, the three-dimensional decoding device may decode the plurality of pieces of attribute information in order. For example, when decoding the color and the reflectance as the attribute information, the three-dimensional data decoding device decodes the encoding result of the color and the encoding result of the reflectance according to the order in which they are added to the bitstream. For example, when the encoding result of the reflectance is added after the encoding result of the color in a bitstream, the three-dimensional data decoding device decodes the encoding result of the color, and thereafter decodes the encoding result of the reflectance. Note that the three-dimensional data decoding device may decode the encoding results of the attribute information added to a bitstream in any order.

Additionally, the three-dimensional data decoding device may obtain the information indicating the start location of the encoded data of each attribute information in a bitstream by decoding a header or the like. Accordingly, since the three-dimensional data decoding device can selectively decode the attribute information that needs to be decoded, the decoding processing of the attribute information that does not need to be decoded can be omitted. Therefore, the processing amount of the three-dimensional decoding device can be reduced. Additionally, the three-dimensional data decoding device may decode a plurality of pieces of attribute information in parallel, and may integrate the decoding results into one three-dimensional point cloud. Accordingly, the three-dimensional data decoding device can decode a plurality of pieces of attribute information at high speed.

Figure 44:
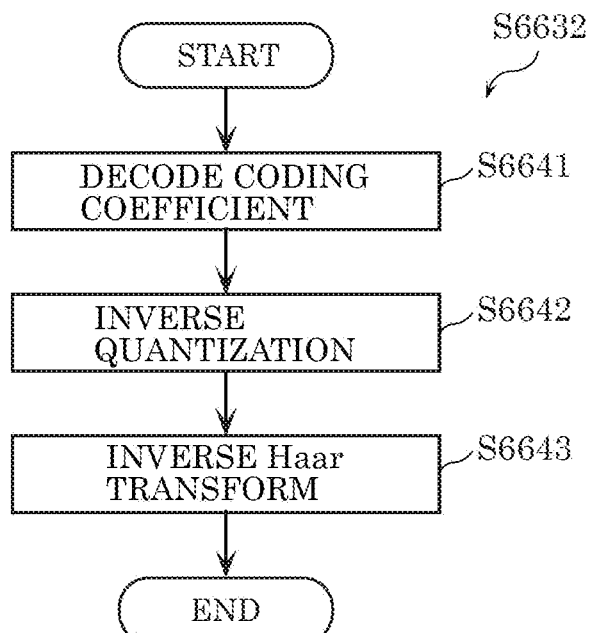
FIG. 44 is a flowchart of the attribute information decoding processing according to Embodiment 3.

FIG. 44 is a flowchart of the attribute information decoding processing (S6632). First, the three-dimensional decoding device decodes a coding coefficient from a bitstream (S6641). Next, the three-dimensional decoding device applies the inverse quantization to the coding coefficient (S6642). Next, the three-dimensional decoding device decodes the attribute information by applying the inverse Haar conversion to the coding coefficient after the inverse quantization (S6643).

Figure 45:
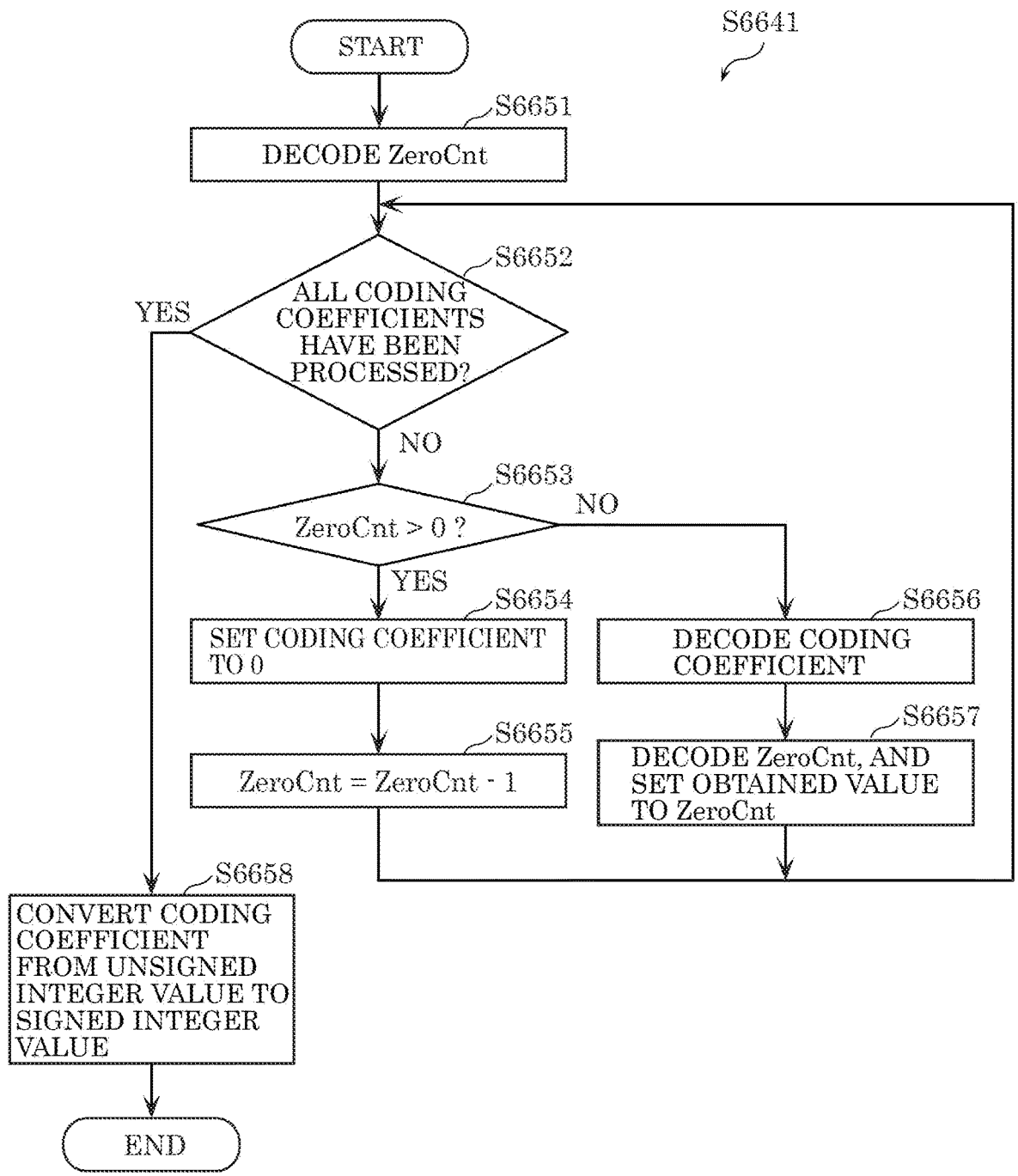
FIG. 45 is a flowchart the coding coefficient decoding processing according to Embodiment 3.

FIG. 45 is a flowchart of the coding coefficient decoding processing (S6641). First, the three-dimensional decoding device decodes ZeroCnt from a bitstream (S6651). When not all coding coefficients have been processed (No in S6652), the three-dimensional decoding device determines whether ZeroCnt is larger than 0 (S6653).

When ZeroCnt is larger than zero (Yes in S6653), the three-dimensional decoding device sets the coding coefficient to be processed to 0 (S6654). Next, the three-dimensional decoding device subtracts 1 from ZeroCnt (S6655), and returns to step S6652.

When ZeroCnt is zero (No in S6653), the three-dimensional decoding device decodes the coding coefficient to be processed (S6656). For example, the three-dimensional decoding device uses binary arithmetic decoding. Additionally, the three-dimensional decoding device may add the value 1 to the decoded coding coefficient.

Next, the three-dimensional decoding device decodes ZeroCnt, sets the obtained value to ZeroCnt (S6657), and returns to step S6652.

Additionally, the processing of steps S6653 to S6657 is repeatedly performed for each coding coefficient. In addition, when all the coding coefficients have been processed (Yes in S6652), the three-dimensional data encoding device converts a plurality of decoded coding coefficients from unsigned integer values to signed integer values (S6658). For example, the three-dimensional data decoding device may convert the decoded coding coefficients from unsigned integer values to signed integer values as follows. When the LSB (least significant bit) of the decoded unsigned integer value Talu is 1, the signed integer value Ta1q is set to −((Talu+1)>>1). When the LSB of the decoded unsigned integer value Talu is not 1 (when it is 0), the signed integer value Ta1q is set to (Talu>>1). Note that, when the coding coefficient does not become a negative value, the three-dimensional data decoding device may use the decoded coding coefficient as is as the signed integer value.

Figure 46:
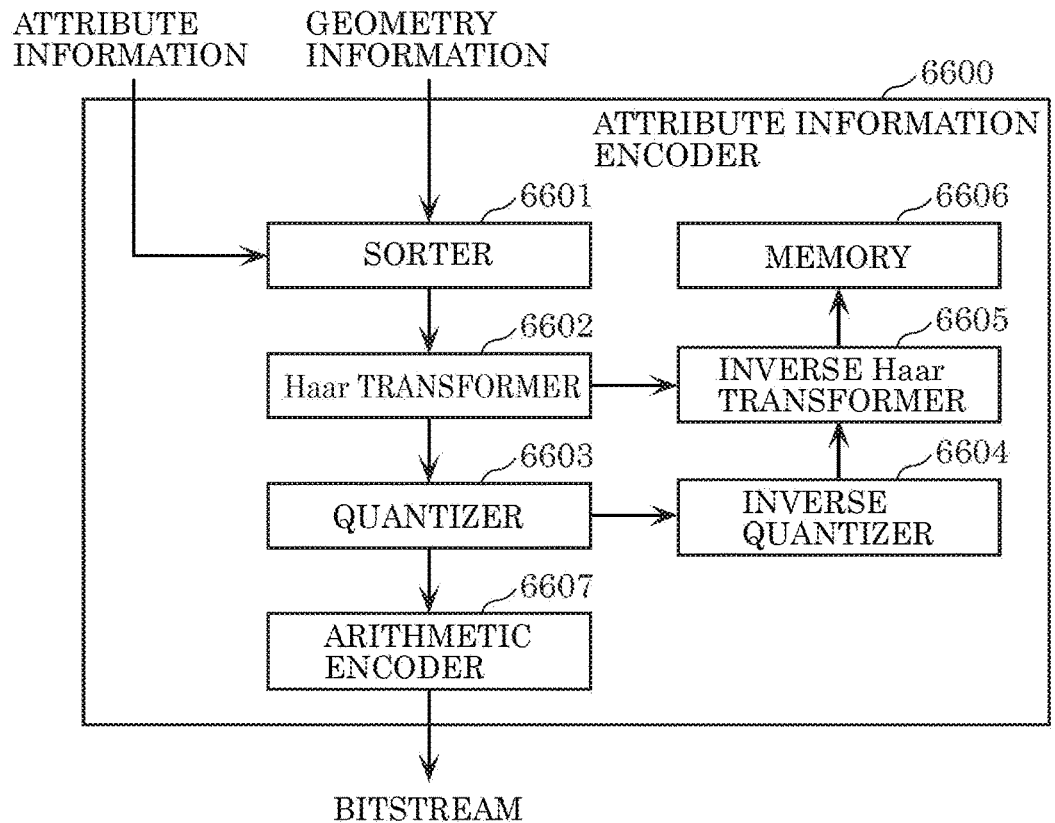
FIG. 46 is a block diagram of an attribute information encoder according to Embodiment 3.

FIG. 46 is a block diagram of attribute information encoder 6600 included in the three-dimensional data encoding device. Attribute information encoder 6600 includes sorter 6601, Haar transformer 6602, quantizer 6603, inverse quantizer 6604, inverse Haar converter 6605, memory 6606, and arithmetic encoder 6607.

Sorter 6601 generates the Morton codes by using the geometry information of three-dimensional points, and sorts the plurality of three-dimensional points in the order of the Morton codes. Haar transformer 6602 generates the coding coefficient by applying the Haar conversion to the attribute information. Quantizer 6603 quantizes the coding coefficient of the attribute information.

Inverse quantizer 6604 inverse quantizes the coding coefficient after the quantization. Inverse Haar converter 6605 applies the inverse Haar conversion to the coding coefficient. Memory 6606 stores the values of pieces of attribute information of a plurality of decoded three-dimensional points. For example, the attribute information of the decoded three-dimensional points stored in memory 6606 may be utilized for prediction and the like of an unencoded three-dimensional point.

Arithmetic encoder 6607 calculates ZeroCnt from the coding coefficient after the quantization, and arithmetically encodes ZeroCnt. Additionally, arithmetic encoder 6607 arithmetically encodes the non-zero coding coefficient after the quantization. Arithmetic encoder 6607 may binarize the coding coefficient before the arithmetic encoding. In addition, arithmetic encoder 6607 may generate and encode various kinds of header information.

Figure 47:
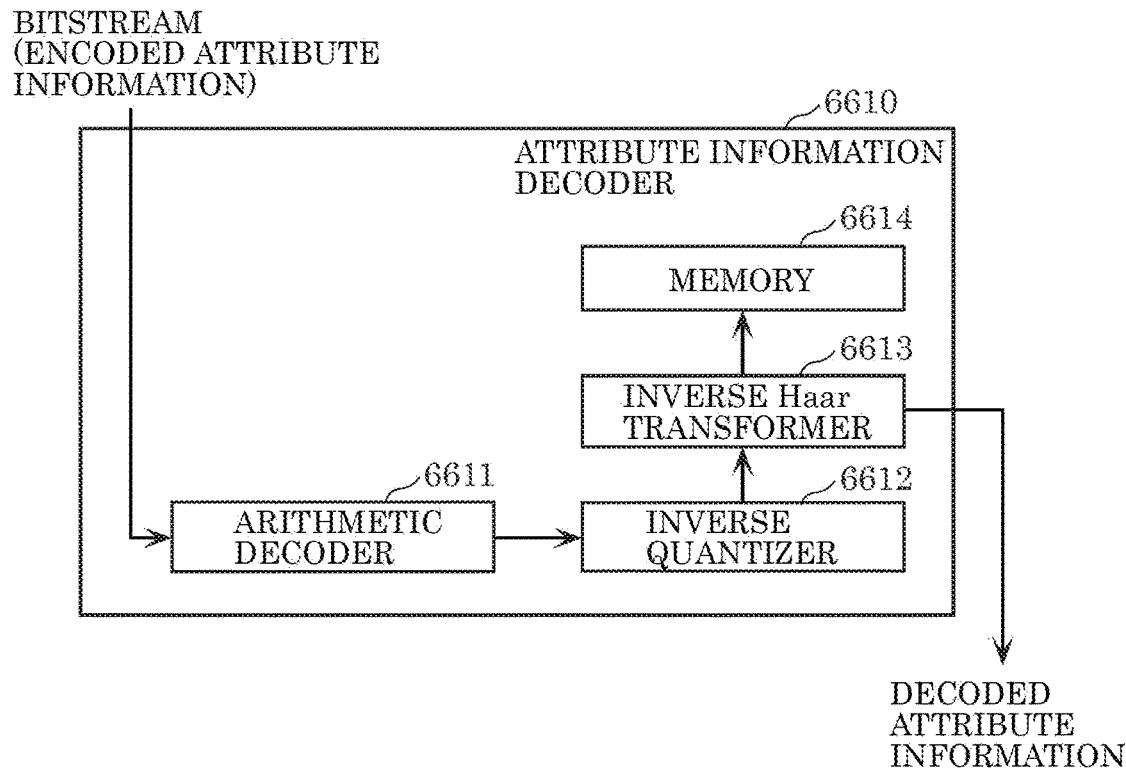
FIG. 47 is a block diagram of an attribute information decoder according to Embodiment 3.

FIG. 47 is a block diagram of attribute information decoder 6610 included in the three-dimensional decoding device. Attribute information decoder 6610 includes arithmetic decoder 6611, inverse quantizer 6612, inverse Haar converter 6613, and memory 6614.

Arithmetic decoder 6611 arithmetically decodes ZeroCnt and the coding coefficient included in a bitstream. Note that arithmetic decoder 6611 may decode various kinds of header information.

Inverse quantizer 6612 inverse quantizes the arithmetically decoded coding coefficient. Inverse Haar converter 6613 applies the inverse Haar conversion to the coding coefficient after the inverse quantization. Memory 6614 stores the values of pieces of attribute information of a plurality of decoded three-dimensional points. For example, the attribute information of the decoded three-dimensional points stored in memory 6614 may be utilized for prediction of an undecoded three-dimensional point.

Note that, in the above-described embodiment, although the example has been shown in which the three-dimensional points are encoded in the order of the lower layers to the higher layers as the encoding order, it is not necessarily limit to this. For example, a method may be used that scans the coding coefficients after the Haar conversion in the order of the higher layers to the lower layers. Note that, also in this case, the three-dimensional data encoding device may encode the number of consecutive times of the value 0 as ZeroCnt.

Additionally, the three-dimensional data encoding device may switch whether or not to use the encoding method using ZeroCnt described in the present embodiment per WLD, SPC, or volume. In this case, the three-dimensional data encoding device may add the information indicating whether or not the encoding method using ZeroCnt has been applied to the header information. Accordingly, the three-dimensional decoding device can appropriately perform decoding. As an example of the switching method, for example, the three-dimensional data encoding device counts the number of times of occurrence of the coding coefficient having a value of 0 with respect to one volume. When the count value exceeds a predefined threshold value, the three-dimensional data encoding device applies the method using ZeroCnt to the next volume, and when the count value is equal to or less than the threshold value, the three-dimensional data encoding device does not apply the method using ZeroCnt to the next volume. Accordingly, since the three-dimensional data encoding device can appropriately switch whether or not to apply the encoding method using ZeroCnt according to the characteristic of a current three-dimensional point to be encoded, the coding efficiency can be improved.

Hereinafter, another technique (modification) of the present embodiment will be described. The three-dimensional data encoding device scans and encodes the coding coefficients (unsigned integer values) after the quantization according to a certain order. For example, the three-dimensional data encoding device encodes a plurality of three-dimensional points from the three-dimensional points included in the lower layers toward the higher layers in order.

Figure 48:
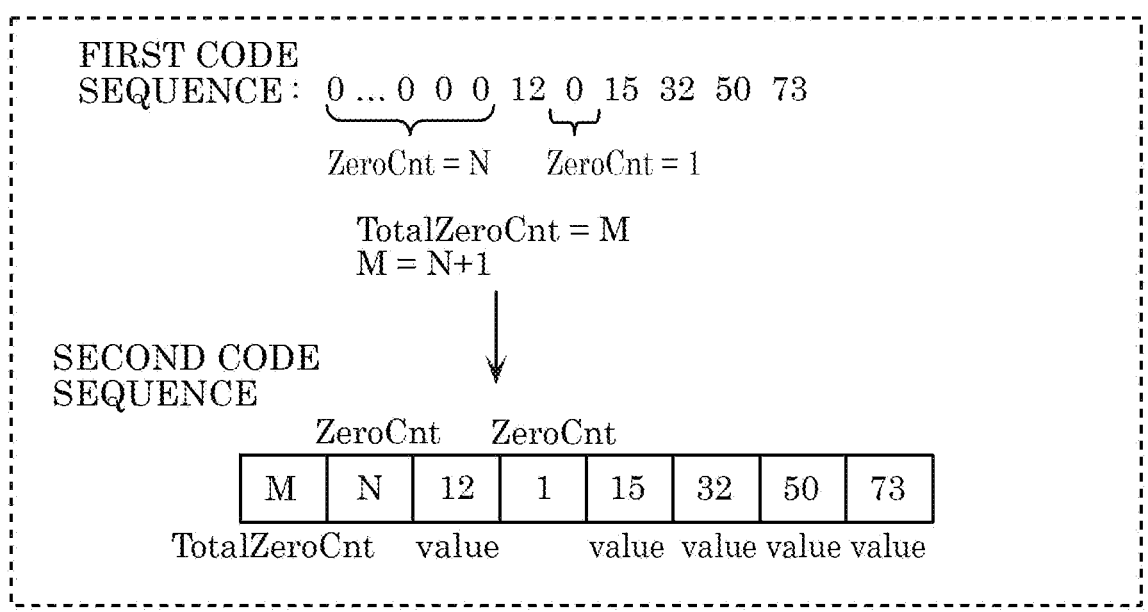
FIG. 48 is a diagram showing an example of a first code sequence and a second code sequence according to a modification of Embodiment 3.

FIG. 48 is a diagram showing an example of the first code sequence and the second code sequence in the case where this technique is used for the attribute information shown in FIG. 33. In the case of this example, the three-dimensional data encoding device encodes a plurality of coding coefficients in the order of Ta5q, Tb1q, Tb3q, Tc1q, and d0q from Ta1q included in the lower layer L. Here, there is a tendency that the lower the layer, the more likely it is that the coding coefficient after quantization becomes 0. This can be due to the following and the like.

Since the coding coefficients of the lower layers L show a higher frequency component than the higher layers, the coding coefficients tend to be 0 depending on the current three-dimensional point to be encoded. Additionally, by switching the quantization scale according to the above-described importance or the like. The lower the layer, the larger the quantization scale, and the coding coefficient after the quantization easily become 0.

In this manner, the lower the layer, the more likely it is that the coding coefficient after the quantization becomes 0, and the value 0 is likely to be consecutively generated for the first code sequence. The three-dimensional data encoding device counts the number of times that the value 0 occurs in the first code sequence, and encodes the number of times (ZeroCnt) that the value 0 consecutively occurs, instead of the consecutive values 0. Accordingly, when there are consecutive values 0 of the coding coefficients after the quantization, the coding efficiency can be improved by encoding the number of consecutive times of 0, rather than encoding a lot of 0s.

Additionally, the three-dimensional data encoding device may encode the information indicating the total number of times of occurrence of the value 0. Accordingly, the overhead of encoding ZeroCnt can be reduced, and the coding efficiency can be improved.

For example, the three-dimensional data encoding device encodes the total number of the coding coefficients having a value of 0 as TotalZeroCnt. Accordingly, in the example shown in FIG. 48, at the time when the three-dimensional data decoding device decodes the second ZeroCnt (value 1) included in the second code sequence, the total number of decoded ZeroCnts will be N+1 (=TotalZeroCnt). Therefore, the three-dimensional data decoding device can identify that 0 does not occur after this. Therefore, subsequently, it becomes unnecessary for the three-dimensional data encoding device to encode ZeroCnt for each value, and the code amount can be reduced.

Additionally, the three-dimensional data encoding device may entropy encode TotalZeroCnt. For example, the three-dimensional data encoding device binarizes the value of TotalZeroCnt with the truncated unary code of the total number T of the encoded three-dimensional points, and arithmetically encodes each bit after binarization. At this time, the three-dimensional data encoding device may improve the coding efficiency by using a different coding table for each bit. For example, the three-dimensional data encoding device uses coding table 1 for the first bit, uses coding table 2 for the second bit, and coding table 3 for the subsequent bits. In this manner, the three-dimensional data encoding device can improve the coding efficiency by switching the coding table for each bit.

Additionally, the three-dimensional data encoding device may arithmetically encode TotalZeroCnt after binarizing TotalZeroCnt with an Exponential-Golomb. Accordingly, when the value of TotalZeroCnt easily becomes large, the efficiency can be more improved than the binarized arithmetic encoding with the truncated unary code. Note that the three-dimensional data encoding device may add a flag for switching between using the truncated unary code and using the Exponential-Golomb to a header. Accordingly, the three-dimensional data encoding device can improve the coding efficiency by selecting the optimum binarization method. Additionally, the three-dimensional data decoding device can correctly decode a bitstream by referring to the flag included in the header to switch the binarization method.

FIG. 49 is a diagram showing a syntax example of the attribute information (attribute_data) in the present modification. The attribute information (attribute_data) shown in FIG. 49 further includes the total number of zeros (TotalZeroCnt) in addition to the attribute information shown in FIG. 38. Note that the other information is the same as that in FIG. 38. The total number of zeros (TotalZeroCnt) indicates the total number of the coding coefficients having a value of 0 after quantization.

Figure 50:
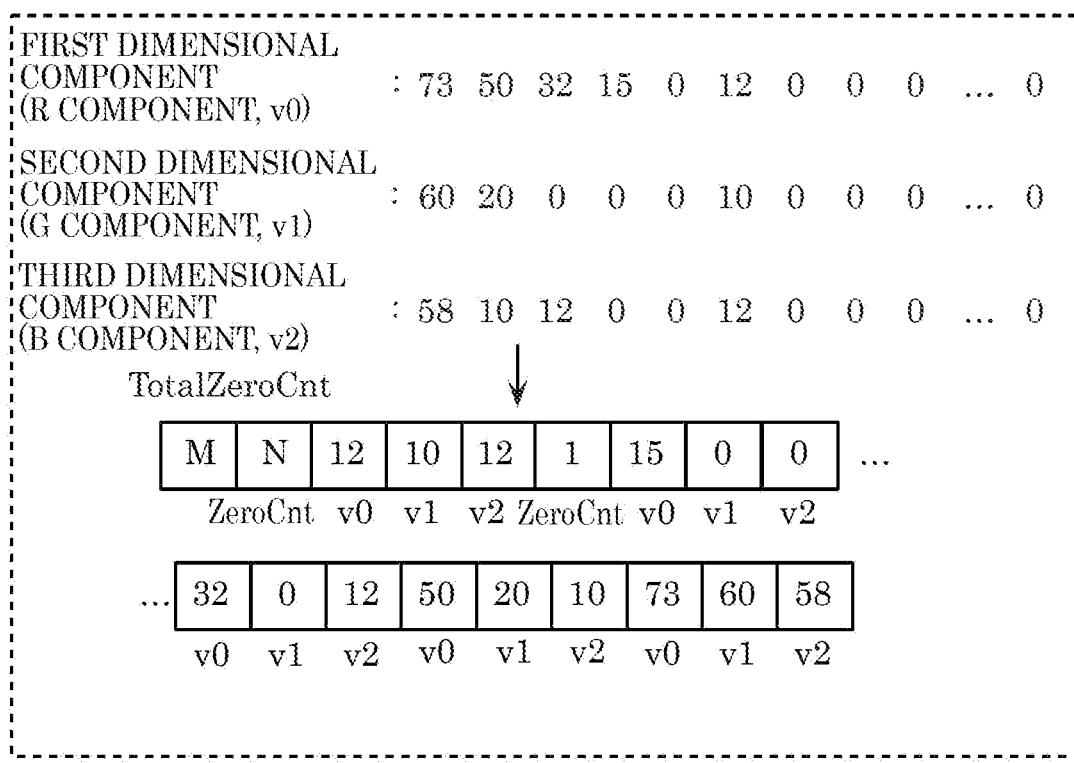
FIG. 50 is a diagram showing an example of a coding coefficient, ZeroCnt, and TotalZeroCnt according to the modification of Embodiment 3.

Additionally, the three-dimensional data encoding device may switch the calculation method of the values of TotalZeroCnt and ZeroCnt depending on the value of attribute_dimension. For example, when attribute_dimension=3, the three-dimensional data encoding device may count the number of times that the values of the coding coefficients of all the components (dimensions) become 0. FIG. 50 is a diagram showing an example of the coding coefficient, ZeroCnt, and TotalZeroCnt in this case. For example, in the case of the color information shown in FIG. 50, the three-dimensional data encoding device counts the number of the consecutive coding coefficients having 0 for all of the R, G, and B components, and adds the counted number to a bitstream as TotalZeroCnt and ZeroCnt. Accordingly, it becomes unnecessary to encode Total ZeroCnt and ZeroCnt for each component, and the overhead can be reduced. Therefore, the coding efficiency can be improved. Note that the three-dimensional data encoding device may calculate TotalZeroCnt and ZeroCnt for each dimension even when attribute_dimension is two or more, and may add the calculated TotalZeroCnt and ZeroCnt to a bitstream.

Figure 51:
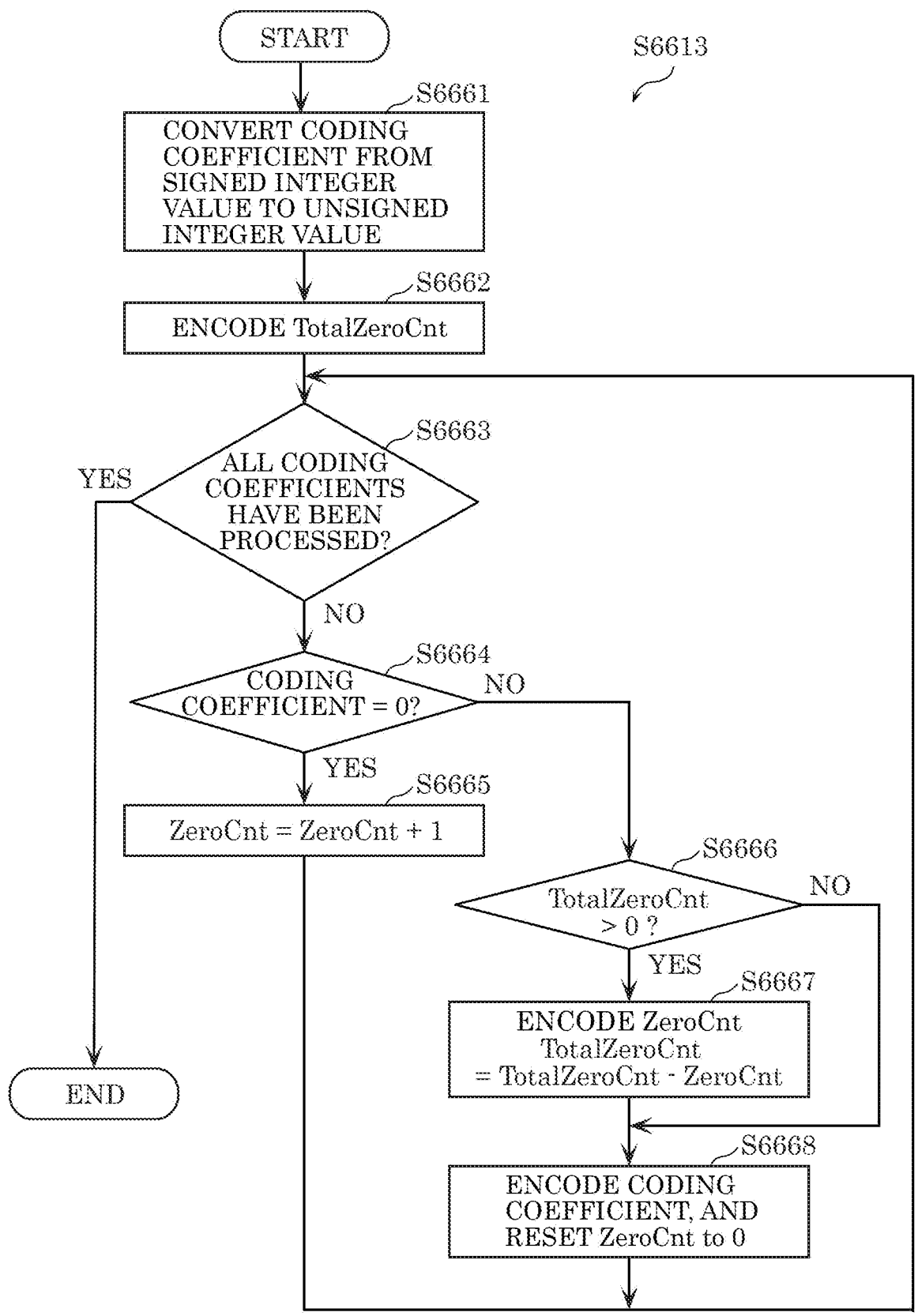
FIG. 51 is a flowchart of the coding coefficient encoding processing according to the modification of Embodiment 3.

FIG. 51 is a flowchart of the coding coefficient encoding processing (S6613) in the present modification. First, the three-dimensional data encoding device converts the coding coefficient from a signed integer value to an unsigned integer value (S6661). Next, the three-dimensional data encoding device encodes TotalZeroCnt (S6662).

When not all coding coefficients have been processed (No in S6663), the three-dimensional data encoding device determines whether the value of the coding coefficient to be processed is zero (S6664). When the value of the coding coefficient to be processed is zero (Yes in S6664), the three-dimensional data encoding device increments ZeroCnt by 1 (S6665), and returns to step S6663.

When the value of the coding coefficient to be processed is not zero (No in S6664), the three-dimensional data encoding device determines whether TotalZeroCnt is larger than 0 (S6666). When TotalZeroCnt is larger than 0 (Yes in S6666), the three-dimensional data encoding device encodes ZeroCnt, and sets TotalZeroCnt to TotalZeroCnt−ZeroCnt (S6667).

After step S6667, or when TotalZeroCnt is 0 (No in S6666), the three-dimensional data encoding device encodes the coding coefficient, resets ZeroCnt to 0 (S6668), and returns to step S6663. For example, the three-dimensional data encoding device performs binary arithmetic encoding.

Additionally, the three-dimensional data encoding device may subtract the value 1 from the coding coefficient, and encode the obtained value.

Additionally, the processing of steps S6664 to S6668 is repeatedly performed for each coding coefficient. In addition, when all the coding coefficients have been processed (Yes in S6663), the three-dimensional data encoding device ends processing.

Figure 52:
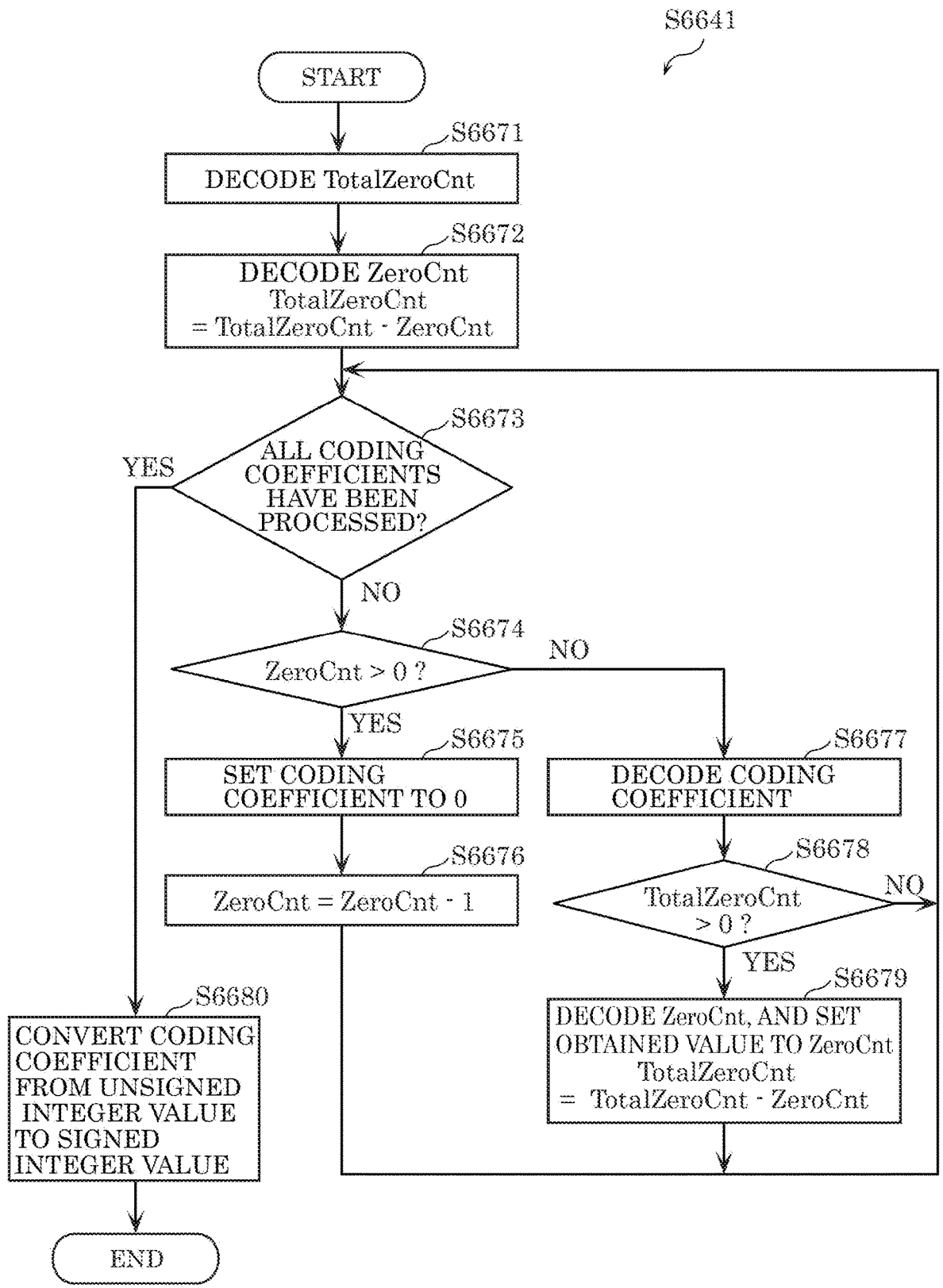
FIG. 52 is a flowchart of the coding coefficient decoding processing according to the modification of Embodiment 3.

FIG. 52 is a flowchart of the coding coefficient decoding processing (S6641) in the present modification. First, the three-dimensional decoding device decodes TotalZeroCnt from a bitstream (S6671). Next, the three-dimensional decoding device decodes ZeroCnt from the bitstream, and sets TotalZeroCnt to TotalZeroCnt−ZeroCnt (S6672).

When not all coding coefficients have been processed (No in S6673), the three-dimensional data encoding device determines whether ZeroCnt is larger than 0 (S6674).

When ZeroCnt is larger than zero (Yes in S6674), the three-dimensional data decoding device sets the coding coefficient to be processed to 0 (S6675). Next, the three-dimensional data decoding device subtracts 1 from ZeroCnt (S6676), and returns to step S6673.

When ZeroCnt is zero (No in S6674), the three-dimensional data decoding device decodes the coding coefficient to be processed (S6677). For example, the three-dimensional data decoding device uses binary arithmetic decoding. Additionally, the three-dimensional data decoding device may add the value 1 to the decoded coding coefficient.

Next, the three-dimensional data decoding device determines whether TotalZeroCnt is larger than 0 (S6678). When TotalZeroCnt is larger than 0 (Yes in S6678), the three-dimensional data decoding device decodes ZeroCnt, sets the obtained value to ZeroCnt, sets TotalZeroCnt to TotalZeroCnt−ZeroCnt (S6679), and returns to step S6673. Additionally, when TotalZeroCnt is 0 (No in S6678), the three-dimensional decoding device returns to step S6673.

Additionally, the processing of steps S6674 to S6679 is repeatedly performed for each coding coefficient. In addition, when all the coding coefficients have been processed (Yes in S6673), the three-dimensional data encoding device converts the decoded coding coefficient from an unsigned integer value to a signed integer value (S6680).

FIG. 53 is a diagram showing another syntax example of the attribute information (attribute_data). The attribute information (attribute_data) shown in FIG. 53 includes value [j] [i]_greater_zero_flag, value [j] [i]_greater_one_flag, and value [j] [i], instead of the coding coefficient (value [j] [i]) shown in FIG. 38. Note that the other information is the same as that in FIG. 38.

Value [j] [i]_greater_zero_flag indicates whether or not the value of the coding coefficient (value [j] [i]) is larger than 0. In other words, value [j] [i]_greater_zero_flag indicates whether or not the value of the coding coefficient (value [j] [i]) is 0.

For example, when the value of the coding coefficient is larger than 0, value [j] [i]_greater_zero_flag is set to the value 1, and when the value of the coding coefficient is 0, value [j] [i]_greater_zero_flag is set to the value 0. When the value of value [j] [i]_greater_zero_flag is 0, the three-dimensional data encoding device need not add value [j] [i] to a bitstream. In this case, the three-dimensional decoding device may determine that the value of value [j] [i] is the value 0. Accordingly, the code amount can be reduced.

Value [j] [i]_greater_one_flag indicates whether or not the value of the coding coefficient (value [j] [i]) is larger than 1 (is equal to or larger than 2). In other words, value [j]

[i]_greater_one_flag indicates whether or not the value of the coding coefficient (value [j] [i]) is 1.

For example, when the value of the coding coefficient is larger than 1, value [ ] [i]_greater_one_flag is set to the value 1. Otherwise (when the value of the coding coefficient is equal to or less than 1), value [j] [i]_greater_one_flag is set to the value 0. When the value of value [j] [i]_greater_one_flag is 0, the three-dimensional data encoding device need not add value [j] [i] to a bitstream. In this case, the three-dimensional decoding device may determine that the value of value [j] [i] is the value 1.

Value [j] [i] indicates the coding coefficient after quantization of the attribute information of the j-th dimension of the i-th three-dimensional point. For example, when the attribute information is color information, value [99] [1] indicates the coding coefficient of the second dimension (for example, the G value) of the 100th three-dimensional point. Additionally, when the attribute information is reflectance information, value [119] [0] indicates the coding coefficient of the first dimension (for example, the reflectance) of the 120th three-dimensional point.

When value [j] [i]_greater_zero_flag=1, and value [j] [i]_greater_one_flag=1, the three-dimensional data encoding device may add value [j] [i] to a bitstream. Additionally, the three-dimensional data encoding device may add the value obtained by subtracting 2 from value [j] [i] to the bitstream. In this case, the three-dimensional decoding device calculates the coding coefficient by adding the value 2 to the decoded value [j] [i].

The three-dimensional data encoding device may entropy encode value [j] [i]_greater_zero_flag and value [j] [i]_greater_one_flag. For example, binary arithmetic encoding and binary arithmetic decoding may be used.

Accordingly, the coding efficiency can be improved.

Embodiment 4

To achieve high compression, attribute information included in Point Cloud Compression (PCC) data is transformed in a plurality of methods, such as Lifting, Region Adaptive Hierarchical Transform (RAHT) and other transformation methods. Here, Lifting is one of transformation methods using Level of Detail (LoD).

Important signal information tends to be included in a low frequency component, and therefore the code amount is reduced by quantizing a high frequency component. That is, the transformation process has strong energy compression characteristics. In addition, the precision is reduced by the quantization according to the magnitude of the quantization parameter.

Figure 54:
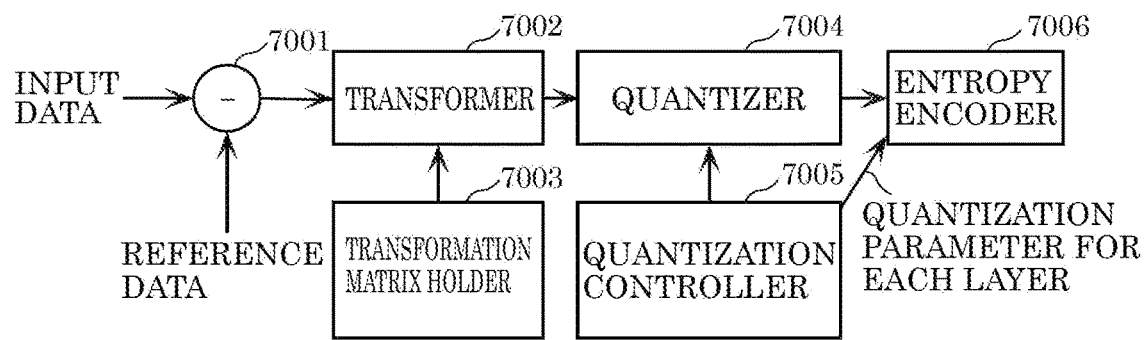
FIG. 54 is a block diagram showing a configuration of a three-dimensional data encoding device according to Embodiment 4.

FIG. 54 is a block diagram showing a configuration of a three-dimensional data encoding device according to this embodiment. The three-dimensional data encoding device includes subtractor 7001, transformer 7002, transformation matrix holder 7003, quantizer 7004, quantization controller 7005, and entropy encoder 7006.

Subtractor 7001 calculates a coefficient value that is the difference between input data and reference data. For example, the input data is attribute information included in point cloud data, and the reference data is a predicted value of the attribute information.

Transformer 7002 performs a transformation process on the coefficient value. For example, the transformation process is a process of classifying a plurality of pieces of attribute information into LoDs. Note that the transformation process may be Haar transformation or the like. Transformation matrix holder 7003 holds a transformation matrix used for the transformation process by transformer 7002. For example, the transformation matrix is a Haar transformation matrix. Note that although an example is shown here in which the three-dimensional data encoding device has both a function of performing a transformation process using LoDs and a function of performing a transformation process such as Haar transformation, the three-dimensional data encoding device may have only any one of the functions. Alternatively, the three-dimensional data encoding device may selectively use any of these two kinds of transformation processes. Alternatively, the three-dimensional data encoding device may change the transformation process to be used for each predetermined processing unit.

Quantizer 7004 quantizes the coefficient value to generate a quantized value. Quantization controller 7005 controls a quantization parameter used for the quantization by quantizer 7004. For example, quantization controller 7005 may change the quantization parameter (or quantization step) according to the hierarchical structure for the encoding. In this way, an appropriate quantization parameter can be selected for each layer of the hierarchical structure, so that the amount of codes occurring in each layer can be controlled. Quantization controller 7005 also sets quantization parameters for a certain layer and the layers lower than the certain layer that include a frequency component that has a small effect on the subjective image quality at a maximum value, and sets quantization coefficients for the certain layer and the layers lower than the certain layer at 0, for example. In this way, the occurring code amount can be reduced while reducing the deterioration of the subjective image quality. Quantization controller 7005 can also finely control the subjective image quality and the occurring code amount. The "layer" herein refers to a layer (at a depth in a tree structure) in LoD or RAHT (Haar transformation).

Entropy encoder 7006 entropy-encodes (arithmetically encodes, for example) the quantization coefficient to generate a bitstream. Entropy encoder 7006 also encodes the quantization parameter for each layer set by quantization controller 7005.

Figure 55:
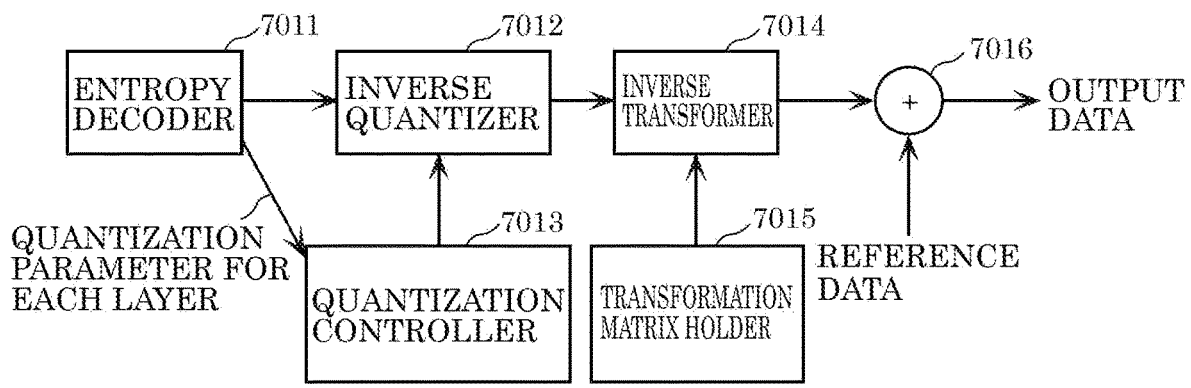
FIG. 55 is a block diagram showing a configuration of a three-dimensional data decoding device according to Embodiment 4.

FIG. 55 is a block diagram showing a configuration of a three-dimensional data decoding device according to this embodiment. The three-dimensional data decoding device includes entropy decoder 7011, inverse quantizer 7012, quantization controller 7013, inverse transformer 7014, transformation matrix holder 7015, and adder 7016.

Entropy decoder 7011 decodes the quantization coefficient and the quantization parameter for each layer from the bitstream. Inverse quantizer 7012 inverse-quantizes the quantization coefficient to generate the coefficient value. Quantization controller 7013 controls the quantization parameter used for the inverse quantization by inverse quantizer 7012 based on the quantization parameter for each layer obtained in entropy decoder 7011.

Inverse transformer 7014 inverse-transforms the coefficient value. For example, inverse transformer 7014 performs inverse Haar transformation on the coefficient value. Transformation matrix holder 7015 holds a transformation matrix used for the inverse transformation process by inverse transformer 7014. For example, the transformation matrix is inverse Haar transformation matrix.

Adder 7016 adds the reference data to the coefficient value to generate output data. For example, the output data is attribute information included in point cloud data, and the reference data is a predicted value of the attribute information.

Next, the setting of a quantization parameter for each layer will be described. In the encoding of attribute information, such as Predicting/Lifting, a different quantization parameter is used for each LoD layer. For example, quantization parameters for lower layers are set to be smaller to increase the precision for the lower layers. In this way, the prediction precision for higher layers can be improved. Quantization parameters for higher layers can be set to be greater, thereby reducing the data amount. In this way, a quantization tree value (Qt) can be separately set for each LoD, according to the use plan of the user. Here, the quantization tree value is the quantization parameter, for example.

Figure 56:
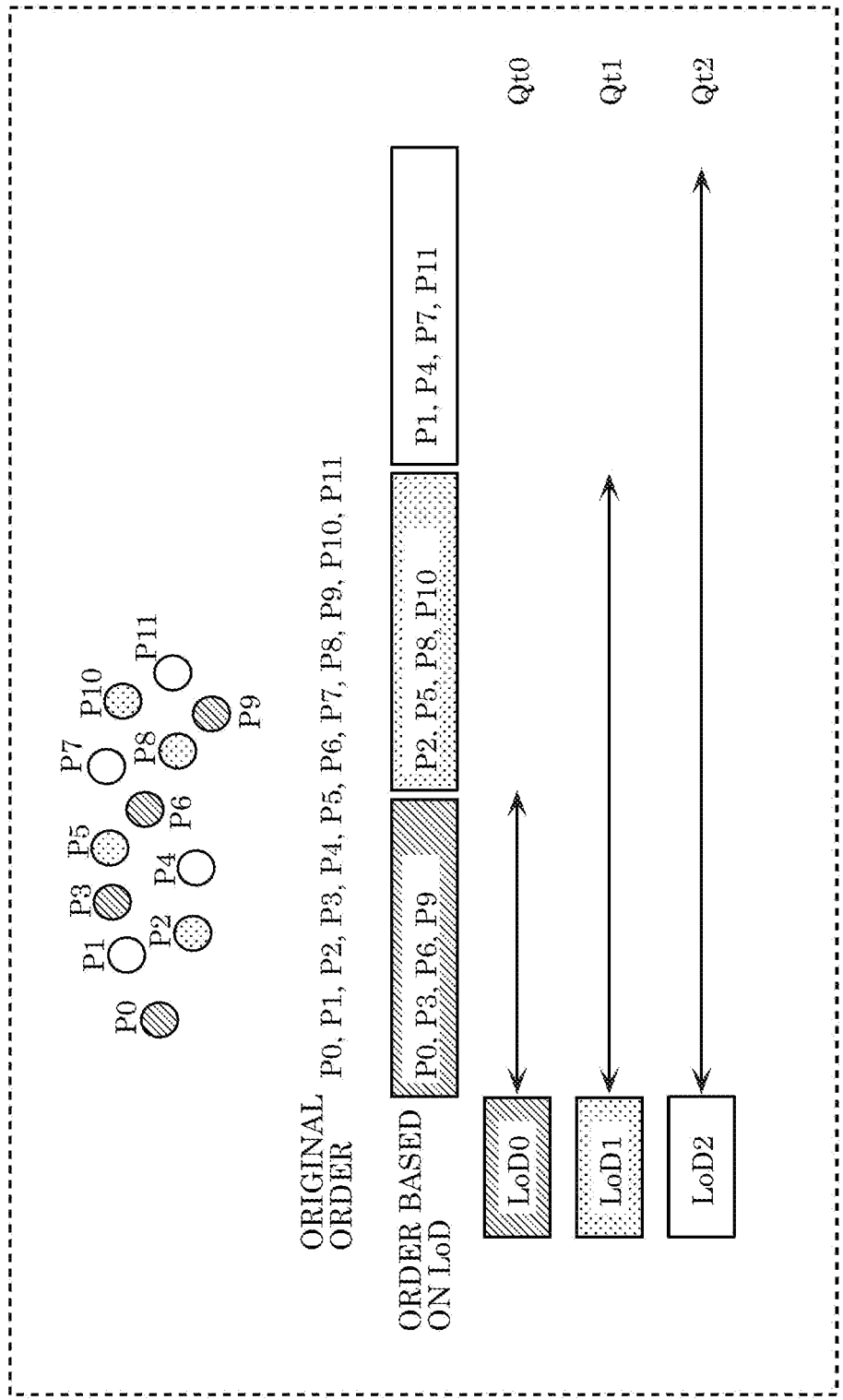
FIG. 56 is a diagram showing an example of the setting of LoDs according to Embodiment 4.

FIG. 56 is a diagram showing an example of the setting of LoDs. As shown in FIG. 56, for example, independent Qt0 to Qt2 are set for LoD0 to LoD2.

In the encoding of the attribute information using RAHT, different quantization parameters are used according to the depth in the tree structure. For example, quantization parameters for lower layers are set to be smaller to increase the precision for the lower layers. In this way, the prediction precision for higher layers can be improved. Quantization parameters for higher layers can be set to be greater, thereby reducing the data amount. In this way, a quantization tree value (Qt) can be separately set for each depth in the tree structure, according to the use plan of the user.

Figure 57:
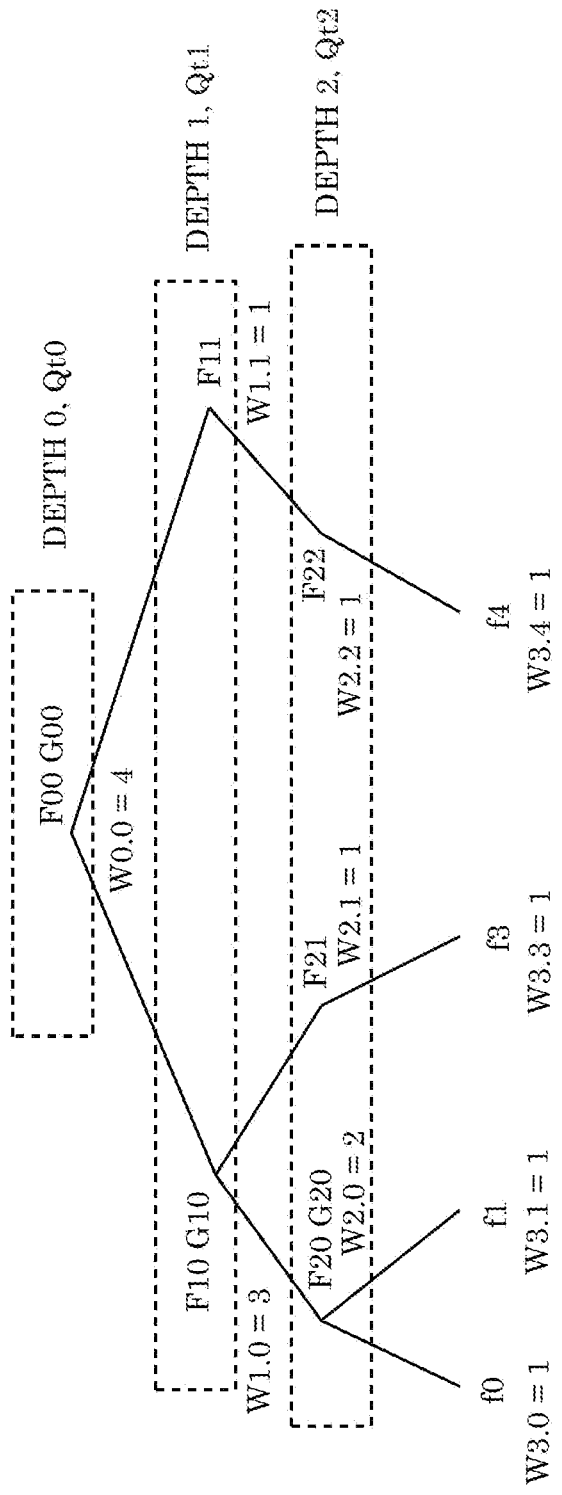
FIG. 57 is a diagram showing an example of a hierarchical structure of RAHT according to Embodiment 4.

FIG. 57 is a diagram showing an example of a hierarchical structure (tree structure) of RAHT. As shown in FIG. 57, for example, independent Qt0 to Qt2 are set for depths in the tree structure.

Figure 58:
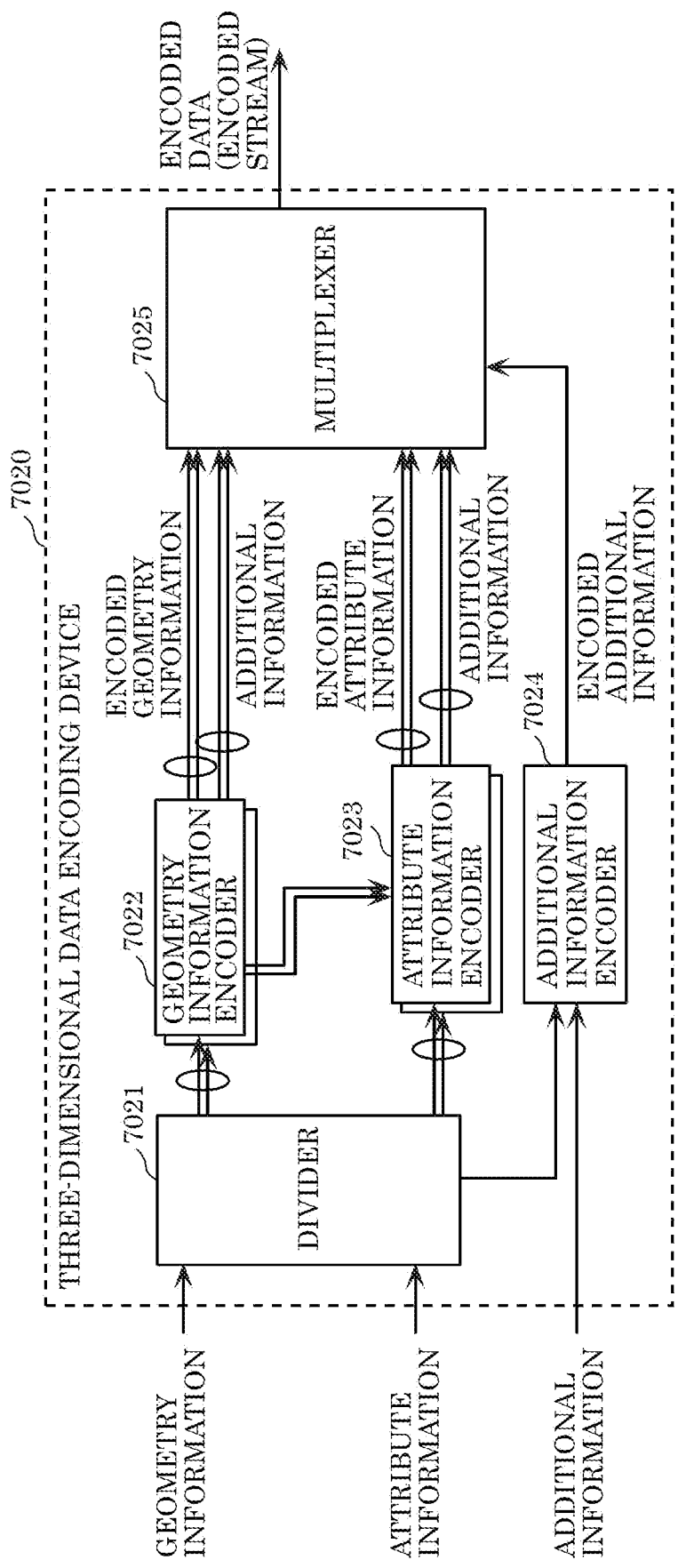
FIG. 58 is a block diagram of a three-dimensional data encoding device according to Embodiment 4.

In the following, a configuration of a three-dimensional data encoding device according to this embodiment will be described. FIG. 58 is a block diagram showing a configuration of three-dimensional data encoding device 7020 according to this embodiment. Three-dimensional data encoding device 7020 encodes point cloud data (point cloud) to generate encoded data (encoded stream). Three-dimensional data encoding device 7020 includes divider 7021, a plurality of geometry information encoders 7022, a plurality of attribute information encoders 7023, additional information encoder 7024, and multiplexer 7025.

Divider 7021 generates a plurality of pieces of divisional data by dividing point cloud data. Specifically, divider 7021 generates a plurality of pieces of divisional data by dividing a space of point cloud data into a plurality of subspaces. Here, a subspace is a combination of tiles or slices or a combination of tiles and slices. More specifically, point cloud data includes geometry information, attribute information (such as color or reflectance), and additional information. Divider 7021 divides geometry information into a plurality of pieces of divisional geometry information, and divides attribute information into a plurality of pieces of divisional attribute information. Divider 7021 also generates additional information concerning the division.

Divider 7021 first divides a point cloud into tiles, for example. Divider 7021 then further divides the resulting tiles into slices.

The plurality of geometry information encoders 7022 generate a plurality of pieces of encoded geometry information by encoding a plurality of pieces of divisional geometry information. For example, geometry information encoders 7022 encode divisional geometry information using an N-ary tree structure, such as an octree. Specifically, in the case of an octree, a current space is divided into eight nodes (subspaces), and 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined layer is reached or the number of the point clouds included in each node becomes equal to or less than a threshold. For example, the plurality of geometry information encoders 7022 process a plurality of pieces of divisional geometry information in parallel.

Attribute information encoder 7023 generates encoded attribute information, which is encoded data, by encoding attribute information using configuration information generated by geometry information encoder 7022. For example, attribute information encoder 7023 determines a reference point (reference node) that is to be referred to in encoding a current point (current node) to be processed based on the octree structure generated by geometry information encoder 7022. For example, attribute information encoder 7023 refers to a node whose parent node in the octree is the same as the parent node of the current node, of peripheral nodes or neighboring nodes. Note that the method of determining a reference relationship is not limited to this method.

The process of encoding geometry information or attribute information may include at least one of a quantization process, a prediction process, and an arithmetic encoding process. In this case, "refer to" means using a reference node for calculation of a predicted value of attribute information or using a state of a reference node (occupancy information that indicates whether a reference node includes a point cloud or not, for example) for determination of a parameter of encoding. For example, the parameter of encoding is a quantization parameter in the quantization process or a context or the like in the arithmetic encoding.

Additional information encoder 7024 generates encoded additional information by encoding the additional information included in the point cloud data and the additional information concerning the data division generated in the division by divider 7021.

Multiplexer 7025 generates encoded stream (encoded stream) by multiplexing the plurality of pieces of encoded geometry information, the plurality of pieces of encoded attribute information, and the encoded additional information, and transmits the generated encoded data. The encoded additional information is used in the decoding.

Figure 59:
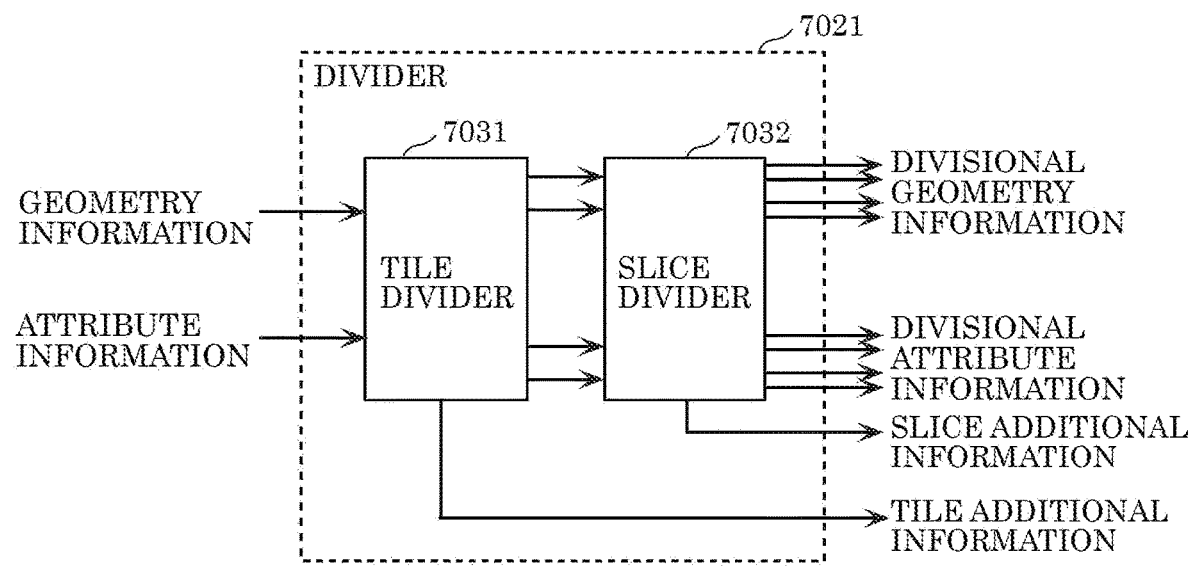
FIG. 59 is a block diagram of a divider according to Embodiment 4.

FIG. 59 is a block diagram of divider 7021. Divider 7021 includes tile divider 7031 and slice divider 7032.

Tile divider 7031 generates a plurality of pieces of tile geometry information by dividing geometry information (position (geometry)) into tiles. Tile divider 7031 generates a plurality of pieces of tile attribute information by dividing attribute information (attribute) into tiles. Tile divider 7031 also outputs tile additional information (Tile MetaData) including information concerning the tile division and information generated in the tile division.

Slice divider 7032 generates a plurality of pieces of divisional geometry information (a plurality of pieces of slice geometry information) by dividing a plurality of pieces of tile geometry information into slices. Slice divider 7032 generates a plurality of pieces of divisional attribute information (a plurality of pieces of slice attribute information) by dividing a plurality of pieces of tile attribute information into slices. Slice divider 7032 also outputs slice additional information (Slice MetaData) including information concerning the slice division and information generated in the slice division.

Tile divider 7031 and slice divider 7032 also determine a quantization tree value (quantization parameter) based on the generated additional information.

Figure 60:
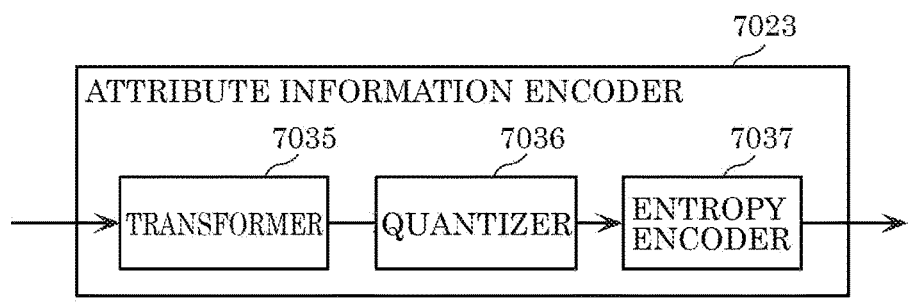
FIG. 60 is a block diagram of an attribute information encoder according to Embodiment 4.

FIG. 60 is a block diagram of attribute information encoder 7023. Attribute information encoder 7023 includes transformer 7035, quantizer 7036, and entropy encoder 7037.

Transformer 7035 classifies the divisional attribute information into layers, such as LoDs, and generates a coefficient value (difference value) by calculating the difference between the divisional attribute information and the predicted value. Note that transformer 7035 may generate the coefficient value by performing the Haar transformation on the divisional attribute information.

Quantizer 7036 generates a quantized value by quantizing the coefficient value. Specifically, quantizer 7036 divides the coefficient by a quantization step based on the quantization parameter. Entropy encoder 7037 generates encoded attribute information by entropy-encoding the quantized value.

Figure 61:
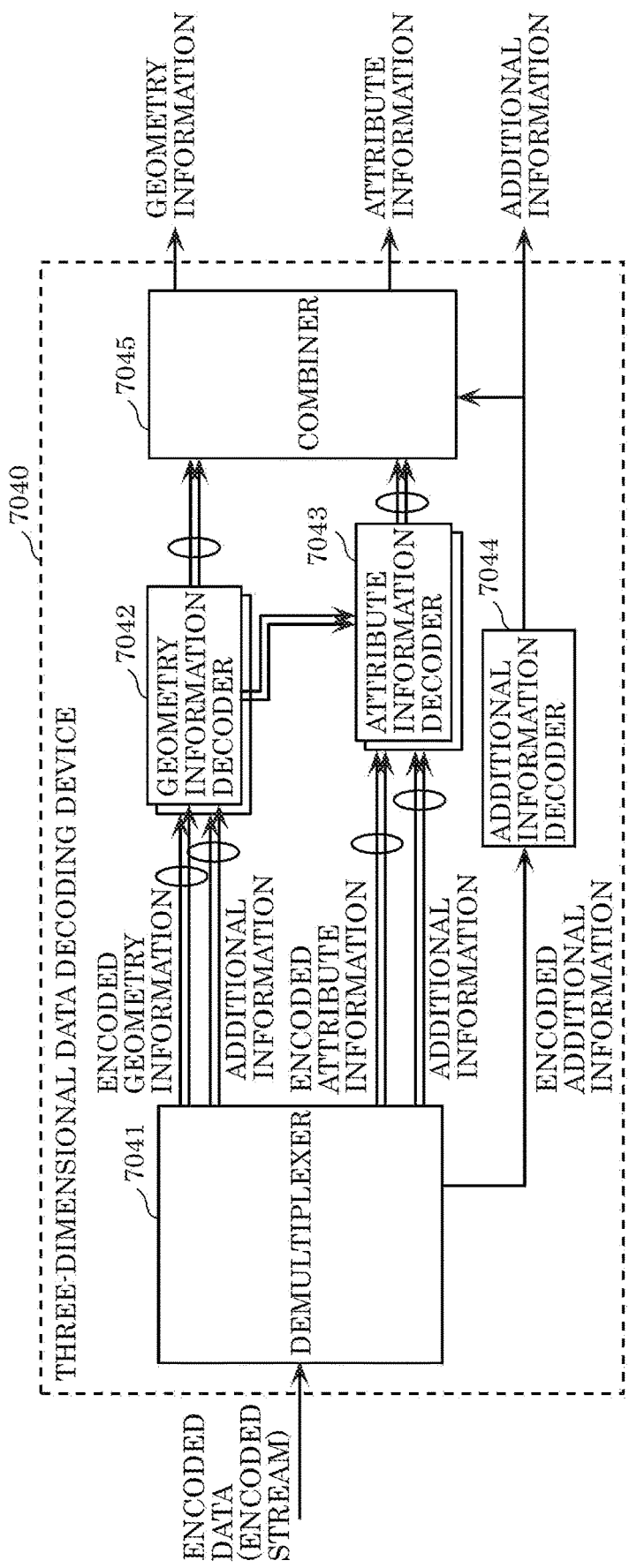
FIG. 61 is a block diagram of a three-dimensional data decoding device according to Embodiment 4.

In the following, a configuration of a three-dimensional data decoding device according to this embodiment will be described. FIG. 61 is a block diagram showing a configuration of three-dimensional data decoding device 7040. Three-dimensional data decoding device 7040 reproduces point cloud data by decoding encoded data (encoded stream) generated by encoding the point cloud data. Three-dimensional data decoding device 7040 includes demultiplexer 7041, a plurality of geometry information decoders 7042, a plurality of attribute information decoders 7043, additional information decoder 7044, and combiner 7045.

Demultiplexer 7041 generates a plurality of pieces of encoded geometry information, a plurality of pieces of encoded attribute information, and encoded additional information by demultiplexing encoded data (encoded stream).

The plurality of geometry information decoders 7042 generates a plurality of pieces of divisional geometry information by decoding a plurality of pieces of encoded geometry information. For example, the plurality of geometry information decoders 7042 process a plurality of pieces of encoded geometry information in parallel.

The plurality of attribute information decoders 7043 generate a plurality of pieces of divisional attribute information by decoding a plurality of pieces of encoded attribute information. For example, the plurality of attribute information decoders 7043 process a plurality of pieces of encoded attribute information in parallel.

A plurality of additional information decoders 7044 generate additional information by decoding encoded additional information.

Combiner 7045 generates geometry information by combining a plurality of pieces of divisional geometry information using additional information. Combiner 7045 generates attribute information by combining a plurality of pieces of divisional attribute information using additional information.

Figure 62:
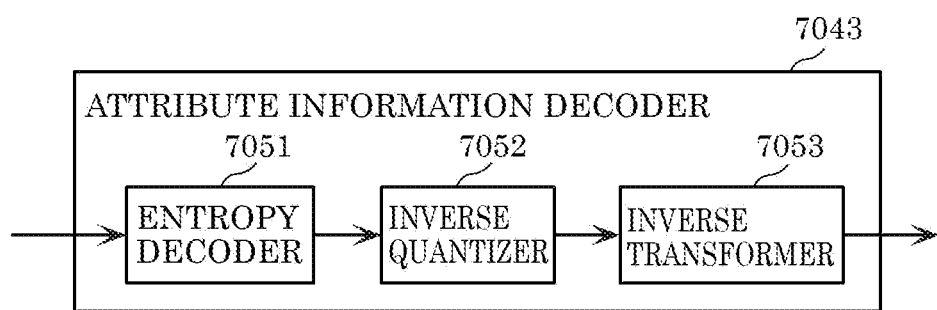
FIG. 62 is a block diagram of an attribute information decoder according to Embodiment 4.

FIG. 62 is a block diagram of attribute information decoder 7043. Attribute information decoder 7043 includes entropy decoder 7051, inverse quantizer 7052, and inverse transformer 7053. Entropy decoder 7051 generates a quantized value by entropy-decoding encoded attribute information. Inverse quantizer 7052 generates a coefficient value by inverse-quantizing the quantized value. Specifically, inverse quantizer 7052 multiplies the coefficient value by a quantization step based on the quantization tree value (quantization parameter) obtained from the bitstream. Inverse transformer 7053 generates divisional attribute information by inverse-transforming the coefficient value. Here, the inverse transformation is a process of adding the predicted value to the coefficient value, for example. Alternatively, the inverse transformation is the inverse Haar transformation.

Figure 63:
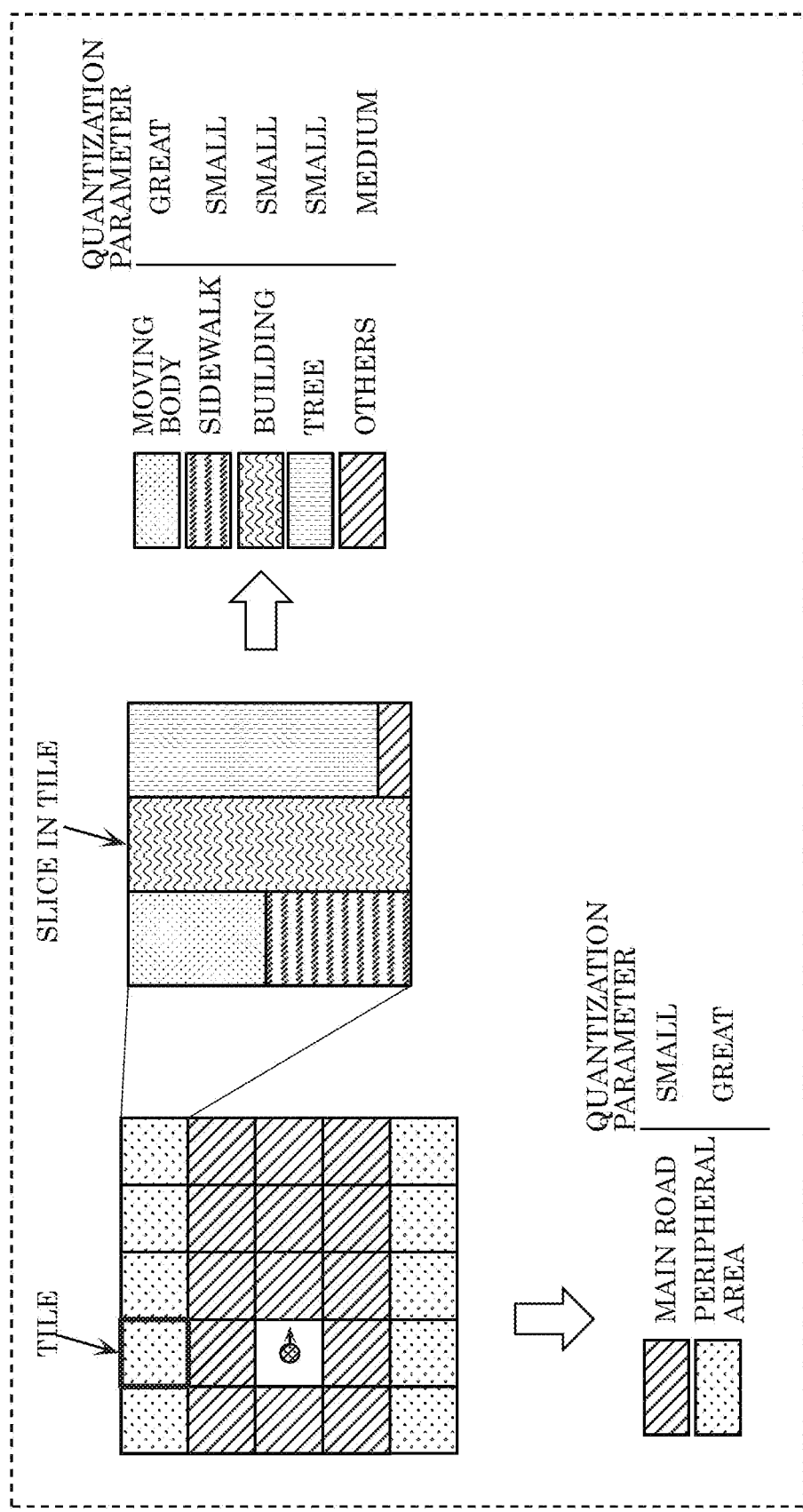
FIG. 63 is a diagram showing an example of the setting of a quantization parameter in the tile division and the slice division according to Embodiment 4.

In the following, an example of a method of determining a quantization parameter will be described. FIG. 63 is a diagram showing an example of the setting of a quantization parameter in the tile division and the slice division.

When the value of the quantization parameter is small, the original information is likely to be maintained. For example, a default value of the quantization parameter is 1. For example, in the encoding process using tiles of PCC data, a quantization parameter for a tile of a main road is set to be a small value, in order to maintain the data quality. On the other hand, a quantization parameter for a tile of a peripheral area is set to be a great value. In this way, the coding efficiency can be improved, while the data quality of the peripheral area decreases.

Similarly, in the encoding process using slices of PCC data, a sidewalk, a tree, and a building are important in the self-position estimation and mapping, and a quantization parameter for a slice of a sidewalk, a tree, or a building is set to be a small value. On the other hand, a moving body or other objects is less important, so that a quantization parameter for a slice of a moving body or other objects is set to be a great value.

When ΔQP (DeltaQP) described later is used, in the encoding of a three-dimensional point belonging to an important area, such as a main road, the three-dimensional data encoding device may perform the encoding by setting the value of ΔQP to be a negative value to reduce the quantization error, in order to decrease the quantization parameter. In this way, the decoded attribute value of the three-dimensional point belonging to the important area can be brought close to the value before the encoding. In the encoding of a three-dimensional point belonging to an area that is not important, such as a peripheral area, the three-dimensional data encoding device may set the value of ΔQP to be a positive value to reduce the information amount, in order to increase the quantization parameter. In this way, the total code amount can be reduced, while maintaining the amount of information on the important area.

In the following, an example of information that indicates a quantization parameter for each layer will be described. In encoding attribute information on a three-dimensional point by quantization, a scheme for controlling quantization parameters on a finer unit basis is introduced in addition to quantization parameter QPbase for a frame, a slice, a tile, or the like. For example, when encoding attribute information using LoDs, the three-dimensional data encoding device perform the encoding by changing the value of the quantization parameter for each LoD by providing Delta_Layer for each LoD and adding Delta_Layer to the value of QPbase for each LoD. The three-dimensional data encoding device also adds Delta_Layer used for the encoding to a header or the like of the bitstream. In this way, the three-dimensional data encoding device can encode attribute information on a three-dimensional point by changing the quantization parameter for each LoD according to a desired code amount and an actual code amount, for example, and therefore can finally generate a bitstream having a code amount close to the desired code amount. The three-dimensional data decoding device can properly decode the bitstream by decoding QPbase and Delta_Layer included in the header to generate the quantization parameters used by the three-dimensional data encoding device.

Figure 64:
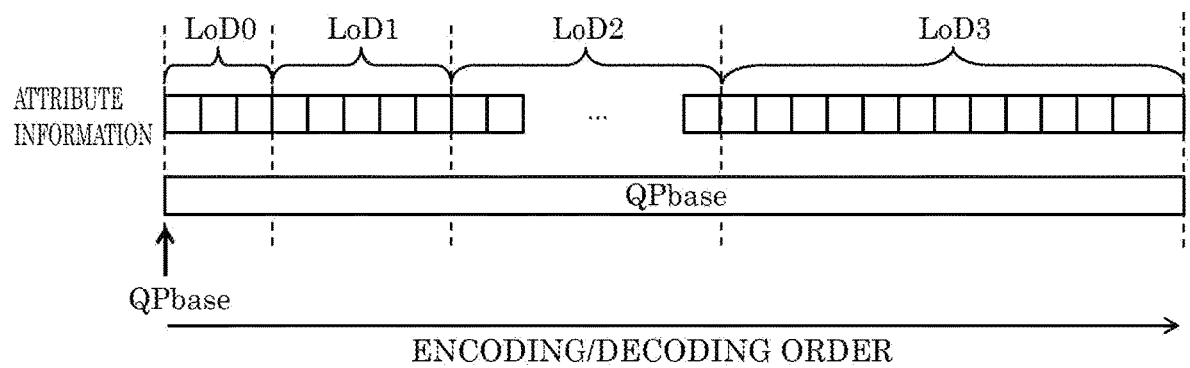
FIG. 64 is a diagram showing an example of the setting of a quantization parameter according to Embodiment 4.
Figure 65:
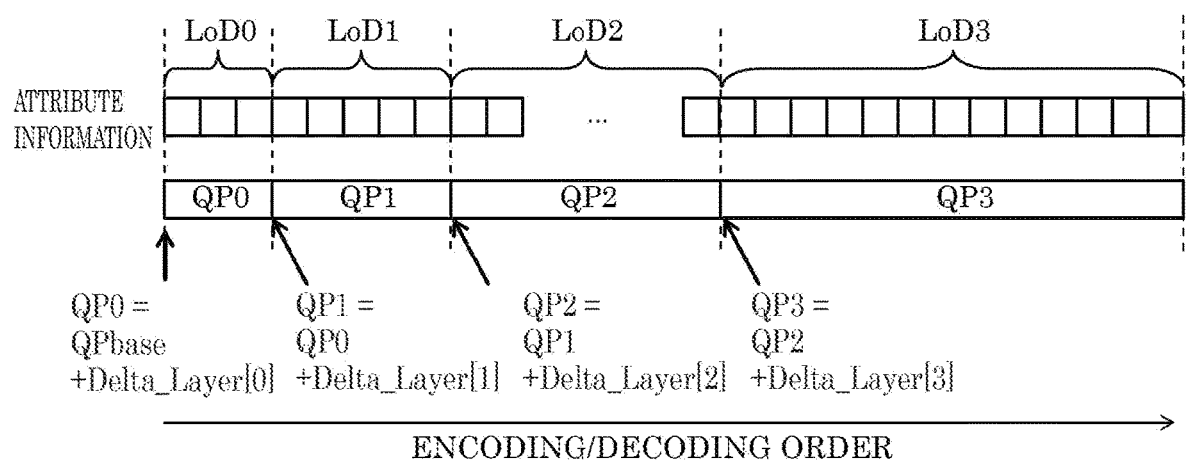
FIG. 65 is a diagram showing an example of the setting of a quantization parameter according to Embodiment 4.

FIG. 64 is a diagram showing an example in which attribute information on all three-dimensional points are encoded using quantization parameter QPbase. FIG. 65 is a diagram showing an example in which encoding is performed by changing the quantization parameter for each LoD layer. In the example shown in FIG. 65, the quantization parameter for the leading LoD is calculated by adding Delta_Layer of the leading LoD to QPbase. For the second and following LoDs, the quantization parameter for the LoD being processed is calculated by adding Delta_Layer of the LoD being processed to the quantization parameter for the immediately preceding LoD. For example, quantization parameter QP3 of at the head of LoD3 is calculated according to QP3=QP2+Delta_Layer[3].

Note that Delta_Layer[i] for each LoD may indicate the difference value with respect to QPbase. That is, quantization parameter QPi of i-th LoDi is indicated by QPi=QPbase+Delta_Layer[i]. For example, QP1=QPbase+Delta_Layer[1], and QP2=QPbase+Delta_Layer[2].

FIG. 66 is a diagram showing a syntax example of an attribute information header (attribute header information). Here, the attribute information header is a header on a frame, slice or tile basis, for example, and is a header of attribute information. As shown in FIG. 66, the attribute information header includes QPbase (reference quantization parameter), NumLayer (number of layers), and Delta_Layer[i] (differential quantization parameter).

QPbase indicates the value of a reference quantization parameter for a frame, a slice, a tile, or the like. NumLayer indicates the number of layers of LoD or RAHT. In other words, NumLayer indicates the number of all Delta_Layer[i] included in the attribute information header.

Delta_Layer[i] indicates the value of ΔQP for layer i. Here, ΔQP is a value obtained by subtracting the quantization parameter for layer i from the quantization parameter for layer i−1. Note that ΔQP may be a value obtained by subtracting the quantization parameter for layer i from QPbase. ΔQP can assume a positive or negative value. Note that Delta_Layer[0] need not be added to the header. In that case, the quantization parameter for layer 0 is equal to QPbase. In this way, the code amount of the header can be reduced.

FIG. 67 is a diagram showing another syntax example of an attribute information header (attribute header information). The attribute information header shown in FIG. 67 differs from the attribute information header shown in FIG. 66 in that the attribute information header further includes delta_Layer-present_flag.

delta_Layer_present_flag is a flag that indicates whether Delta_Layer is included in the bitstream or not. For example, a value of 1 indicates that Delta_Layer is included in the bitstream, and a value of 0 indicates that Delta_Layer is not included in the bitstream. When delta_Layer_present_flag is 0, the three-dimensional data decoding device performs the following decoding process by setting Delta_Layer to be 0, for example.

Note that although examples have been described here in which the quantization parameter is indicated by QPbase and Delta_Layer, a quantization step may be indicated by QPbase and Delta_Layer. The quantization step is calculated from the quantization parameter using an equation, a table or the like determined in advance. In the quantization process, the three-dimensional data encoding device divides the coefficient value by the quantization step. In the inverse quantization process, the three-dimensional data decoding device reproduces the coefficient value by multiplying the quantized value by the quantization step.

Figure 68:
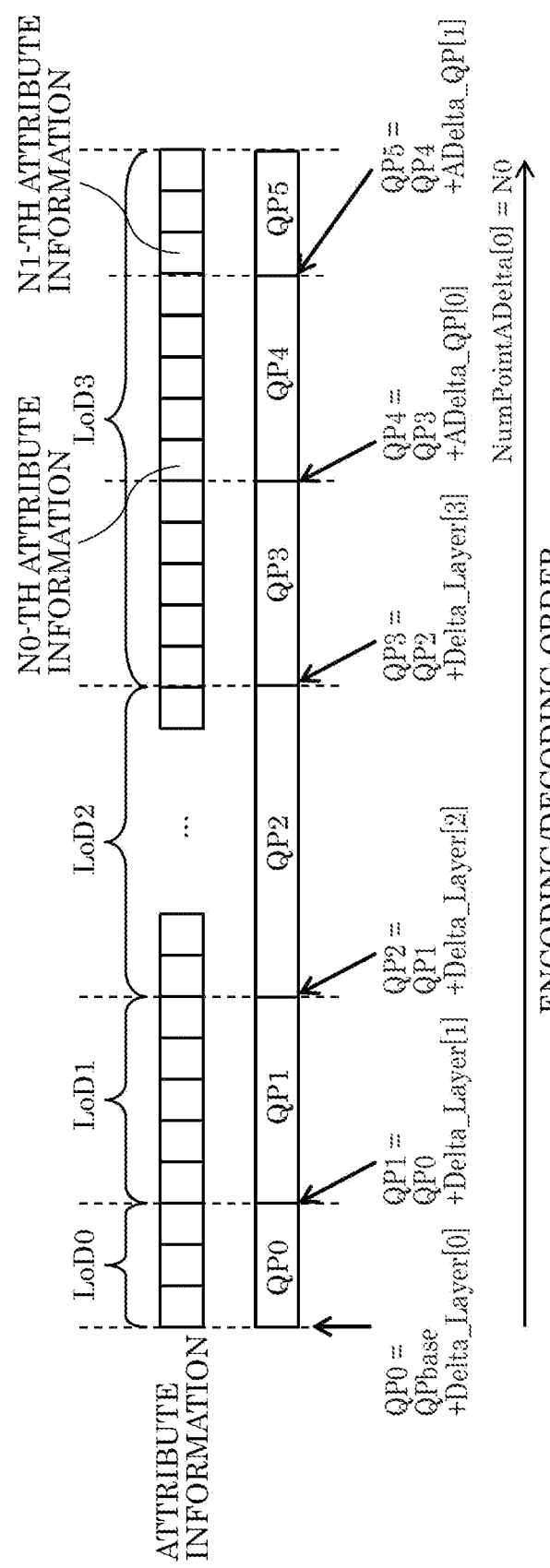
FIG. 68 is a diagram showing an example of the setting of a quantization parameter according to Embodiment 4.

Next, an example in which the quantization parameters are controlled on a finer unit basis will be described. FIG. 68 is a diagram showing an example in which the quantization parameters are controlled on a basis of a unit finer than LoD.

For example, when encoding attribute information using LoD, the three-dimensional data encoding device defines ADelta_QP and NumPointADelta, which represents the geometry information on a three-dimensional point to which ADelta_QP is to be added, in addition to Delta_Layer for each LoD layer. The three-dimensional data encoding device performs the encoding by changing the value of the quantization parameter based on Delta_Layer, ADelta_QP, and NumPointADelta.

The three-dimensional data encoding device may add ADelta and NumPointADelta used for the encoding to the header or the like of the bitstream. This allows the three-dimensional data encoding device to encode attribute information on a plurality of three-dimensional points by changing the quantization parameter for each three-dimensional point according to the desired code amount and the actual code amount, for example. In this way, the three-dimensional data encoding device can finally generate a bitstream having a code amount close to the desired code amount. The three-dimensional data decoding device can properly decode the bitstream by decoding QPbase, Delta_Layer, and ADelta included in the header to generate the quantization parameters used by the three-dimensional data encoding device.

For example, as shown in FIG. 68, quantized value QP4 of N0-th attribute information is calculated according to QP4=QP3+ADelta_QP[0].

An encoding/decoding order reverse to the encoding/decoding order shown in FIG. 68 can also be used. For example, encoding/decoding can also be performed in the order of LoD3, LoD2, LoD1, and then LoD0.

FIG. 69 is a diagram showing a syntax example of an attribute information header (attribute header information) in the case where the example shown in FIG. 68 is used. The attribute information header shown in FIG. 69 differs from the attribute information header shown in FIG. 66 in that the attribute information header further includes NumADelta, NumPointADelta[i], and ADelta_QP[i].

NumADelta indicates the number of all ADelta_QP included in the bitstream. NumPointADelta[i] indicates an identification number of three-dimensional point A to which ADelta_QP[i] is applied. For example, NumPointADelta[i] indicates the number of the three-dimensional points from the leading three-dimensional point to three-dimensional point A in the encoding/decoding order. NumPointADelta[i] may also indicates the number of the three-dimensional points from the first three-dimensional point to three-dimensional point A in the LoD to which three-dimensional point A belongs.

Alternatively, NumPointADelta[i] may indicate the difference value between the identification number of the three-dimensional point indicated by NumPointADelta[i−1] and the identification number of three-dimensional point A. In this way, the value of NumPointADelta[i] can be reduced, so that the code amount can be reduced.

ADelta_QP[i] indicates the value of ΔQP of the three-dimensional point indicated by NumPointADelta[i]. That is, ADelta_QP[i] indicates the difference between the quantization parameter of the three-dimensional point indicated by NumPointADelta[i] and the quantization parameter of the three-dimensional point immediately preceding that three-dimensional point.

FIG. 70 is a diagram showing another syntax example of an attribute information header (attribute header information) in the case where the example shown in FIG. 68 is used. The attribute information header shown in FIG. 70 differs from the attribute information header shown in FIG. 69 in that the attribute information header further includes delta_Layer_present_flag and additional_delta_QP_present_ flag and includes NumADelta_minus1 instead of NumADelta.

delta_Layer_present_flag is the same as that already described with reference to FIG. 67.

additional_delta_QP_present_flag is a flag that indicates whether ADelta_QP is included in the bitstream or not. For example, a value of 1 indicates that ADelta_QP is included in the bitstream, and a value of 0 indicates that ADelta_QP is not included in the bitstream. When additional_delta_QP_ present_flag is 0, the three-dimensional data decoding device performs the following decoding process by setting ADelta_QP to be 0, for example.

NumADelta_minus1 indicates the number of all ADelta_QP included in the bitstream minus 1. In this way, by adding the value obtained by subtracting 1 from the number of ADelta_QP to the header, the code amount of the header can be reduced. For example, the three-dimensional data decoding device calculates NumADelta=NumADelta_minus1+1. ADelta_QP[i] indicates the value of i-th ADelta_QP. Note that ADelta_QP[i] can be set to be not only a positive value but also a negative value.

FIG. 71 is a flowchart of a three-dimensional data encoding process according to this embodiment. First, the three-dimensional data encoding device encodes geometry information (geometry) (S7001). For example, the three-dimensional data encoding device performs the encoding using an octree representation.

The three-dimensional data encoding device then transforms attribute information (S7002). For example, after the encoding of the geometry information, if the position of a three-dimensional point is changed because of quantization or the like, the three-dimensional data encoding device reassigns the attribute information on the original three-dimensional point to the three-dimensional point changed in position. Note that the three-dimensional data encoding device may perform the reassignment by interpolation of values of the attribute information according to the amount of change in position. For example, the three-dimensional data encoding device detects N three-dimensional points yet to be changed in position close to the three-dimensional position of the three-dimensional point changed in position, takes a weighted average of the values of the attribute information on the N three-dimensional points based on the distance between the three-dimensional positions of the three-dimensional point changed in position and each of the N three-dimensional points, and determines the resulting value as the value of the attribute information on the three-dimensional point changed in position. If the three-dimensional positions of two or more three-dimensional points are changed to the same three-dimensional position because of quantization or the like, the three-dimensional data encoding device may assign an average value of the attribute information on the two or more three-dimensional points yet to be changed in position as the value of the attribute information on the three-dimensional points changed in position.

The three-dimensional data encoding device then encodes the attribute information (S7003). When the three-dimensional data encoding device encodes a plurality of pieces of attribute information, for example, the three-dimensional data encoding device may sequentially encode the plurality of pieces of attribute information. For example, when the three-dimensional data encoding device encodes color and reflectance as attribute information, the three-dimensional data encoding device generates a bitstream including the result of encoding of color followed by the result of encoding of reflectance. Note that the plurality of results of encoding of attribute information can be included in the bitstream in any order.

The three-dimensional data encoding device may add information indicating a starting point of the encoded data of each attribute information in the bitstream to the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data encoding device may encode a plurality of pieces of attribute information in parallel, and integrate the results of the encoding into one bitstream. In this way, the three-dimensional data encoding device can encode a plurality of pieces of attribute information at a high speed.

Figure 72:
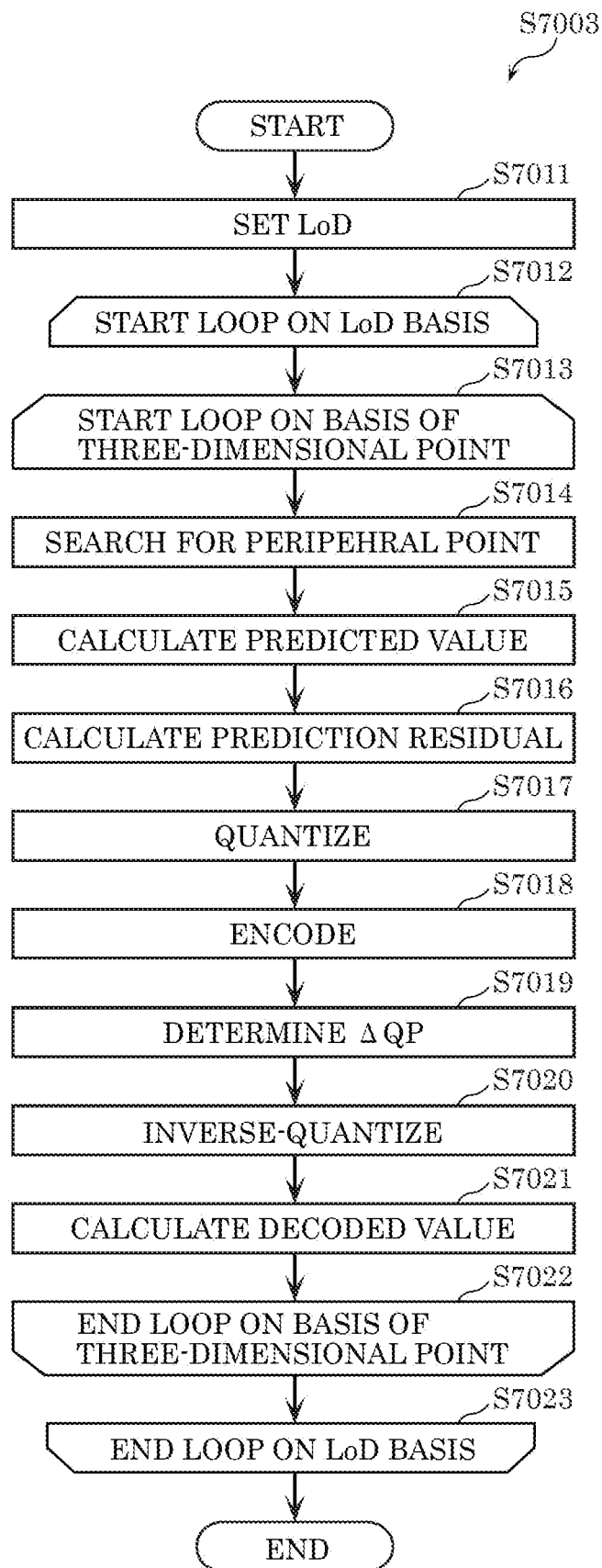
FIG. 72 is a flowchart of an attribute information encoding process according to Embodiment 4.

FIG. 72 is a flowchart of the attribute information encoding process (S7003). First, the three-dimensional data encoding device sets an LoD (S7011). That is, the three-dimensional data encoding device assigns each three-dimensional point to any of a plurality of LoDs.

The three-dimensional data encoding device then starts a loop on an LoD basis (S7012). That is, the three-dimensional data encoding device repeatedly performs the process from step S7013 to step S7021 for each LoD.

The three-dimensional data encoding device then starts a loop on a basis of a three-dimensional point (S7013). That is, the three-dimensional data encoding device repeatedly performs the process from step S7014 to step S7020 for each three-dimensional point.

First, the three-dimensional data encoding device searches for a plurality of peripheral points, which are three-dimensional points present in the periphery of the current three-dimensional point, that are to be used for calculation of a predicted value of the current three-dimensional point to be processed (S7014). The three-dimensional data encoding device then calculates a weighted average of values of the attribute information on the plurality of peripheral points, and sets the obtained value as predicted value P (S7015). The three-dimensional data encoding device then calculates a prediction residual, which is the difference between the attribute information and the predicted value of the current three-dimensional point (S7016). The three-dimensional data encoding device then calculates a quantized value by quantizing the prediction residual (S7017). The three-dimensional data encoding device then arithmetically encodes the quantized value (S7018). The three-dimensional data encoding device then determines ΔQP (S7019). ΔQP determined here is used for determining a quantization parameter used for quantization of a subsequent prediction residual.

The three-dimensional data encoding device then calculates an inverse-quantized value by inverse-quantizing the quantized value (S7020). The three-dimensional data encoding device then generates a decoded value by adding the predicted value to the inverse-quantized value (S7021). The three-dimensional data encoding device then ends the loop on a basis of a three-dimensional point (S7022). The three-dimensional data encoding device also ends the loop on a LoD basis (S7023).

Figure 73:
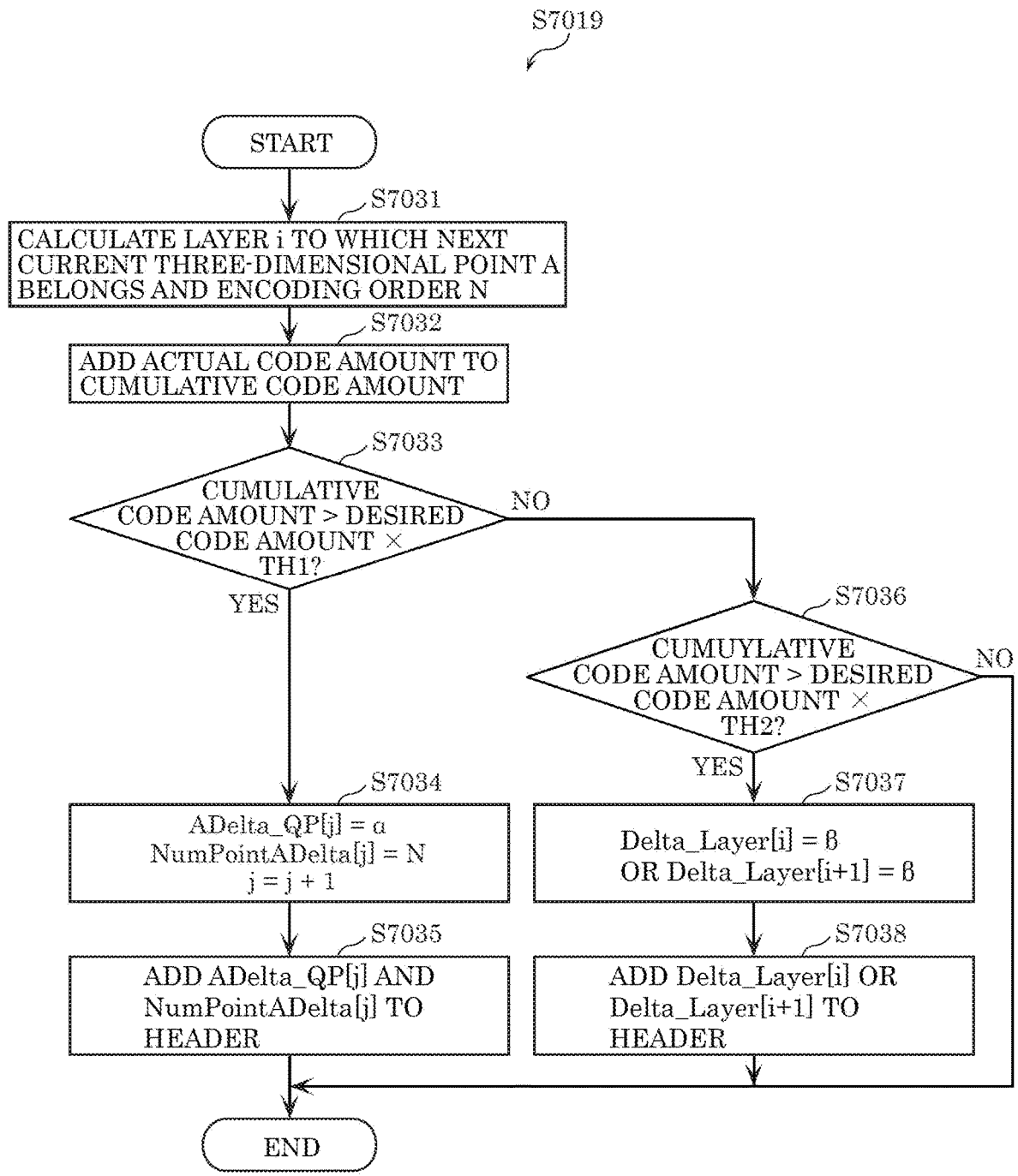
FIG. 73 is a flowchart of a ΔQP determination process according to Embodiment 4.

FIG. 73 is a flowchart of the ΔQP determination process (S7019). First, the three-dimensional data encoding device calculates layer i to which current three-dimensional point A to be encoded next belongs and encoding order N (S7031). Layer i indicates a LoD layer or a RAHT layer, for example.

The three-dimensional data encoding device then adds the actual code amount to a cumulative code amount (S7032). Here, the cumulative code amount refers to a cumulative code amount for one frame, one slice, or one tile of the current three-dimensional point. Note that the cumulative code amount may refer to a cumulative code amount for a plurality of frames, a plurality of slices, or a plurality of tiles. Alternatively, a cumulative code amount of attribute information may be used, or a cumulative code amount of both geometry information and attribute information may be used.

The three-dimensional data encoding device then determines whether the cumulative code amount is greater than the desired code amount×TH1 or not (S7033). Here, the desired code amount refers to a desired code amount for one frame, one slice, or one tile of the current three-dimensional point. Note that the desired code amount may refer to a desired code amount for a plurality of frames, a plurality of slices, or a plurality of tiles. Alternatively, a desired code amount of attribute information may be used, or a desired code amount of both geometry information and attribute information may be used.

When the cumulative code amount is equal to or smaller than the desired code amount×TH1 (if No in S7033), the three-dimensional data encoding device determines whether the cumulative code amount is greater than the desired code amount×TH2 or not (S7036).

Here, as thresholds TH1 and TH2, values from 0.0 to 1.0 are set, for example. In addition, TH1>TH2. For example, when the cumulative code amount is greater than the value of the desired code amount×TH1 (if Yes in S7033), the three-dimensional data encoding device determines that the code amount needs to be reduced as early as possible, and sets ADelta_QP to value α in order to increase the quantization parameter for next three-dimensional point N. The three-dimensional data encoding device also sets NumPointADelta to value N, and increment j by 1 (S7034). The three-dimensional data encoding device then adds ADelta_QP=a and NumPointADelta=N to the header (S7035). Note that value α may be a fixed value or a variable value. For example, the three-dimensional data encoding device may determine value α based on the magnitude of the difference between the cumulative code amount and the desired code amount×TH1. For example, the three-dimensional data encoding device sets value α to be greater as the difference between the cumulative code amount and the desired code amount×TH1 increases. In this way, the three-dimensional data encoding device can control the quantization parameter so that the cumulative code amount does not exceed the desired code amount.

When the cumulative code amount is greater than the desired code amount×TH2 (if Yes in S7036), the three-dimensional data encoding device sets Delta_Layer to value β in order to increase the quantization parameter for layer i to which current three-dimensional point A belongs or the subsequent layer i+1 (S7037). For example, the three-dimensional data encoding device sets Delta_Layer[i] of layer i to be value R when current three-dimensional point A is at the top of layer i, and sets Delta_Layer[i+1] of layer i+1 to be value β when current three-dimensional point A is not at the top of layer i.

The three-dimensional data encoding device adds Delta_Layer=0 of layer i or layer i+1 to the header (S7038). Note that value R may be a fixed value or a variable value. For example, the three-dimensional data encoding device may determine value β based on the magnitude of the difference between the cumulative code amount and the desired code amount×TH2. For example, the three-dimensional data encoding device sets value 0 to be greater as the difference between the cumulative code amount and the desired code amount×TH2 increases. In this way, the three-dimensional data encoding device can control the quantization parameter so that the cumulative code amount does not exceed the desired code amount.

If the cumulative code amount exceeds or is about to exceed the desired code amount, the three-dimensional data encoding device may set the value of ADelta_QP or Delta_Layer so that the quantization parameter assumes the maximum value supported by the standard or the like. In this way, the three-dimensional data encoding device can set the quantization coefficient for points subsequent to three-dimensional point A or layers subsequent to layer i to be 0, thereby reducing the increase of the actual code amount and preventing the cumulative code amount from exceeding the desired code amount.

If the cumulative code amount is smaller than the desired code amount×TH3, the three-dimensional data encoding device may decrease the quantization parameter so that the actual code amount increases. For example, the three-dimensional data encoding device may decrease the quantization parameter by setting the value of Delta_Layer or ADelta_QP to be a negative value depending on the difference between the cumulative code amount and the desired code amount. In this way, the three-dimensional data encoding device can generate a bitstream having a code amount close to the desired code amount.

Figure 74:
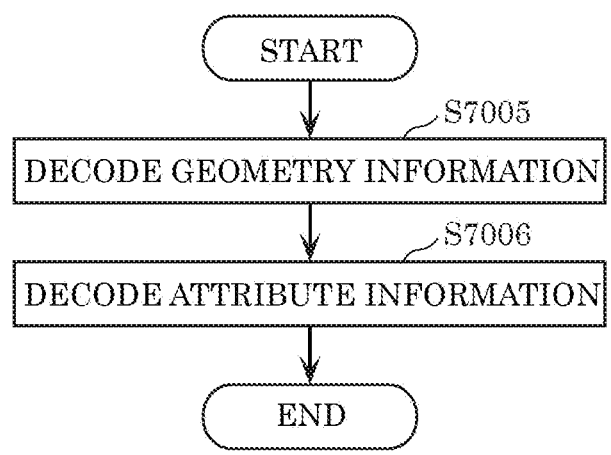
FIG. 74 is a flowchart of a three-dimensional data decoding process according to Embodiment 4.

FIG. 74 is a flowchart of a three-dimensional data decoding process according to this embodiment. First, the three-dimensional data decoding device decodes geometry information (geometry) from the bitstream (S7005). For example, the three-dimensional data decoding device performs the decoding using an octree representation.

The three-dimensional data decoding device then decodes attribute information from the bitstream (S7006). For example, when the three-dimensional data decoding device decodes a plurality of pieces of attribute information, the three-dimensional data decoding device may sequentially decode the plurality of pieces of attribute information. For example, when the three-dimensional data decoding device decodes color and reflectance as attribute information, the three-dimensional data decoding device may decode the result of encoding of color and the result of encoding of reflectance in the order thereof in the bitstream. For example, if the result of encoding of color is followed by the result of encoding of reflectance in the bitstream, the three-dimensional data decoding device first decodes the result of encoding of color and then decodes the result of encoding of reflectance. Note that the three-dimensional data decoding device can decode the result of encoding of attribute information in the bitstream in any order.

The three-dimensional data decoding device may obtain the information indicating the starting point of the encoded data of each piece of attribute information in the bitstream by decoding the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data decoding device may decode a plurality of pieces of attribute information in parallel, and integrate the results of the decoding into one three-dimensional point cloud. In this way, the three-dimensional data decoding device can decode a plurality of pieces of attribute information at a high speed.

Figure 75:
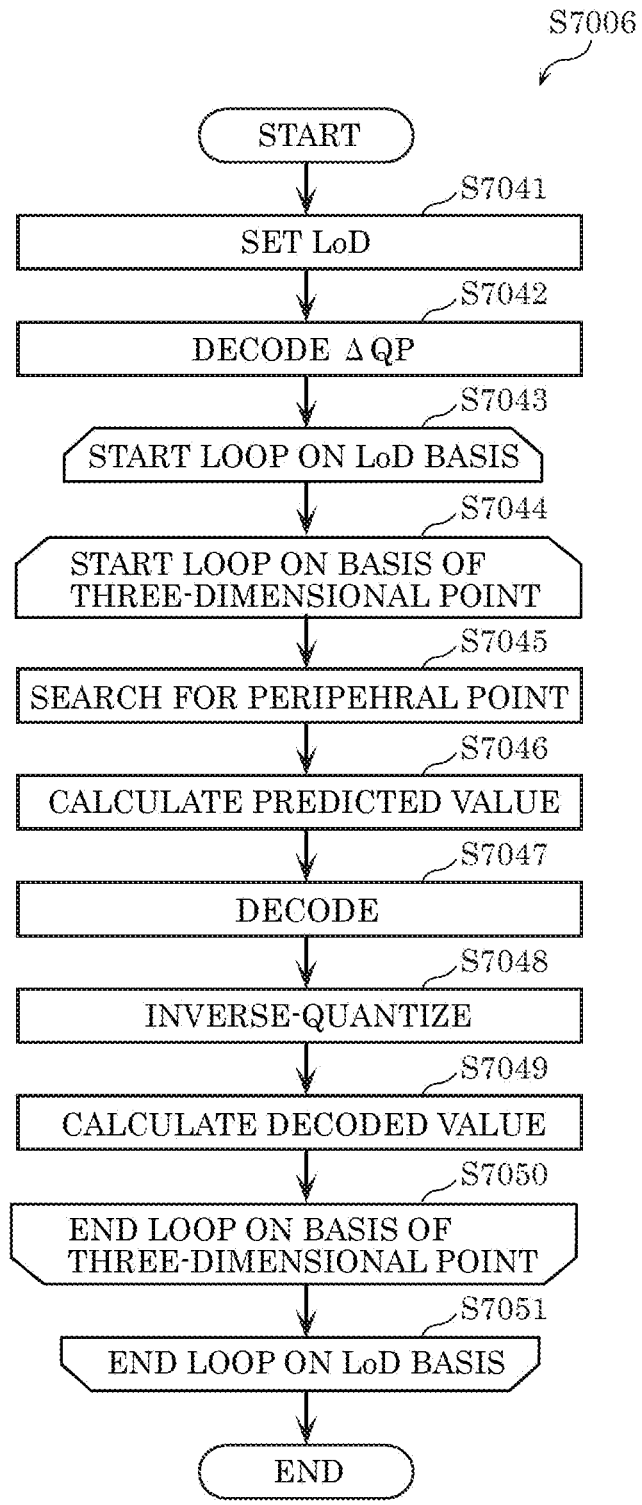
FIG. 75 is a flowchart of an attribute information decoding process according to Embodiment 4.

FIG. 75 is a flowchart of the attribute information decoding process (S7006). First, the three-dimensional data decoding device sets an LoD (S7041). That is, the three-dimensional data decoding device assigns each of a plurality of three-dimensional points having decoded geometry information to any of a plurality of LoDs. For example, the method of the assignment is the same as the method of assignment used in the three-dimensional data encoding device.

The three-dimensional data decoding device then decodes ΔQP from the bitstream (S7042). Specifically, the three-dimensional data decoding device decodes Delta_Layer, ADelta_QP, and NumPointADelta from the header of the bitstream.

The three-dimensional data decoding device then starts a loop on an LoD basis (S7043). That is, the three-dimensional data decoding device repeatedly performs the process from step S7044 to step S7050 for each LoD.

The three-dimensional data decoding device then starts a loop on a basis of a three-dimensional point (S7044). That is, the three-dimensional data decoding device repeatedly performs the process from step S7045 to step S7049 for each three-dimensional point.

First, the three-dimensional data decoding device searches for a plurality of peripheral points, which are three-dimensional points present in the periphery of the current three-dimensional point, that are to be used for calculation of a predicted value of the current three-dimensional point to be processed (S7045). The three-dimensional data decoding device then calculates a weighted average of values of the attribute information on the plurality of peripheral points, and sets the obtained value as predicted value P (S7046). Note that these processings are the same as those in the three-dimensional data encoding device.

The three-dimensional data decoding device then arithmetically decodes the quantized value from the bitstream (S7047). The three-dimensional data decoding device then calculates an inverse-quantized value by inverse-quantizing the decoded quantized value (S7048). In this inverse quantization, a quantization parameter calculated using ΔQP obtained in step S7042 is used.

The three-dimensional data decoding device then generates a decoded value by adding the predicted value to the inverse-quantized value (S7049). The three-dimensional data decoding device then ends the loop on a basis of a three-dimensional point (S7050). The three-dimensional data decoding device also ends the loop on a LoD basis (S7051).

Figure 76:
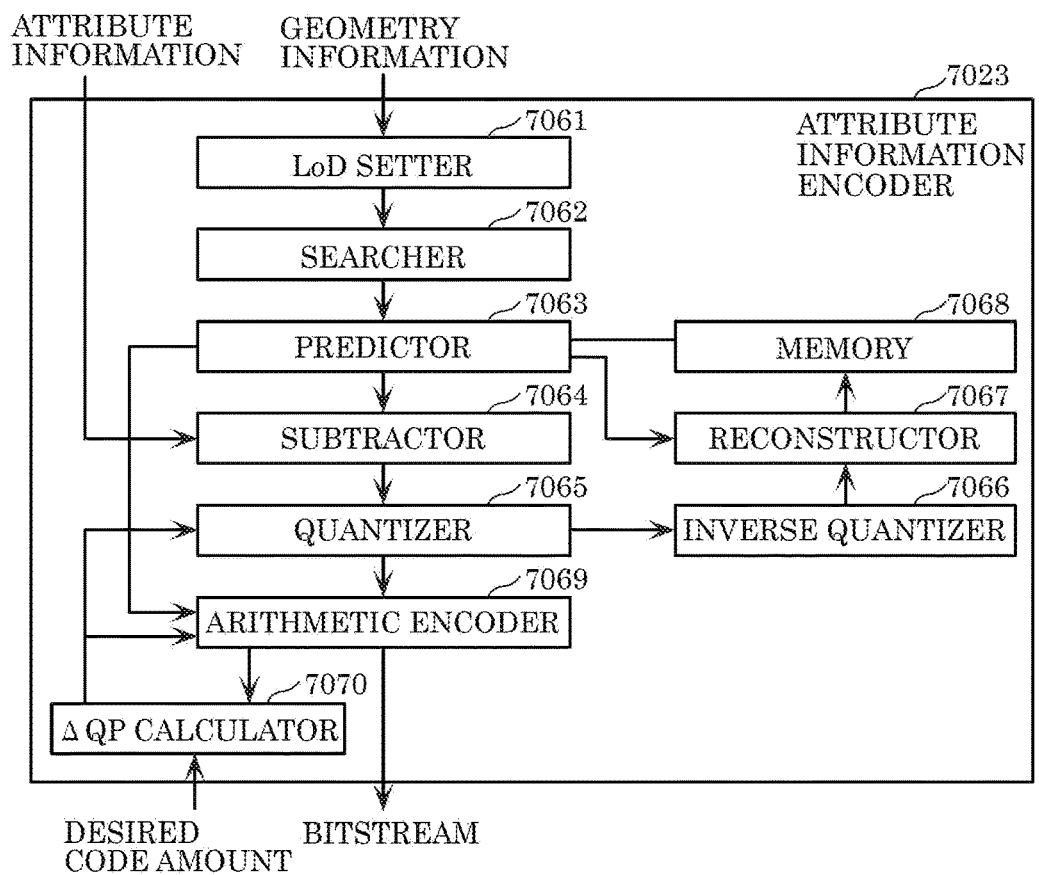
FIG. 76 is a block diagram of an attribute information encoder according to Embodiment 4.

FIG. 76 is a block diagram of attribute information encoder 7023. Attribute information encoder 7023 includes LoD setter 7061, searcher 7062, predictor 7063, subtractor 7064, quantizer 7065, inverse quantizer 7066, reconstructor 7067, memory 7068, and ΔQP calculator 7070.

LoD setter 7061 generates a LoD using geometry information on a three-dimensional point. Searcher 7062 searches for a neighboring three-dimensional point of each three-dimensional point using a LoD generation result and distance information between three-dimensional points. Predictor 7063 generates a predicted value of attribute information of a current three-dimensional point. Predictor 7063 also assigns a predicted value to a plurality of prediction modes 0 to M−1, and selects a prediction mode to be used from the plurality of prediction modes.

Subtractor 7064 generates a prediction residual by subtracting the predicted value from the attribute information. Quantizer 7065 quantizes the prediction residual of the attribute information. Inverse quantizer 7066 inverse-quantizes the quantized prediction residual. Reconstructor 7067 generates a decoded value by summing the predicted value and the inverse-quantized prediction residual. Memory 7068 stores the value (decoded value) of the decoded attribute information on each three-dimensional point. The decoded attribute information on the three-dimensional points stored in memory 7068 is used for prediction of a three-dimensional point yet to be encoded by predictor 7063.

Arithmetic encoder 7069 calculates ZeroCnt from the quantized prediction residual, and arithmetically encodes ZeroCnt. Arithmetic encoder 7069 also arithmetically encodes any quantized prediction residual that is not zero. Arithmetic encoder 7069 may binarize the prediction residual before the arithmetic encoding. Arithmetic encoder 7069 may generate and encode various kinds of head information. Arithmetic encoder 7069 may arithmetically encode prediction mode information (PredMode) that indicates the prediction mode used for the encoding by predictor 7063, and add the information to the bitstream.

ΔQP calculator 7070 determines values of Delta_Layer, ADelta_QP, and NumPointADelta from the actual code amount obtained by arithmetic encoder 7069 and the predetermined desired code amount. The quantization by quantizer 7065 is performed using a quantization parameter based on the determined Delta_Layer, ADelta_QP, and NumPointADelta. Arithmetic encoder 7069 arithmetically encodes Delta_Layer, ADelta_QP, and NumPointADelta and adds these values to the bitstream.

Figure 77:
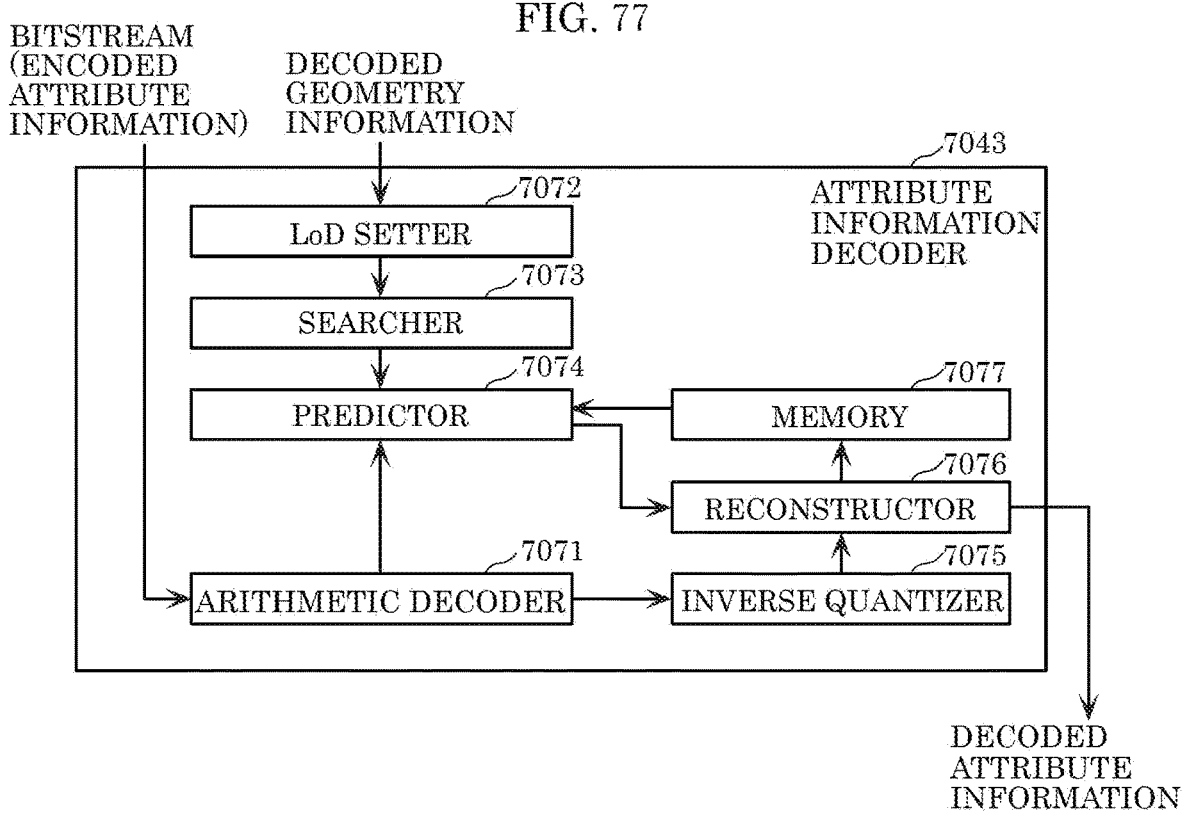
FIG. 77 is a block diagram of an attribute information decoder according to Embodiment 4.

FIG. 77 is a block diagram of attribute information decoder 7043. Attribute information decoder 7043 includes arithmetic decoder 7071, LoD setter 7072, searcher 7073, predictor 7074, inverse quantizer 7075, reconstructor 7076, and memory 7077.

Arithmetic decoder 7071 arithmetically decodes ZeroCnt and the prediction residual included in the bitstream. Arithmetic decoder 7071 also decodes various kinds of header information. Arithmetic decoder 7071 also arithmetically decodes prediction mode information (PredMode) from the bitstream, and outputs the obtained prediction mode information to predictor 7074. Arithmetic decoder 7071 also decodes Delta_Layer, ADelta_QP, and NumPointADelta from the header of the bitstream.

LoD setter 7072 generates a LoD using decoded geometry information on a three-dimensional point. Searcher 7073 searches for a neighboring three-dimensional point of each three-dimensional point using a LoD generation result and distance information between three-dimensional points.

Predictor 7074 generates a predicted value of attribute information of a current three-dimensional point to be decoded. Inverse quantizer 7075 inverse-quantizes the arithmetically decoded prediction residual. Specifically, inverse quantizer 7075 performs inverse quantization using a quantization parameter based on the decoded Delta_Layer, ADelta_QP, and NumPointADelta.

Reconstructor 7076 generates a decoded value by summing the predicted value and the inverse-quantized prediction residual. Memory 7077 stores the value (decoded value) of the decoded attribute information on each three-dimensional point. The decoded attribute information on the three-dimensional points stored in memory 7077 is used for prediction of a three-dimensional point yet to be decoded by predictor 7074.

Figure 78:
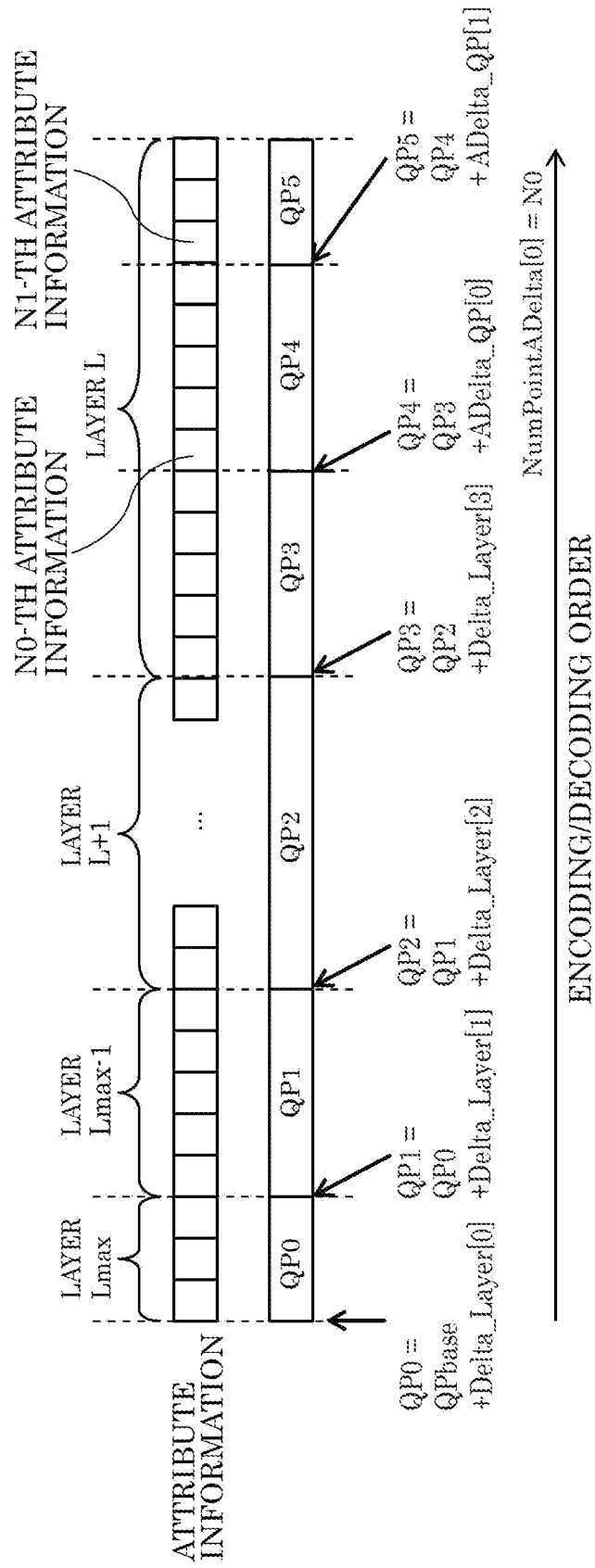
FIG. 78 is a diagram showing an example of the setting of a quantization parameter according to Embodiment 4.

In the following, an example in which RAHT layers are used instead of the LoD layers will be described. FIG. 78 is a diagram showing an example in which the quantization parameters are controlled on a basis of a finer unit when attribute information is encoded using RAHT. For example, when encoding attribute information using RAHT, the three-dimensional data encoding device defines ADelta_QP and NumPointADelta, which represents the geometry information on a three-dimensional point to which ADelta_QP is to be added, in addition to Delta_Layer for each RAHT layer. The three-dimensional data encoding device performs the encoding by changing the value of the quantization parameter based on Delta_Layer, ADelta_QP, and NumPointADelta.

The three-dimensional data encoding device may add ADelta and NumPointADelta used for the encoding to the header or the like of the bitstream. This allows the three-dimensional data encoding device to encode attribute information on three-dimensional points by changing the quantization parameter for each three-dimensional point according to the desired code amount and the actual code amount, for example. In this way, the three-dimensional data encoding device can finally generate a bitstream having a code amount close to the desired code amount. The three-dimensional data decoding device can properly decode the bitstream by decoding QPbase, Delta_Layer, and ADelta included in the header to generate the quantization parameters used by the three-dimensional data encoding device.

For example, quantized value QP4 of N0-th attribute information is calculated according to QP4=QP3+ADelta_QP[0]. Each ADelta_QP[i] may be the difference value with respect to QPbase, like QP4=QPbase+ADelta_QP[0].

FIG. 79 is a diagram showing a syntax example of an attribute information header (attribute header information) in the case where the example shown in FIG. 78 is used. The attribute information header shown in FIG. 79 is basically the same as the attribute information header shown in FIG. 69 but differs in that RAHT layers are used instead of LoD layers.

NumADelta indicates the number of all ADelta_QP included in the bitstream. NumPointADelta[i] indicates an identification number of three-dimensional point A to which ADelta_QP[i] is applied. For example, NumPointADelta[i] indicates the number of the three-dimensional points from the leading three-dimensional point to three-dimensional point A in the encoding/decoding order. NumPointADelta[i] may also indicates the number of the three-dimensional points from the first three-dimensional point to three-dimensional point A in the layer to which three-dimensional point A belongs.

Alternatively, NumPointADelta[i] may indicate the difference value between the identification number of the three-dimensional point indicated by NumPointADelta[i−1] and the identification number of three-dimensional point A. In this way, the value of NumPointADelta[i] can be reduced, so that the code amount can be reduced.

FIG. 80 is a diagram showing another syntax example of an attribute information header (attribute header information) in the case where the example shown in FIG. 78 is used. Note that the attribute information header shown in FIG. 80 is basically the same as the attribute information header shown in FIG. 70 but differs in that RAHT layers are used instead of LoD layers.

additional_delta_QP_present_flag is a flag that indicates whether ADelta_QP is included in the bitstream or not. For example, a value of 1 indicates that ADelta_QP is included in the bitstream, and a value of 0 indicates that ADelta_QP is not included in the bitstream. When additional_delta_QP_present_flag is 0, the three-dimensional data decoding device performs the following decoding process by setting ADelta_QP to be 0, for example.

NumADelta_minus1 indicates the number of all ADelta_QP included in the bitstream minus 1. In this way, by adding the value obtained by subtracting 1 from the number of ADelta_QP to the header, the code amount of the header can be reduced. For example, the three-dimensional data decoding device calculates NumADelta=NumADelta_minus1+1. ADelta_QP[i] indicates the value of i-th ADelta_QP. Note that ADelta_QP[i] can be set to be not only a positive value but also a negative value.

FIG. 81 is a flowchart of a three-dimensional data encoding process in the case where RAHT is used. First, the three-dimensional data encoding device encodes geometry information (geometry) (S7061). For example, the three-dimensional data encoding device performs the encoding using an octree representation.

The three-dimensional data encoding device then transforms attribute information (S7062). For example, after the encoding of the geometry information, if the position of a three-dimensional point is changed because of quantization or the like, the three-dimensional data encoding device reassigns the attribute information on the original three-dimensional point to the three-dimensional point changed in position. Note that the three-dimensional data encoding device may perform the reassignment by interpolation of values of the attribute information according to the amount of change in position. For example, the three-dimensional data encoding device detects N three-dimensional points yet to be changed in position close to the three-dimensional position of the three-dimensional point changed in position, takes a weighted average of the values of the attribute information on the N three-dimensional points based on the distance between the three-dimensional positions of the three-dimensional point changed in position and each of the N three-dimensional points, and determines the resulting value as the value of the attribute information on the three-dimensional point changed in position. If the three-dimensional positions of two or more three-dimensional points are changed to the same three-dimensional position because of quantization or the like, the three-dimensional data encoding device may assign an average value of the attribute information on the two or more three-dimensional points yet to be changed in position as the value of the attribute information on the three-dimensional points changed in position.

The three-dimensional data encoding device then encodes the attribute information (S7063). When the three-dimensional data encoding device encodes a plurality of pieces of attribute information, for example, the three-dimensional data encoding device may sequentially encode the plurality of pieces of attribute information. For example, when the three-dimensional data encoding device encodes color and reflectance as attribute information, the three-dimensional data encoding device generates a bitstream including the result of encoding of color followed by the result of encoding of reflectance. Note that the plurality of results of encoding of attribute information can be included in the bitstream in any order.

The three-dimensional data encoding device may add information indicating a starting point of the encoded data of each attribute information in the bitstream to the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data encoding device may encode a plurality of pieces of attribute information in parallel, and integrate the results of the encoding into one bitstream. In this way, the three-dimensional data encoding device can encode a plurality of pieces of attribute information at a high speed.

Figure 82:
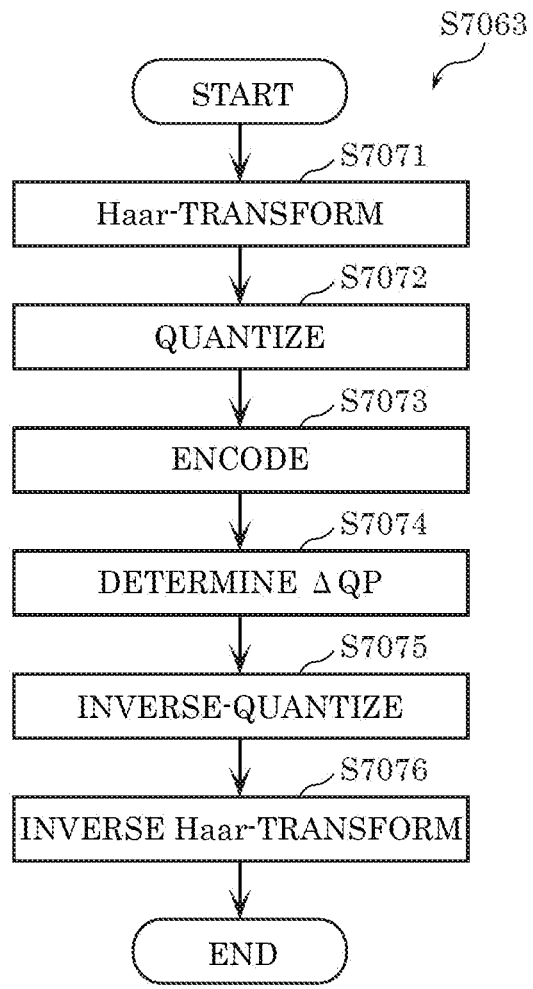
FIG. 82 is a flowchart of an attribute information encoding process according to Embodiment 4.

FIG. 82 is a flowchart of the attribute information encoding process (S7063). First, the three-dimensional data encoding device generates a coding coefficient from attribute information by Haar transformation (S7071).

The three-dimensional data encoding device then applies quantization to the coding coefficient (S7072). The three-dimensional data encoding device then generates encoded attribute information (bitstream) by encoding the quantized coding coefficient (S7073).

The three-dimensional data encoding device then determines ΔQP (S7074). Note that the method of determining ΔQP is the same as step S7019 in the case where LoD layers are used. Determined ΔQP is used for determining a quantization parameter used for quantization of a subsequent coding coefficient.

The three-dimensional data encoding device applies inverse quantization to the quantized coding coefficient (S7075). The three-dimensional data encoding device then decodes the attribute information by applying inverse Haar transformation to the inverse-quantized coding coefficient (S7076). For example, the decoded attribute information is referred to in the subsequent encoding.

Figure 83:
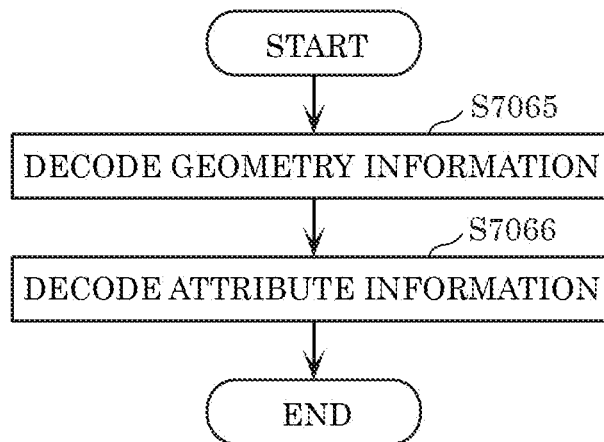
FIG. 83 is a flowchart of a three-dimensional data decoding process according to Embodiment 4.

FIG. 83 is a flowchart of a three-dimensional data decoding process in the case where RAHT is used. First, the three-dimensional data decoding device decodes geometry information (geometry) from the bitstream (S7065). For example, the three-dimensional data decoding device performs the decoding using an octree representation.

The three-dimensional data decoding device then decodes attribute information from the bitstream (S7066). For example, when the three-dimensional data decoding device decodes a plurality of pieces of attribute information, the three-dimensional data decoding device may sequentially decode the plurality of pieces of attribute information. For example, when the three-dimensional data decoding device decodes color and reflectance as attribute information, the three-dimensional data decoding device decodes the result of encoding of color and the result of encoding of reflectance in the order thereof in the bitstream. For example, if the result of encoding of color is followed by the result of encoding of reflectance in the bitstream, the three-dimensional data decoding device first decodes the result of encoding of color and then decodes the result of encoding of reflectance. Note that the three-dimensional data decoding device can decode the result of encoding of attribute information in the bitstream in any order.

The three-dimensional data decoding device may obtain the information indicating the starting point of the encoded data of each piece of attribute information in the bitstream by decoding the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data decoding device may decode a plurality of pieces of attribute information in parallel, and integrate the results of the decoding into one three-dimensional point cloud. In this way, the three-dimensional data decoding device can decode a plurality of pieces of attribute information at a high speed.

Figure 84:
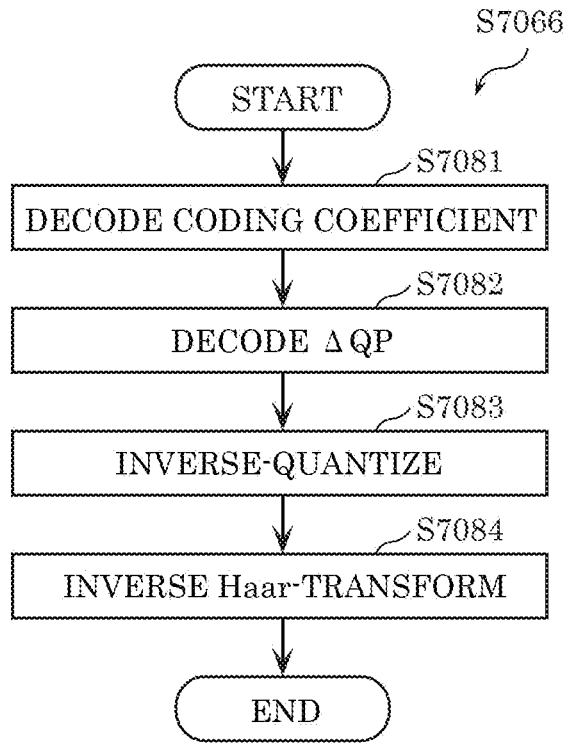
FIG. 84 is a flowchart of an attribute information decoding process according to Embodiment 4.

FIG. 84 is a flowchart of the attribute information decoding process (S7066). First, the three-dimensional data decoding device decodes the coding coefficient from the bitstream (S7081). The three-dimensional data decoding device then decodes ΔQP from the bitstream (S7082). Specifically, the three-dimensional data decoding device decodes Delta_Layer, ADelta_QP, and NumPointADelta from the header of the bitstream.

The three-dimensional data decoding device then applies inverse quantization to the coding coefficient (S7083). In this inverse quantization, a quantization parameter calculated using ΔQP obtained in step S7082 is used. The three-dimensional data decoding device then decodes the attribute information by applying inverse Haar transformation to the inverse-quantized coding coefficient (S7084).

Figure 85:
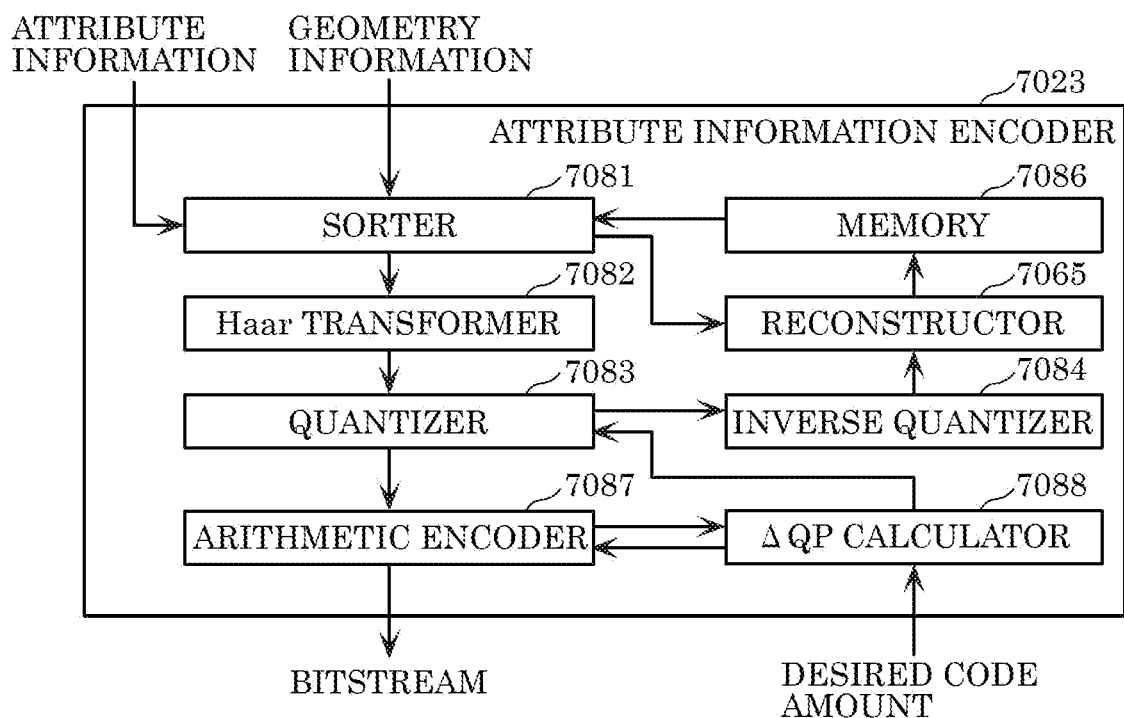
FIG. 85 is a block diagram of an attribute information encoder according to Embodiment 4.

FIG. 85 is a block diagram of attribute information encoder 7023 in the case where RAHT is used. Attribute information encoder 7023 includes sorter 7081, Haar transformer 7082, quantizer 7083, inverse quantizer 7084, inverse Haar transformer 7085, memory 7086, arithmetic encoder 7087, and ΔQP calculator 7088.

Sorter 7081 generates a Morton code using geometry information on a three-dimensional point, and sorts a plurality of three-dimensional points in the order of Morton codes. Haar transformer 7082 generates a coding coefficient by applying Haar transformation to attribute information. Quantizer 7083 quantizes the coding coefficient of the attribute information.

Inverse quantizer 7084 inverse-quantizes the quantized coding coefficient. Inverse Haar transformer 7085 applies inverse Haar transformation to the coding coefficient. Memory 7086 stores values of the decoded attribute information on the plurality of three-dimensional points. For example, the decoded attribute information on the three-dimensional points stored in memory 7086 may be used for prediction or the like of a three-dimensional point yet to be encoded.

Arithmetic encoder 7087 calculates ZeroCnt from the quantized coding coefficient, and arithmetically encodes ZeroCnt. Arithmetic encoder 7087 also arithmetically encodes any quantized coding coefficient that is not zero. Arithmetic encoder 7087 may binarize the coding coefficient before the arithmetic encoding. Arithmetic encoder 7087 may generate and encode various kinds of head information.

ΔQP calculator 7088 determines values of Delta_Layer, ADelta_QP, and NumPointADelta from the actual code amount obtained by arithmetic encoder 7087 and the predetermined desired code amount. The quantization by quantizer 7083 is performed using a quantization parameter based on the determined Delta_Layer, ADelta_QP, and NumPointADelta. Arithmetic encoder 7087 arithmetically encodes Delta_Layer, ADelta_QP, and NumPointADelta and adds these values to the bitstream.

FIG. 86 is a block diagram of attribute information decoder 7043 in the case where RAHT is used. Attribute information decoder 7043 includes arithmetic decoder 7091, inverse quantizer 7092, inverse Haar transformer 7093, and memory 7094.

Arithmetic decoder 7091 arithmetically decodes ZeroCnt and the coding coefficient included in the bitstream. Arithmetic decoder 7091 may decode various kinds of header information. Arithmetic decoder 7091 also decodes Delta_Layer, ADelta_QP, and NumPointADelta from the header of the bitstream.

Inverse quantizer 7092 inverse-quantizes the arithmetically decoded coding coefficient. Specifically, inverse quantizer 7092 performs the inverse quantization using a quantization parameter based on the decoded Delta_Layer, ADelta_QP, and NumPointADelta.

Inverse Haar transformer 7093 applies inverse Haar transformation to the inverse-quantized coding coefficient. Memory 7094 stores values of the decoded attribute information on the plurality of three-dimensional points. For example, the decoded attribute information on the three-dimensional points stored in memory 7094 may be used for prediction of a three-dimensional point yet to be decoded.

In the following, a variation of this embodiment will be described. The three-dimensional data encoding device may encode a quantization parameter of attribute information on each three-dimensional point as new attribute information.

In the following, an example of a process performed by the three-dimensional data encoding device in this case will be described. The three-dimensional data encoding device encodes attribute information A (such as color) by calculating a quantization parameter according to the flow shown in FIG. 72. In this process, as a new attribute value of each three-dimensional point, the three-dimensional data encoding device encodes the quantization parameter used. In this case, the three-dimensional data encoding device may perform the encoding by changing the value of the quantization parameter for each three-dimensional point. For example, if the cumulative code amount is greater than the value of the desired code amount×TH1, the three-dimensional data encoding device can set the value of the quantization parameter to be greater, in order to reduce the actual code amount. If the cumulative code amount is smaller than the value of the desired code amount×TH3, the three-dimensional data encoding device can set the value of the quantization parameter to be smaller, in order to increase the actual code amount.

After the encoding of attribute information A, the three-dimensional data encoding device encodes the quantization parameter assigned to each three-dimensional point as new attribute information A'. In this process, the three-dimensional data encoding device may apply lossless encoding to prevent losing of the amount of information on the quantization parameters. The three-dimensional data encoding device may add, to the header or the like, information that indicates that the encoded attribute information is a quantization parameter. In this way, the three-dimensional data decoding device can properly decode the quantization parameter used by the three-dimensional data encoding device.

When performing predictive encoding of attribute information using N three-dimensional points in the periphery of a current three-dimensional point, the three-dimensional data encoding device may encode a quantization parameter on the supposition that N=1. In this way, the calculation amount can be reduced.

Next, an example of a process performed by the three-dimensional data decoding device will be described. First, the three-dimensional data decoding device decodes attribute information A' among the attribute information in the bitstream to obtain a quantization parameter used for the decoding of attribute information A. The three-dimensional data decoding device then decodes attribute information A using the decoded quantization parameter.

Note that the three-dimensional data encoding device may encode, as new attribute information A', $\Delta QP$, which is the amount of change of the quantization parameter between three-dimensional points, instead of the quantization parameter described above. When $\Delta QP$ assumes a positive or negative value, the three-dimensional data encoding device may transform signed $\Delta QP$ into a positive value before encoding $\Delta QP$ as described below. When signed $\Delta QP$ (deltaQP_s) is smaller than 0, unsigned $\Delta QP$ (deltaQP_u) is set to be $-1-(2\times\text{deltaQP\_s})$. When signed $\Delta QP$ (deltaQP_s) is equal to or greater than 0, unsigned $\Delta QP$ (deltaQP_u) is set to be $2\times\text{deltaQP\_s}$.

The three-dimensional data encoding device may encode, as attribute information, a quantization parameter used for encoding of each attribute information. For example, the three-dimensional data encoding device may encode a quantization parameter of attribute information A on color as attribute information A', and encode a quantization parameter of attribute information B on reflectance as attribute information B'. In this way, the quantization parameter can be changed for each attribute information. For example, if the quantization parameter of attribute information having higher priority is set to be smaller, and the quantization parameter of attribute information having lower priority is set to be greater, the total code amount can be reduced while preserving the attribute information having higher priority.

When quantizing and encoding a prediction residual for attribute information on a three-dimensional point, if delta_Layer_present_flag, additional_delta_QP_present_flag and the like indicate that Delta_Layer and ADelta_QP are set in the header, the three-dimensional data encoding device need not use the value of a quantization weight (QW) that indicates the importance of a three-dimensional point. For example, when QW is used, the quantization parameter is set to be smaller when QW is greater (the importance is higher). In this way, it can be chosen whether to perform the quantization based on the importance determined by an internal process such as prediction or based on a value set in the header by the user, so that the two manners can be selectively used depending on the purpose of the user.

The three-dimensional data encoding device may add, to the header, a flag that indicates whether to use the value of the quantization weight (QW) or not. In this way, it can be chosen whether to perform the quantization by combining the values of Delta_Layer and ADelta_QP and QW or not, the two manners can be selectively used depending on the purpose of the user.

When quantizing and encoding a transformation coefficient for attribute information on a three-dimensional point using RAHT or the like, if delta_Layer_present_flag, additional_delta_QP_present_flag and the like indicate that Delta_Layer and ADelta_QP are set in the header, the three-dimensional data encoding device need not use the value of the quantization weight (QW). In this way, it can be chosen whether to perform the quantization based on the importance determined by an internal process such as prediction or based on a value set in the header by the user, so that the two manners can be selectively used depending on the purpose of the user. Furthermore, the three-dimensional data encoding device may add, to the header, a flag that indicates whether to use the value of quantization weight (QW) or not. In this way, it can be chosen whether to perform the quantization by combining the values of Delta_Layer and ADelta_QP and QW or not, the two manners can be selectively used depending on the purpose of the user.

FIG. 87 is a diagram showing a syntax example of an attribute information header (attribute header information)

in this case. The attribute information header shown in FIG. 87 differs from the attribute information header shown in FIG. 70 in that the attribute information header further includes default_delta_Layer_present_flag, default_delta_Layer_index, default_additional_delta_QP_present_flag, and default_additional_delta_QP_index.

default_delta_Layer_present_flag is a flag that indicates whether to use an initially set value of Delta_Layer defined by a standard or the like or not. For example, a value of 1 indicates that initially set Delta_Layer is to be used. A value of 0 indicates that initially set Delta_Layer is not to be used. In the case of the value of 0, the three-dimensional data decoding device performs the following decoding process by setting Delta_Layer to be 0, for example.

default_deltabLayer_index is information that allows identification of Delta_Layer to be used among one or more initially set values of Delta_Layer defined by a standard or the like. For example, default_delta_Layer_index is defined as described below.

When default_delta_Layer_index=0, Delta_Layer for all layers is set to be 1. That is, the value of the quantization parameter increases by 1 every time a layer is incremented. When default_delta_Layer_index=1, Delta_Layer for all layers is set to be 2. That is, the value of the quantization parameter increases by 2 every time a layer is incremented.

If an initially set Delta_Layer is defined by a standard or the like in this way, the quantization parameter can be changed without adding the value of Delta_Layer to the header, so that the code amount of the header can be reduced.

default_additional_delta_QP_present_flag is a flag that indicates whether to use an initially set value of ADelta_QP defined by a standard or the like or not. For example, a value of 1 indicates that initially set ADelta_QP is to be used. A value of 0 indicates that initially set ADelta_QP is not to be used. In the case of the value of 0, the three-dimensional data decoding device performs the following decoding process by setting ADelta_QP to be 0, for example.

default_additional_delta_QP_index is information that allows identification of ADelta_QP to be used among one or more values of initially set ADelta_QP defined by a standard or the like. For example, default_additional_delta_QP_index is defined as described below.

When default_additional_delta_QP_index=0, ADelta_QP is set to be 1 every N three-dimensional points. That is, the value of the quantization parameter increases by 1 each time N three-dimensional points are encoded or decoded. Note that the three-dimensional data encoding device may additionally add information indicating N to the header.

When default_additional_delta_QP_index=1, ADelta_QP is set to be 2 every N three-dimensional points. That is, the value of the quantization parameter increases by 2 each time N three-dimensional points are encoded or decoded. Note that the three-dimensional data encoding device may additionally add information indicating N to the header.

If an initially set ADelta_QP is defined by a standard or the like in this way, the quantization parameter can be changed without adding the value of ADelta_QP to the header, so that the code amount of the header can be reduced.

Embodiment 5

In the process of assigning a quantization parameter to each layer described in Embodiment 9, a process according to Embodiment 10 can also be performed.

Figure 88:
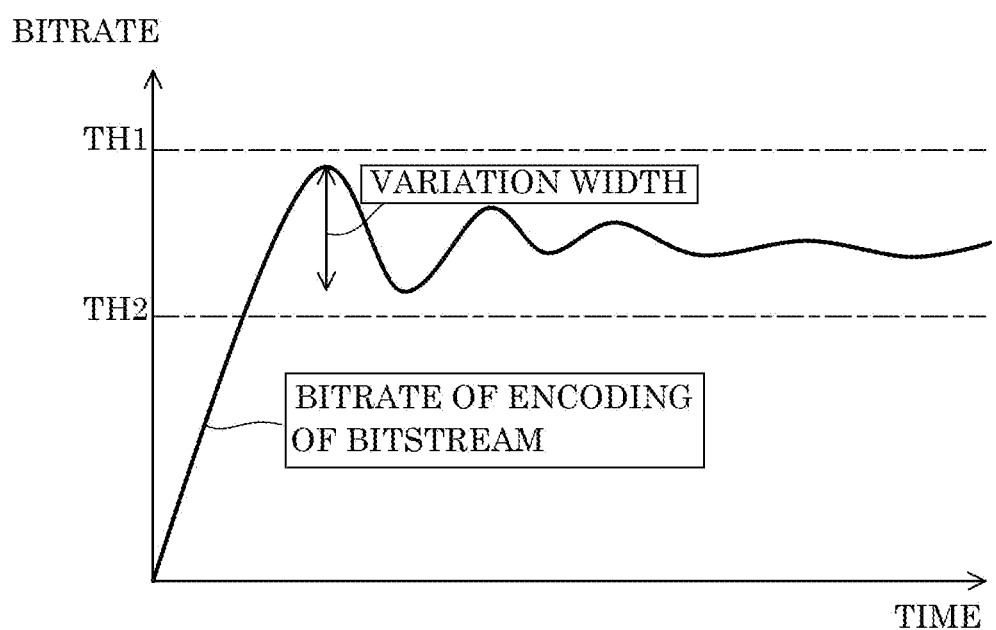
FIG. 88 is a graph showing a relationship between bitrate of encoding of a bitstream and time according to Embodiment 5.

In this embodiment, an example where a QP value applied in quantization is assigned on a layer basis will be described. FIG. 88 is a graph showing a relationship between bitrate of encoding of a bitstream and time.

As shown in FIG. 88, the three-dimensional data encoding device desirably controls the bitrate of encoding within a predetermined range between threshold TH1 and threshold TH2 that is permitted in advance. Threshold TH1 is a maximum threshold (upper limit value) of the predetermined range. Specifically, threshold TH1 is a hard limit that cannot be exceeded because of the limitation of the buffer or transmission bandwidth. Threshold TH2 is a minimum threshold (lower limit value) of the predetermined range. Specifically, threshold TH2 is a soft limit that is set to maintain the consistency of the bitrate and the image quality.

In order to control the bitrate of encoding within the range between threshold TH1 and threshold TH2, adjustment of the QP value may be required during encoding. The process of adjusting the QP value so that the bitrate falls within a predetermined range can be easily implemented using an adjustment tool for the QP value. In the process of adjusting the QP value, the bitrate is increased and decreased by adjusting the QP value in accordance with the number of three-dimensional points having an attribute value with which the QP value is to be associated and the complexity of the attribute value to be encoded.

Variations of the bitrate occur in an early stage of the adjustment of the QP value to a proper value by an encoding tool. Once the encoded stream becomes stable, the variations of the bitrate become small, and the bitrate eventually becomes stable.

Figure 89:
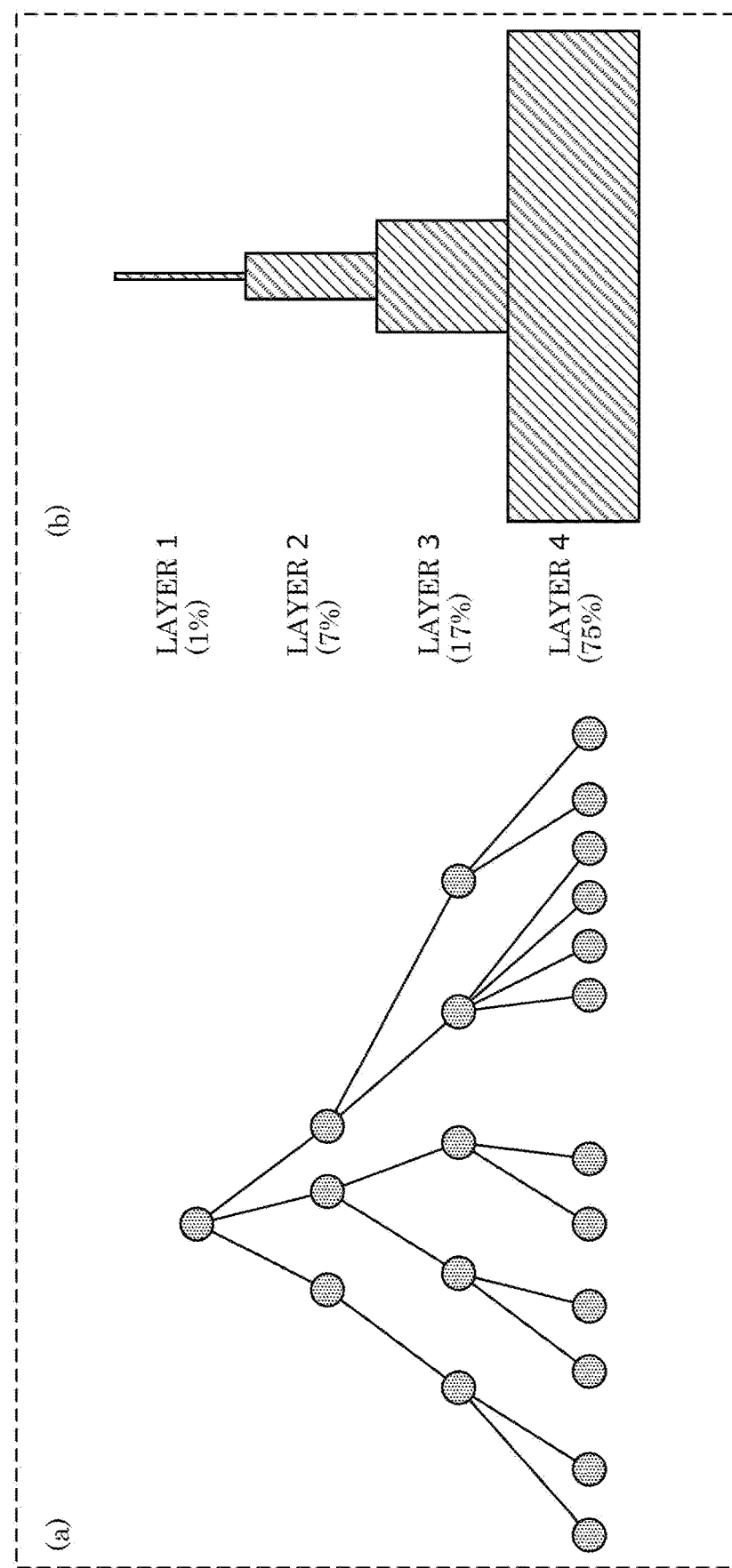
FIG. 89 is a diagram showing a hierarchical structure of a three-dimensional point cloud and the number of three-dimensional points belonging to each layer according to Embodiment 5.

FIG. 89 is a diagram showing a hierarchical structure of a three-dimensional point cloud and the number of three-dimensional points belonging to each layer.

As shown in part (a) of FIG. 89, the plurality of three-dimensional points included in the three-dimensional point cloud are classified into four layers, layer 1, layer 2, layer 3, and layer 4.

As shown in FIG. 89, the number of three-dimensional points may be significantly different between different LoD layers or different depth layers, depending on the properties of the predictive transformation, the lifting transformation, or the RAHT. For example, layer 4, which is the bottom layer, includes 75% of the three-dimensional points in the three-dimensional point cloud, and the other layers 1 to 3 include the remaining 25% of the three-dimensional points. Therefore, changing the QP value for layer 4 has a greater effect on the size or bitrate of the bitstream than changing the QP value for any of layers 1 to 3.

This method can be applied not only to the predictive transformation, the lifting transformation, and the RAHT but also to another method that uses a plurality of layers for encoding a three-dimensional point cloud. That is, this method is not limited to the application to the three-dimensional points classified into layers illustrated above, as far as an original QP value (for a slice or layer) to be applied can be applied to a group of pieces of three-dimensional point cloud data. Furthermore, when one layer is further divided into a plurality of sub-layers (SubLayer), and a plurality of three-dimensional points included in the one layer are assigned to (classified into) any of the resulting plurality of sub-layers, ΔQP (DeltaQP) may be assigned to each of the plurality of sub-layers. Here, one sub-layer has only to be assigned one or more three-dimensional points.

The process of further dividing one layer into a plurality of sub-layers is not necessarily applied to the bottom layer. The process can be applied to any of the plurality of layers.

In order to effectively control the bitrate of the bitstream in the encoding, an adjustment tool for more finely adjusting the QP value is needed, in addition to performing the quantization by adjusting the QP value for each layer. Thus, in a method using NumPointADelta, the user can set the quantity of an attribute value for a particular layer of a particular slice to be a desired value.

Figure 90:
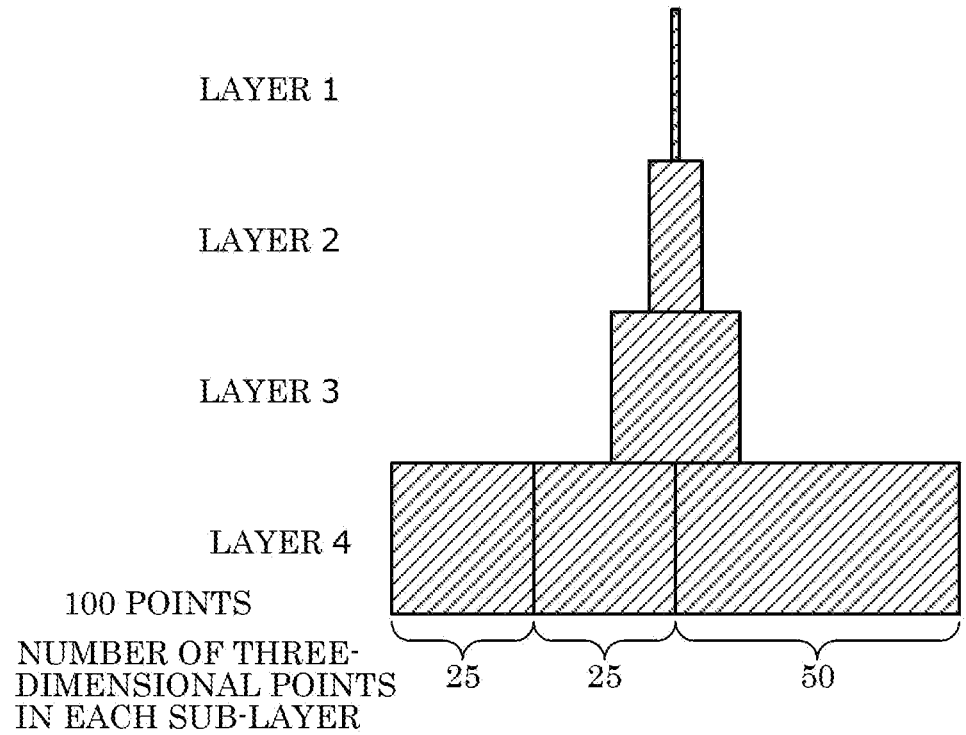
FIG. 90 is a diagram showing a first example of the classification of a three-dimensional point cloud in one layer into sub-layers each including a specified number of three-dimensional points according to Embodiment 5.

FIG. 90 is a diagram showing a first example of the classification of a three-dimensional point cloud in one layer into sub-layers each including a specified number of three-dimensional points. In the first example, the number of the three-dimensional points included in each of the plurality of sub-layers is specified.

In the division into sub-layers, the three-dimensional point cloud can be divided in many methods, depending on the situation or the encoding method. For example, it is possible that, by directly specifying the amount of the three-dimensional point cloud in each sub-layer, a layer is divided into a plurality of sub-layers in accordance with the specified amounts of three-dimensional point clouds.

For example, in FIG. 90, layer 4 includes 100 three-dimensional points to be encoded, and layer 4 is divided into two sub-layers each including 25 three-dimensional points and one sub-layer including 50 three-dimensional points. For example, the number of the sub-layers obtained by dividing layer 4 and the number of the three-dimensional points included in each sub-layer may be specified by user input.

In the syntax example of the header shown in FIG. 70, NumPointADelta[i] is used for storing three-dimensional point information on a sub-layer. In this example, the array size is 3, or NumPointADelta[i] is set to be a value from 0 to 2 that indicate three sub-layers of layer 4. i represents a value that indicates the layer that includes the sub-layers. NumPointADelta[i] may indicates the size of each sub-layer or indicates the starting point of each sub-layer. The size of a sub-layer is the number of the three-dimensional points included in the sub-layer. The starting point of a sub-layer is the smallest serial number of the serial numbers of the plurality of three-dimensional points included in the sub-layer (the serial number of the leading three-dimensional point in the sub-layer) when a serial number is assigned to each three-dimensional point in the three-dimensional point cloud included in the layer to which the sublayer belongs.

When NumPointADelta[i] indicates size, the three sub-layers included in layer 4 in FIG. 90 can be expressed as NumPointADelta[3]=[25, 25, 50], for example. In this case, the encoding size, that is, the encoding coverage, is smaller in most cases, so that a slightly smaller parameter value can be generated. However, both the three-dimensional data encoding device and the three-dimensional data decoding device have to keep track of the size of the sub-layer being processed.

When NumPointADelta[i] indicates starting point, the three sub-layers included in layer 4 in FIG. 90 can be expressed as NumPointADelta[3]=[0, 25, 50], for example. In this case, as the encoding position, the overall range of the last element is always required. On the other hand, the counter for the three-dimensional point cloud is constantly kept track of, so that the three-dimensional data encoding device and the three-dimensional data decoding device can more easily perform the processing.

Figure 91:
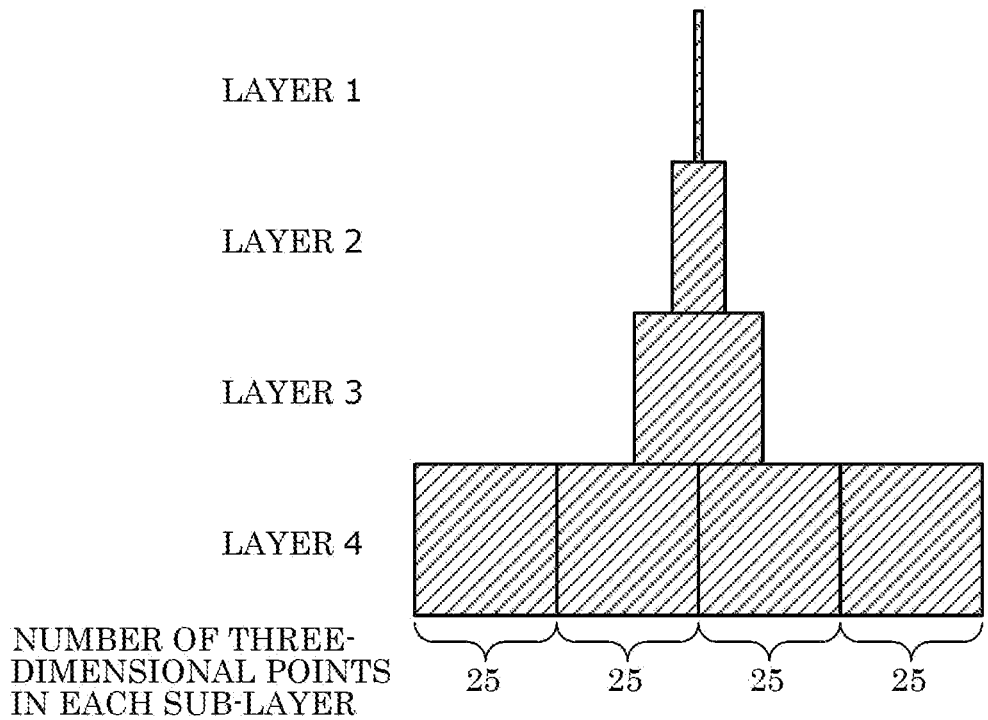
FIG. 91 is a diagram showing a second example of the classification of a three-dimensional point cloud in one layer into sub-layers each including the same number of three-dimensional points according to Embodiment 5.

FIG. 91 is a diagram showing a second example of the classification of a three-dimensional point cloud in one layer into sub-layers each including the same number of three-dimensional points. FIG. 92 shows a syntax example of a header of attribute information in the second example. FIG. 93 shows another syntax example of attribute information in the second example. In the second example, a common number of three-dimensional points is specified for a plurality of sub-layers. That is, in the second example, one common number is specified as the number of the three-dimensional points classified into each sub-layer.

In the second example, as shown in FIG. 92, const_NumPoint may be encoded, and ADelta_QP may be encoded for each sub-layer. As shown in FIG. 93, const_NumPoint may be generated for each sub-layer and changed for each layer.

additional_delta_QP_present_flag is implemented to indicate const_NumPoint, and ADelta_QP can be used for each sub-layer. When const_NumPoint need to be constantly encoded, additional_delta_QP_present_flag may be omitted. Similarly, TotalPoint for each sub-layer may be internally calculated in the encoding or decoding processing, or may be encoded and stored in the header for simplification.

const_NumPoint indicates the number (constant) of the three-dimensional points in each sub-layer.

num_sublayer indicates the number of sub-layers that can be generated by division based on the total number of the three-dimensional points in the sub-layers and const_NumPoint.

By setting the number of the three-dimensional points included in each sub-layer to be a constant in this way, the overhead of the encoding or decoding can be reduced.

Figures 94, 95:
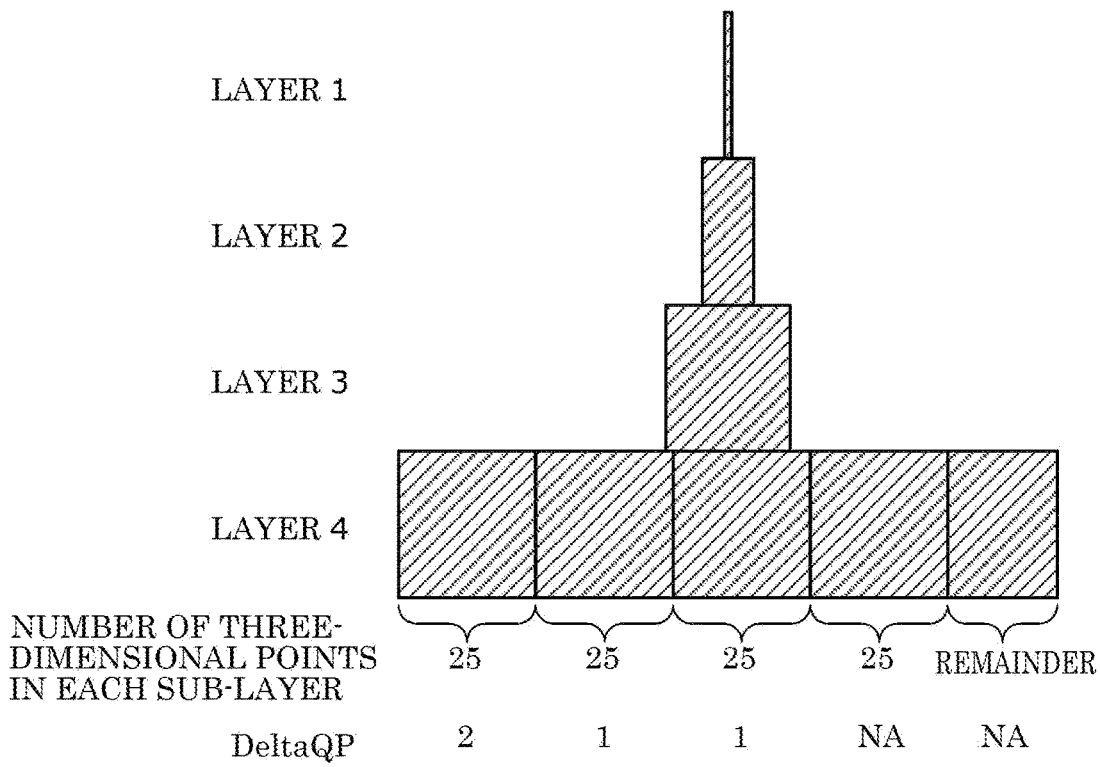
FIG. 94 is a diagram showing a third example of the classification of a three-dimensional point cloud in one layer into a different number of sub-layers than predetermined according to Embodiment 5.
FIG. 95 shows a syntax example of a header of attribute information in the third example according to Embodiment 5.

FIG. 94 is a diagram showing a third example of the classification of a three-dimensional point cloud in one layer into a different number of sub-layers than predetermined. FIG. 95 shows a syntax example of a header of attribute information in the third example. FIG. 96 shows another syntax example of a header of attribute information in the third example. In the third example, a plurality of three-dimensional points are classified into a different number of sub-layers than predetermined, such as a larger number of sub-layers than a predetermined number.

In this example, since a larger number of sub-layers than predetermined are generated, a sub-layer that is not assigned a DeltaQP value occurs. In this case, a default value or a predetermined value, such as 0, may be set as a DeltaQP value for a sub-layer that is not assigned a DeltaQP value. Alternatively, the DeltaQP value assigned to one (such as the last or bottom sub-layer) of the sub-layers assigned a DeltaQP value may be assigned to the sub-layer that is not assigned a DeltaQP value as a DeltaQP value for the sub-layer that is not assigned a DeltaQP value. In that case, the number of ADeltaQP values required for the encoding can be reduced, so that the overhead can be reduced.

Note that the last sub-layer (layer) is the (n−1)-th layer of n layers from layer 0 to layer n−1 determined in a predetermined method by the three-dimensional data encoding device. The number of layers is added to the header. For example, the predetermined method is a method in which when the three-dimensional data encoding device determines that a desired bitrate will be achieved and the QP values for the subsequent sub-layers need not be changed in the course of encoding of the layers by performing rate control, the three-dimensional data encoding device does not transmit the DeltaQP values for the subsequent layers. This can reduce the code amount of the header.

There are a plurality of examples of the syntax that identifies the number of ADeltaQP values to be encoded or decoded. For example, FIG. 95 shows a syntax that includes a particular stop_code, which is a fixed value for a range of DeltaQP for a sub-layer. The three-dimensional data decoding device ends the loop when the three-dimensional data decoding device obtains stop_code. The range of DeltaQP need to be encoded by the three-dimensional data encoding device or may be defined by a standard so that both the three-dimensional data encoding device and the three-dimensional data decoding device can recognize the range. As another example, FIG. 96 shows a syntax in which num_sublayer is directly encoded to indicate the number of ADeltaQP values that can be decoded.

Note that, when a smaller number of sub-layers than predetermined are generated, and there is an excessive number of ADeltaQP values when the number of sub-layers is referred to, the excessive number of ADeltaQP values need not be used and can be discarded.

Figures 97, 98:
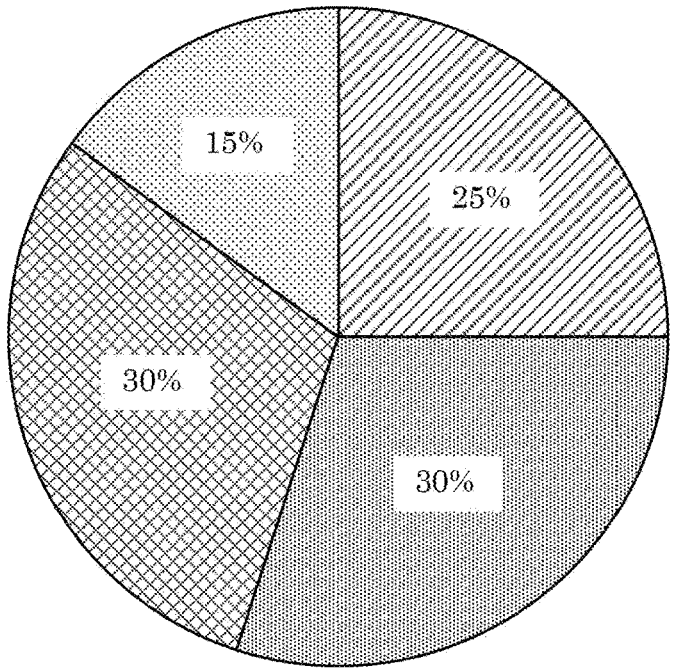
FIG. 97 is a diagram showing a fourth example of the classification of a three-dimensional point cloud in one layer into sub-layers each including a specified ratio (percentage) of the three-dimensional points according to Embodiment 5.
FIG. 98 shows an example of a syntax of a header of attribute information in the fourth example according to Embodiment 5.

FIG. 97 is a diagram showing a fourth example of the classification of a three-dimensional point cloud in one layer into sub-layers each including a specified ratio (percentage) of the three-dimensional points. FIG. 98 shows an example of a syntax of a header of attribute information in the fourth example. In the fourth example, the ratio used for the classification into sub-layers are specified as the number of three-dimensional points to be classified into each sub-layer.

In this example, the number of the three-dimensional points in a sub-layer is specified by the ratio of the number of the three-dimensional points in the sub-layer to the number of the three-dimensional points included in the layer including the sub-layer. FIG. 97 shows that four sub-layers include 25%, 30%, 30%, and 15% of the total number of the three-dimensional points included in the layer including the respective sub-layers. When a layer is divided into a plurality of sub-layers in this way, the number of the three-dimensional points included in each of the plurality of sub-layers generated by division may be indicated by the ratio of the number of three-dimensional points included in the sub-layer to the total number of the three-dimensional points included in the layer. In this case, both the three-dimensional data encoding device and the three-dimensional data decoding device keep track of the number of three-dimensional points to be encoded for the respective processings. The ratio may be calculated with respect to the whole of the three-dimensional point cloud or may be calculated as a ratio for a particular layer, depending on the method to be implemented.

In FIG. 98, num_sublayer indicates the number of the sub-layers divided by the ratio of the number of the three-dimensional points. percentile indicates the ratio of the total number of the three-dimensional points included in a relevant sub-layer to the total number of the three-dimensional points included in the layer to which the sub-layer belongs.

For example, when the sum of the ratios is less than 100%, such as when a plurality of three-dimensional points remain without being classified into any sub-layer, the plurality of remaining three-dimensional points may be classified into an additional sub-layer or into the previous sub-layer, depending on the implementation shared by both the three-dimensional data encoding device and the three-dimensional data decoding device. On the other hand, when an error occurs, and the sum of the ratios is greater than 100%, which is an allowable value, the division into sub-layers ends when the last three-dimensional point is reached.

Note that, since the sum of the ratios is always fixed at 100%, the last ratio of the plurality of ratios specified for classifying a plurality of three-dimensional points included in one layer into a plurality of sub-layers can be omitted. This means that the number of the ratio elements is smaller than the number of the ADelta_QP elements by 1.

Figures 99, 100:
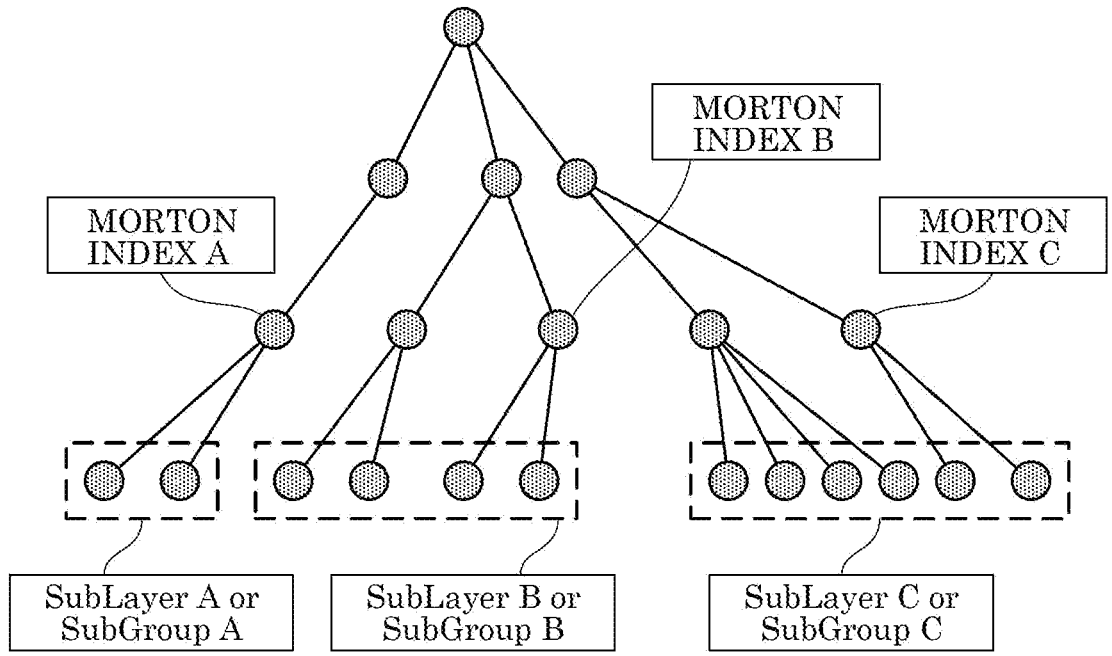
FIG. 99 is a diagram showing a fifth example of the classification of a three-dimensional point cloud in one layer into sub-layers based on Morton indices according to Embodiment 5.
FIG. 100 is a syntax example of a header of attribute information in the fifth example according to Embodiment 5.

FIG. 99 is a diagram showing a fifth example of the classification of a three-dimensional point cloud in one layer into sub-layers based on Morton indices. FIG. 100 is a syntax example of a header of attribute information in the fifth example.

In the fifth example, Morton indices in the Morton code for a three-dimensional point cloud are specified for a plurality of sub-layers. Specifically, in the fifth example, a three-dimensional point cloud included in one layer is classified into sub-layers using the Morton code. For example, a plurality of three-dimensional points having a common Morton index may be classified into the same sub-layer. In that case, in the three-dimensional point cloud, three-dimensional points spatially close to each other, such as three-dimensional points within a predetermined distance, are grouped. Therefore, for example, the three-dimensional point cloud included in each sub-layer is included in one three-dimensional space, and the three-dimensional space corresponding to one of a plurality of sub-layers does not overlap with the three-dimensional spaces corresponding to the other sub-layers. In this way, one sub-layer is assigned a three-dimensional point cloud including three-dimensional points spatially close to each other, and the three-dimensional points in the three-dimensional point cloud are likely to have similar characteristics or attributes. Therefore, three-dimensional points included in the same sub-layer are encoded using a common QP value, so that the encoding efficiency can be improved.

When a three-dimensional point cloud is arranged in Morton order in each layer, sorting of the three-dimensional points need not be performed. The three-dimensional data encoding device can determine, in advance, which three-dimensional points are to be classified into the same sub-layer, and determine the number of the three-dimensional points to be classified into each sub-layer in the method described above.

num_morton_sublayer indicates the number of sub-layers generated by division in the grouping using Morton order. Index indicates a Morton index. For example, when Index indicates that Morton index A in FIG. 99 is selected, child nodes of a node of Morton index A are set to be sub-layers. A starting point or ending point of a corresponding sub-layer may be indicated using the Morton code. The Morton index is not exclusively obtained from a three-dimensional point in the bottom layer but can also be obtained from a three-dimensional point in the top layer. A starting point or ending point for classifying three-dimensional points into each sub-layer may be determined depending on the settings of both the three-dimensional data encoding device and the three-dimensional data decoding device.

Figure 101:
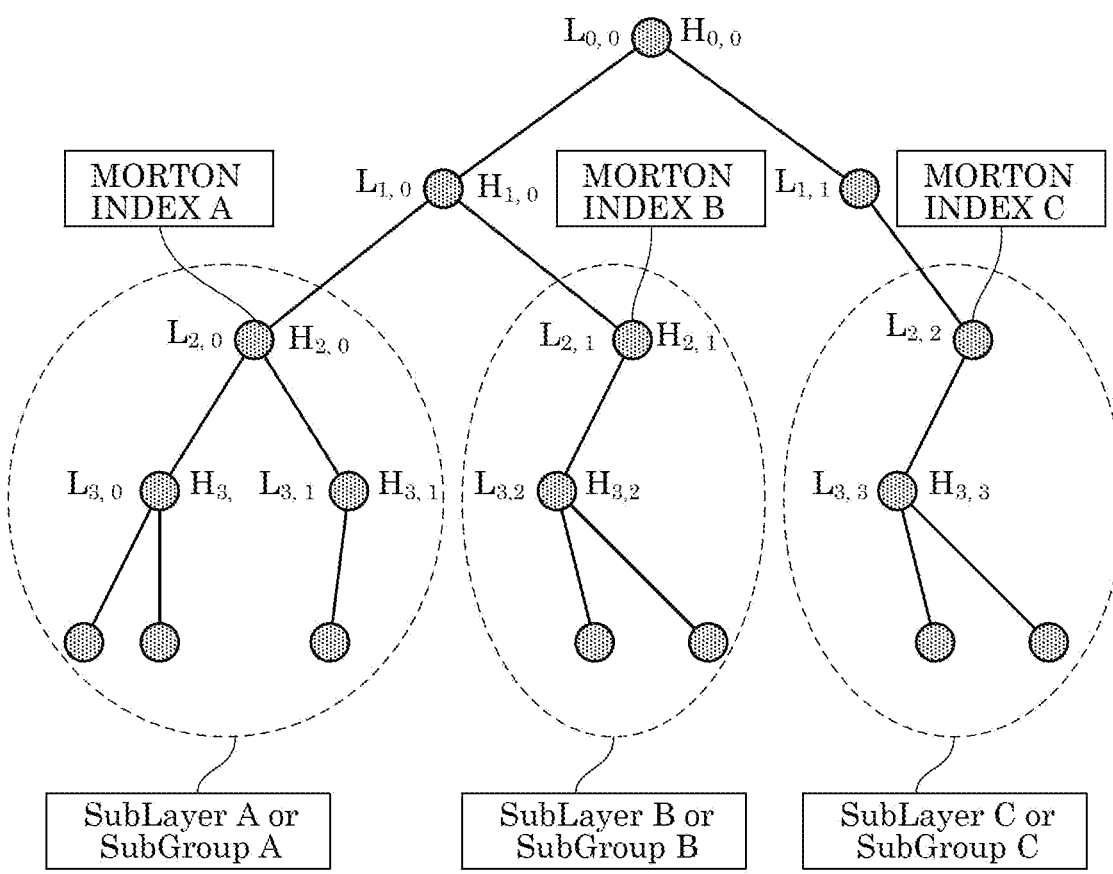
FIG. 101 is a diagram showing a sixth example of the classification of a three-dimensional point cloud in one layer into sub-layers based on Morton indices according to Embodiment 5.
Figure 102:
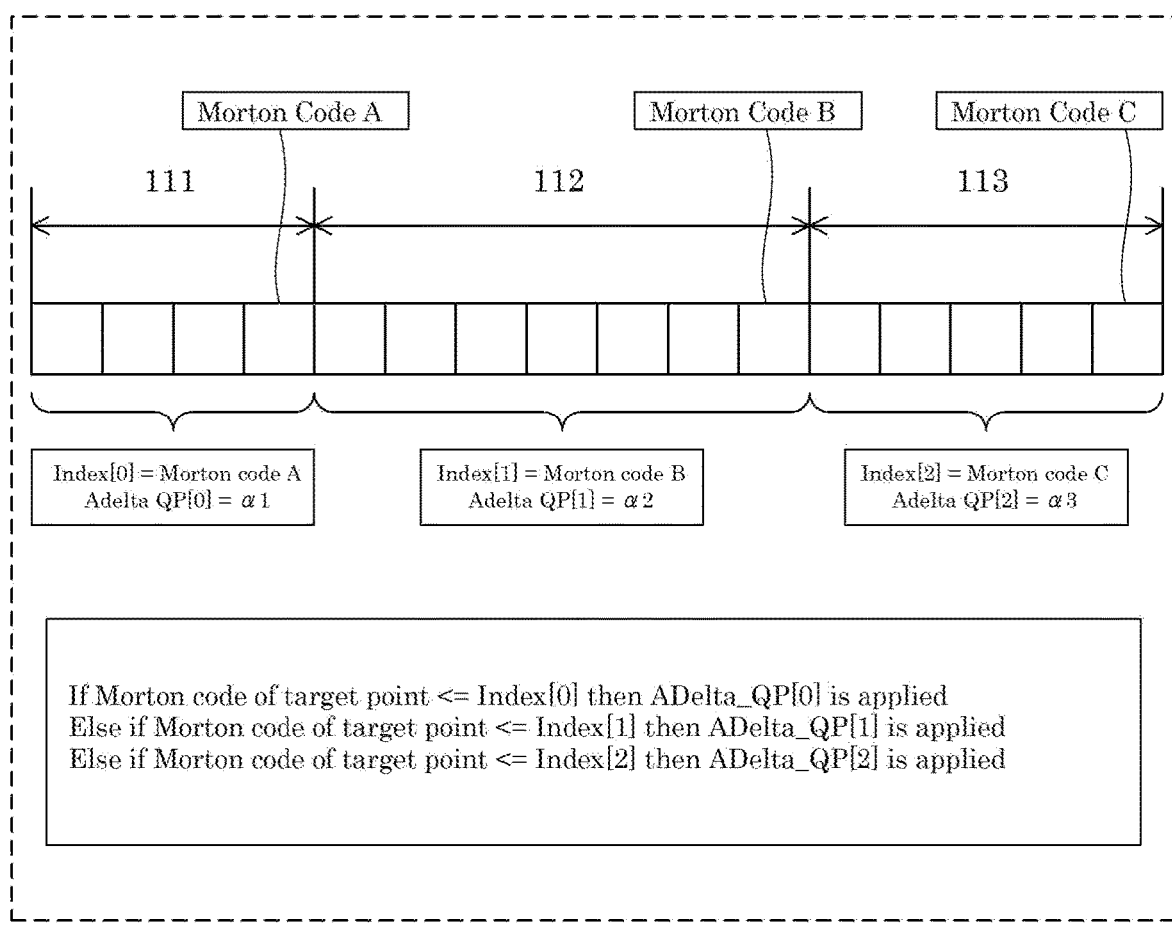
FIG. 102 is a diagram showing the sixth example of the classification of a three-dimensional point cloud in one layer into sub-layers based on Morton indices according to Embodiment 5.

FIG. 101 and FIG. 102 are diagrams showing a sixth example of the classification of a three-dimensional point cloud in one layer into sub-layers based on Morton indices. In the sixth example, a three-dimensional point cloud is classified using a RAHT hierarchical structure.

In the sixth example, sub-layers A to C, which are groups of classified three-dimensional points, are identified using Morton indices for three-dimensional points. In this way, three-dimensional points having a common Morton index are classified into the same sub-layer, as in the fifth example.

A three-dimensional point cloud can be classified based on Morton indices of the three-dimensional point cloud, depending on the three-dimensional data encoding device and the three-dimensional data decoding device. A setting of sub-layers can be applied to any layer. A three-dimensional point located higher than a specified Morton index may be classified into the subsequent sub-layer or may be handled as an outlier.

FIG. 102 shows the last three-dimensional points in sub-layers classified based on Morton indices. In FIG. 102, sub-layers similar to those in FIG. 101 are shown in a one-dimensional arrangement representation.

The classification into sub-layers using Morton indices is not exclusively applied to the classification using a specific layer structure such as depths of RAHT, but can also be applied to the classification at a plurality of layers or depths. In that case, sub-layers are sub-groups.

Figure 103:
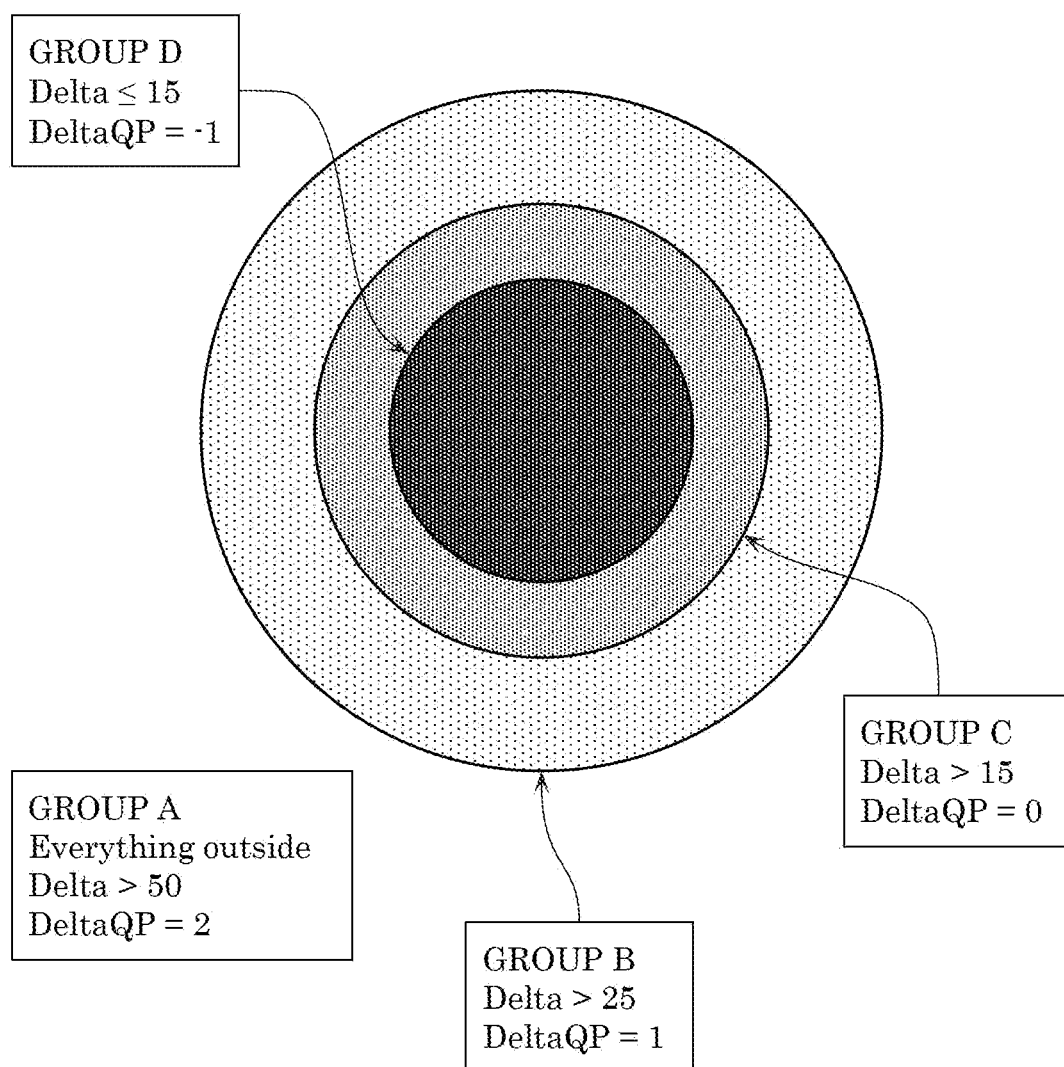
FIG. 103 is a diagram showing a seventh example of the classification of a three-dimensional point cloud in one layer into sub-layers using a residual or Delta value according to Embodiment 5.

FIG. 103 is a diagram showing a seventh example of the classification of a three-dimensional point cloud in one layer into sub-layers using a residual or Delta value.

In the seventh example, for example, a Delta value is attribute information (attribute value) by which a quantization weight function for LoD layers in the predictive transformation or the lifting is to be multiplied. Similarly, in the RAHT, a Delta value is attribute information (attribute value) by which a weight is to be multiplied. The Delta value may be a value to be encoded as attribute information, and may be a value after prediction depending on the encoding processing, regardless of which of the predictive transformation, the lifting, the RAHT, and any other method is used for transformation. Note that, in FIG. 103, "Delta" denotes a Delta value.

When a Delta value is small, the Delta value can be encoded with a slightly small QP so that details are maintained and not quantized. In this way, a reduction of the resolution can be prevented. However, when a Delta value is large a large QP value can be used, since a large difference in Delta value is not easily quantized.

In FIG. 103, the radius of a circle represents the magnitude of Delta values. The larger the Delta value, the farther from the center the three-dimensional point is.

Figures 104, 105:
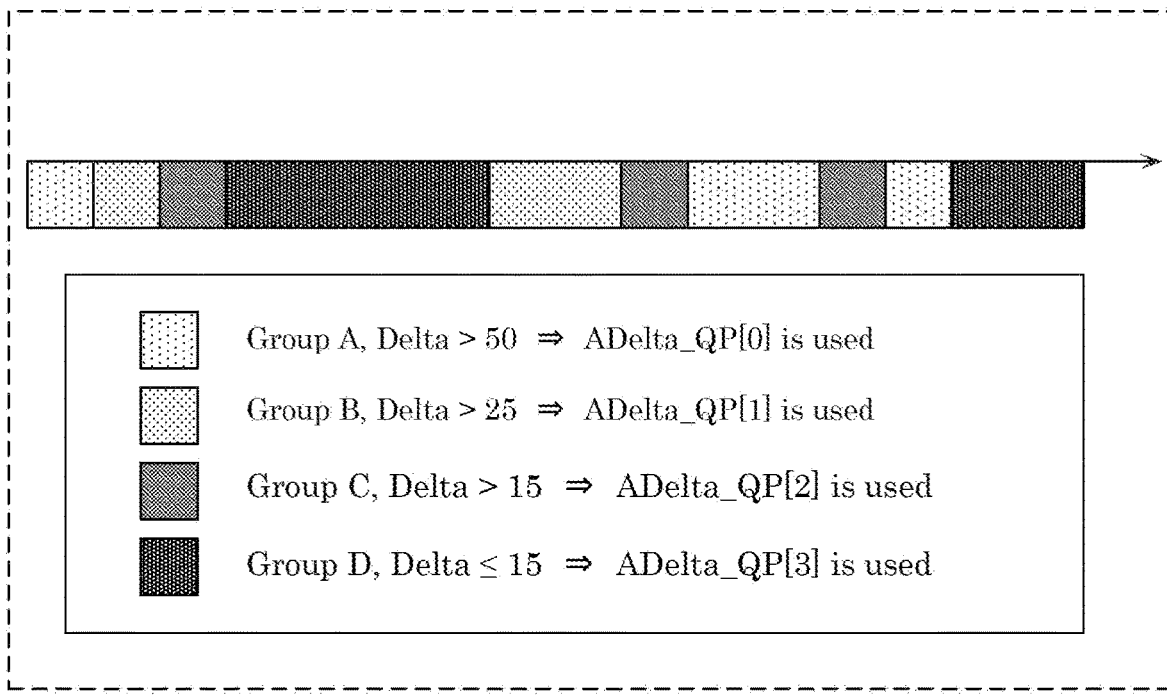
FIG. 104 is a diagram showing an arrangement of three-dimensional points arranged in a two-dimensional Morton order according to Embodiment 5.
FIG. 105 shows a syntax example of a header of attribute information in the seventh example according to Embodiment 5.

FIG. 104 is a diagram showing an arrangement of three-dimensional points arranged in a two-dimensional Morton order. FIG. 105 shows a syntax example of a header of attribute information in the seventh example.

When Delta values are used to classify a three-dimensional point cloud into a plurality of sub-layers like in the seventh example, all the three-dimensional points covered by a QP value for a sub-layer are not consecutive. For example, as shown in FIG. 104, some three-dimensional points are classified into group A, other discrete three-dimensional points are classified into group B, and some of the remaining three-dimensional points are classified into group C.

A three-dimensional point cloud is assigned to a group index value and the index value is encoded along with a Delta value. Note that encoding for lower levels will be described later. Note that the index value may be encoded as additional attribute information or as a SEI message.

In the seventh example, an additional index needs to be encoded for each three-dimensional point cloud, so that encoding using DeltaQP is made possible for a sub-layer of a cross layer, although an overhead can occur. Note that the three-dimensional data encoding device may rearrange three-dimensional points in a particular layer after determining indices, and then encode the indices and corresponding QP indices in ascending or descending order.

num_Group indicates the number of groups or sub-layers generated by division based on Delta values.

FIG. 106 shows a syntax example of a bitstream of a residual. FIG. 107 shows an equation for calculating an encoding cost (Encoding cost). FIG. 108 is a graph showing a relationship between bits per point (BPP) and time.

As shown in FIG. 106, when a bitstream of a residual is being encoded, index information is encoded for each point cloud. Note that index indicates an index number of a sub-layer or sub-group to which a three-dimensional point belongs. values indicates a prediction residual (residual value).

Note that, in determining an appropriate index for each three-dimensional point, the encoding cost (see FIG. 107) for each piece of attribute information may be used, or the encoding cost of a previously encoded three-dimensional point may be used. The encoding cost in this context is referred to as a bit count required for encoding attribute information on each three-dimensional point cloud. The encoding cost is an objective value used for approximately determining an index according to an equation or for accurately determining an index based on a previously encoded three-dimensional point.

As shown in FIG. 108, the three-dimensional data encoding device may control BPP by classifying (grouping) a plurality of three-dimensional points using an index based on the bits per point frequency (BPP rate) or, in other words, based on the cost of the number of three-dimensional points encoded or decoded per second and applying different sub-layer QPs based on the encoding cost. This method is suitable for controlling the bitrate of PCC encoding.

This method operates in the same manner in a frame-based encoding of a three-dimensional point cloud, and therefore, the bitrate or buffer status is useful in the classification into sub-layers. When the threshold of the buffer is being approached, the classification (grouping) is preferably performed using a high DeltaQP value in addition to the encoding cost of the three-dimensional points.

In the seventh example, as in all the examples described above, the number of sub-layers (groups) needs to be defined by a corresponding DeltaQP value. For example, in the syntax shown in FIG. 105, the number of sub-layers is defined in the header of attribute information or SPS.

Figure 109:
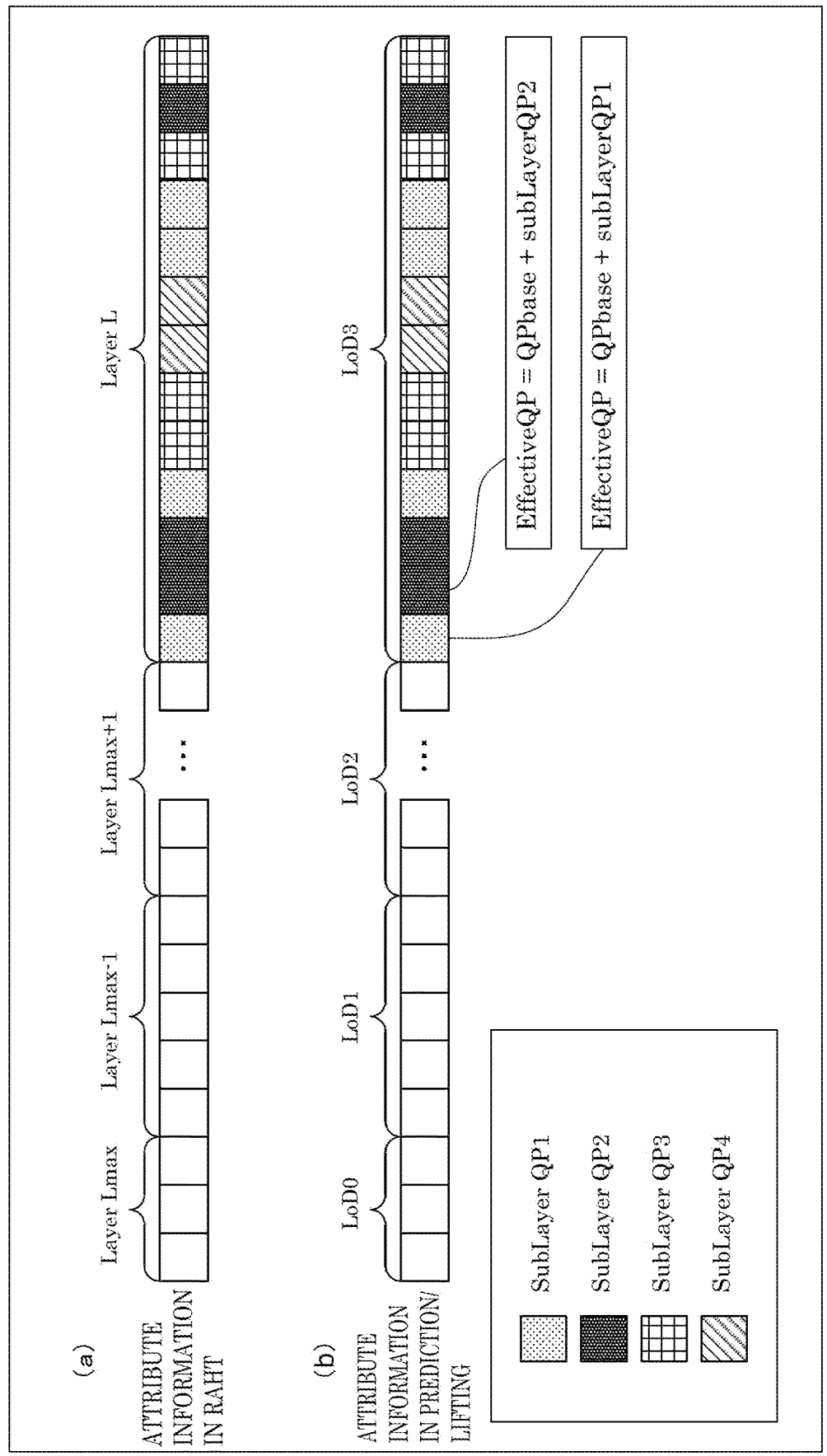
FIG. 109 is a diagram showing that a QP value applied to the encoding of attribute information is set for each sublayer according to Embodiment 5.

FIG. 109 is a diagram showing that a QP value applied to the encoding of attribute information is set for each sub-layer. Part (a) of FIG. 109 shows a case where the method in which a QP value is set for each sub-layer is applied to a RAHT hierarchical structure, and part (b) shows a case where the method is applied to a LoD hierarchical structure.

The method that uses an index described in the seventh example can be used in combination of a PCC RDOQ (Rate-distortion Optimized quantization) method, and is based on an optimal combination of distortion and bit cost.

RDOQ can be recursively implemented for attribute information on each three-dimensional point cloud by using various settings of DeltaQP for sublayers. To reduce the processing time, DeltaQP set for each sub-layer can be set first (in advance) in the header of attribute information or SPS. When set in SPS, DeltaQP is common to all the sub-layers. In RDOQ, only by recursively setting these values of DeltaQP, the encoding is efficiently achieved using an index for a particular sub-layer in the syntax of the bitstream of the residual.

Figures 110, 111:
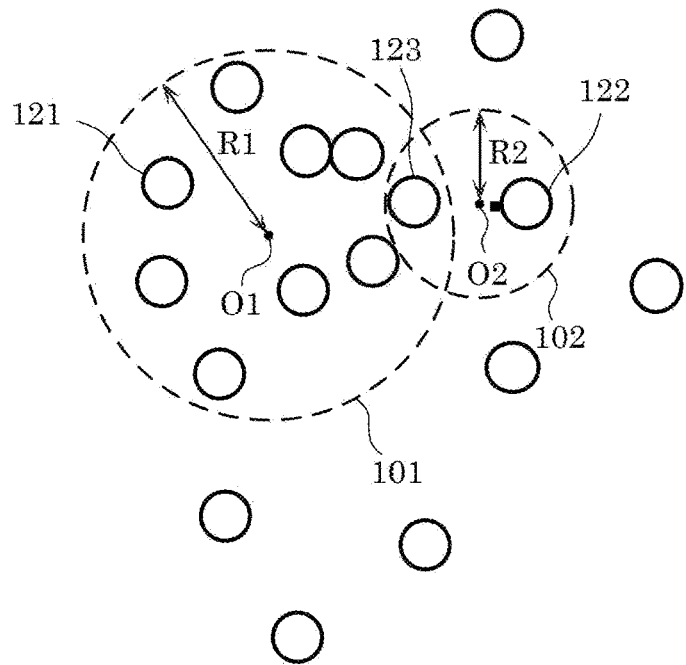
FIG. 110 is a diagram showing an eighth example of the classification of a three-dimensional point cloud into sublayers using the Morton code according to Embodiment 5.
FIG. 111 is a syntax example of a header of attribute information in the eighth example according to Embodiment 5.

FIG. 110 is a diagram showing an eighth example of the classification of a three-dimensional point cloud into sub-layers using the Morton code. FIG. 111 is a syntax example of a header of attribute information in the eighth example.

In this embodiment, although a method that groups a three-dimensional point cloud into a plurality of sub-layers (groups) based on Morton codes for three-dimensional points and sets ADelta_QP for each sub-layer (each group) has been described in the fifth example and the sixth example, the present disclosure is not necessarily limited thereto. For example, a three-dimensional point cloud may be grouped based on geometry information (x, y, z) on three-dimensional points, and ADelta_QP may be set for each group.

Specifically, center coordinate cA, radius rA, and ADelta_QP_A are defined for group A, and center coordinate cB, radius rB, and ADelta_QP_B are defined for group B. When there are other groups, similarly, the center coordinate, the radius, and ADelta_QP are defined for each group. The center coordinate, the radius, and ADelta_QP defined for each group, the total number of groups and the like are added to the header of the attribute information.

The three-dimensional data encoding device can apply ADelta_QP_A when a position coordinate of the three-dimensional point to be processed is included in group A (a sphere having center coordinate cA and radius rA), and apply ADelta_QP_B when a position coordinate of the three-dimensional point to be processed in included in group B (a sphere having center coordinate cB and radius rB). When the three-dimensional point to be processed is included in both the spheres of group A and group B, the three-dimensional data encoding device may calculate the distances between the three-dimensional point to be processed and center coordinate cA and cB of the groups and apply ADelta_QP of the group with the shorter distance.

In this way, close values of ADelta_QP can be applied to three-dimensional points close to each other in the three-dimensional space, the subjective image quality of encoded or decoded three-dimensional points can be controlled on a region basis.

When it is desired to improve the subjective image quality of an object, the three-dimensional data encoding device may designate the center coordinate of a three-dimensional point forming the object as the center coordinate of group 101, designate a half of the size of the object as the radius of group 101, and set ADelta_QP of group 101 to be a negative value, for example. In this way, the quantization step value of the encoding of the attribute of a three-dimensional point belonging to group 101 (included in the sphere of group 101) can be reduced, and as a result, the subjective image quality of the object can be improved.

Note that FIG. 110 shows groups 101 and 102 in a three-dimensional space into which a three-dimensional point cloud is classified. Group 101 includes three-dimensional point 121, which is included in a spherical space having central point O1 and radius R1. Group 102 includes three-dimensional point 122, which is included in a spherical space having central point O2 and radius R2. To the encoding of the three-dimensional points belonging to group 101, ADelta_QP_O set for group 101 is applied. To the encoding of the three-dimensional points belonging to group 102, ADelta_QP_P set for group 102 is applied. Central point O1 and central point O2, which are reference points for defining the respective groups, are expressed using coordinate values on three axes.

There may be three-dimensional point 123 included in both group 101 and group 102. To the encoding of three-dimensional point 123, the sum or average of ADelta_QP_O set for group 101 and ADelta_QP_P set for group 102 can be applied. In this way, QP values can be more finely controlled. Each three-dimensional point may belong to a plurality of groups. In that case, the sum of ADelta_QP of all the groups to which the three-dimensional point to be processed belongs can be used as the value of ADelta_QP of the three-dimensional point to be processed. In this way, QP values for a region in the three-dimensional space can be more flexibly controlled.

Note that ADelta_QP_O for group 101 may be set to be a negative value to decease the QP value, for example. In this way, a deterioration of the attribute information on the three-dimensional points belonging to group 101 due to the encoding can be prevented.

To the contrary, ADelta_QP_O for group O may be set to be a positive value to increase the QP value, for example. In this way, the code amount of the attribute information on the three-dimensional points belonging to group 101 can be reduced.

Note that although an example has been shown in which a sphere is used as a three-dimensional space for defining a group, the present disclosure is not necessarily limited thereto, and a group can also be defined using an ellipsoid or a cube. In that case, a parameter that defines the shape may be added to the header or control information.

Note that, in FIG. 111, num_group indicates the total number of groups. center_x, center_y, and center_z indicates a center coordinate of each group. radius indicates the radius of each group. When the group used is an ellipsoid or a cube, a parameter that indicates the shape may be added to the header or the like. For example, when a cube or a rectangular parallelepiped is used, a parameter that indicates coordinates of a reference point, and a width, a depth, and a height from the reference point may be added to the header or the like. When a plurality of shapes, such as a sphere and an ellipsoid, are used as shapes of three-dimensional spaces for defining groups, information that indicates the shape of a relevant three-dimensional space may be added to the header.

Figure 112:
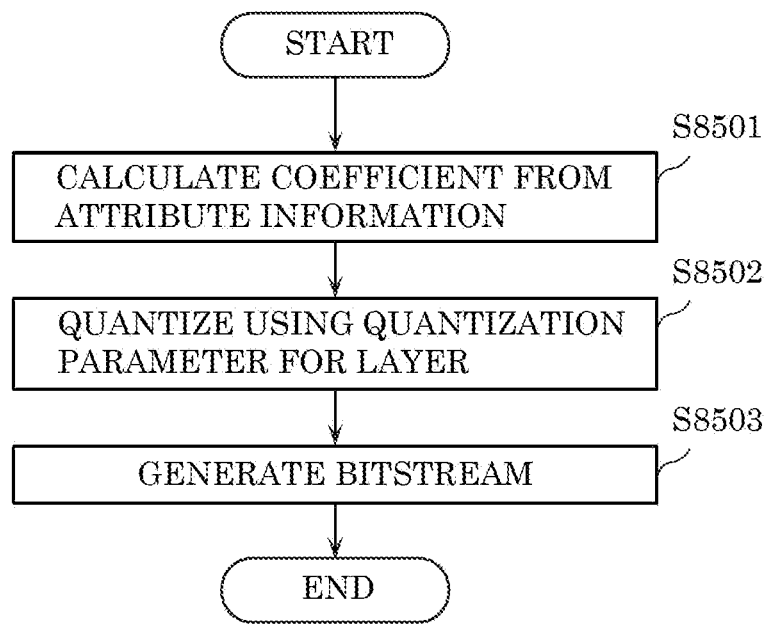
FIG. 112 is a flowchart of a three-dimensional data encoding process according to Embodiment 5.

As stated above, a three-dimensional data encoding device according to one aspect of the present disclosure performs the process shown by FIG. 112. The three-dimensional data encoding device calculates coefficient values from pieces of attribute information of three-dimensional points included in point cloud data (S8501); quantizes the coefficient values to generate quantization values (S8502); and generates a bitstream including the quantization values (S8503). The three-dimensional points corresponding to the coefficient values belong to one layer among one or more layers. Each of a predetermined number of layers among the one or more layers is assigned a quantization parameter for the layer. In the quantizing (S8502), (i) when a quantization parameter is assigned to a layer to which each of the coefficient values belongs, the coefficient value is quantized using the quantization parameter, and (ii) when the quantization parameter is not assigned to a layer to which each of the coefficient values belongs, the coefficient value is quantized using a quantization parameter assigned to one layer among the predetermined number of the layers. According to the three-dimensional data encoding method, the quantization parameter can be changed for each layer, and therefore the encoding can be properly performed.

For example, the one layer is a last layer among the predetermined number of the layers.

For example, in the quantizing (S8502), when a total number of the one or more layers is less than the predetermined number of the layers, quantization parameters assigned to the predetermined number of the layers and not corresponding to the one or more layers are not used.

For example, the bitstream includes first information indicating a reference quantization parameter, and pieces of second information for calculating quantization parameters for the one or more layers from the reference quantization parameter. For this reason, it is possible to improve coding efficiency.

It should be noted that steps S8501, S8502, and S8503 correspond to the respective processes described in Embodiment 9.

For example, the three-dimensional data encoding device includes a processor and memory. Using the memory, the processor performs the above-described process.

Figure 113:
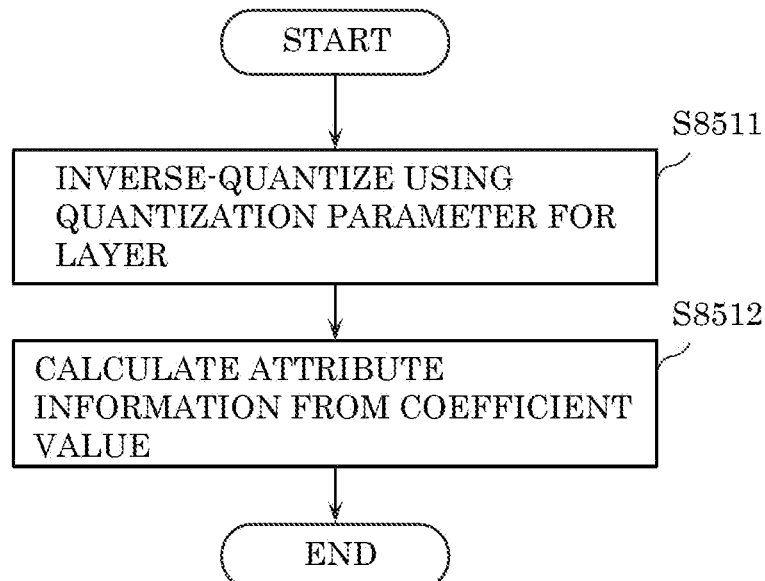
FIG. 113 is a flowchart of a three-dimensional data decoding process according to Embodiment 5.

A three-dimensional data decoding device according to one aspect of the present disclosure performs the process shown by FIG. 113. The three-dimensional data decoding device inverse quantizes quantization values to generate coefficient values, the quantization values being included in a bitstream (S8511); and calculates, from the coefficient values, pieces of attribute information of three-dimensional points included in point cloud data (S8512). The three-dimensional points corresponding to the coefficient values belong to one layer among one or more layers. Each of a predetermined number of layers among the one or more layers is assigned a quantization parameter for the layer. In the inverse quantizing (S8511), (i) when a quantization parameter is assigned to a layer to which each of the quantization values belongs, the quantization value is inverse quantized using the quantization parameter, and (ii) when the quantization parameter is not assigned to a layer to which each of the quantization values belongs, the quantization value is inverse quantized using a quantization parameter assigned to one layer among the predetermined number of the layers. According to the three-dimensional data decoding method, the quantization parameter can be changed for each layer, and therefore the decoding can be properly performed.

For example, the one layer is a last layer among the predetermined number of the layers.

For example, in the inverse quantizing, when a total number of the one or more layers is less than the predetermined number of the layers, quantization parameters assigned to the predetermined number of the layers and not corresponding to the one or more layers are not used.

For example, the bitstream includes first information indicating a reference quantization parameter, and pieces of second information for calculating quantization parameters for the one or more layers from the reference quantization parameter. For this reason, a bitstream whose coding efficiency has been improved can be decoded appropriately.

It should be noted that steps S8511, S8512, and S8513 correspond to the respective processes described in Embodiment 9.

For example, the three-dimensional data decoding device includes a processor and memory. Using the memory, the processor performs the above-described process.

A three-dimensional data encoding device according to another aspect of the present disclosure may perform steps S8501, S8502, and S8503 described with reference to FIG. 112, in the following manner. The three-dimensional data encoding device calculates coefficient values from pieces of attribute information of three-dimensional points included in point cloud data (S8501); quantizes the coefficient values to generate quantization values (S8502); and generates a bitstream including the quantization values (S8503). Each of the coefficient values belongs to one group among groups that is associated with, among three-dimensional spaces, a three-dimensional space to which a three-dimensional point having attribute information used to calculate the coefficient value belongs. In the quantizing (S8502), each of the coefficient values is quantized using a quantization parameter for the one group to which the coefficient value belongs. With this, since the three-dimensional data encoding device can change the quantization parameter for each group, the three-dimensional data encoding device is capable of performing encoding appropriately.

For example, the bitstream includes space information indicating, for each group, a reference point of a three-dimensional space corresponding to the group, and a size of the three-dimensional space corresponding to the group.

For example, the bitstream includes a flag indicating whether the space information and a quantization parameter for a group of three-dimensional spaces indicated by the space information are included.

For example, the three-dimensional data encoding device includes a processor and memory. Using the memory, the processor performs the above-described process.

A three-dimensional data decoding device according to another aspect of the present disclosure may performs steps S8511 and S8512 described with reference to FIG. 113, in the following manner. The three-dimensional data decoding device inverse quantizes quantization values to generate coefficient values, the quantization values being included in a bitstream (S8511); and calculates, from the coefficient values, pieces of attribute information of three-dimensional points included in point cloud data (S8512). Each of the quantization values belongs to one group among groups that is associated with, among three-dimensional spaces, a three-dimensional space to which a three-dimensional point having attribute information used to calculate the quantization value belongs. Each of a predetermined number of layers among the one or more layers is assigned a quantization parameter for the layer. In the inverse quantizing, each of the quantization values is inverse quantized using a quantization parameter for a layer to which the quantization value belongs.

For example, the bitstream includes space information indicating, for each group, a reference point of a three-dimensional space corresponding to the group, and a size of the three-dimensional space corresponding to the group.

For example, the bitstream includes a flag indicating whether the space information and a quantization parameter for a group of three-dimensional spaces indicated by the space information are included.

For example, the three-dimensional data decoding device includes a processor and memory. Using the memory, the processor performs the above-described process.

Embodiment 6

A quantization parameter (QP) used for quantizing a plurality of coefficient values calculated from a plurality of items of attribute information may be associated in advance with a group corresponding to a three-dimensional space (region) to which three-dimensional points having the plurality of items of attribute information belong. Note that the plurality of three-dimensional points may include a three-dimensional point that does not belong to the group. The attribute information of the three-dimensional point that does not belong to the group is quantized using a predetermined quantization parameter. The predetermined quantization parameter is a quantization parameter set as an initial value and may be a fixed value. In this way, each item of attribute information is quantized using a quantization parameter associated with a group when the three-dimensional point having the attribute information belongs to the group, and is quantized using a predetermined quantization parameter when the three-dimensional point having the attribute information does not belong to any group.

In this case, when the plurality of coefficient values are calculated by generating a hierarchical structure in which each of the plurality of items of attribute information is hierarchically divided into a high-frequency component and a low-frequency component, a coefficient value of a higher layer is calculated using two or more items of attribute information. Two or more three-dimensional points having these two or more items of attribute information may belong to different three-dimensional spaces, and in that case, the two or more items of attribute information are assigned with a plurality of different quantization parameters. Therefore, a quantization parameter used for quantization of a coefficient value of a higher layer can be determined using the plurality of quantization parameters.

Figure 114:
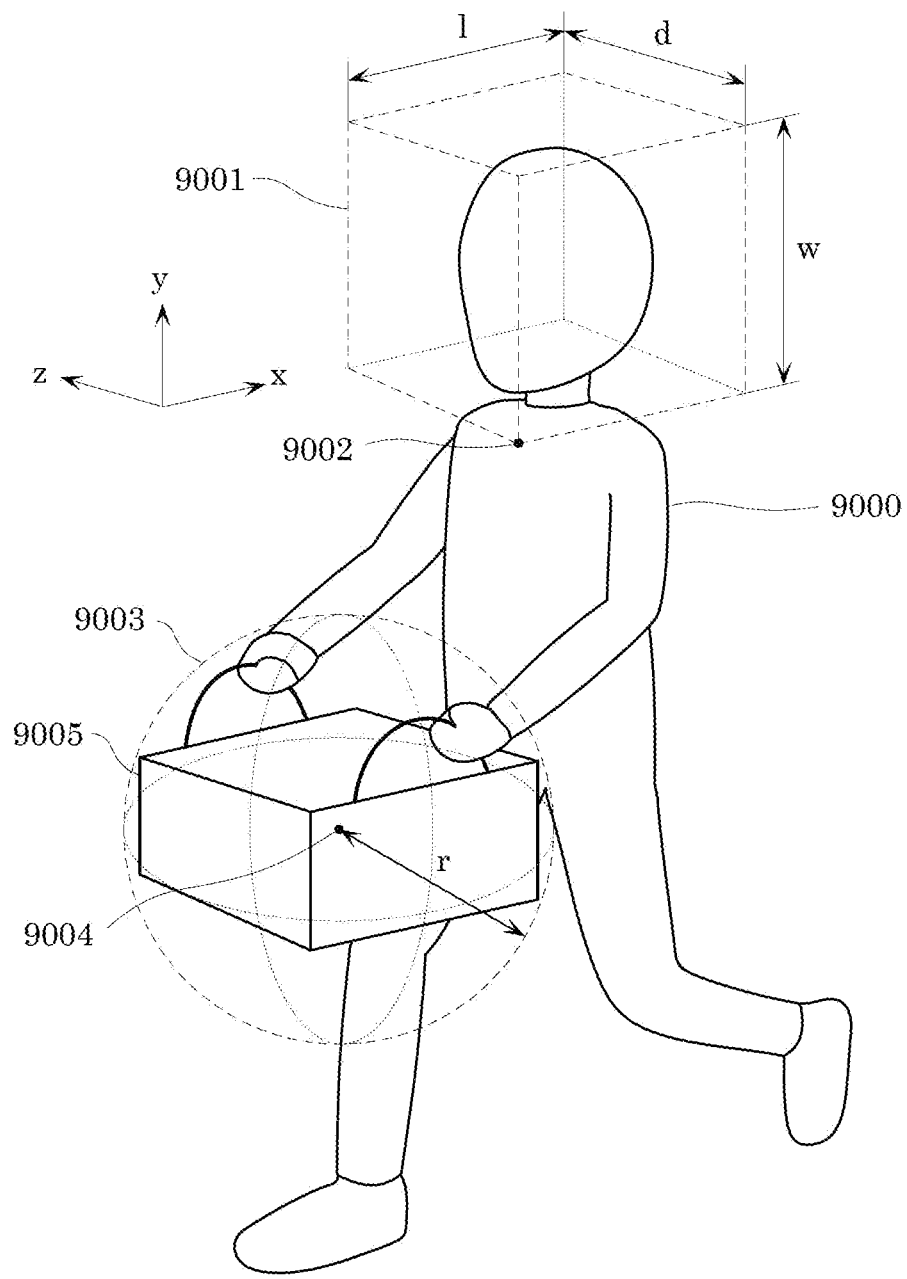
FIG. 114 is a diagram for illustrating an example of three-dimensional spaces to which a three-dimensional point cloud of a three-dimensional model according to Embodiment 6.

FIG. 114 is a diagram for illustrating an example of three-dimensional spaces to which a three-dimensional point cloud of three-dimensional model 9000 belongs.

The importance and the image quality (quality) of a three-dimensional point cloud forming three-dimensional model 9000 of a person are evaluated in different manners based on geometry information with respect to a center point of interest, as with the amount of detail information and the data amount of the three-dimensional point cloud.

For example, a face region of a person has high importance and therefore needs to have high quality. By setting the quantization parameter used in encoding of a three-dimensional point cloud included in three-dimensional space 9001 having the shape of a rectangular parallelepiped to be a smaller value, the quality of a three-dimensional model of the face region of the person can be improved. As shown in the syntax in FIG. 115, for example, three-dimensional space 9001 is defined by the coordinates (x1, y1, z1) of origin 9002 of three-dimensional space 9001, and the length, the width, and the depth of three-dimensional space 9001. FIG. 115 shows an example of a syntax of a header of attribute information.

In FIG. 115, the coordinates of origin 9002 are represented by origin_x[i], origin_y[i], and origin_z[i]. The length of three-dimensional space 9001 is represented by length[i], the width of three-dimensional space 9001 is represented by width[i], and the depth of three-dimensional space 9001 is represented by depth[i]. ADelta_QP is a value that defines a delta QP value (difference) with respect to QP of the original slice, and may be a negative value in order to improve the image quality (quality) or a positive value in order to increase the compression rate, depending on the use scenario.

The three-dimensional space (delta_QP region) corresponding to a group with which a quantization parameter is associated is not limited to three-dimensional space 9001 having the shape of a rectangular parallelepiped described above. For example, the three-dimensional space may be three-dimensional space 9003 having a spherical shape. Three-dimensional space 9003 is defined by coordinates (x2, y2, z2) of origin 9004 of three-dimensional space 9003 and radius r of the sphere of three-dimensional space 9003 centered on origin 9004. In FIG. 114, for example, three-dimensional space 9003 may be set to include a three-dimensional model of package 9005 carried by the person.

A three-dimensional space (delta_QP region) corresponding to a group can be defined in any way as far as the three-dimensional space is a fixed region of interest in which a quantization parameter is required to be adjusted in order to adapt to a desired image quality or obtain higher bit/point performance. Note that three-dimensional space 9003 is represented by the syntax in FIG. 111. In FIG. 111, the coordinates of origin 9004 are represented by center_x[i], center_y[i], and center_z[i]. Radius r is represented by radius[i].

Figure 116:
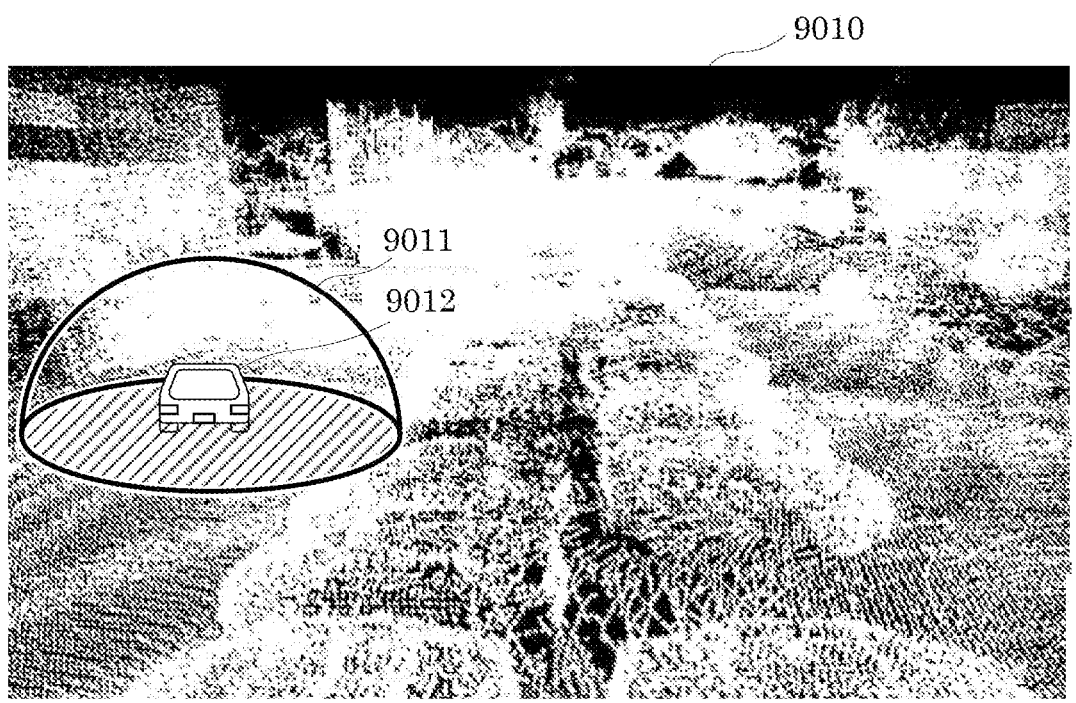
FIG. 116 is a diagram for illustrating another example of a three-dimensional space to which a three-dimensional point cloud belongs according to Embodiment 6.
Figure 117:
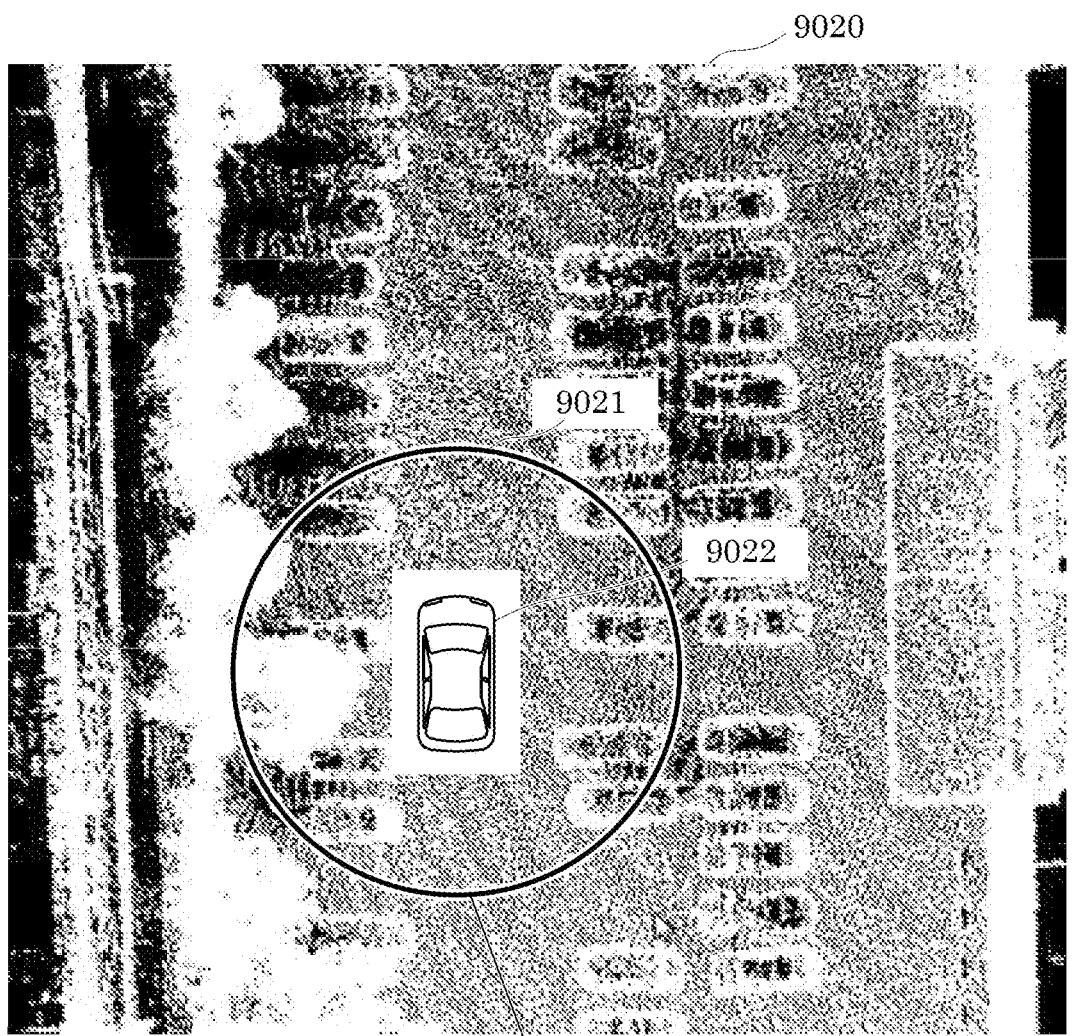
FIG. 117 is a diagram for illustrating another example of the three-dimensional space to which a three-dimensional point cloud belongs according to Embodiment 6.

FIG. 116 and FIG. 117 are diagrams for illustrating another example of a three-dimensional space to which a three-dimensional point cloud belongs.

FIG. 116 shows an example in which, in three-dimensional point cloud data 9010 obtained by scanning by LiDAR, three-dimensional space 9011 having a 360-degree hemispherical shape around vehicle 9012 is set as a region of interest in a three-dimensional space. Three-dimensional space 9011 may be set in such a manner that the center of vehicle 9012 viewed from above agrees with the center of the bottom face of the hemisphere. The bottom face of three-dimensional space 9011 is a road surface of a road, for example. Three-dimensional space 9011 is set to be hemispherical because the three-dimensional point cloud data obtained by scanning the object on the road by LiDAR includes no point cloud data below the road. Three-dimensional space 9011 is a peripheral region of vehicle 9012 and has high importance. Therefore, to ensure more detailed information, the delta QP value may be set to be a negative value.

FIG. 117 shows an example in which, in three-dimensional point cloud data 9020 obtained by scanning by LiDAR, three-dimensional space 9021 having a 360-degree cylindrical shape around vehicle 9022 is set as a region of interest in a three-dimensional space. In this way, three-dimensional space 9021 having a cylindrical shape, rather than the three-dimensional space having a hemispherical shape in FIG. 116, may be set in such a manner that the center of vehicle 9022 viewed from above agrees with the center of the bottom face of the cylindrical shape.

FIG. 118 shows an example of a syntax of a header of attribute information in the case where a three-dimensional space having a cylindrical shape is set.

Three-dimensional space 9021 is defined by coordinates (origin_x[i], origin_y[i], and origin_z[i]) of the origin, which is the coordinates of the center of the bottom face of three-dimensional space 9021, parameter1[i] indicating radius r of the bottom face of the circle, and parameter2[i] indicating height h of the cylinder. The syntax of the header may further include a kind of the shape of the three-dimensional space. In this way, the syntax of the header shows that a region of interest of any shape and size can be arbitrarily defined, and a parameter of each shape can be defined in advance.

Note that, when the shape of the three-dimensional space is a hemispherical shape, the hemisphere is defined by the coordinates of the origin and the radius of the hemisphere centered on the origin, as with the spherical shape.

Figure 119:
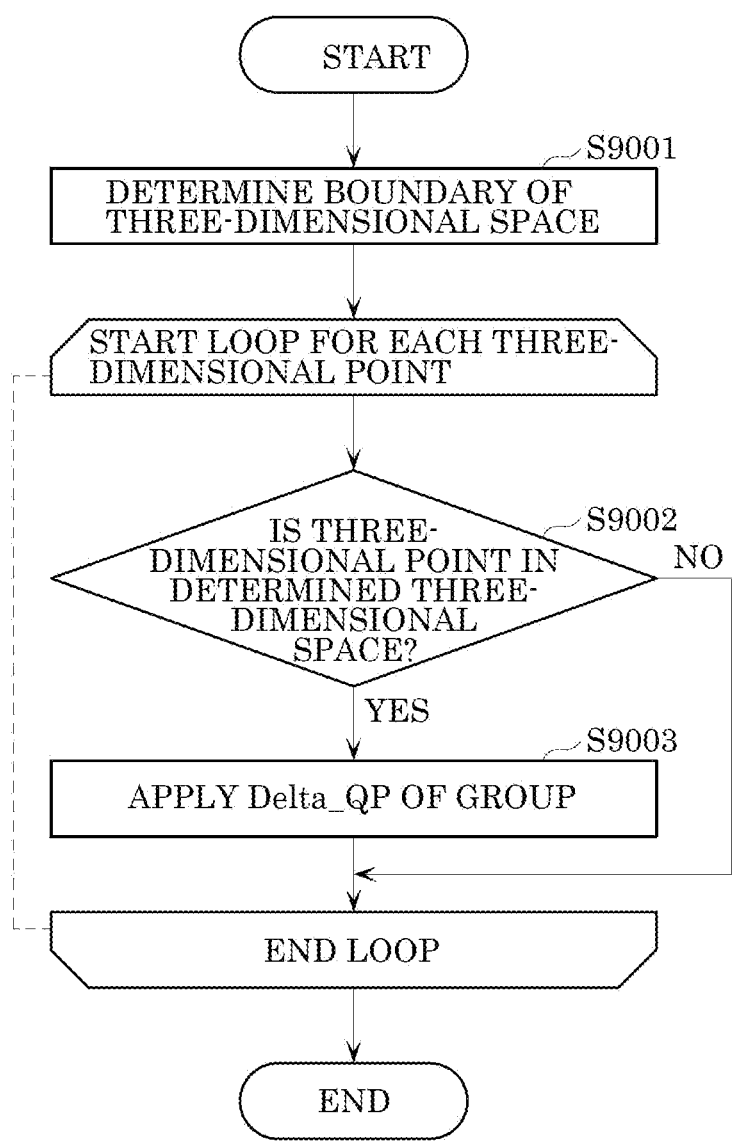

FIG. 119 is a flowchart showing an example of a process of applying a different quantization parameter for each three-dimensional space.

First, the three-dimensional data encoding device determines a boundary of a three-dimensional space for classifying a three-dimensional point cloud into a group with which a quantization parameter is associated (S9001). Specifically, a boundary is determined based on the origin of the three-dimensional space and the size of the three-dimensional space that are included in the syntax of the header of the attribute information illustrated above. At this point, if the kind of the shape of the three-dimensional space has been set, the kind of the shape may be used.

The three-dimensional data encoding device then performs a loop for each of a plurality of three-dimensional points included in the point cloud data. The loop includes step S9002 and step S9003.

In the loop, the three-dimensional data encoding device first determines whether a three-dimensional point to be processed is in the determined three-dimensional space or not (S9002). For example, the three-dimensional data encoding device uses a check function to determine whether a three-dimensional point to be processed belongs to the particular three-dimensional space associated with Delta_QP or not. If a plurality of three-dimensional spaces are determined, the three-dimensional data encoding device checks the three-dimensional point to be processed against the boundary of each of the plurality of determined three-dimensional regions. The check function includes a MIN/MAX function that determines whether the three-dimensional point to be processed is equal to or greater than the determined boundary or equal to or smaller than the determined boundary. The MIN/MAX function is performed separately for each of the x axis, the y axis, and the z axis, and outputs a value that indicates the inside or outside of the boundary of the three-dimensional space. For example, the MIN/MAX function outputs any of two values, 0 or 1, as a result. In this way, the three-dimensional space to which the three-dimensional point to be processed belongs is determined. Note that the three-dimensional data encoding device may determine that there is no three-dimensional space to which the three-dimensional point to be processed belongs.

When it is determined that the three-dimensional point to be processed is in the determined three-dimensional space (if Yes in S9002), the three-dimensional data encoding device applies Delta_QP of the group associated with the determined three-dimensional space to calculate a quantization parameter, and encodes attribute information on the three-dimensional point to be processed using the calculated quantization parameter (S9003).

When it is determined that the three-dimensional point to be processed is not in the determined three-dimensional space (if No in S9002), the three-dimensional data encoding device skips step S9003.

Once step S9002 and S9003 for the three-dimensional point to be processed ends, step S9002 and step S9003 are performed for a next three-dimensional point yet to be processed that is not subjected to the loop.

The region-based adjustment of Delta_QP differs from the tile-based or slice-based adjustment of Delta_QP in that the encoding process continues, and there is no new setting from the slide header that breaks the continuity of the reference in the three-dimensional point cloud. Therefore, a more efficient prediction algorithm can be implemented, and the encoding performance can be improved.

When a three-dimensional point cloud is divided into a plurality of sub-point clouds, such as tiles and slices, and different sub-point clouds have different quantization parameters, reference between sub-point clouds is often prohibited, so that the prediction efficiency may decrease, and therefore the encoding efficiency may decrease. On the other hand, when the present approach is used, reference between three-dimensional points is not prohibited, and different quantization parameters can be assigned to three-dimensional points, so that quantization parameters can be more finely adjusted while maintaining the encoding efficiency.

Figure 120:
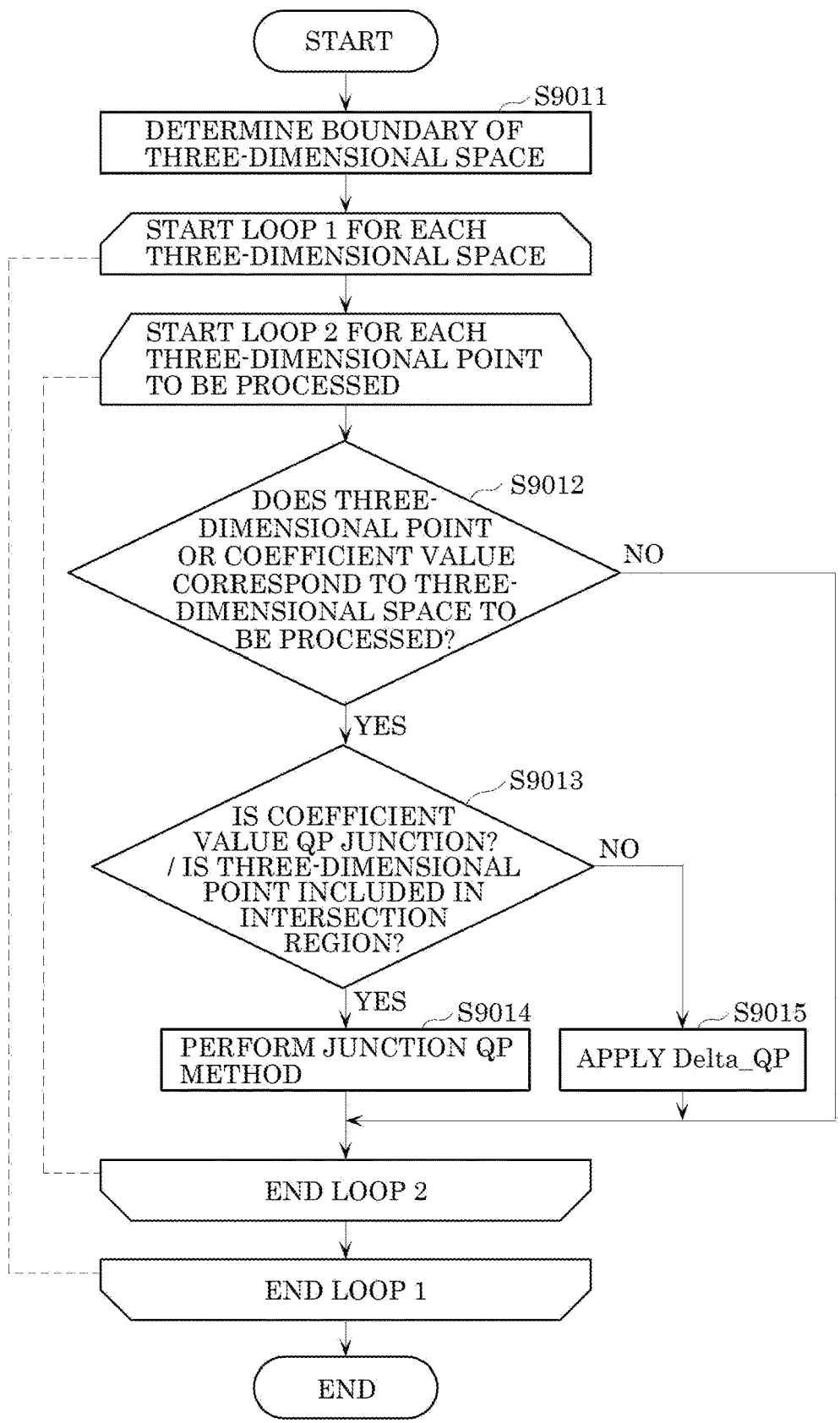

FIG. 120 is a flowchart showing another example of the process of applying a different quantization parameter for each three-dimensional space.

First, the three-dimensional data encoding device determines a boundary of one or more three-dimensional spaces for classifying a three-dimensional point cloud into a group with which a quantization parameter is associated (S9011). Step S9011 is the same processing as step S9001.

The three-dimensional data encoding device then performs loop 1 for each of the plurality of three-dimensional spaces determined. Loop 1 includes loop 2. The three-dimensional data encoding device performs loop 2 for each of a plurality of three-dimensional points included in the point cloud data. Loop 2 includes steps S9012 to S9015. Note that when a plurality of coefficient values to be quantized are calculated based on a plurality of items of attribute information, loop 2 may be performed for each of the plurality of coefficient values.

In loop 2, the three-dimensional data encoding device first determines whether a three-dimensional point to be processed or a coefficient value to be processed corresponds to the determined three-dimensional space to be processed or not (S9012). When what is to be processed is a three-dimensional point, step S9012 is the same processing as step S9002. When what is to be processed is a coefficient value, the three-dimensional data encoding device determines one or more items of attribute information from which the coefficient value has been calculated, and determines whether the three-dimensional space to which each of one or more three-dimensional points having the determined one or more items of attribute information belongs includes the three-dimensional space to be processed or not. When the three-dimensional space to which each of the one or more three-dimensional points belongs includes the three-dimensional space to be processed, the three-dimensional data encoding device determines that the coefficient value to be processed corresponds to the three-dimensional space to be processed. To the contrary, when the three-dimensional space to which each of the one or more three-dimensional points belongs does not include the three-dimensional space to be processed, the three-dimensional data encoding device determines that the coefficient value to be processed does not correspond to the three-dimensional space to be processed. Here, the method of determining the three-dimensional space to which each of the one or more three-dimensional points belongs can be the same method in step S9002.

When it is determined that the three-dimensional point to be processed or the coefficient value to be processed corresponds to the three-dimensional space to be processed (if Yes in S9012), the three-dimensional data encoding device then determines whether the three-dimensional point to be processed is included in an intersection region or not or whether the coefficient value to be processed is a value of a QP junction or not (S9013). The intersection region is a region where a plurality of three-dimensional spaces overlap with each other. The QP junction will be described later.

When the three-dimensional point to be processed is included in an intersection region, or when the coefficient value to be processed is a value of a QP junction, the three-dimensional data encoding device (if Yes in S9013), the three-dimensional data encoding device performs a junction QP method to calculate Delta_QP to be applied, and encodes the attribute information on the three-dimensional point to be processed or the coefficient value to be processed using a quantization parameter based on the calculated Delta_QP (S9014). Specific examples of the junction QP method will be described later.

When the three-dimensional point to be processed is not included in an intersection region, or when the coefficient value to be processed is not a value of a QP junction (if No in S9013), the three-dimensional data encoding device applies Delta_QP of the group associated with the three-dimensional space determined for the three-dimensional point to be processed or the coefficient value to be processed to calculate a quantization parameter, and encodes the attribute information on the three-dimensional point to be processed using the calculated quantization parameter (S9015).

When it is determined that the three-dimensional point to be processed or the coefficient value to be processed does not correspond to the three-dimensional space to be processed (if No in S9012), the three-dimensional data encoding device skips steps S9013 to S9015.

Once step S9012 and S9015 for the three-dimensional point or coefficient value to be processed ends, steps S9012 to S9015 are performed for a next three-dimensional point yet to be processed that is not subjected to loop 2.

Once loop 2 for the three-dimensional space to be processed ends, loop 1 is performed for a next three-dimensional space yet to be processed that is not subjected to loop 1. The three-dimensional point or coefficient value to be processed in loop 2 in next loop 1 may be a three-dimensional point or coefficient value for which the result of the determination of step S9012 in a previous process is negative.

The region-based adjustment of Delta_QP differs from the tile-based or slice-based adjustment of Delta_QP in that the encoding process continues, and there is no new setting from the slide header that breaks the continuity of the reference in the three-dimensional point cloud. Therefore, a more efficient prediction algorithm can be implemented, and the encoding performance can be improved.

Each three-dimensional point may belong to a plurality of three-dimensional spaces. That is, each three-dimensional point may be included in an intersection region, in which a plurality of three-dimensional spaces overlap with each other. In that case, for all the values Delta_QP (or quantization parameters) associated with all the three-dimensional spaces to which the three-dimensional point belongs, a minimum value, a maximum value, an average value, or a sum of all the values Delta_QP may be used as Delta_QP of the three-dimensional point. In this way, a quantization parameter used for encoding a three-dimensional point in a particular region in a three-dimensional space can be more flexibly controlled.

In encoding of attribute information by point cloud compression (PCC), in order to achieve high compression, a transform method, such as predictive/lifting transform and region adaptive hierarchical transform (RAHT), is used. A transform function takes two or more nodes, and divides the energy level of attribute information into a high-frequency component and a low-frequency component. In this way, the value of the higher-frequency component is quantized, and a residual is encoded after high-frequency noise is removed by this processing. The low-frequency component is carried to a higher next layer.

Figure 121:
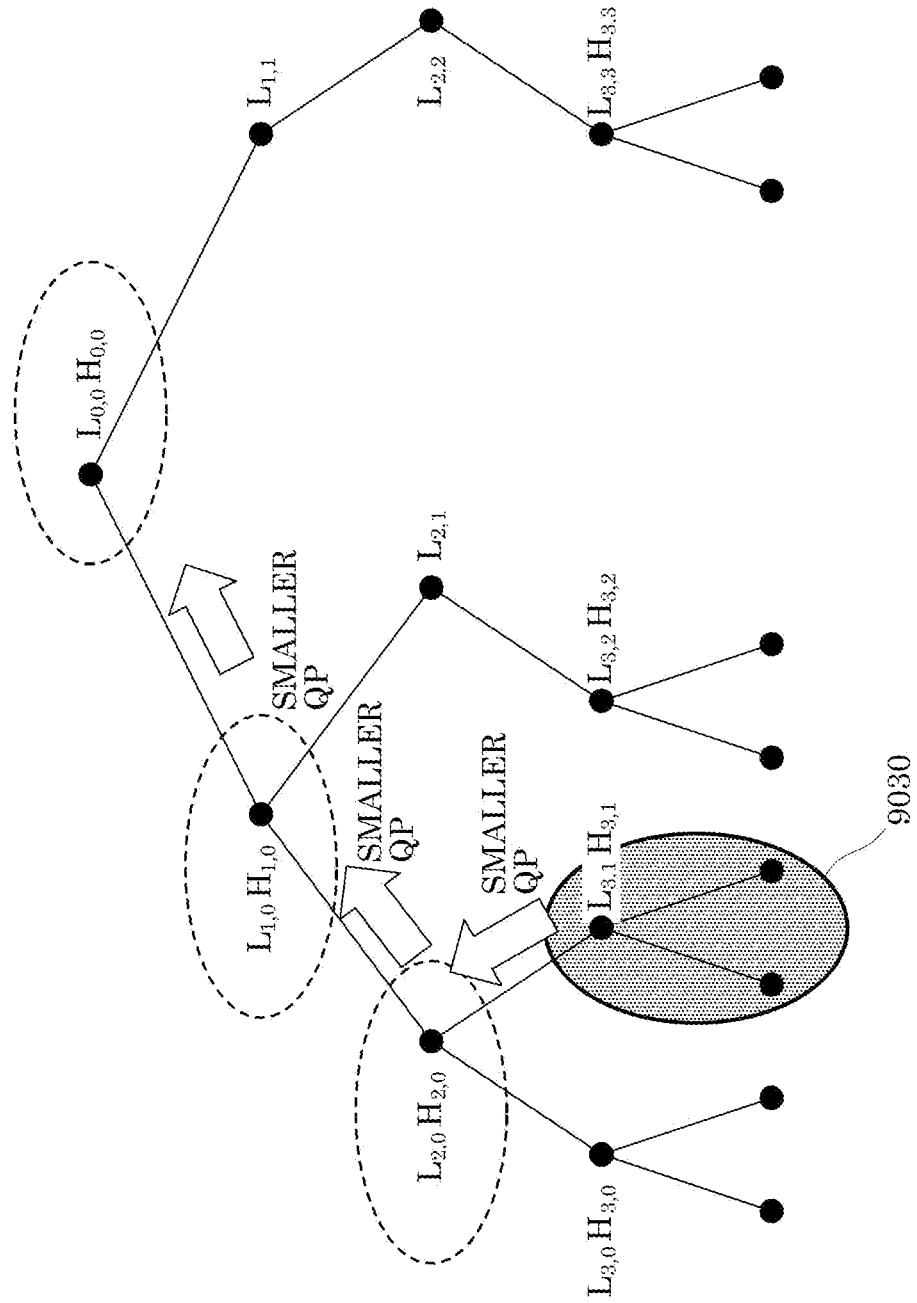

FIG. 121 is a diagram for illustrating a first example of the encoding of attribute information using RAHT.

In this case, the three-dimensional data encoding device generates a RAHT hierarchical structure shown in FIG. 121 for a plurality of three-dimensional points. Specifically, the three-dimensional data encoding device calculates Haar-transformed encoding coefficients by applying a Haar transform on two items of attribute information that are adjacent in a predetermined order (such as the order of Morton codes) among a plurality of items of attribute information on a plurality of input three-dimensional points to generate attribute information of a higher layer and repeating such generation. The three-dimensional data encoding device then generates a bitstream including the calculated encoding coefficients.

In such a RAHT example, a selected number of nodes in a previously defined region are set by a negative delta QP value. As quantization and RAHT proceeds up in the hierarchical structure, for example, node $L_{2,0}H_{2,0}$ is calculated using node $L_{3,0}H_{3,0}$ and node $L_{3,1}H_{3,1}$. In this case, for the quantization of node $L_{2,0}H_{2,0}$, a first delta QP (or first QP value) applied to node $L_{3,0}H_{3,0}$ and a second delta QP (or second QP value) applied to node $L_{3,1}H_{3,1}$ can be used. For example, two three-dimensional points having two items of attribute information used for calculation of node $L_{3,1}H_{3,1}$ belong to region 9030, and region 9030 is associated with the second delta QP. Region 9030 is a region defined by any of the three-dimensional spaces for classification into a group associated with a QP value described above with reference to FIG. 114 to FIG. 118.

A node higher than nodes for which two different QP values are set as described above is referred to as a QP junction. When the first delta QP is a normal value, and the second delta QP is set to be a negative value as described above, the three-dimensional data encoding device may adopt the smaller delta QP as a delta QP to be used for the quantization of node $L_{2,0}H_{2,0}$. In this way, in the RAHT hierarchical structure, as a QP value for the quantization of a coefficient value of a node higher than two lower nodes for which two different QP values are set, the three-dimensional data encoding device adopts the smaller of the two QP values of the lower nodes. The three-dimensional data encoding device then quantizes the coefficient value of the node using the adopted QP value. Note that the three-dimensional data encoding device may adopt a minimum QP value as a QP value of a higher node, rather than adopting the smaller QP value of two QP values of the lower nodes.

In this example, a selected appropriate method sets a smaller QP value to maintain the highest quality and therefore can reduce the loss of the low-frequency component transferred to the next layer.

There are many methods of determining the QP value applied to the QP junction node. However, the same method needs to be used for both the encoding process and the decoding process. There is also a method that does not need any modification to the RAHT encoding process or RAHT decoding process, in addition to the method that adopts, for a higher node, the smaller QP value of two QP values used for two lower layers described with reference to FIG. 121.

Figure 122:
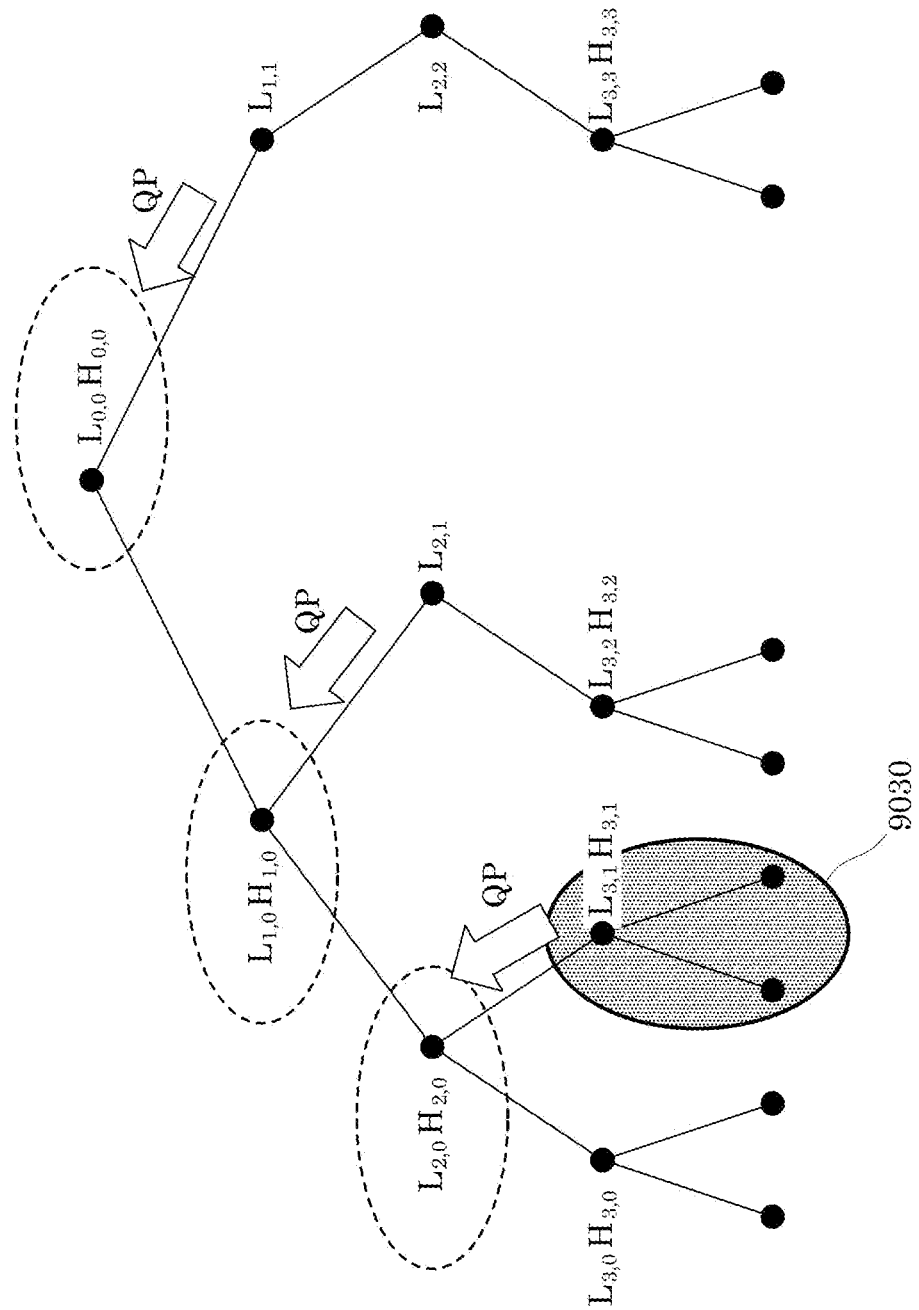

FIG. 122 is a diagram for illustrating a second example of the encoding of attribute information using RAHT.

A RAHT hierarchical structure will be discussed in which items of attribute information are arranged from left to right in the order of Morton codes as shown in FIG. 122. In this case, at a QP junction node, the three-dimensional data encoding device may adopt a QP value applied to a node located on the right side among two lower nodes as a QP value used for the quantization of a coefficient value of the QP junction node.

Note that although FIG. 122 shows an example in which the QP value assigned to the node located on the right side in the order of Morton codes is always applied to the node in the higher layer, the present disclosure is not necessarily limited thereto. For example, the QP value assigned to the node located on the left side in the order of Morton codes may be always adopted as a QP value used for the quantization of a coefficient value of the node in the higher layer.

As described above, the three-dimensional data encoding device can adopt the QP value applied to the node on the right or left side among the two lower nodes as a QP value of the higher node, and therefore does not need to choose, for each QP junction, which of the QP value of the lower node on the right side and the QP value of the lower node on the left side should be applied to the higher node. Therefore, the three-dimensional data encoding device can pass, to a higher node, the QP value assigned to a lower node while reducing the processing amount involved with the choice.

Figure 123:
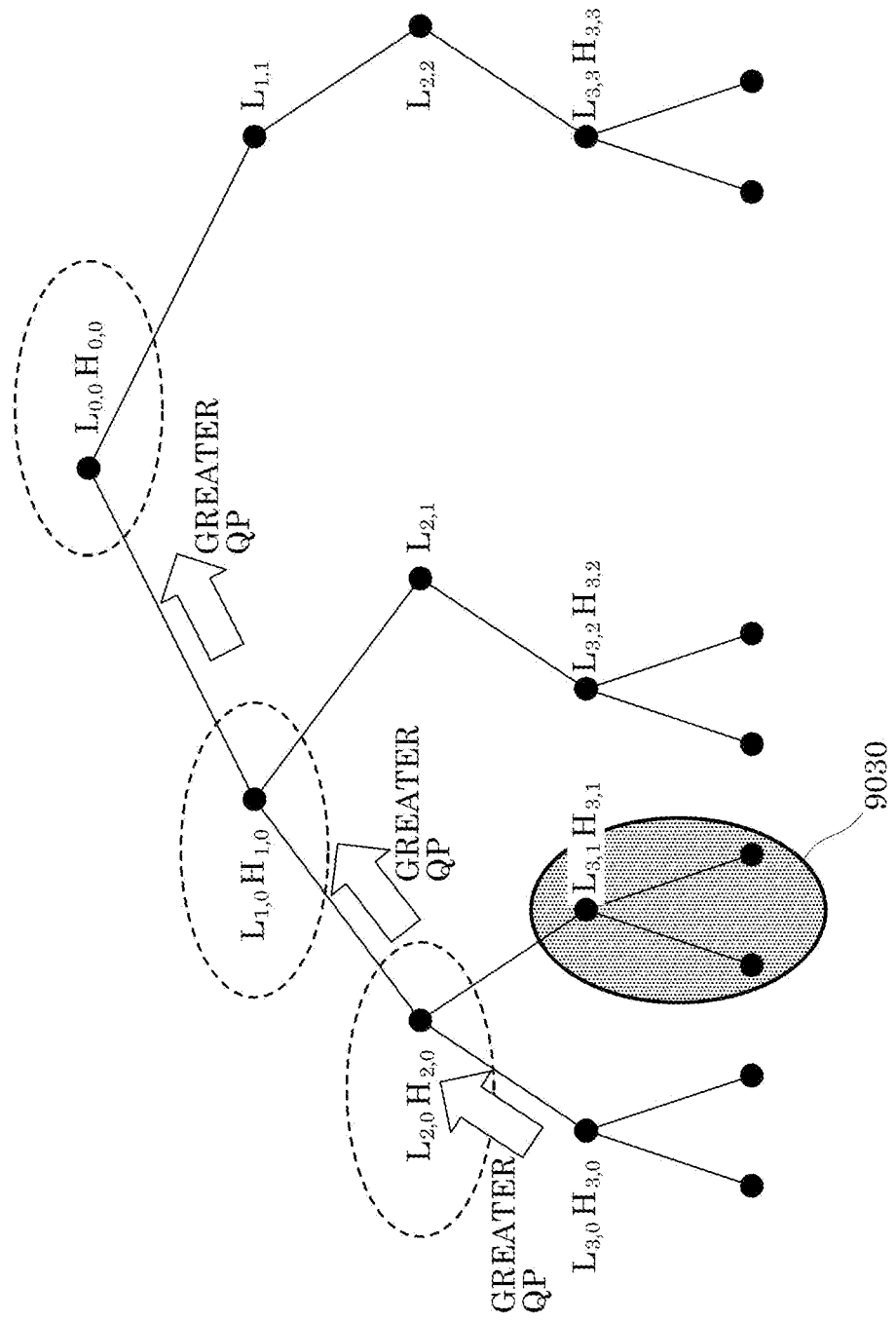

FIG. 123 is a diagram for illustrating a third example of the encoding of attribute information using RAHT.

Contrary to the first example, in the RAHT hierarchical structure, as a QP value for the quantization of a coefficient value of a node higher than two lower nodes for which two different QP values are set, the three-dimensional data encoding device may adopt the greater of the two QP values of the lower nodes. In this way, compression performance can be ensured while specially controlling the encoding efficiency of the three-dimensional point cloud in region 9030 having Delta_QP. Note that the three-dimensional data encoding device may adopt a maximum QP value as a QP value of a higher node, rather than adopting the greater QP value of two QP values of the lower nodes.

Figure 124:
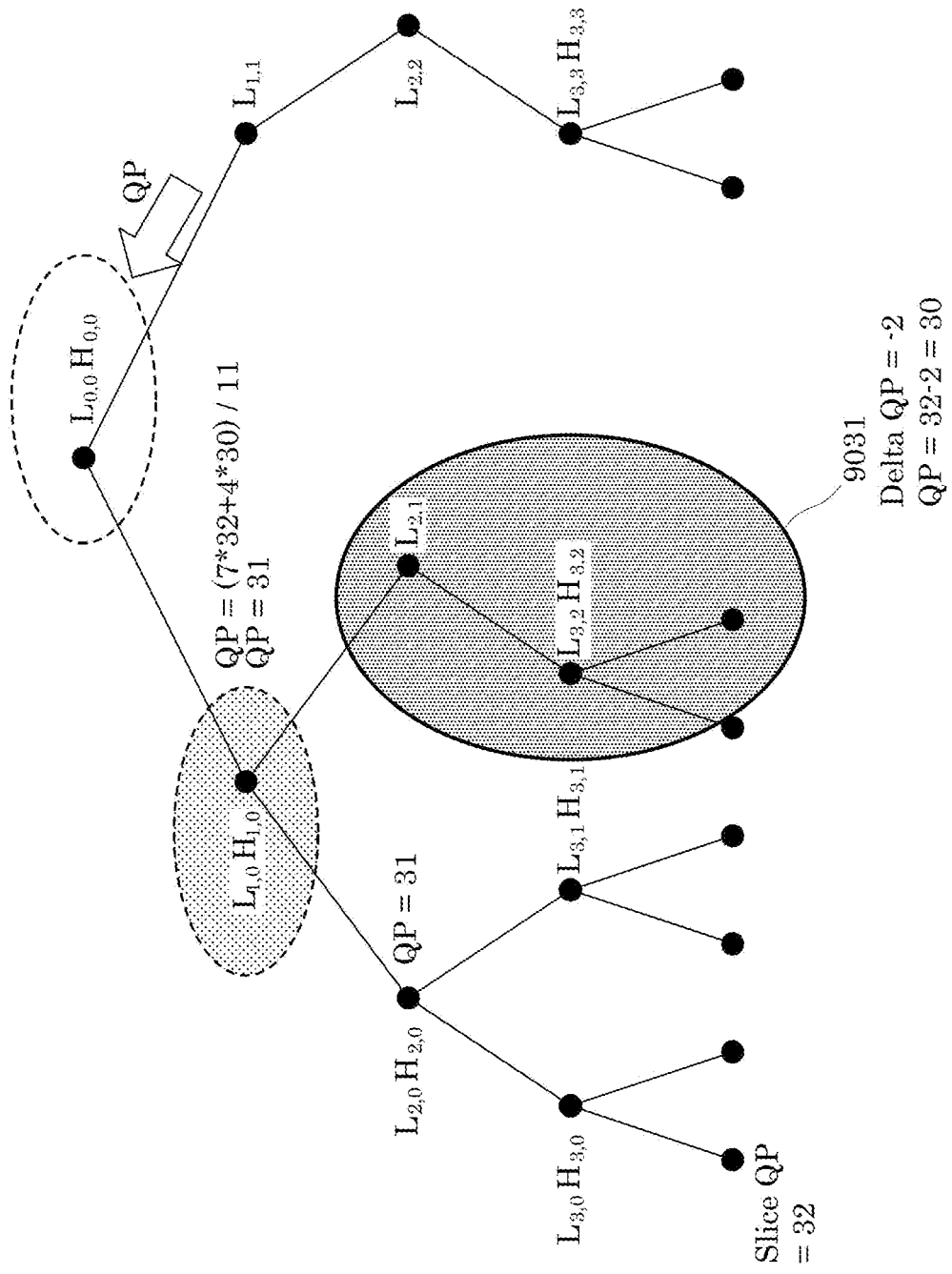

FIG. 124 is a diagram for illustrating a fourth example of the encoding of attribute information using RAHT.

In the fourth example, the three-dimensional data encoding device may calculate two QP values of lower nodes by weighted averaging, and adopt the result of the weighted averaging as a QP value of a higher node. In FIG. 124, the QP value of node $L_{2,0}H_{2,0}$, which is a lower node of node $L_{1,0}H_{1,0}$ for which an example calculation of the QP value applied to node $L_{1,0}H_{1,0}$ is shown, is 31, and the delta QP value of node $L_{2,1}$, which is also a lower node, is set to be −2. The slice QP value of a node on the left side of region 9031 to which node $L_{2,1}$ belongs is 32, and the QP value applied to node $L_{2,1}$ can be calculated with respect to the slice QP value. Specifically, the QP value applied to node $L_{2,1}$ is 30, which is the sum of the slice QP value of the node on the left side of region 9031 and the delta QP value of region 9031 to which node $L_{2,1}$ belongs.

The three-dimensional data encoding device then determines a weighting factor of the weighted averaging. For example, the three-dimensional data encoding device may determine a weighting factor of the weighted averaging based on the number of lower nodes including node $L_{2,0}H_{2,0}$ and the number of lower nodes including node $L_{2,1}$. The number of the lower nodes including node $L_{2,0}H_{2,0}$ is 7, and the number of the lower nodes including node $L_{2,1}$ is 4. Therefore, the QP value applied to node $L_{1,0}H_{1,0}$ is calculated to be 31 according to the following equation.

$QP=(7*32+4*30)/11=31$

In this way, the QP value applied to a QP junction node is calculated by weighted averaging using, as a weight, the number of the child nodes of a lower node including the lower node itself. When the calculation result is a decimal number, an integer value obtained by rounding up the decimal number is adopted as a QP value.

Figure 125:
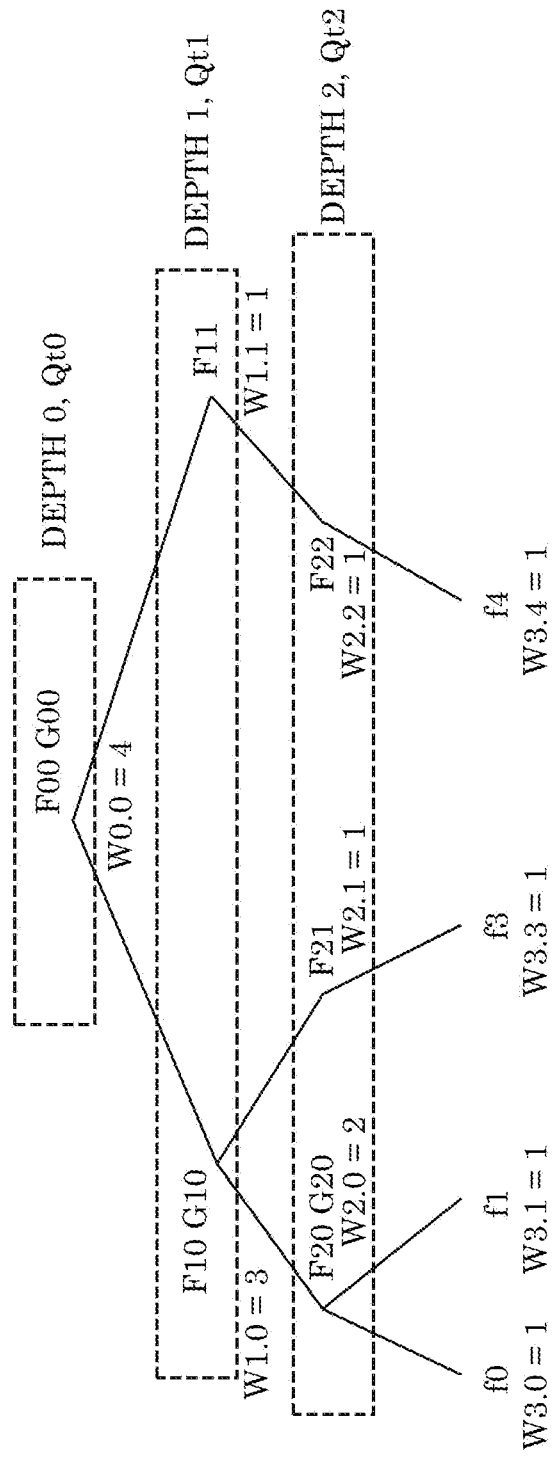

FIG. 125 is a diagram showing an example of a RAHT hierarchical structure (tree structure). For example, as shown in FIG. 125, independent values Qt0 to Qt2 are set for different depths in the tree structure. As shown in FIG. 125, in the RAHT hierarchical structure, weights W0.0, W1.0, W1.1, W3.0, W3.1, W3.3, and W3.4 for nodes are set, and these weights W0.0, W1.0, W1.1, W3.0, W3.1, W3.3, and W3.4 may be used as weighting factors of the weighted averaging in the fourth example.

Figure 126:
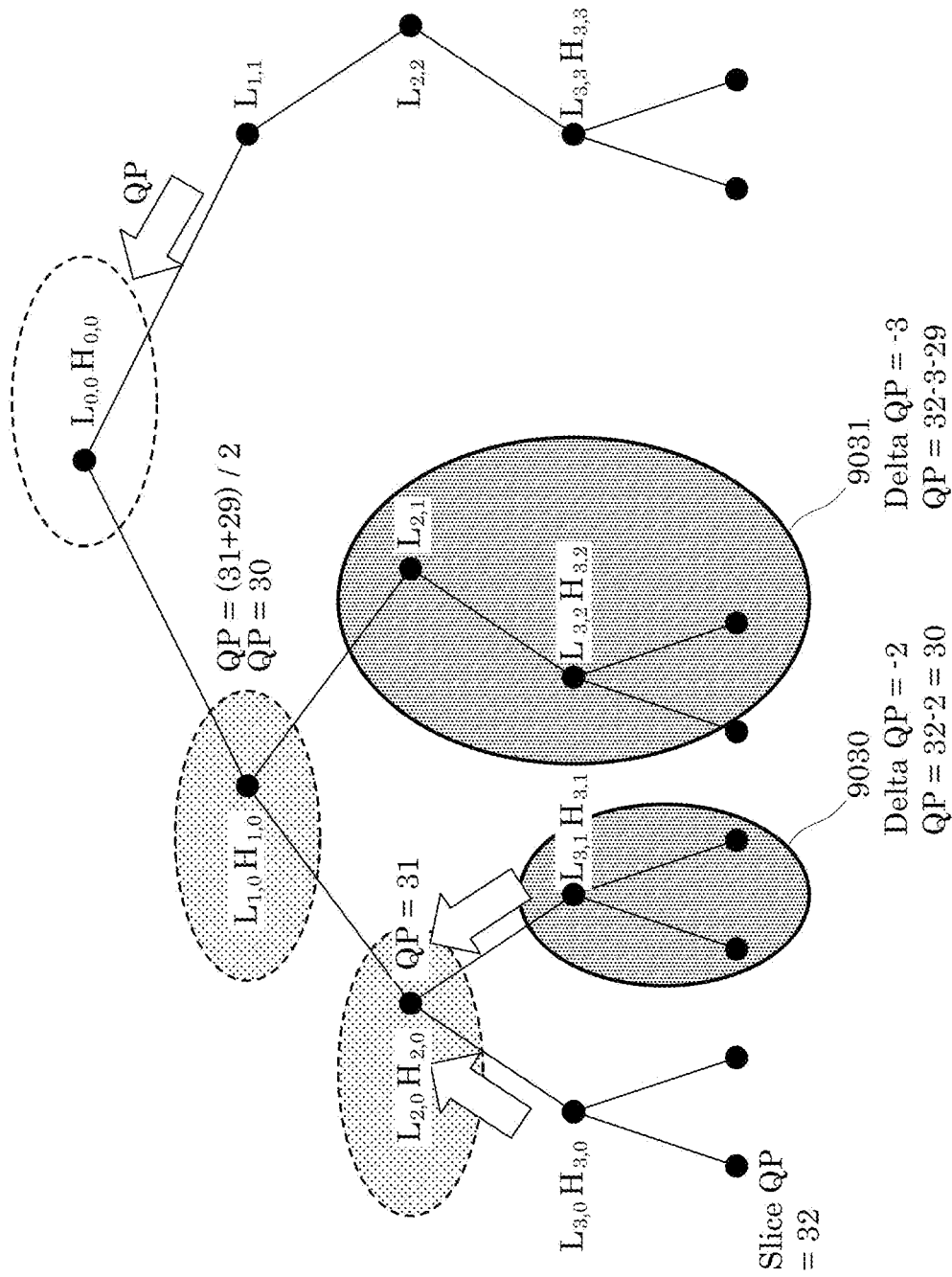

FIG. 126 is a diagram for illustrating a fifth example of the encoding of attribute information using RAHT.

In the fifth example, the three-dimensional data encoding device may adopt an average of two QP values of lower nodes as a QP value of a higher node. In FIG. 126, for example, the QP value applied to node $L_{2,0}H_{2,0}$ is calculated to be 31, which is an average of the QP value (=32) of node $L_{3,0}H_{3,0}$, which is a node lower than the node, and the QP value (=30) of node $L_{3,1}H_{3,1}$, which is also a node lower than the node. For example, the QP value applied to node $L_{1,0}H_{1,0}$ is calculated to be 30, which is an average of the QP value (=31) of node $L_{2,0}H_{2,0}$ which is a node lower than the node, and the QP value (=29) of node $L_{2,1}$, which is also a node lower than the node.

As described above, in the quantization, the three-dimensional data encoding device may calculate an average of two QP values assigned to two coefficient values of a lower layer, and adopt the average as a QP value used for quantization of a coefficient value of a higher layer.

In the case of the fifth example, an average of the QP values assigned to two lower nodes is used as a QP value of a higher node regardless of the number of nodes, the load of the calculation process for the QP value of the higher node can be reduced, and the calculation process can be quickly performed, compared with the fourth example. Compression efficiency can also be improved. In addition, the reduction of the quality of attribute information can be reduced.

Figure 127:
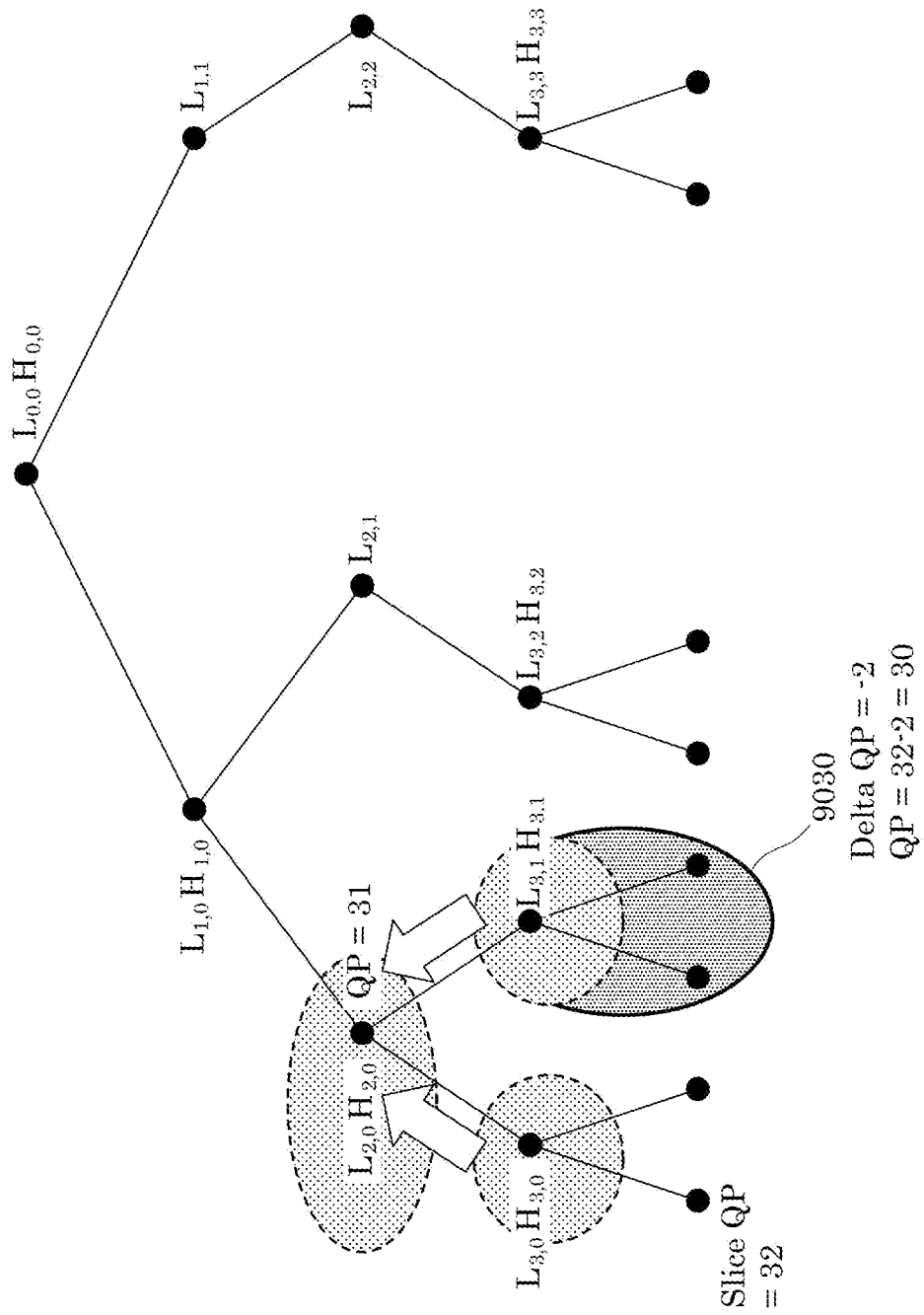

There is also an algorithm that is calculation based on the position of a new node calculated from two points input to the RAHT hierarchical structure and that is suitable for efficient calculation of the QP value applied to a QP junction node. As shown in FIG. 127, a delta QP may be selected based on the calculated position of a new node. When the QP junction node is closer to the left node, the QP value is more strongly affected by the left node.

Figure 128:
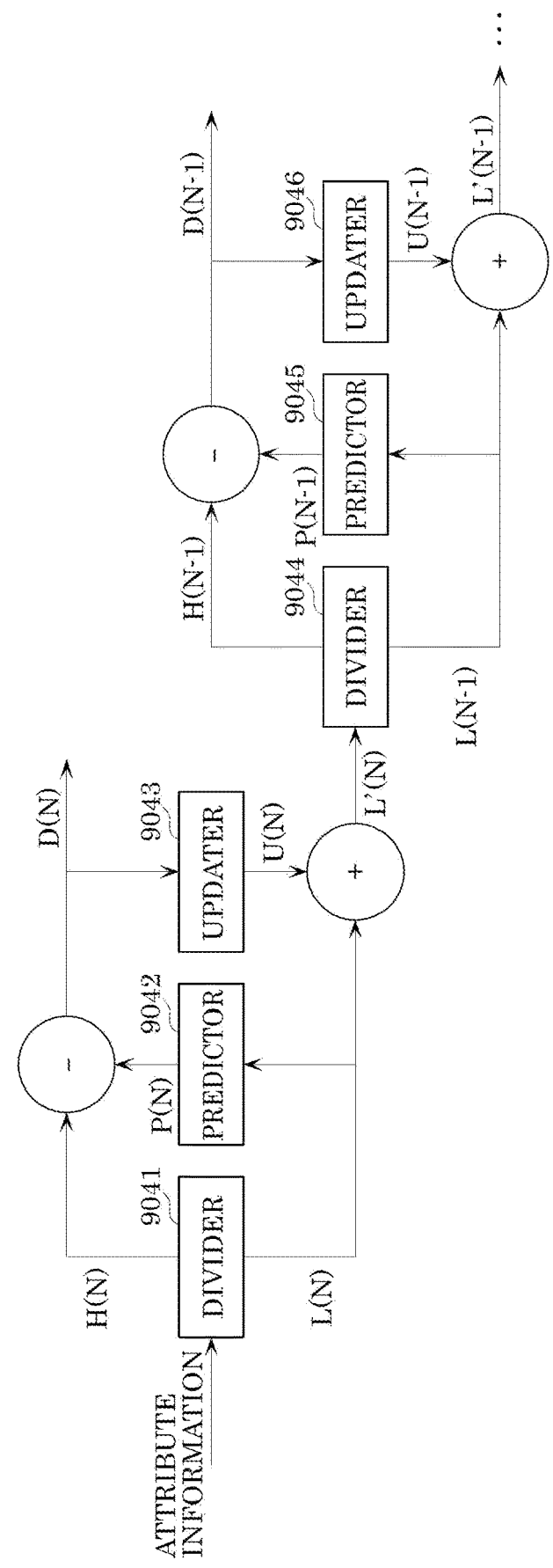

FIG. 128 is a block diagram showing an example of a processor that performs an attribute information encoding process.

The method of calculating the QP value applied to a QP junction node according to RAHT can be applied or adapted to another attribute transform when the QP needs to be calculated on a level/layer basis. Note that the present disclosure is not limited thereto and shows that the calculation method can be applied to a processing of adaptively adjusting a QP value in the lifting transform that generates a LoD hierarchical structure for encoding.

In FIG. 128, divider 9041 divides attribute information into high-frequency component H(N) and low-frequency component L(N). Predictor 9042 generates predicted value P(N) based on low-frequency component L(N). The difference between high-frequency component H(N) and predicted value P(N) is calculated as prediction residual D(N). Updater 9043 generates updated value U(N) from prediction residual D(N), and transmits a value obtained by summing low-frequency component L(N) and updated value U(N) to divider 9044 of layer (N−1) higher than layer (N). Updater 9043 compares the QP value of high-frequency component H(N) and the QP value of low-frequency component (N) and uses the smaller QP value (minimum QP value) for updating for maintaining similar details in both the nodes.

Divider 9044, predictor 9045, and updater 9046 are processing units that perform processings in higher layer (N−1), and have the same functions as divider 9041, predictor 9042, and updater 9043, respectively. Note that, in the case of the forward transform, updaters 9043 and 9046 can update the QP value as required.

Figure 129:
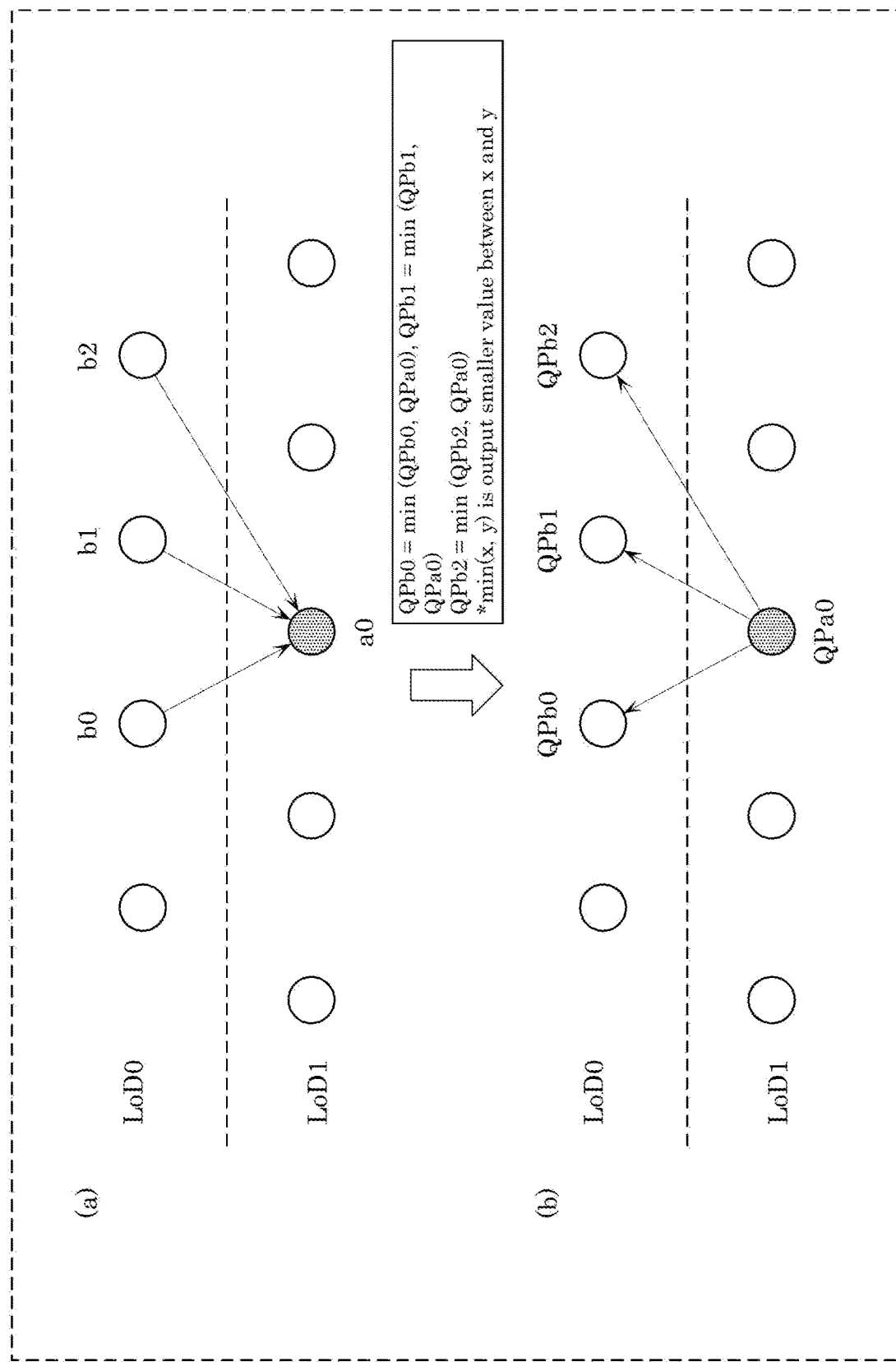

FIG. 129 is a diagram showing a relationship between items of attribute information and a relationship between QP values in a LoD hierarchical structure.

Part (a) of FIG. 129 shows a relationship between items of attribute information in a LoD hierarchical structure, and part (b) of FIG. 129 shows a relationship between QP values in the LoD hierarchical structure.

When the value of attribute information a0 is predicted from attribute information b0, b1, and b2, quantization parameter QPa0 of attribute information a0 is used for calculation of quantization parameters QPb0, QPb1, and QPb2 of attribute information b0, b1, and b2.

Figure 130:
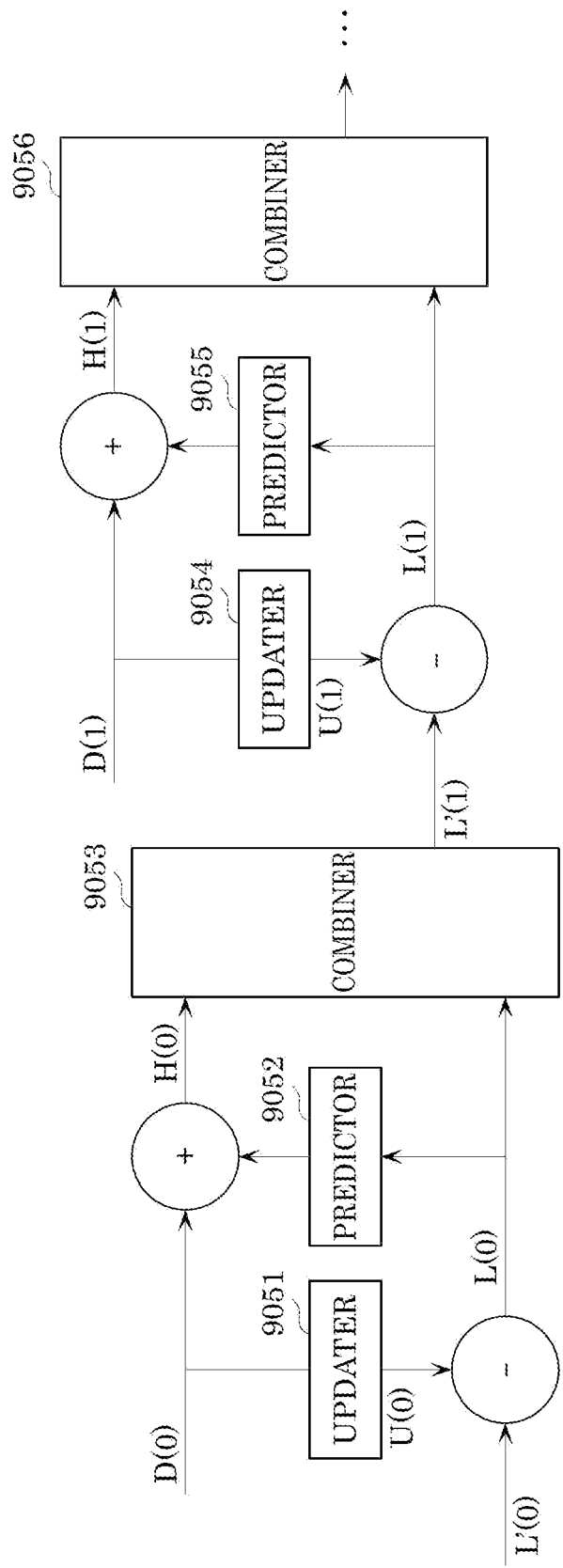

FIG. 130 is a block diagram showing an example of a processor that performs an attribute information decoding process.

In the inverse lifting transform, updater 9051 updates a QP value. Updater 9051 compares the QP value of prediction residual D(0) and the QP value of low-frequency component L'(0) and uses the smaller QP value (minimum QP value) for updating for maintaining similar details in both the nodes. Low-frequency component L(0) is calculated by subtracting updated value U(0) from low-frequency component L'(0).

Predictor 9052 generates predicted value P(0) from low-frequency component L(0). High-frequency component H(0) is calculated by summing prediction residual D(0) and predicted value P(0).

Combiner 9053 calculates low-frequency component L'(1) of a lower layer by summing high-frequency component H(0) and low-frequency component L(0).

Updater 9054, predictor 9055, and combiner 9056 are processing units that perform processings in lower layer (1), and have the same functions as updater 9051, predictor 9052, and combiner 9053, respectively.

Note that although FIG. 129 shows an example in which the minimum value of quantization parameter QPb0 and quantization parameter QPa0 is applied as quantization parameter QPb0, the present disclosure is not necessarily limited thereto. For example, the maximum value, an average value, or a sum value of quantization parameter QPb0 and quantization parameter QPa0 may be applied as quantization parameter QPb0. When calculating an average value, a value obtained by weighted arithmetic averaging based on the distance between the three-dimensional point having attribute information b0 and the three-dimensional point having attribute information a0 may be applied as quantization parameter QPb0. In this way, QP of a lower layer can be finely passed to a higher layer, and the QP value can be flexibly controlled.

As described above, the three-dimensional data encoding device according to the present embodiment performs the process shown by FIG. 131. The three-dimensional data encoding device calculates coefficient values from items of attribute information of three-dimensional points included in point cloud data (S9021); quantizes the coefficient values to generate quantization values (S9022); and generates a bitstream including the quantization values (S9023). One or more items of attribute information included in the items of attribute information are classified, for each of three-dimensional spaces, into one of groups, the three-dimensional spaces (i) being included in a plurality of three-dimensional spaces each being a rectangular parallelepiped, and (ii) including, among the three-dimensional points, three-dimensional points including the one or more items of attribute information. In the quantizing, the coefficient values are quantized using a predetermined quantization parameter or one or more quantization parameters for one or more groups, the one or more groups being included in the groups and including one or more items of attribute information used to calculate the coefficient values, the one or more items of attribute information being included in the items of attribute information. According to this configuration, since the three-dimensional data encoding device can perform switching using one or more quantization parameters for each of one or more groups or a predetermined quantization parameter, the three-dimensional data encoding device can perform encoding properly.

For example, each of the plurality of three-dimensional spaces is represented by an origin, a length, a width, and a depth of the three-dimensional space.

For example, in the calculating (S9021), the coefficient values are calculated by generating a hierarchical structure in which each of the items of attribute information is hierarchically divided into a high-frequency component and a low-frequency component.

For example, in the calculating (S9021), a second coefficient value included in a second layer is calculated using two first coefficient values included in a first layer, the second layer being one layer higher than the first layer, and in the quantizing (S9023), the second coefficient value is quantized using an average of two quantization parameters each assigned to a corresponding one of the two first coefficient values.

For example, the three-dimensional data encoding device includes a processor and memory. The processor performs the above-described process using the memory.

The three-dimensional data decoding device according to the present embodiment performs the process shown by FIG. 132. The three-dimensional data decoding device inverse quantizes quantization values included in a bitstream to calculate coefficient values (S9031); and calculates, from the coefficient values, items of attribute information of three-dimensional points included in point cloud data (S9032). One or more items of attribute information included in the items of attribute information are classified, for each of three-dimensional spaces, into one of groups, the three-dimensional spaces (i) being included in a plurality of three-dimensional spaces each being a rectangular parallelepiped, and (ii) including, among the three-dimensional points, three-dimensional points including the one or more items of attribute information. In the inverse quantizing, the quantization values are inverse quantized using a predetermined quantization parameter or one or more quantization parameters for one or more groups, the one or more groups being included in the groups and including one or more items of attribute information used to calculate coefficient values corresponding to the quantization values, the one or more items of attribute information being included in the items of attribute information. According to this configuration, since the three-dimensional data decoding device can perform inverse quantization using one or more quantization parameters for one or more groups or a predetermined quantization parameter, the three-dimensional data encoding device can perform decoding properly.

For example, each of the plurality of three-dimensional spaces is represented by an origin, a length, a width, and a depth of the three-dimensional space.

For example, in the calculating (S9031), the coefficient values are calculated by generating a hierarchical structure in which each of the items of attribute information is hierarchically divided into a high-frequency component and a low-frequency component.

For example, in the calculating (S9031), a second coefficient value included in a second layer is calculated using two first coefficient values included in a first layer, the second layer being one layer higher than the first layer, and in the inverse quantizing (S9032), the second coefficient value is inverse quantized using an average of two quantization parameters each assigned to a corresponding one of the two first coefficient values.

For example, the three-dimensional data decoding device includes a processor and memory. The processor performs the above-described process using the memory.

Embodiment 7

Next, a quantization parameter will be described.

In order to divide point cloud data based on characteristics and positions concerning the point cloud data, a slice and a tile are used. Here, a different quality may be required for each of the items of divisional point cloud data, because of hardware restrictions or requirements for real-time processing. For example, when encoding point cloud data by dividing the point cloud data into slices on an object basis, slice data including an object that is less important is less important, so that the resolution (quality) of the slice data can be decreased by quantization. On the other hand, the resolution (quality) of important slice data can be increased by setting the quantization value at a lower value. A quantization parameter is used to enable such control of quantized value.

Here, data to be quantized, a scale used for the quantization, and quantized data, which is the calculation result of the quantization, are expressed by (Equation S1) and (Equation S2) below.

$$\text{quantized data} = \text{data}/\text{scale} \quad \text{(Equation S1)}$$

$$\text{data} = \text{quantized data} * \text{scale} \quad \text{(Equation S2)}$$

The three-dimensional data encoding device quantizes data using a scale. That is, quantized data, which is data quantized, is calculated by performing a process according to Equation S1.

The three-dimensional data decoding device inverse-quantizes quantized data using the scale. That is, quantized data inverse-quantized is calculated by performing a process according to Equation S2.

The scale and the quantization value (Quantization Parameter (QP) value) are expressed by (Equation S3) and (Equation S4) below.

$$\text{quantization value } (QP \text{ value}) = \log(\text{scale}) \quad \text{(Equation S3)}$$

$$\text{quantization value } (QP \text{ value}) = \text{default value (reference value)} + \text{quantization delta (difference information)} \quad \text{(Equation S4)}$$

These parameters are generically referred to as a quantization parameter.

For example, a quantization value may be a value with respect to a default value, and may be calculated by adding a quantization delta (delta QP value) to the default value. If the quantization value is smaller than the default value, the quantization delta is a negative value. If the quantization value is greater than the default value, the quantization delta is a positive value. If the quantization value is equal to the default value, the quantization delta is 0. When the quantization delta is 0, the quantization delta can be omitted.

Next, a method of transmitting a quantization parameter will be described.

FIG. 133 is a diagram for describing a method of transmitting a quantization parameter used for encoding of attribute information. Part (a) of FIG. 133 is a diagram showing an example of a relationship between data (slice) in a frame and QP values.

Attribute information includes first color information indicating a first color and reflectance information indicating a reflectance. The attribute information may further include second color information indicating a second color. The attribute information has only to include at least one of the first color information, the second color information, and the reflectance information.

The first color information is indicated by luminance (luma) Y and chrominances (chroma) Cb and Cr. QY1 in Part (a) of FIG. 133 indicates a QP value used for encoding of luminance Y1 of the first color. QY1 is a quantization parameter used for quantization of luminance Y1 of the first color.

QCb1 and QCr1, which are QP values used for encoding of chrominances Cb1 and Cr1 of the first color, are derived from QY1 and Δ(QCb1, QY1) indicating the difference between QCb1 and QY1 and Δ(QCr1, QY1) indicating the difference between QCr1 and QY1, respectively. Specifically, QCb1 is derived by adding Δ(QCb1, QY1), which is a difference value (relative value), to QY1, which is a reference value (absolute value). QCb1 is a quantization parameter used for quantization of chrominance Cb1 of the first color. QCr1 is derived by adding Δ(QCr1, QY1), which is a difference value (relative value), to QY1, which is a reference value (absolute value). QCr1 is a quantization parameter used for quantization of chrominance Cr1 of the first color.

Note that QCb1 and QCr1 may be identical values or a common value. When a common value is used, one of QCb1 and QCr1 will suffice, so that the other can be omitted.

QY1D, which is a QP value used for encoding of luminance Y1D of the first color in the slice data, is derived from QY1 and Δ(QY1D, QY1) indicating the difference between QY1D and QY1. Specifically, QY1D is derived by adding Δ(QY1D, QY1), which is a difference value (relative value), to QY1, which is a reference value (absolute value). QY1D is a quantization parameter used for quantization of luminance Y1D of the first color. Luminance Y1D of the first color in the slice data is an example of the luminance of one or more three-dimensional points included in the subspace.

Similarly, QCb1D and QCr1D, which are QP values used for encoding of chrominances Cb1D and Cr1D of the first color in the slice data, are derived from QCb1 and Δ(QCb1D, QCb1) indicating the difference between QCb1D and QCb1 and Δ(QCr1D, QCr1) indicating the difference between QCr1D and QCr1, respectively. Specifically, QCb1D is derived by adding Δ(QCb1D, QCb1), which is a difference value (relative value), to QCb1, which is a reference value (absolute value). QCb1D is a quantization parameter used for quantization of chrominance Cb1D of the first color in the slice data. QCr1D is derived by adding Δ(QCr1D, QCr1), which is a difference value (relative value), to QCr1, which is a reference value (absolute value). QCr1D is a quantization parameter used for quantization of chrominance Cr1D of the first color in the slice data. Chrominances Cb1D and Cr1D of the first color in the slice data are examples of a first chrominance of one or more three-dimensional points included in the subspace.

The relationship between QP values for the first color holds for the second color, so that redundant descriptions will be omitted.

QR in FIG. 133 denotes a QP value used for encoding of reflectance R. QR is a quantization parameter used for quantization of reflectance R. QRD, which is a QP value used for encoding of reflectance RD in the slice data, is derived from QR and Δ(QRD, QR) indicating the difference between QRD and QR. Specifically, QRD is derived by adding Δ(QRD, QR), which is a difference value (relative value), to QR, which is a reference value (absolute value). QRD is a quantization parameter used for quantization of reflectance RD in the slice data. Reflectance RD in the slice data is an example of the reflectance of one or more three-dimensional points included in the subspace.

Note that when the values of the data QP and the frame QP are the same, the difference value may be set at 0, or the transmission of the difference value may be omitted, and the absence of the transmission may be regarded as the difference value of 0.

In this way, QP values used for encoding of attribute information on each slice in the frame can be calculated.

Each of the plurality of items of attribute information belongs to any of one or more layers. The hierarchical structure including the one or more layers may be a Level of Detail (LoD) hierarchical structure, for example. The LoD hierarchical structure is a hierarchical structure generated by classifying a plurality of three-dimensional points into layers in such a manner that distances between three-dimensional points belonging to higher layers are longer than distances between three-dimensional points belonging to lower layers. Therefore, each item of attribute information belongs to the layer to which the three-dimensional point having the attribute information belongs.

The hierarchical structure may be a Region Adaptive Hierarchical Transform (RAHT) hierarchical structure, for example. The RAHT hierarchical structure is a hierarchical structure generated by classifying a plurality of items of attribute information on a plurality of three-dimensional points into layers by dividing each item of attribute information into a high-frequency component and a low-frequency component. That is, attribute information belonging to any of one or more layers includes a high-frequency component and a low-frequency component.

Note that the hierarchical structure may be a structure including one layer or a structure including a plurality of layers. In the following, a hierarchical structure including a plurality of layers will be described as an example.

Part (b) of FIG. 133 is a diagram illustrating an example of the relationship between QP values for a plurality of layers in one slice.

S1 (SliceQP) in Part (b) of FIG. 133 is a QP value used for encoding of the attribute information in the slice data. Here, the attribute information in the slice data includes luminance Y1D and chrominances Cb1D and Cr1D, which are the first color information in the slice data. The attribute information in the slice data also includes reflectance RD, which is the reflectance information in the slice data. S1 includes QY1D, QCb1D, and QCr1D in Part (a) of FIG. 133.

L1, L2, and L3, which are QP values used for encoding of attribute information on three-dimensional points belonging to different layers, are derived from S1 and Δ(L1, S1) indicating the difference between L1 and S1, S1 and Δ(L2, S1) indicating the difference between L2 and S1, and S1 and Δ(L3, S1) indicating the difference between L3 and S1, respectively. Specifically, L1 is derived by adding Δ(L1, S1), which is a difference value (relative value), to S1, which is a reference value (absolute value). L2 is derived by adding Δ(L2, S1), which is a difference value (relative value), to S1, which is a reference value (absolute value). L3 is derived by adding Δ(L3, S1), which is a difference value (relative value), to S1, which is a reference value (absolute value). L1 is a QP value used for encoding of attribute information belonging to a first layer of the plurality of layers. L2 is a QP value used for encoding of attribute information belonging to a second layer of the plurality of layers. L3 is a QP value used for encoding of attribute information belonging to a third layer of the plurality of layers. Note that the plurality of layers include the first layer, the second layer, and the third layer in the example described above, the plurality of layers have only to include two or more layers, and the present invention is not limited to the plurality of layers including three layers.

Each of the plurality of three-dimensional points belongs to any of one or more regions. The one or more regions are three-dimensional regions in a three-dimensional space including a plurality of three-dimensional points. The one or more regions may be one region or a plurality of regions. Each of the plurality of three-dimensional points may belong to the one region or any of the plurality of regions. In the following, an example will be described where each of a plurality of three-dimensional points belongs to any of a plurality of regions. Note that a plurality of regions may overlap with each other or may be isolated from each other and not overlap with each other.

The QP value for each three-dimensional point is a QP value used for encoding of attribute information on the three-dimensional point. As shown in Part (c) of FIG. 133, a case will be considered where a plurality of three-dimensional points are classified into a plurality of regions R1 to Rnum_region. Regions R1 to Rnum_region correspond to a plurality of delta QP values Q1 to Qnum_region, respectively. Each of the plurality of delta QP values Q1 to Qnum_region is used for encoding of attribute information on a three-dimensional point belonging to the region to which the delta QP value corresponds. That is, the attribute information to be processed is encoded using the delta QP value associated with the region to which the three-dimensional point having the attribute information determined based on the position of the three-dimensional point belongs.

As described above, the attribute information to be processed belongs to any of one or more layers, and the three-dimensional point having the attribute information belongs to any of one or more regions. The QP value used for encoding of the attribute information to be processed is derived by adding the delta QP value associated with the layer of the attribute information and the delta QP value associated with the region to which the three-dimensional point having the attribute information belongs to QP value S1 determined for the slice to which the three-dimensional point having the attribute information belongs.

FIG. 134 is an example of a flowchart for deriving a QP value to be applied to attribute information to be processed. The process shown in this flowchart may be used for encoding of attribute information by the three-dimensional data encoding device or for decoding of encoded attribute information by the three-dimensional data decoding device. Although a case will be described below where the three-dimensional data encoding device performs this process, a case where the three-dimensional data decoding device performs this process can also be described in the same manner.

The three-dimensional data encoding device analyzes a parameter set for each frame, and derives a QP value for each frame (S9201). The QP value (FrameQP) for each frame is derived from QY1 and Δ(QCb1, QY1) and Δ(QCr1, QY1) indicating differences. QY1, Δ(QCb1, QY1), and Δ(QCr1, QY1) are stored in the parameter set for each frame.

Note that, in FIG. 134, FrameQP is a QP value for each frame and is a QP value for chroma Cb. FramePS.QY1 is a QP value used for encoding of luminance Y1 of the first color. FramePS.Qcb1 is a QP value used for encoding of chrominance Cb1 of the first color. Similarly, the QP value for chroma Cr can be calculated in the same manner as (Equation S4) described above.

The three-dimensional data encoding device then derives a QP value for each slice using a delta QP value included in the slice header of the slice (S9202). When it is indicated in the parameter set for each frame that a QP value for each slice is given, the three-dimensional data encoding device can perform the processing of step S9202. Such a case is a case where identification information (FramePS.slice_qp_present_flag) included in the parameter set for each frame indicates that a QP value for each slice is given, for example. The QP value for each slice, such as a QP value (SliceQP[i]) to be applied to an i-th slice, is derived from FrameQP and delta QP values (Δ(QY1D, QY1), Δ(QCb1D, QCb1), and Δ(QCr1D, QCr1), for example) indicating differences. Δ(QY1D, QY1), Δ(QCb1D, QCb1), and Δ(QCr1D, QCr1) are stored in the slice header.

Note that, in FIG. 134, deltaSliceQP[i] is a delta QP value included in an i-th slice header.

The three-dimensional data encoding device then derives a QP value for each layer from the delta QP values for the layer included in the slice header (S9203). When it is indicated in the slice header that a QP value for each layer is given, the three-dimensional data encoding device can perform the processing of step S9203. Such a case is a case where identification information (SliceHeader.delta_Layer_present_flag) included in the slice header indicates that a QP value for each layer is given, for example. The QP value for each layer, such as a QP value (LayerQP[i][j]) to be applied to a j-th layer in the i-th slice, is derived from SliceQP[i] and delta QP values (Δ(L1, S1), Δ(L2, S1), and Δ(L3, S), for example) indicating differences. Δ(L1, S1), Δ(L2, S1), and Δ(L3, S1) are stored in the slice header.

Note that, in FIG. 134, deltaSliceQP[i][j] is a delta QP value to be applied to the attribute information belonging to the j-th layer in the i-th slice header.

The three-dimensional data encoding device then derives, in a predetermined manner, a delta QP value for each three-dimensional point from a delta QP for each region included in the slice header (S9204). When it is indicated in the slice header that a QP value for each region is given, the three-dimensional data encoding device can perform the processing of step S9204. Such a case is a case where identification information (SliceHeader.additional_delta_QP_present_flag) included in the slice header indicates that a QP value for each region is given, for example.

Note that, in FIG. 134, RegionQP[i][j][p] is a QP value to be applied to a p-th three-dimensional point belonging to the j-th layer in the i-th slice header. deltaRegionQP[i][p] is a delta QP value corresponding to the region to which the p-th three-dimensional point belongs in the i-th slice header.

FIG. 135 is a flowchart of a method of determining a QP value for each three-dimensional point. The process shown in this flowchart may be used for encoding of attribute information by the three-dimensional data encoding device or for decoding of encoded attribute information by the three-dimensional data decoding device. Although a case will be described below where the three-dimensional data encoding device performs this process, a case where the three-dimensional data decoding device performs this process can also be described in the same manner.

The three-dimensional data encoding device performs a processing for each of a plurality of three-dimensional points (S9211). Specifically, the three-dimensional data encoding device selects one three-dimensional point to be processed from a plurality of three-dimensional points yet to be processed that have not been selected in the method of determining a QP value.

The three-dimensional data encoding device then performs a processing for each of a plurality of regions for the selected one three-dimensional point (S9212). Specifically, the three-dimensional data encoding device selects one region to be processed from a plurality of regions yet to be processed, in the processing for the selected one three-dimensional point.

The three-dimensional data encoding device then determines whether the one three-dimensional point to be processed is included in the one region to be processed or not (S9213).

When it is determined that the one three-dimensional point to be processed is included in the one region to be processed (if Yes in S9213), the three-dimensional data encoding device determines to apply the QP value assigned to the one region to be processed to the encoding of attribute information on the one three-dimensional point to be processed (S9214).

After step S9214 ends, or when it is determined that the one three-dimensional point to be processed is not included in the one region to be processed (if No in S9213), the three-dimensional data encoding device determines whether the determination in step S9213 has been performed for all of the plurality of regions or not (S9215).

When it is determined that the determination in step S9213 has not been performed for all of the plurality of regions (if No in S9215), the three-dimensional data encoding device returns to step S9212.

When it is determined that the determination in step S9213 has been performed for all of the plurality of regions (if Yes in S9215), the three-dimensional data encoding device proceeds to step S9216.

The three-dimensional data encoding device derives the QP value to be applied to the three-dimensional point to be processed in a predetermined manner using the QP value for the region determined in step S9214 (S9216). Here, in step S9216, when there is a plurality of pertinent regions, the predetermined manner is to derive a minimum value, a maximum value, an average value, or a sum value of the plurality of QP values of the plurality of regions as the QP value to be applied to the three-dimensional point to be processed. When there is a plurality of pertinent regions, the QP values may be weighted based on the distance from a region boundary. For example, provided that the QP value at the region boundary is an average value of the plurality of QP values of the plurality of regions, and the QP values may be weighted so that the further away from the region boundary a position is, the closer to the original QP value at the position the QP value at the position is. In this way, the QP value can slowly vary at the region boundary, and the prediction precision of the encoding of attribute information can be improved. Note that when there is only one pertinent region, the QP value for the one region is derived as the QP value to be applied to the three-dimensional point to be processed.

The three-dimensional data encoding device determines whether the processings of steps S9212 to S9216 have been performed for all of the plurality of three-dimensional points or not (S9217).

When it is determined that the processings of steps S9212 to S9216 have not been performed for all of the plurality of three-dimensional points (if No in S9217), the three-dimensional data encoding device returns to step S9211.

If it is determined that the processings of steps S9212 to S9216 have been performed for all of the plurality of three-dimensional points (if Yes in S9217), the three-dimensional data encoding device determines the QP value for each three-dimensional point using the delta QP value for each slice, the delta QP value for each layer, and the delta QP value relating to the region of the three-dimensional point (S9218). Note that when step S9218 is performed by the three-dimensional data decoding device, the three-dimensional data decoding device determines the QP value used for decoding of the encoded attribute information on each three-dimensional point using the delta QP value for each slice, the delta QP value for each layer, and the delta QP value relating to the region of the three-dimensional point.

FIG. 136 is an example of a flowchart of an encoding method by the three-dimensional data encoding device.

The three-dimensional data encoding device determines a region whose quality is to be changed (S9221).

The three-dimensional data encoding device then determines a QP value relating to the region of each three-dimensional point in the method of determining a QP value for each three-dimensional point in FIG. 134 (S9222).

The three-dimensional data encoding device then encodes attribute information on each three-dimensional point using the QP value for the three-dimensional point (S9223).

The three-dimensional data encoding device then generates metadata relating to the QP values, and generates a bitstream including the metadata (S9224). The generated bitstream is transmitted. The metadata relating to the QP values includes a reference value used for calculation of the QP values and a difference value.

FIG. 137 is an example of a flowchart of a decoding method by the three-dimensional data decoding device.

The three-dimensional data decoding device decodes the metadata to obtain the metadata relating to the QP values (S9231). By obtaining the bitstream, the three-dimensional data decoding device obtains the plurality of items of encoded attribute information and the encoded metadata.

The three-dimensional data decoding device then determines the QP value relating to the region of each three-dimensional point in the method of determining a QP value for each three-dimensional point in FIG. 134 (S9232).

The three-dimensional data decoding device then obtains a plurality of items of attribute information by decoding the plurality of items of encoded attribute information using the QP value for each three-dimensional point (S9233). The three-dimensional data decoding device obtains the plurality of items of attribute information by inverse-quantizing a plurality of items of quantized attribute information.

Note that a method of controlling (changing) the QP value in the encoding of attribute information on a region basis has been described in this embodiment, a method of dividing each region whose quality is to be controlled into slices or tiles and controlling (changing) the QP value on a slice basis may be used, or another method (such as that described below) may be used to control the quality on a region basis. Which of different methods is to be used may be determined by calculating the encoding efficiency or quality in advance or may be adaptively changed.

Next, a case will be described where the QP value for each region is set on a slice basis.

In the embodiment described above, an example of the quality control on a region basis has been described by taking as an example a case where tile or slice division is not used. However, when tile or slice division is used, regions in each slice can be set. For example, as shown in FIG. 138, a three-dimensional point cloud may be divided into slice A and slice B. In slice A, the quality control of the three-dimensional point cloud in region A and the three-dimensional point cloud in region B may be independently performed. In slice B, the quality control of the three-dimensional point cloud in region C and the three-dimensional point cloud in region D in slice B may be independently performed. The number of regions to be subjected to the quality control or whether to perform the quality control or not may be independently determined for each slice.

Origin coordinates of a region may be set with respect to the origin of the slice to which the region belongs. In that case, the origin coordinates of the region stored in the slice header and size information indicating the size of the region are set to be positive values. Therefore, the information amount of region information indicating the region can be reduced. The region information includes the origin coordinates of the region and size information on the region.

For example, as shown in FIG. 140, when the origin coordinates of a region are always positive values in a coordinate system with respect to the origin of a slice divided, such as when regions are set after point cloud data on a three-dimensional point cloud is divided, the region information can be set without any adjustment.

On the other hand, as shown in FIG. 141, when regions are set before point cloud data on a three-dimensional point cloud is divided, and the region information is based on the coordinate system before the division, the coordinates are shifted by the amount of change of the coordinate system in the direction of the change, in order to adjust the coordinates in the coordinate system before the division to the coordinate system for each item of divisional data. Specifically, the values of the origin of the slice are subtracted. The example shown in FIG. 139 is an example in which region A and region B are set before point cloud data is divided into slice A and slice B.

Note that the origin coordinates of a region may be set at a negative position with respect to the origin of a slice.

Next, an example of a case where a QP value for each region common to all slices is set will be described.

In this embodiment, a syntax configuration that allows setting of a region on a slice basis has been described. However, a region that is common to all slices may be set. In that case, the region information may be stored in metadata (for each frame) at a higher level, such as the sequence parameter set (SPS) or the attribute parameter set (APS), rather than in the header of each slice. The region information includes the region count indicating the number of a plurality of regions, the origin of each region, the size of each region, and the QP value for each region, for example. The region information is common to all slices and therefore may indicate the origin of each region with respect to the origin of the point cloud data yet to be divided into slices.

The processing for each slice may be performed after the reference of the origin of each region is transformed from a predetermined reference for the point cloud data yet to be divided into slices to a predetermined reference for the point cloud data of each slice resulting from the division.

Whether region information common to a plurality of slices is set or region information is independently set for each slice may be switched based on the purpose. A switch flag for this switching may be stored in SPS or APS, for example.

A plurality of regions may be set for each frame, or a plurality of regions common to a plurality of frames may be set. When a plurality of regions common to a plurality of frames are set, the region information is stored in metadata (SPS, for example) common to the plurality of frames.

In the embodiment described above, an example has been described in which the quality of each region is controlled by changing the QP value. However, the present invention is not limited to the quality control using QP values. A case will be described where values other than QP values are used in the method of quality control on a region basis. In the examples described above, the information amount is reduced by changing values by quantization. However, a method in which values are changed by clipping may be used, or other methods may be used.

In an example of the process in which a value is changed by quantization, a value calculated in the encoding process and a value calculated in the decoding process are calculated according to the equations below.
(Encoding)

$$Value=Value/Quantization\ Value$$

(Decoding)

$$Value=Value*Quantization\ Value$$

In an example of the process in which a value is changed by clipping, a value calculated in the encoding process and a value calculated in the decoding process are calculated according to the equations below.
(Encoding)

$$Value=if(Value<threshold)\ Value=0$$

(Decoding)
No Processing

The process in which a value is changed by clipping is the same as in the case of quantization. A threshold for clipping for each region is determined in advance, and a final threshold is derived from the threshold for each region while determining, for each three-dimensional point, whether the three-dimensional point is included in a region or not. This process can be explained by replacing the term "QP value" with the term "threshold" in S9214 and S9216 in the "method of determining a QP value for each three-dimensional point", for example. Here, in step S9216, when there is a plurality of pertinent regions, the predetermined manner is to derive a minimum value, a maximum value, an average value, or a sum value of the plurality of thresholds of the plurality of regions as the threshold to be applied to the three-dimensional point to be processed. When there is a plurality of pertinent regions, the thresholds may be weighted based on the distance from a region boundary. For example, provided that the threshold at the region boundary is an average value of the plurality of thresholds of the plurality of regions, and the thresholds may be weighted so that the further away from the region boundary a position is, the closer to the original threshold at the position the threshold at the position is. In this way, the threshold can slowly vary at the region boundary, and the prediction precision of the encoding of attribute information can be improved. Note that the threshold may be determined according to the object to be controlled, or may be set at a value that is based on the attribute information encoding method or the quantization value for the entire three-dimensional point cloud.

As described above, the three-dimensional data encoding device according to one aspect of the present embodiment performs the process shown by FIG. 142. The three-dimensional data encoding device encodes items of attribute information of three-dimensional points using a parameter (S9241). The three-dimensional data encoding device generates a bitstream including the items of attribute information encoded and the parameter (S9242). Each of the items of attribute information belongs to one of at least one layer. Each of the three-dimensional points belongs to one of at least one region. The parameter is determined based on, among the at least one layer, a layer to which an item of attribute information to be encoded in the encoding belongs, and, among the at least one region, a region to which a three-dimensional point having the item of attribute information to be encoded in the encoding belongs, the item of attribute information to be encoded in the encoding being included in the items of attribute information. The parameter included in the bitstream includes a predetermined reference value, a first difference value determined for each of the at least one layer, and a second difference value determined for each of the at least one region.

With this configuration, since the parameter is indicated, in the bitstream, by the predetermined reference value, the first difference value determined for each layer, and the second difference value determined for each region, the three-dimensional data encoding device can improve the encoding efficiency.

For example, each of the items of attribute information further belongs to one of at least one slice. The parameter is determined based on, among the at least one slice, a slice to which the item of attribute information to be encoded in the encoding belongs. The parameter included in the bitstream further includes a third difference value determined for each of the at least one slice.

With this configuration, since the parameter is indicated, in the bitstream, by the predetermined reference value, the first difference value determined for each layer, the second difference value determined for each region, and the third difference value determined for each slice, the three-dimensional data encoding device can improve the encoding efficiency.

For example, each of the items of attribute information further belongs to one of at least one frame. The parameter is determined based on, among the at least one frame, a frame to which the item of attribute information to be encoded in the encoding belongs. The parameter included in the bitstream further includes a fourth difference value determined for each of the at least one frame.

With this configuration, since the parameter is indicated, in the bitstream, by the predetermined reference value, the first difference value determined for each layer, the second difference value determined for each region, and the fourth difference value determined for each frame, the three-dimensional data encoding device can improve the encoding efficiency.

For example, a first region among the at least one region belongs to a first slice among the at least one slice. The first region has origin coordinates based on origin coordinates of the first slice.

Therefore, the origin coordinates of the first region are indicated by the origin coordinates of the first slice and the difference value thereof, so that the encoding efficiency can be improved.

For example, the three-dimensional data encoding device includes a processor and memory. Using the memory, the processor performs the above-described process.

The three-dimensional data decoding device according to the present embodiment performs the process shown by FIG. 143. The three-dimensional data decoding device obtains encoded items of attribute information and a parameter from a bitstream (S9251). The three-dimensional data decoding device decodes the encoded items of attribute information using the parameter (S9252). Items of attribute information obtained in the decoding are items of attribute information of three-dimensional points. Each of the items of attribute information belongs to one of at least one layer. Each of the three-dimensional points belongs to one of at least one region. The parameter is determined based on, among the at least one layer, a layer to which an item of attribute information to be encoded in the encoding belongs, and, among the at least one region, a region to which a three-dimensional point having the item of attribute information to be encoded in the encoding belongs, the item of attribute information to be encoded in the encoding being included in the items of attribute information. The parameter included in the bitstream includes a predetermined reference value, a first difference value determined for each of the at least one layer, and a second difference value determined for each of the at least one region.

Therefore, the three-dimensional data decoding device can properly decode attribute information on a three-dimensional point.

For example, each of the items of attribute information further belongs to one of at least one slice. The parameter is determined based on, among the at least one slice, a slice to which an item of attribute information to be decoded in the decoding belongs, the item of attribute information to be decoded in the decoding being included in the items of attribute information. The parameter included in the bitstream further includes a third difference value determined for each of the at least one slice.

Therefore, the three-dimensional data decoding device can properly decode attribute information on a three-dimensional point.

For example, each of the items of attribute information further belongs to one of at least one frame. The parameter is determined based on, among the at least one frame, a frame to which an item of attribute information to be decoded in the decoding belongs, the item of attribute information to be decoded in the decoding being included in the items of attribute information. The parameter included in the bitstream further includes a fourth difference value determined for each of the at least one frame.

Therefore, the three-dimensional data decoding device can properly decode attribute information on a three-dimensional point.

For example, a first region among the at least one region belongs to a first slice among the at least one slice. The first region has origin coordinates based on origin coordinates of the first slice.

Therefore, the three-dimensional data decoding device can properly decode the origin coordinates of the first region.

For example, the three-dimensional data decoding device includes a processor and memory. Using the memory, the processor performs the above-described process.

Embodiment 8

FIG. 144 is a diagram illustrating a method for calculating a weight according to Embodiment 8. FIG. 144 also illustrates a RAHT layered structure (tree structure) (also referred to here as hierarchical structure). As illustrated in FIG. 144, in the RAHT layered structure, weights W0.0, W1.0, W1.1, W3.0, W3.1, W3.3, and W3.4 are set to nodes. It should be noted that the RAHT layered structure is generated by hierarchically dividing each of items of attribute information of three-dimensional points included in point cloud data into a high-frequency component and a low-frequency component. Each of the nodes included in the RAHT layered structure has a coefficient value. The coefficient value includes a high-frequency component and a low-frequency component calculated in the hierarchical division. A second coefficient value of a second node of a second layer that is one layer higher than a first layer is calculated by using, for example, two first coefficient values of two first nodes belonging to a first layer of the layered structure.

In the RAHT layered structure illustrated in FIG. 144, nodes at Level 0 (leaf nodes) indicate three-dimensional points that are arranged in Morton order. Weights of the three-dimensional points are all set to one. That is, weights W3.0, W3.1, W3.3, and W3.4 are all one.

A parameter of a node at Level 1, which is the next level of Level 0, is calculated using two nodes that are adjacent to each other in Morton order. For example, node f0 and node f1 are two adjacent nodes. Level 1 is one layer higher than Level 0. For example, node F20G20 belonging to Level 1 is calculated using node f0 and node f1 belonging to Level 0. Node F20G20 is a parent node of node f0 and node f1. That is, node f0 and node f1 are child nodes of node F20G20. Weight W2.0 of node F20G20 is obtained by adding weight W3.0 (=1) of node fb and weight W3.1 (=1) of node f1. That is, weight W2.0 of node F20G20 is calculated to be two.

It should be noted that node F21, which is a parent node of a node that has no adjacent node, such as node f3, is calculated using node f3. A weight of a node not present is regarded as zero. Weight W2.1 of node F21 is obtained by adding weight W3.3 (=1) of node f3 and zero. That is, weight W2.1 of node F21 is calculated to be one.

As seen from the above, in a case where a parent node has two child nodes, a weight of the parent node is calculated by adding weights set to the two child nodes, and in a case where the parent node has one child node, a weight set to the one child node is set to the weight of the parent node.

Next, a method for calculating regionQP will be described.

FIG. 145 is a flowchart illustrating an example of a method for calculating regionQP according to Embodiment 8.

First, the three-dimensional data encoding device calculates regionQP of each three-dimensional point (S10101).

Next, the three-dimensional data encoding device calculates regionQP of each node using a RAHT layered structure (S10102).

FIG. 146 is a flowchart illustrating another example of a method for calculating regionQP according to Embodiment 8.

First, the three-dimensional data encoding device calculates delta_regionQP of each three-dimensional point (S10111).

Next, the three-dimensional data encoding device calculates delta_regionQP of each node using a RAHT layered structure (S10112).

Here, delta_regionQP of a higher node is calculated using the following equation.

$$\text{delta\_region}QP(C) = \text{weight}(A)*\text{delta\_region}QP(A) + \text{weight}(B)*\text{delta\_region}QP(B)/(\text{weight}(A) + \text{weight}(B)) \quad \text{(Equation W1)}$$

For example, in FIG. 147, node L2,0H2,0 is set such that delta_regionQP=0 and weight w=4, and node L2,1 is set such that delta_regionQP=2 and weight=2. Therefore, delta_regionQP of higher node (parent node) L1,0H1,0 of node L2,0H2,0 is calculated as follows.

$$\text{delta\_region}QP = (0*4 + 2*2)/(4+2) = 4/6$$

It should be noted that FIG. 147 is a diagram for describing an example of a method for calculating QP of each node of RAHT according to Embodiment 8.

Next, the three-dimensional data encoding device calculates regionQP by adding up delta_regionQP of each node to reference QP (S10113).

It should be noted that delta_regionQP is a value obtained by subtracting reference QP from QP that is set for each region (referred to as regionQP). The region is, for example, a three-dimensional space. At least one of three-dimensional points is included in region 10101 having a limited size. Three-dimensional points included in region 10101 belong to a first group, and for quantization of items of attribute information of the three-dimensional points, a first quantization parameter is set. For example, for the first group, "2" is set to delta_regionQP for calculating the first quantization parameter.

Three-dimensional points not included in region 10101 belong to a second group different from the first group, and for quantization of items of attribute information of the three-dimensional points, a second quantization parameter different from the first quantization parameter is set. For example, for the second group, "0" is set to delta_regionQP for calculating the second quantization parameter. The three-dimensional points belonging to the second group may belong to a region different from region 10101. That is, at least one item of attribute information among items of attribute information belongs to any one of one or more groups. To each group, a quantization parameter for quantizing attribute information belonging to the group is set. Different values may be set to quantization parameters of different groups.

As seen from the above, each of the items of attribute information may be classified into any one of the one or more groups, according to a three-dimensional space (region) to which a three-dimensional point having the item of attribute information belongs. It should be noted that the items of attribute information may be classified into different groups even when three-dimensional spaces having the items of attribute information belong to the same three-dimensional space (region). That is, a group into which an item of attribute information is classified need not be set according to a three-dimensional space (region) to which a three-dimensional point having the item of attribute information belongs.

As with the weights, the three-dimensional data encoding device may calculate delta_regionQP of each node in advance by addition under a condition of whether the node has an adjacent node and dividing delta_regionQP finally calculated for each node by a weight of the node. Calculation of delta_regionQP of each node may be made using the following equation.

$$(\text{delta\_region}QP \text{ of each node}) = (\text{delta\_region}QP \text{ obtained by addition for the node})/(\text{weight of the node}) \quad \text{(Equation W2)}$$

For example, a weight of node L1,0H1,0 is calculated to be six, and delta_regionQP obtained by addition for L1,0H1,0 is calculated to be four. Therefore, delta_regionQP of L1,0H1,0 may be calculated to be 4/6. This enables a process that is equivalent to a derivation method using an average value described later. It should be noted that the processing amount may be reduced by using shift operations instead of the division.

Next, a method for calculating QP of each node using averaging will be described.

FIG. 148 is a diagram for describing another example of the method for calculating QP of each node of RAHT according to Embodiment 8. FIG. 149 is a flowchart of the other example of the method for calculating QP of each node of RAHT according to Embodiment 8.

In a RAHT layered structure illustrated in FIG. 148, nodes at Level 0 (leaf nodes) indicate three-dimensional points that are arranged in Morton order.

As in FIG. 147, at least one of three-dimensional points is included in region 10102 having a limited size. Three-dimensional points included in region 10102 belong to a first group, and for quantization of items of attribute information of the three-dimensional points, a first quantization parameter is set. For example, for the first group, "2" is set to delta_regionQP for calculating the first quantization parameter.

Three-dimensional points not included in region 10102 belong to a second group different from the first group, and for quantization of items of attribute information of the three-dimensional points, a second quantization parameter different from the first quantization parameter is set. For example, for the second group, "0" is set to delta_regionQP for calculating the second quantization parameter. The three-dimensional points belonging to the second group may belong to a region different from region 10102. That is, at least one item of attribute information among items of attribute information belongs to any one of one or more groups. To each group, a quantization parameter for quantizing attribute information belonging to the group is set. Different values may be set to quantization parameters of different groups.

This method for calculating QP is capable of calculating delta_regionQP using only bitwise operations such as addition and bit shifting. This can reduce an amount of calculation.

The three-dimensional data encoding device calculates delta_regionQP of each three-dimensional point using position coordinates of each three-dimensional point and region information (S10121). The region information includes, for example, a position, a size, a shape, and the like of a region that is set in advance. An example of the region set in advance is region 10102. The region set in advance is a region that is set for classifying three-dimensional points into groups.

In step S10121, the three-dimensional data encoding device first determines, for each three-dimensional point, whether the three-dimensional point is included in a region set in advance (e.g., region 10102) using position information (geometry information) of the three-dimensional point and region information. By the determination, in FIG. 148, for example, delta_regionQP for calculating a quantization parameter for three-dimensional points included in region 10102 is calculated to be two, and delta_regionQP for calculating quantization parameters for the other three-dimensional points is calculated to be zero.

Next, the three-dimensional data encoding device shifts up (left shift) delta_regionQP calculated for each three-dimensional point by N bits (S10122). delta_regionQP calculated for each three-dimensional point is an example of a first parameter. delta_regionQP shifted up (left shift) by N bits is an example of a second parameter. For example, when a most significant bit of delta_regionQP is located in bit position M, the three-dimensional data encoding device may shift up delta_regionQP by (L−M) bits so that the number of bits of delta_regionQP is L that is determined in advance. It should be noted that in the processing of step S10122, an error of delta_regionQP may be tolerated, and in a case where accuracy is not required for delta_regionQP, N may be set as N=0. Further, the bit shifting performed in step S10122 and step S124 need not be used.

Next, the three-dimensional data encoding device calculates delta_regionQP used for quantizing a coefficient value of each of nodes (parent nodes) included in a RAHT layered structure using delta_regionQP of nodes of a layer that is one layer lower than the parent node (S10123). The three-dimensional data encoding device performs the processing of step S10123 for each level (layer). Specifically, the three-dimensional data encoding device shifts down (right shift), by one bit, a sum obtained by adding up two parameters of two child nodes that have been shifted up by N bits. That is, the three-dimensional data encoding device calculates an average of the two parameters of the two child nodes. In this manner, a third parameter is obtained for each parent node.

Here, when calculating the average of the two parameters of the two child nodes, the three-dimensional data encoding device performs the right shift on the sum by one bit for reducing the amount of calculation. As a result, a least significant bit of the sum is rounded, which produces a rounding error. Since the shifting-up (left shift) by N bits is performed in advance in step S10122, the rounding error can be reduced. As a result, a calculation with a reduced amount of calculation and a high accuracy can be performed.

In step S10123, specifically, delta_regionQP(C) of a parent node is calculated using delta_regionQP(A) and delta_regionQP(B) of two child nodes of the parent node as shown by the following formula.

$$\text{delta\_region}QP(C) = (\text{delta\_region}QP(A) + \text{delta\_region}QP(B)) \gg 1 \quad \text{(Equation W3)}$$

It should be noted that in a case where a parent node does not have two child nodes but has one child node, delta_regionQP(C) of the parent node is calculated using delta_regionQP(A) of the one child node as shown by the following formula.

$$\text{delta\_region}QP(C) = \text{delta\_region}QP(A) \quad \text{(Equation W4)}$$

Next, after calculating delta_regionQP, the three-dimensional data encoding device calculates final delta_regionQP by shifting-down (right shift) delta_regionQP by N bits (S10124). The final delta_regionQP is an example of a fourth parameter.

Next, the three-dimensional data encoding device calculates regionQP by adding delta_regionQP of each node to reference QP (S10125).

Next, the three-dimensional data encoding device converts regionQP into Qstep and quantizes an item of attribute information or a coefficient value of each node using Qstep converted into (S10126). That is, the three-dimensional data encoding device quantizes the item of attribute information or the coefficient value of each node using Qstep that is calculated using the fourth parameter. In this manner, a quantized value into which the coefficient value of each node is quantized is obtained. It should be noted that the coefficient value of each node may include an item of attribute information of the node.

The three-dimensional data encoding device may generate a bitstream including quantized values. The bitstream may include the parameter used for the quantization.

As seen from the above, in step S10122, the three-dimensional data encoding device performs the shifting-up (left shift) before the processing for calculating delta_regionQP in S10123, so that an average value of delta_regionQP can be calculated with high accuracy. N used in the N-bit shifting-up and the N-bit shifting-down may be, for example, a fixed value such as two and four or may be a value that is adaptively varied.

It should be noted that, for example, the three-dimensional data encoding device may once calculate delta_regionQP of node L0,0H0,0 with a bit precision of delta_regionQP being increased by shifting-up delta_regionQP by N bits and shift down delta_regionQP of node L0,0H0,0 by N bits to make delta_regionQP to have the original bit precision when quantizing an item of attribute information belonging to node L0,0H0,0. Calculation of delta_regionQP of node L0,0H0,0 can be made with high accuracy.

It should be noted that in the method for calculating QP of each node, which is described with reference to FIG. 148 and FIG. 149, S10121 to S10125 may be executed by the three-dimensional data decoding device.

The description of this Embodiment 8 is given of an example in which delta_regionQP of each node in the layered structure is calculated from delta_regionQP of each three-dimensional point using the average of delta_regionQP of child nodes or the like while a bit precision of delta_regionQP is increased and decreased by N-bit shifting-up or N-bit shifting-down, and then regionQP is calculated from delta_regionQP of each node to calculate Qstep, but the example is not limitative.

For example, regionQP of each three-dimensional point may be calculated from delta_regionQP of each three-dimensional point while the bit precision is increased and decreased using the same method, regionQP of each of the nodes in the layered structure may be calculated, from the calculated regionQP, using the average of regionQP of child nodes, and then Qstep of each node may be calculated. That is, regionQP of each node may be calculated rather than calculating delta_regionQP of each node. This enables regionQP of each node to be calculated with high accuracy.

Alternatively, regionQP of each three-dimensional point may be calculated from delta_regionQP of each three-dimensional point while the increasing and decreasing of the bit precision is applied using the same method, further, Qstep of each three-dimensional point may be calculated from the calculated regionQP, and from the calculated Qstep, Qstep of each of the nodes in the layered structure may be calculated using an average of Qstep of child nodes. That is, Qstep of each node may be calculated rather than calculating delta_regionQP of each node. This enables Qstep of each node to be calculated with high accuracy.

In this Embodiment 8, information indicating whether the N-bit shift operations (N-bit shifting-up and N-bit shifting-down) are applied for calculating delta_regionQP may be added to a header. This enables the three-dimensional data decoding device to determine whether to apply the bit shift operations for calculating delta_regionQP by decoding the header. Further, the value of N in the N-bit shifting may be added to the header. This allows the three-dimensional data encoding device and the three-dimensional data decoding device to use the same amount of bit shifting to perform the processing, and a bitstream encoded by the encoder using the N-bit shift operations can be decoded appropriately by the three-dimensional data decoding device.

It should be noted that the value of N may be set to a fixed value (e.g., N=4, N=8, etc.) and may be switched to another value based on a level or on a profile of a standard. This enables switching of an accuracy of delta_regionQP by selecting a level or a profile of a standard. Further, by specifying the value of N based on a standard or a profile, the addition of the value of N to a header is dispensed with, and a size of the header can be reduced.

As described above, a three-dimensional data encoding device according to the present embodiment performs the process shown in FIG. 150. The three-dimensional encoding device: calculates a coefficient value of each of nodes included in a layered structure by generating the layered structure in which each of items of attribute information of three-dimensional points included in point cloud data is hierarchically divided into a first component (high-frequency component) and a second component (low-frequency component) (S10131); quantizes, for each of the nodes, the coefficient value of the node using one or more first parameters for one or more groups to which one or more items of attribute information used in the calculating of the coefficient value belong, to generate quantized values (S10132); and generates a bitstream including the quantized values (S10133). At least one item of attribute information among the items of attribute belongs to any one of the one or more groups. In the calculating, the processor calculates a second coefficient value of a second node of a second layer which is one layer higher than a first layer of the layered structure, using two first coefficient values of two first nodes belonging to the first layer. In the quantizing, the three-dimensional data encoding device performs the process described in FIG. 149. The three-dimensional data encoding device: (i) generates one or more second parameters by shifting-up the one or more first parameters by N bits (N is a natural number) (S10122); (ii) generates a third parameter by shifting-down, by one bit, a sum obtained by adding up two second parameters of the two first nodes (S10123); (iii) generates a fourth parameter by shifting-down the third parameter by N bits (S10124); and (iv) quantizes the second coefficient value using the fourth parameter (S10125, S10126).

Accordingly, the three-dimensional data encoding method includes encoding capable of switching the parameters used for the quantization for each of the groups. In the encoding, a sum of the parameters of the two child nodes is calculated as a parameter of each of the nodes in the layered structure by shifting-down the sum by one bit, before the calculation, each of the parameters is shifted up by N bits, and after the calculation, each of the parameters is shifted down by N bits. This enables reduction of a rounding error, and the fourth parameter can be calculated with high accuracy. Further, an average of the parameters of the two child nodes is calculated by shifting-down the sum of the parameters of the two child nodes by one bit, and therefore, an amount of calculation for the parameters of the two child nodes can be reduced.

For example, the first parameter and the fourth parameter are each differences from a reference parameter, and, in the quantizing of the second coefficient value, a fifth parameter obtained by adding the reference parameter to the fourth parameter is used. For this reason, the information amount of the first parameter and the fourth parameter can be reduced.

For example, N is 4.

For example, each of the items of attribute information is classified into any one of the one or more groups, according to a three-dimensional space to which the three-dimensional point having the item of attribute information belongs. For this reason, the appropriate parameter can be set for each three-dimensional space.

For example, the three-dimensional data encoding device includes a processor and memory, and, using the memory, the processor performs the above-described processes.

A three-dimensional data decoding device according to the present embodiment performs the process shown in FIG. 151. The three-dimensional data decoding device: calculates, using quantized values and one or more first parameters, coefficient values by inverse-quantizing each of the quantized values, the quantized values and the one or more first parameters being included in a bitstream (S10141); and calculates, from the coefficient values, items of attribute information of three-dimensional points included in point cloud data (S10142). The one or more first parameters are one or more parameters for one or more groups to which one or more items of attribute information used in the calculating of a coefficient value to which a corresponding one of the quantized values corresponds belong. At least one item of attribute information among the items of attribute information belongs to any one of the one or more groups. The coefficient values are calculated corresponding to nodes included to a layered structure. The layered structure is a structure in which each of the items of attribute information is hierarchically divided into a first component (high-frequency component) and a second component (low-frequency component). Two first coefficient values of two first nodes belonging to a first layer of the layered structure are used in calculating a second coefficient value of a second node of a second layer which is one layer higher than the first layer. In the inverse-quantizing, the three-dimensional data decoding device performs part of the process described in FIG. 149. The three-dimensional data decoding device: (i) generates one or more second parameters by shifting-up the one or more first parameters by N bits (N is a natural number) (S10122); (ii) generates a third parameter by shifting-down, by one bit, a sum obtained by adding up two second parameters of the two first nodes (S10123); (iii) generates a fourth parameter by shifting-down the third parameter by N bits (S10124); and (iv) inverse-quantizes a quantized value of the second node using the fourth parameter.

Accordingly, the three-dimensional data decoding method includes decoding a bitstream generated by switching the parameters used for the quantization for each of the groups. In the encoding, a sum of the parameters of the two child nodes is calculated as a parameter of each of the nodes in the layered structure by shifting-down the sum by one bit, before the calculation, each of the parameters is shifted up by N bits, and after the calculation, each of the parameters is shifted down by N bits. This enables reduction of a rounding error, and the fourth parameter can be calculated with high accuracy. Further, an average of the parameters of the two child nodes is calculated by shifting-down the sum of the parameters of the two child nodes by one bit, and therefore, an amount of calculation for the parameters of the two child nodes can be reduced.

For example, the first parameter and the fourth parameter are each differences from a reference parameter, and, in the inverse-quantizing of the quantized value of the second node, a fifth parameter obtained by adding the reference parameter to the fourth parameter is used. For this reason, the information amount of the first parameter and the fourth parameter can be reduced.

For example, N is 4.

For example, each of the items of attribute information is classified into any one of the one or more groups, according to a three-dimensional space to which the three-dimensional point having the item of attribute information belongs. For this reason, the appropriate parameter can be set for each three-dimensional space.

It should be noted that, the three-dimensional data decoding device may obtain a bitstream including fourth parameters and coefficient values which are calculated in a three-dimensional data encoding device, and may perform decoding by inverse-quantizing each of the coefficient values using the fourth parameter corresponding to the coefficient value.

For example, the three-dimensional data decoding device includes a processor and memory, and, using the memory, the processor performs the above-described processes.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a three-dimensional data encoding device and a three-dimensional data decoding device.

What is claimed is:

1. A three-dimensional data encoding method comprising:
    calculating a coefficient value of each of nodes included in a layered structure by generating the layered structure in which each of items of attribute information of three-dimensional points included in point cloud data is hierarchically divided into a first component and a second component; and
    quantizing, for each of the nodes, the coefficient value of the node using one or more first parameters for one or more groups to which one or more items of attribute information used in the calculating of the coefficient value belong, to generate quantized values, wherein
    at least one item of attribute information among the items of attribute belongs to any one of the one or more groups,
    in the calculating, a second coefficient value of a second node of a second layer which is one layer higher than a first layer of the layered structure is calculated using two first coefficient values of two first nodes belonging to the first layer,
    the quantizing includes:
        (i) generating one or more second parameters by left-shifting the one or more first parameters by N bits, N being a natural number;
        (ii) generating a third parameter by right-shifting, by one bit, a sum obtained by adding up two second parameters from among the one or more second parameters, the two second parameters corresponding to the two first nodes;
        (iii) generating a fourth parameter by right-shifting the third parameter by N bits; and
        (iv) quantizing the second coefficient value using the fourth parameter, and
    each parameter of the one or more first parameters, the one or more second parameters, the third parameter, and the fourth parameter is expressed by a bit sequence.

2. The three-dimensional data encoding method according to claim 1, wherein
    the first parameter and the fourth parameter are each differences from a reference parameter, and
    in the quantizing of the second coefficient value, a fifth parameter obtained by adding the reference parameter to the fourth parameter is used.

3. The three-dimensional data encoding method according to claim 1, wherein N is 4.

4. The three-dimensional data encoding method according to claim 1, wherein
each of the items of attribute information is classified into any one of the one or more groups, according to a three-dimensional space to which the three-dimensional point having the item of attribute information belongs.

5. A three-dimensional data decoding method comprising:
calculating, using quantized values and one or more first parameters, coefficient values by inverse-quantizing each of the quantized values; and
calculating, from the coefficient values, items of attribute information of three-dimensional points included in point cloud data, wherein
the one or more first parameters are one or more parameters for one or more groups to which one or more items of attribute information belong, the one or more items of attribute information being used in the calculating of a coefficient value to which a corresponding one of the quantized values corresponds,
at least one item of attribute information among the items of attribute information belongs to any one of the one or more groups,
the coefficient values are calculated corresponding to nodes included to a layered structure,
the layered structure is a structure in which each of the items of attribute information is hierarchically divided into a first component and a second component,
two first coefficient values of two first nodes belonging to a first layer of the layered structure are used in calculating a second coefficient value of a second node of a second layer which is one layer higher than the first layer,
the inverse-quantizing includes:
(i) generating one or more second parameters by left-shifting the one or more first parameters by N bits, N being a natural number;
(ii) generating a third parameter by right-shifting, by one bit, a sum obtained by adding up two second parameters from among the one or more second parameters, the two second parameters corresponding to the two first nodes;
(iii) generating a fourth parameter by right-shifting the third parameter by N bits; and
(iv) inverse-quantizing a quantized value of the second node using the fourth parameter, and
each parameter of the one or more first parameters, the one or more second parameters, the third parameter, and the fourth parameter is expressed by a bit sequence.

6. The three-dimensional data decoding method according to claim 5, wherein
the first parameter and the fourth parameter are each differences from a reference parameter, and
in the inverse-quantizing of the quantized value of the second node, a fifth parameter obtained by adding the reference parameter to the fourth parameter is used.

7. The three-dimensional data decoding method according to claim 5, wherein N is 4.

8. The three-dimensional data decoding method according to claim 5, wherein
each of the items of attribute information is classified into any one of the one or more groups, according to a three-dimensional space to which the three-dimensional point having the item of attribute information belongs.

9. A three-dimensional data encoding device comprising:
a processor; and
memory, wherein
using the memory, the processor:
calculates a coefficient value of each of nodes included in a layered structure by generating the layered structure in which each of items of attribute information of three-dimensional points included in point cloud data is hierarchically divided into a first component and a second component; and
quantizes, for each of the nodes, the coefficient value of the node using one or more first parameters for one or more groups to which one or more items of attribute information used in the calculating of the coefficient value belong, to generate quantized values,
at least one item of attribute information among the items of attribute belongs to any one of the one or more groups,
in the calculating, the processor calculates a second coefficient value of a second node of a second layer which is one layer higher than a first layer of the layered structure, using two first coefficient values of two first nodes belonging to the first layer,
in the quantizing, the processor:
(i) generates one or more second parameters by left-shifting the one or more first parameters by N bits, N being a natural number;
(ii) generates a third parameter by right-shifting, by one bit, a sum obtained by adding up two second parameters from among the one or more second parameters, the two second parameters corresponding to the two first nodes;
(iii) generates a fourth parameter by right-shifting the third parameter by N bits; and
(iv) quantizes the second coefficient value using the fourth parameter, and
each parameter of the one or more first parameters, the one or more second parameters, the third parameter, and the fourth parameter is expressed by a bit sequence.

10. A three-dimensional data decoding device comprising:
a processor; and
memory, wherein
using the memory, the processor:
calculates, using quantized values and one or more first parameters, coefficient values by inverse-quantizing each of the quantized values; and
calculates, from the coefficient values, items of attribute information of three-dimensional points included in point cloud data,
the one or more first parameters are one or more parameters for one or more groups to which one or more items of attribute information belong, the one or more items of attribute information being used in the calculating of a coefficient value to which a corresponding one of the quantized values corresponds,
at least one item of attribute information among the items of attribute information belongs to any one of the one or more groups,
the coefficient values are calculated corresponding to nodes included to a layered structure,
the layered structure is a structure in which each of the items of attribute information is hierarchically divided into a first component and a second component,
two first coefficient values of two first nodes belonging to a first layer of the layered structure are used in calculating a second coefficient value of a second node of a second layer which is one layer higher than the first layer, in the inverse-quantizing, the processor:
- (i) generates one or more second parameters by left-shifting the one or more first parameters by N bits, N being a natural number;
- (ii) generates a third parameter by right-shifting, by one bit, a sum obtained by adding up two second parameters from among the one or more second parameters, the two second parameters corresponding to the two first nodes;
- (iii) generates a fourth parameter by right-shifting the third parameter by N bits; and
- (iv) inverse-quantizes a quantized value of the second node using the fourth parameter, and each parameter of the one or more first parameters, the one or more second parameters, the third parameter, and the fourth parameter is expressed by a bit sequence.

\* \* \* \* \*